(12) United States Patent
Sergyeyenko et al.

(10) Patent No.: US 10,524,592 B2
(45) Date of Patent: Jan. 7, 2020

(54) PICTURE HANGING DEVICE

(71) Applicant: Black & Decker Inc., New Britain, CT (US)

(72) Inventors: Oleksiy P. Sergyeyenko, Baldwin, MD (US); Tyler M. Knight, Ellicott City, MD (US); Christopher Murray, Philadelphia, PA (US); Daniel Massam, Langhorne, PA (US); David A. Miller, Baltimore, MD (US); Ashok S. Baskar, Lutherville, MD (US)

(73) Assignee: Black & Decker Inc., New Britain, CT (US)

( * ) Notice: Subject to any disclaimer, the term of this patent is extended or adjusted under 35 U.S.C. 154(b) by 227 days.

(21) Appl. No.: 15/357,016

(22) Filed: Nov. 21, 2016

(65) Prior Publication Data

US 2017/0150834 A1    Jun. 1, 2017

Related U.S. Application Data

(60) Provisional application No. 62/320,924, filed on Apr. 11, 2016, provisional application No. 62/299,261, filed on Feb. 24, 2016, provisional application No. 62/261,816, filed on Dec. 1, 2015.

(51) Int. Cl.
| | |
|---|---|
| *A47G 1/24* | (2006.01) |
| *G01C 9/26* | (2006.01) |
| *B25H 7/04* | (2006.01) |
| *A47G 1/20* | (2006.01) |
| *A47G 1/16* | (2006.01) |

(52) U.S. Cl.
CPC .................. *A47G 1/24* (2013.01); *B25H 7/04* (2013.01); *A47G 1/205* (2013.01); *A47G 2001/1693* (2013.01); *G01C 9/26* (2013.01)

(58) Field of Classification Search
CPC ... A47G 1/205; A47G 1/24; A47G 2001/1693
USPC .................................................... 33/418, 452
See application file for complete search history.

(56) References Cited

U.S. PATENT DOCUMENTS

| | | | |
|---|---|---|---|
| 366,812 | A | 7/1887 | Brinkerhoff |
| 2,249,631 | A | 7/1941 | Kershenstein |
| 3,822,848 | A | 7/1974 | Hopkins |
| 4,002,366 | A | 1/1977 | Hammes |
| 4,026,510 | A | 5/1977 | Holmes |
| 4,192,066 | A | 3/1980 | Tucker |

(Continued)

FOREIGN PATENT DOCUMENTS

| | | |
|---|---|---|
| GB | 3B2213717 | 12/1987 |
| WO | WO0074900 | 12/2000 |

*Primary Examiner* — Yaritza Guadalupe-McCall
(74) *Attorney, Agent, or Firm* — Stephen R. Valancius

(57) ABSTRACT

Devices, systems and methods for hanging one or more objects, such as frames, on a surface. A marking device for marking a surface for hanging one or more objects. The marking device can have a main body portion having first and second arms pivotably attached thereto. The first and second arms, as well as the main body, can each have a marker to mark a target surface. The marking device can optionally have a level indicator and the first and second arms can have markers which can slide along a ruled measure for convenient positioning of marks on the target surface. Optionally, the markers can have biased, retractable, or sheathed marker pins.

15 Claims, 108 Drawing Sheets

(56) References Cited

U.S. PATENT DOCUMENTS

| | | | |
|---|---|---|---|
| 4,241,510 A * | 12/1980 | Radecki | A47G 1/205 33/451 |
| 4,637,583 A | 1/1987 | Babitz | |
| 4,837,942 A | 6/1989 | Watts | |
| 4,893,776 A | 1/1990 | Floyd | |
| 4,944,094 A | 7/1990 | Depiano et al. | |
| 4,976,409 A | 12/1990 | Hansen | |
| 5,103,573 A | 4/1992 | Ehling et al. | |
| 5,103,574 A | 4/1992 | Levy | |
| 5,112,022 A | 5/1992 | Cardas | |
| 5,129,154 A * | 7/1992 | Aydelott | A47G 1/205 248/542 |
| 5,155,917 A | 10/1992 | Townsend et al. | |
| 5,180,135 A | 1/1993 | Hindall | |
| D344,010 S | 2/1994 | Brazis | |
| 5,398,906 A | 3/1995 | Aydelott | |
| 5,471,760 A | 12/1995 | Arris | |
| 5,509,213 A * | 4/1996 | Kelly | A47G 1/205 33/451 |
| D393,412 S | 4/1998 | Bries et al. | |
| 5,829,152 A | 11/1998 | Potter et al. | |
| 5,867,917 A | 2/1999 | Karon | |
| 6,021,572 A | 2/2000 | Smith | |
| 6,026,584 A | 2/2000 | Wegman | |
| 6,029,362 A | 2/2000 | Miodragovic | |
| 6,032,378 A | 3/2000 | Null | |
| 6,049,991 A | 4/2000 | Gruenberg et al. | |
| 6,122,828 A | 9/2000 | Sterino, Jr. | |
| 6,138,369 A | 10/2000 | Mushin | |
| 6,178,655 B1 | 1/2001 | Potter et al. | |
| 6,185,831 B1 | 2/2001 | Pluciennik | |
| 6,205,669 B1 | 3/2001 | Sollars et al. | |
| 6,421,928 B1 * | 7/2002 | Miller | A47G 1/205 33/520 |
| 6,473,983 B1 | 11/2002 | Gier | |
| 6,618,955 B2 | 9/2003 | Rice | |
| D480,293 S | 10/2003 | Ismail | |
| 6,629,680 B2 | 10/2003 | Weck et al. | |
| 6,636,648 B2 | 10/2003 | Loui et al. | |
| 6,663,075 B2 | 12/2003 | Zuller | |
| 6,739,065 B2 | 5/2004 | Hofmeister et al. | |
| 6,758,455 B2 | 7/2004 | Weck et al. | |
| 6,883,244 B2 | 4/2005 | Rimback | |
| 6,898,862 B1 * | 5/2005 | Oberst | A47G 1/205 33/574 |
| 6,912,293 B1 | 6/2005 | Korobkin | |
| 6,952,887 B2 | 10/2005 | Muchnik | |
| 6,971,184 B2 | 12/2005 | Prevost | |
| 6,973,733 B2 | 12/2005 | Levine | |
| 6,978,551 B2 | 12/2005 | Krake et al. | |
| 7,155,840 B1 | 1/2007 | Carbonaro | |
| 7,159,329 B2 | 1/2007 | Dolenz et al. | |
| 7,210,243 B2 | 5/2007 | Schmidt et | |
| 7,234,245 B2 | 6/2007 | Tatum | |
| 7,293,925 B1 | 11/2007 | Sanseviero | |
| 7,421,796 B1 | 9/2008 | De-Angels-Morris | |
| 7,457,730 B2 | 11/2008 | Degnan | |
| 7,503,126 B2 | 3/2009 | Robins | |
| 7,525,536 B2 | 4/2009 | Kobayashi | |
| 7,661,959 B2 | 2/2010 | Green et al. | |
| 7,665,705 B2 | 2/2010 | Wong | |
| 7,720,276 B1 | 5/2010 | Korobkin | |
| 7,797,853 B2 | 9/2010 | Compton | |
| 7,877,696 B2 | 1/2011 | Telek et al. | |
| 7,882,442 B2 | 2/2011 | Lawther et al. | |
| 7,954,782 B2 | 6/2011 | Harralson et al. | |
| RE42,649 E | 8/2011 | Schultz | |
| 8,333,026 B2 | 12/2012 | Southard | |
| D674,262 S | 1/2013 | Dressel et al. | |
| 8,369,610 B1 | 2/2013 | Korobkin | |
| RE44,504 E | 9/2013 | Schultz | |
| 8,539,691 B2 | 9/2013 | Daniel | |
| 8,542,911 B1 | 9/2013 | Korobkin | |
| 8,705,893 B1 | 4/2014 | Zhang et al. | |
| 8,739,423 B1 | 6/2014 | Cortum et al. | |
| 8,782,531 B2 | 7/2014 | Lawther et al. | |
| 8,818,080 B1 | 8/2014 | Korobkin | |
| D715,624 S | 10/2014 | Thompson et al. | |
| 8,864,095 B1 * | 10/2014 | Marks | A47G 1/16 248/323 |
| 8,903,516 B2 | 12/2014 | Trzcinski et al. | |
| 9,013,507 B2 | 4/2015 | Plante et al. | |
| 9,032,637 B2 * | 5/2015 | Propp | B25H 7/04 33/613 |
| 9,237,819 B1 * | 1/2016 | Marks | A47G 1/205 |
| 2002/0109064 A1 | 8/2002 | Zuller | |
| 2003/0229999 A1 * | 12/2003 | Rimback | A47G 1/205 33/613 |
| 2004/0177527 A1 * | 9/2004 | Prevost | A47G 1/205 33/613 |
| 2005/0193613 A1 | 9/2005 | Faltesek | |
| 2006/0214080 A1 | 9/2006 | de Keratry | |
| 2009/0313843 A1 * | 12/2009 | Compton | A47G 1/205 33/613 |
| 2010/0011602 A1 | 1/2010 | Houssian et al. | |
| 2012/0194555 A1 | 8/2012 | Byrnes | |
| 2013/0199068 A1 | 8/2013 | Southard | |
| 2013/0204584 A1 | 8/2013 | Jaquez-Vazquez et al. | |
| 2013/0215132 A1 | 8/2013 | Fong | |
| 2014/0063063 A1 | 3/2014 | Scott et al. | |
| 2014/0259718 A1 | 9/2014 | Mehra et al. | |
| 2015/0342374 A1 | 12/2015 | Greve | |
| 2017/0150834 A1 * | 6/2017 | Sergyeyenko | A47G 1/24 |

* cited by examiner

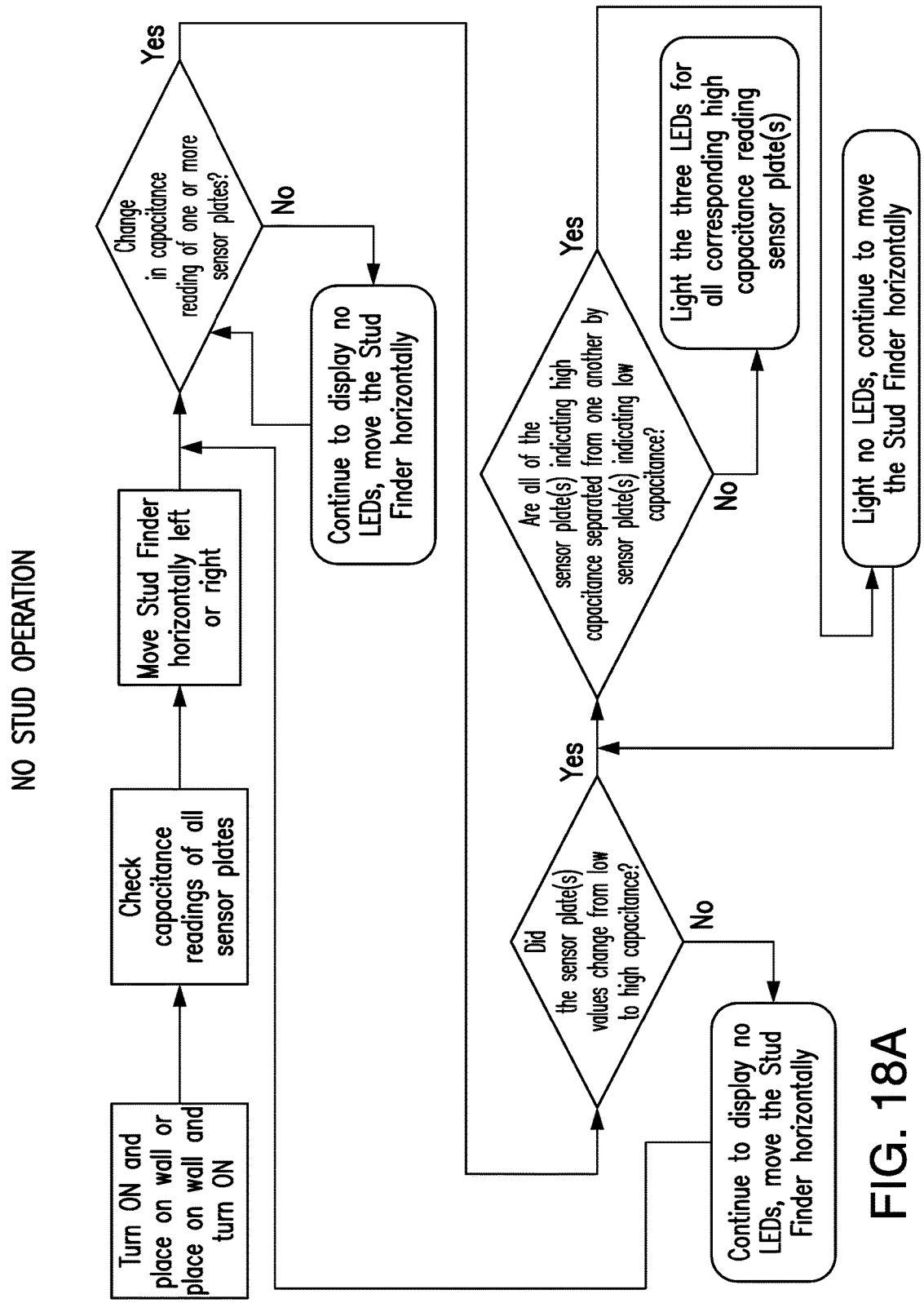

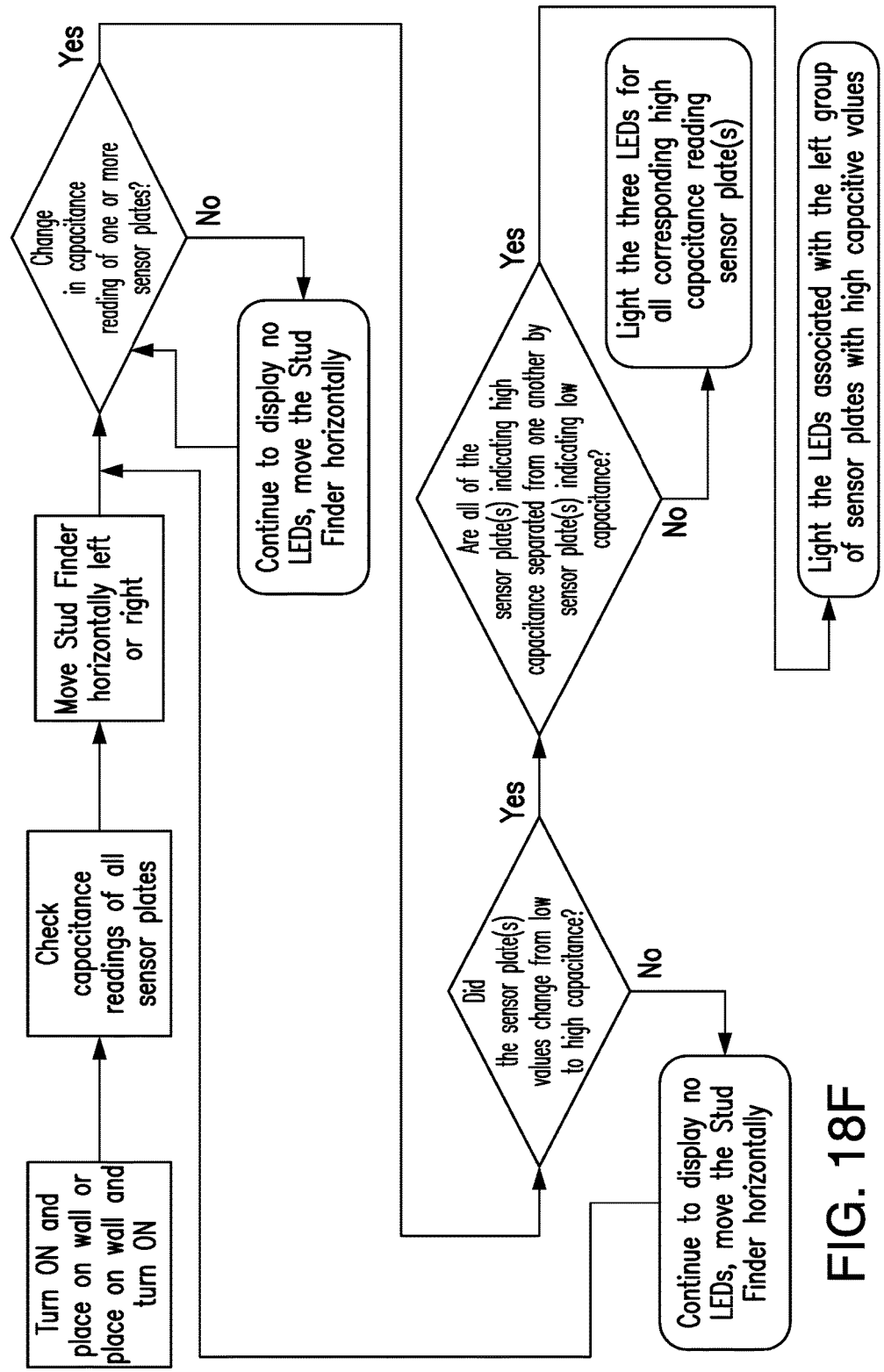

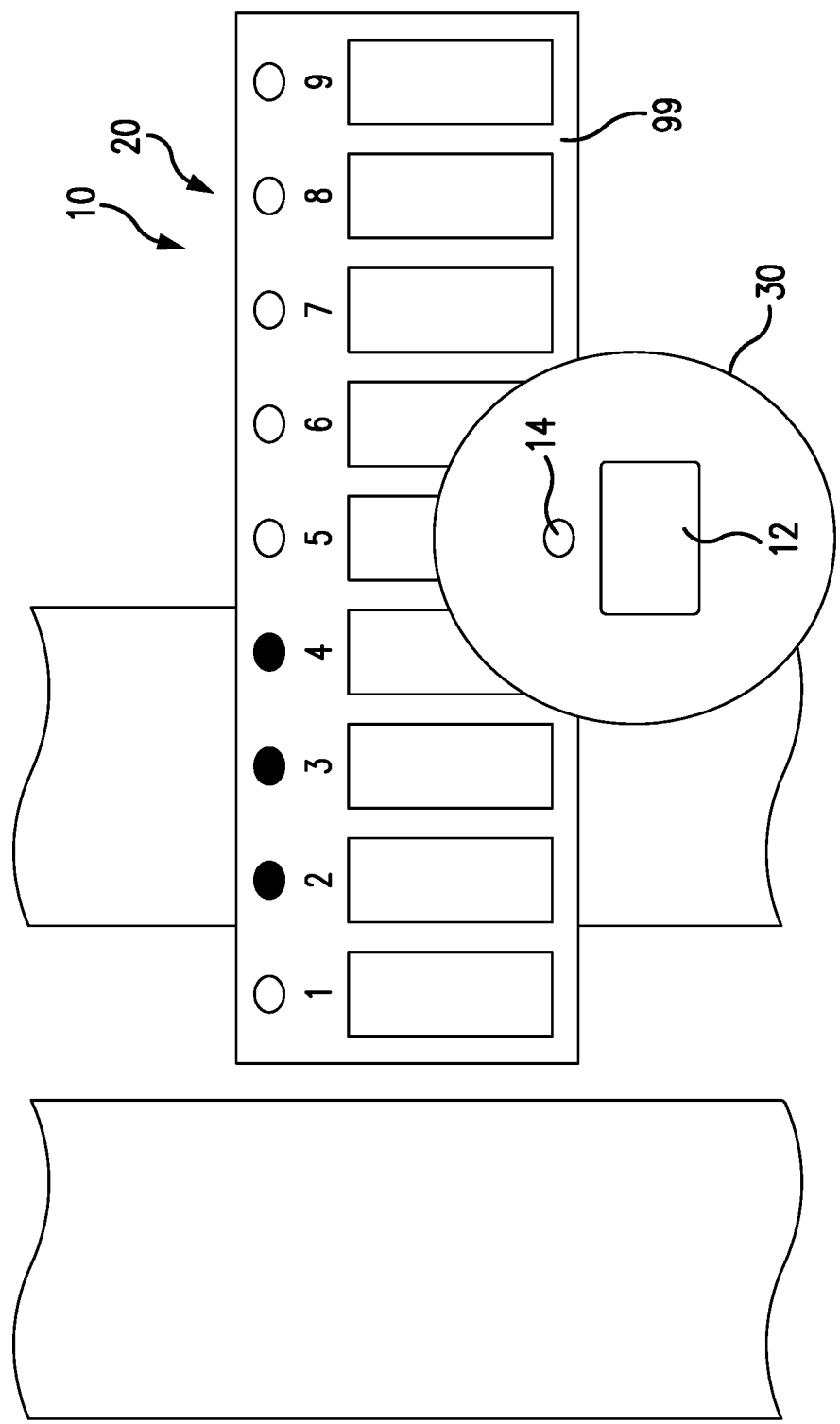
FIG. 18K1

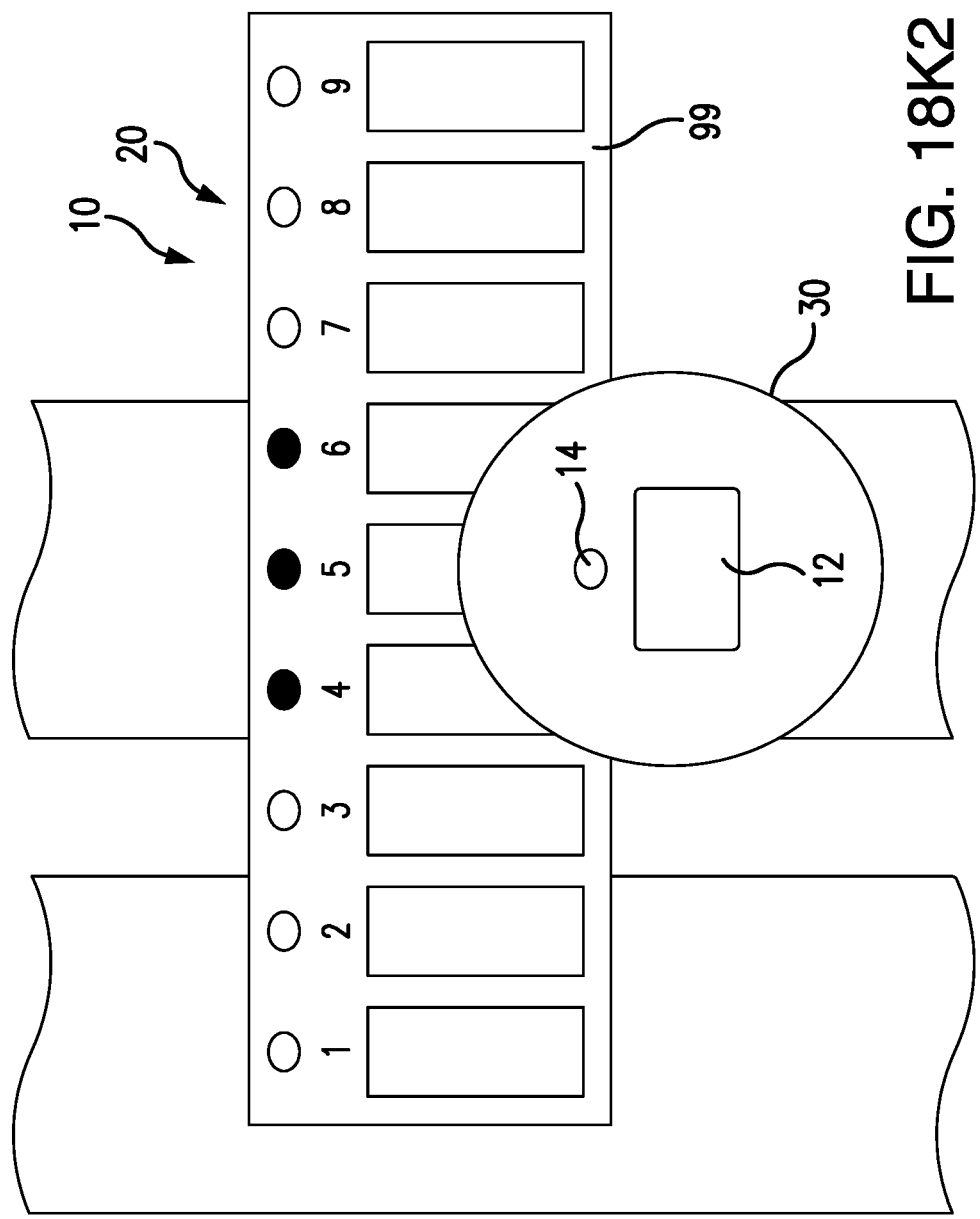

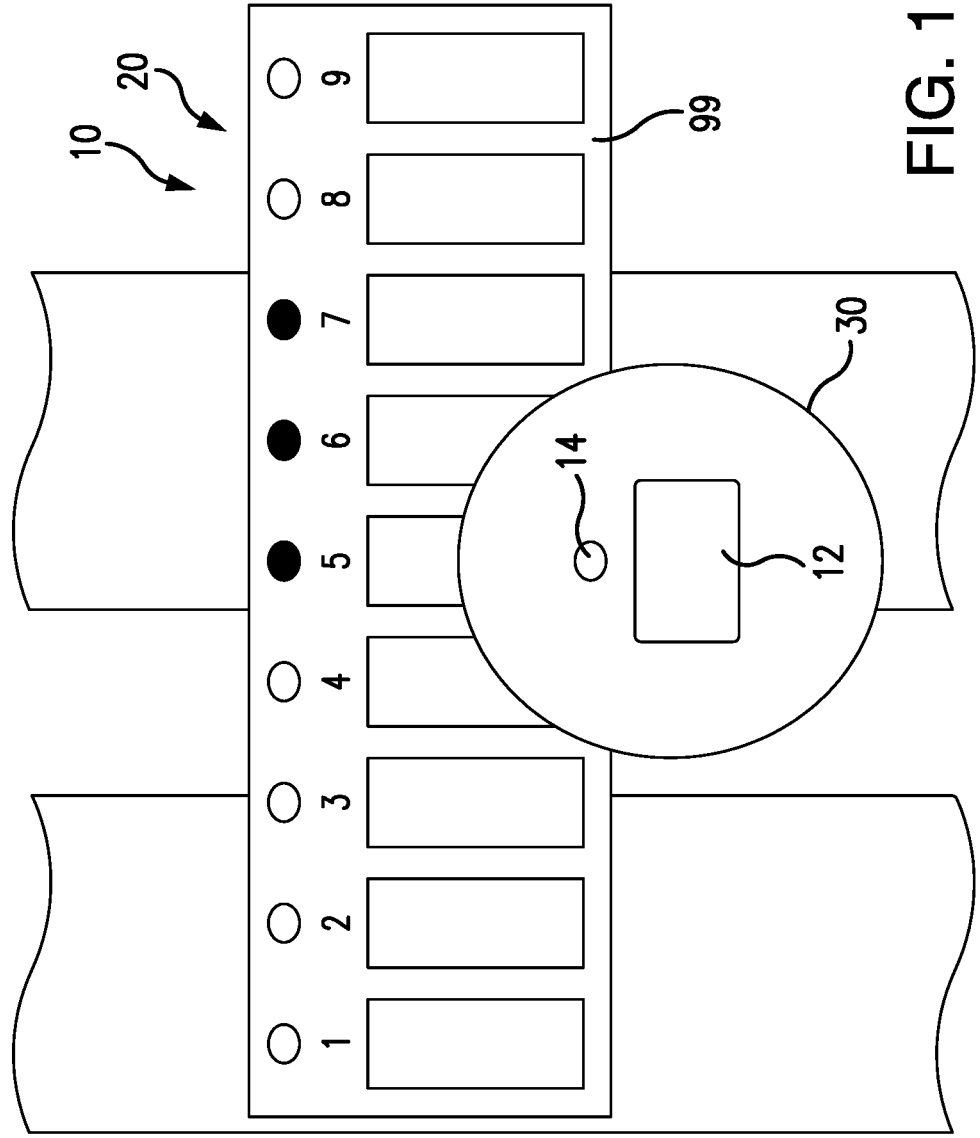
FIG. 18K3

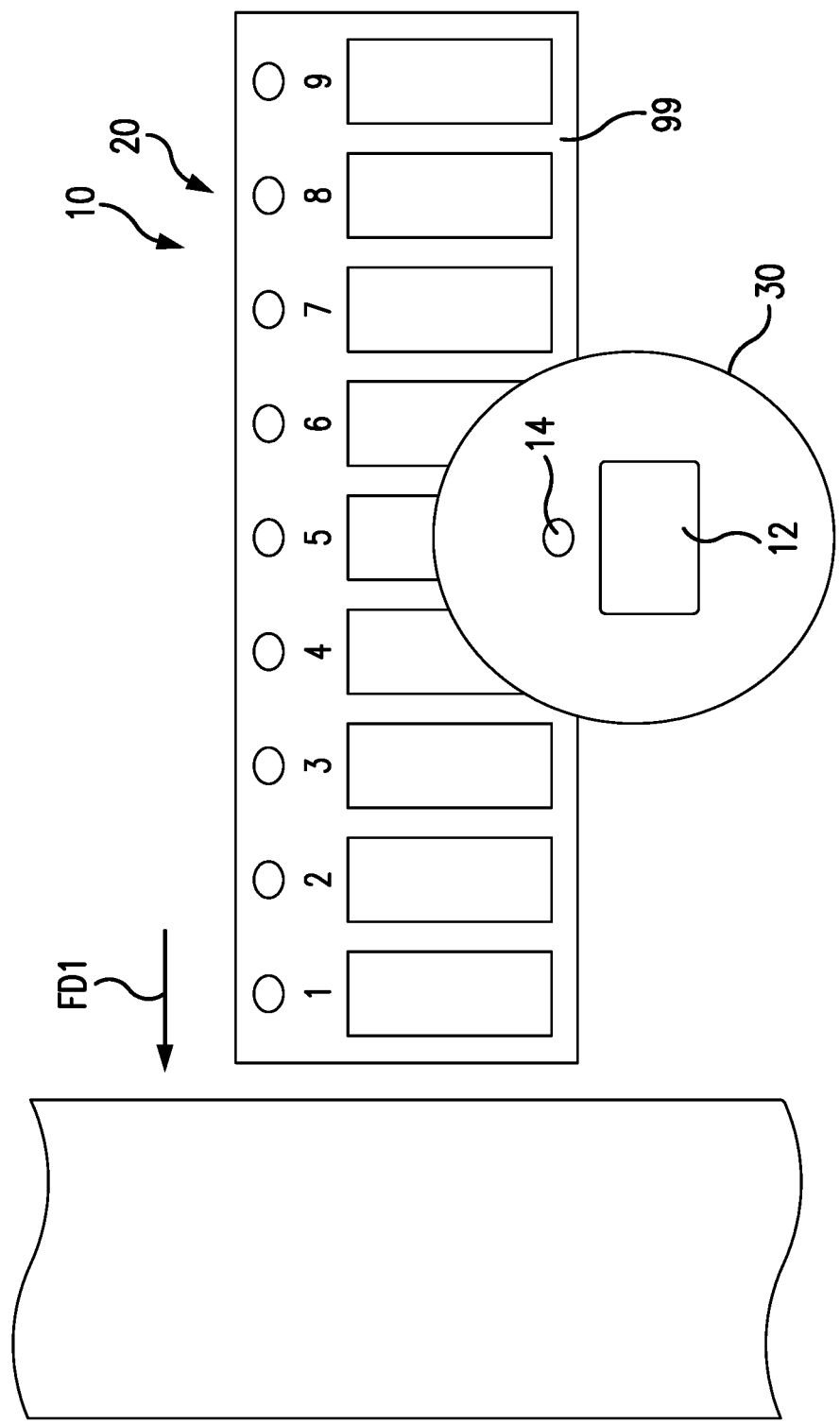

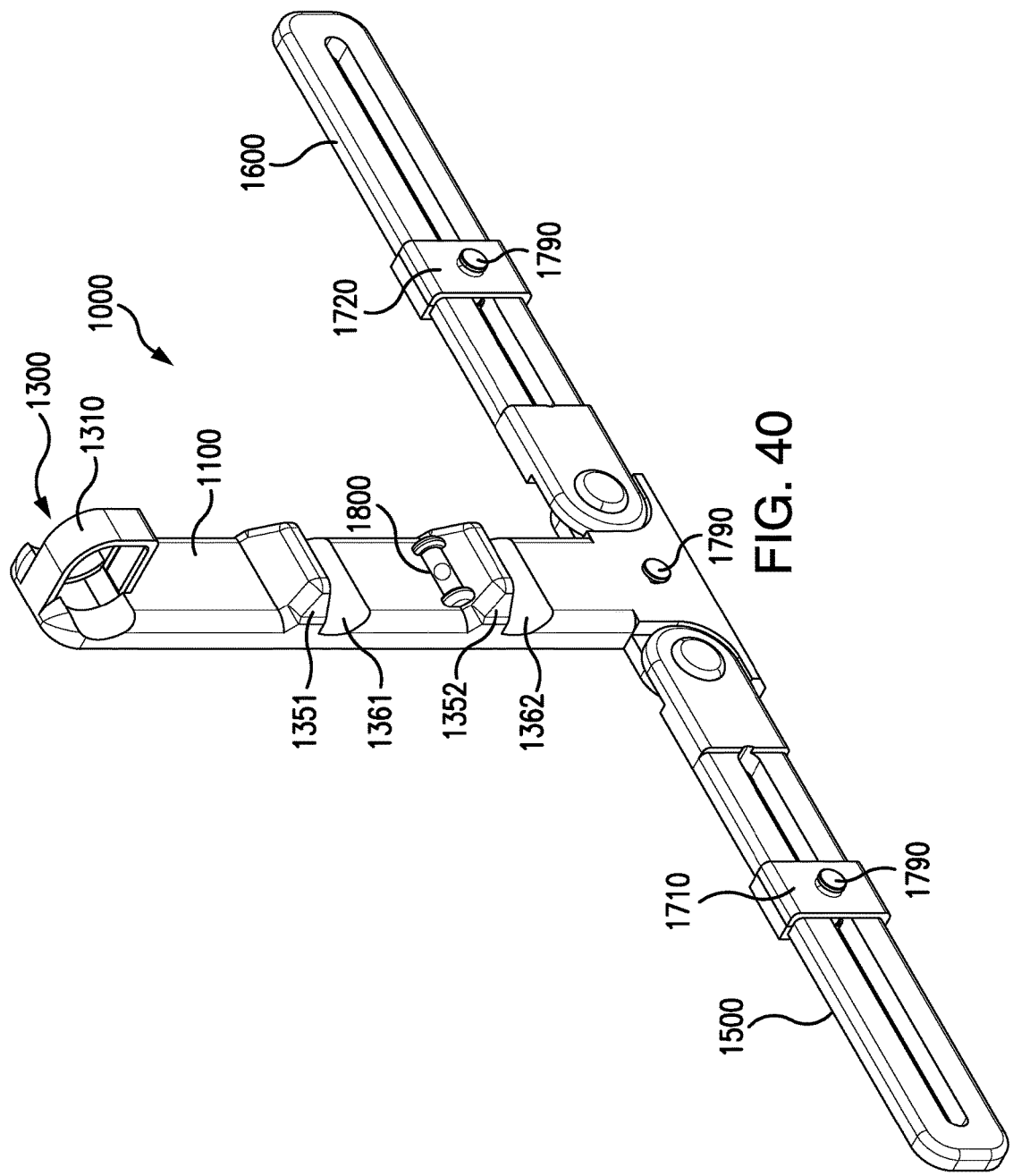

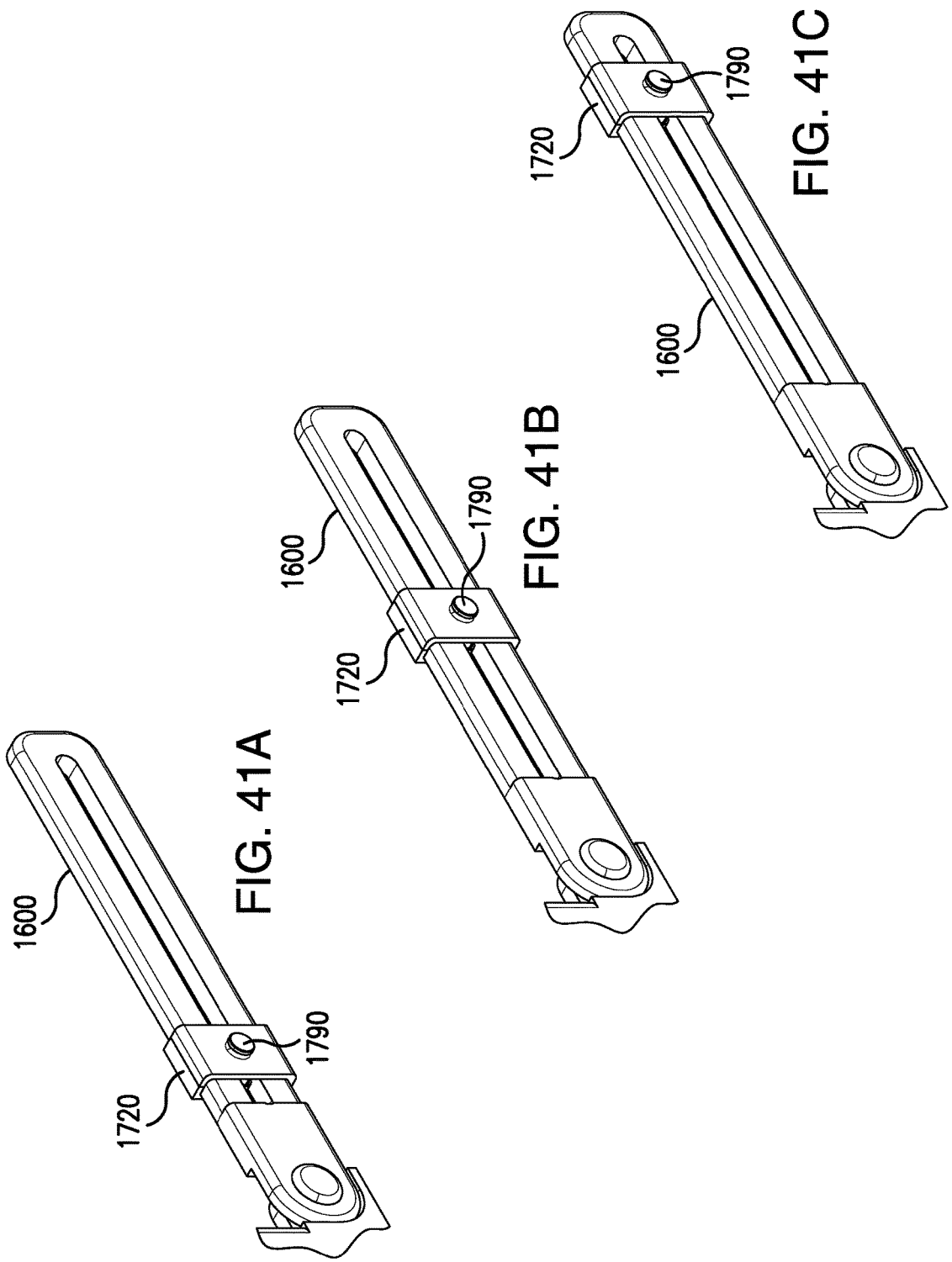

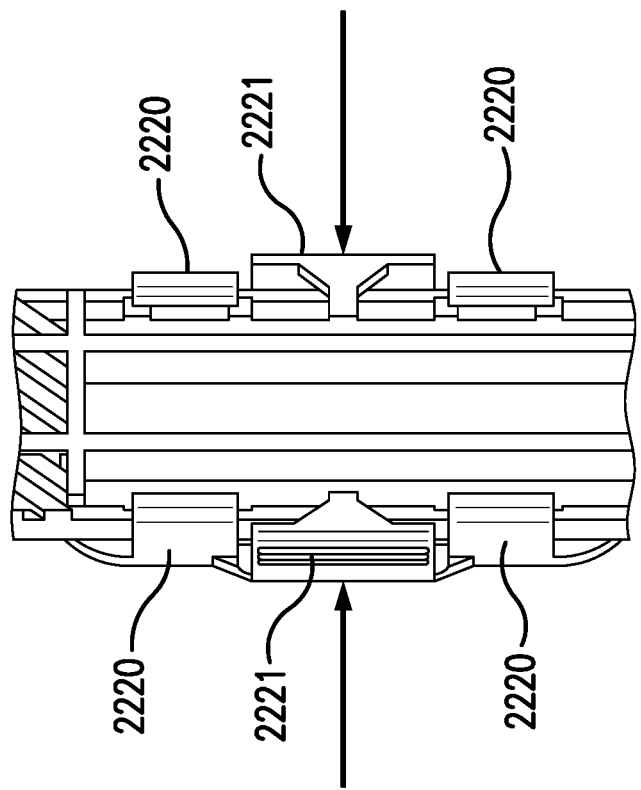
FIG. 46H2
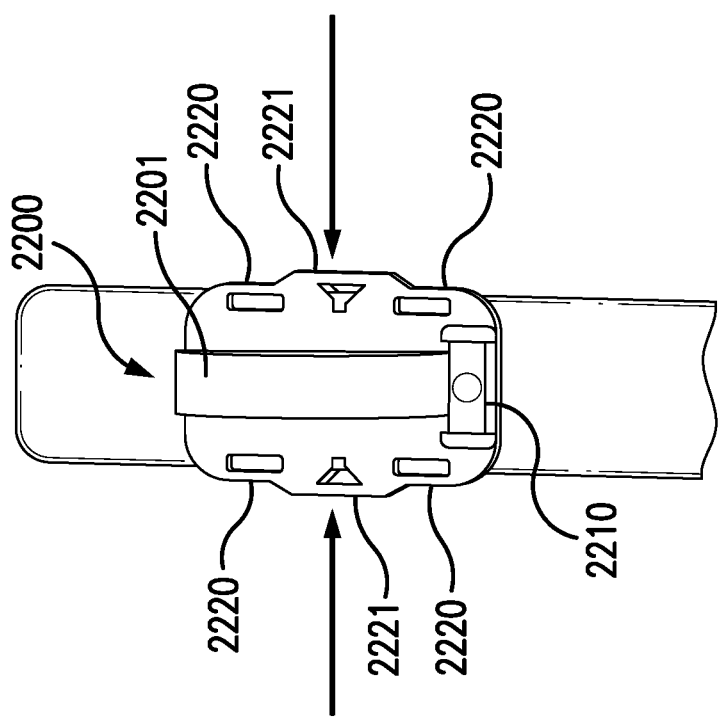
FIG. 46H1

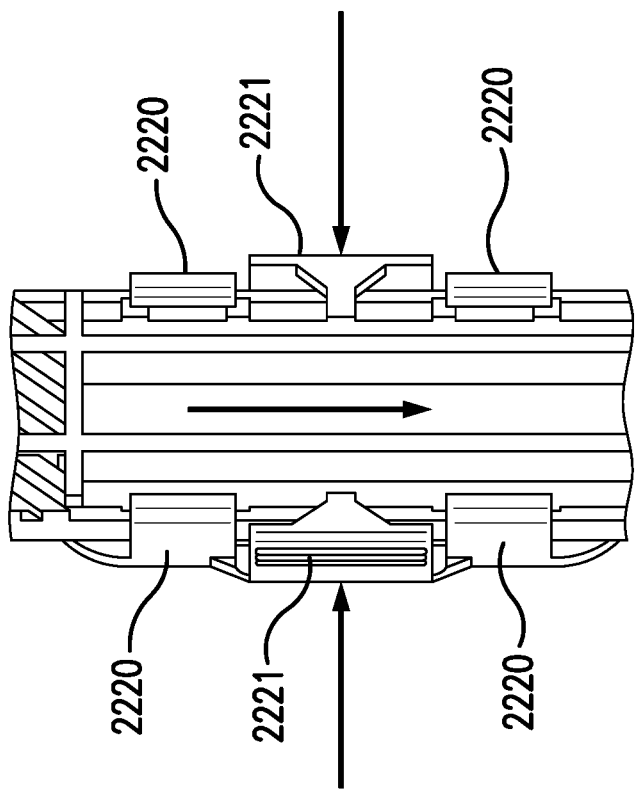
FIG. 46I2
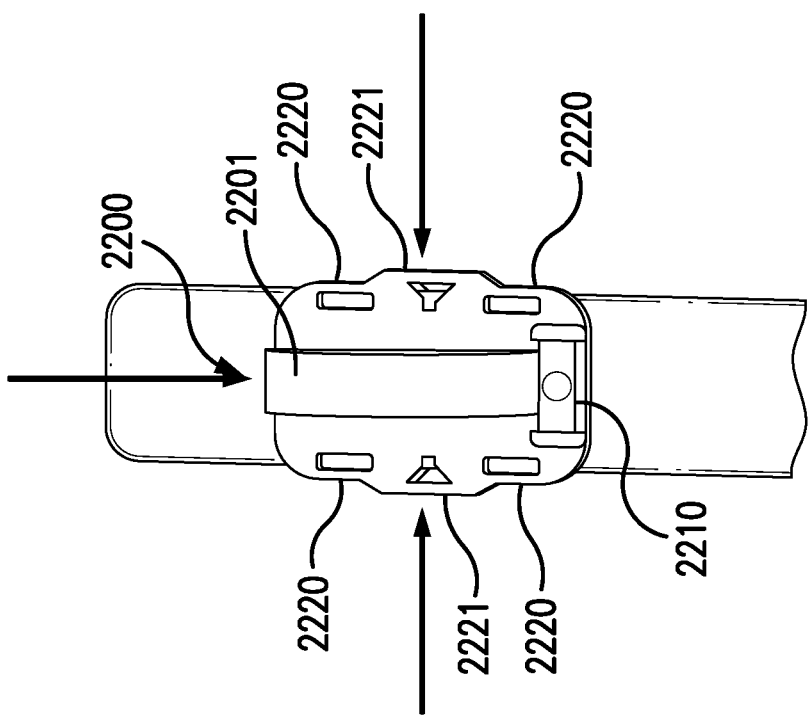
FIG. 46I1

4: 5" x 7" frames
4: 8" x 10" frames

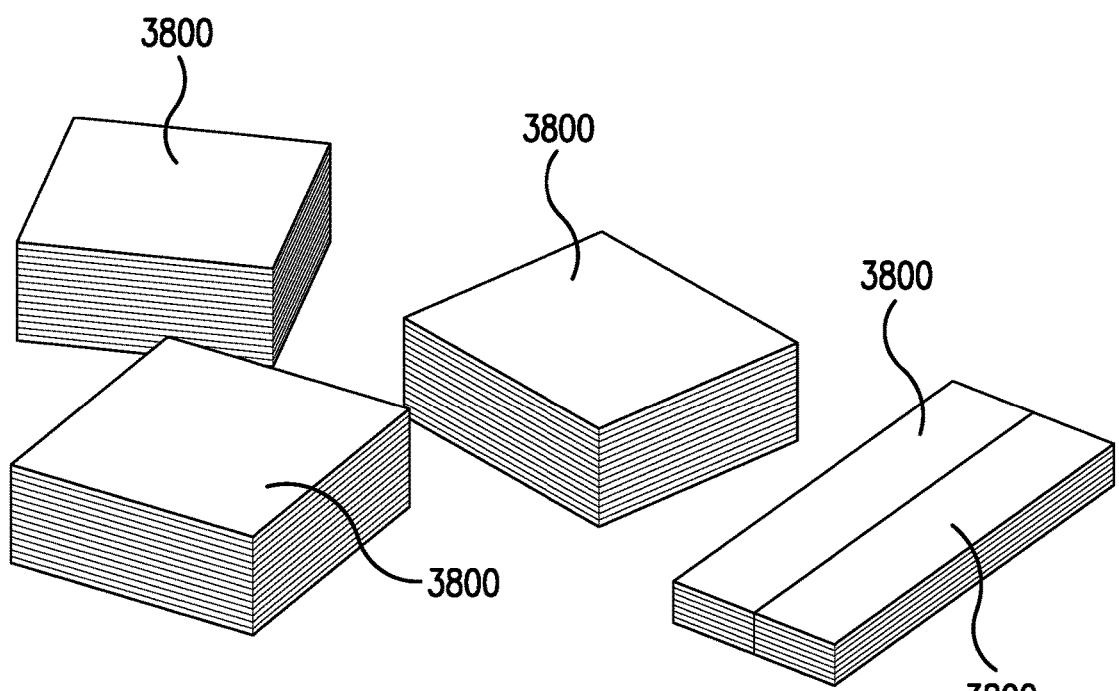
FIG. 60C1

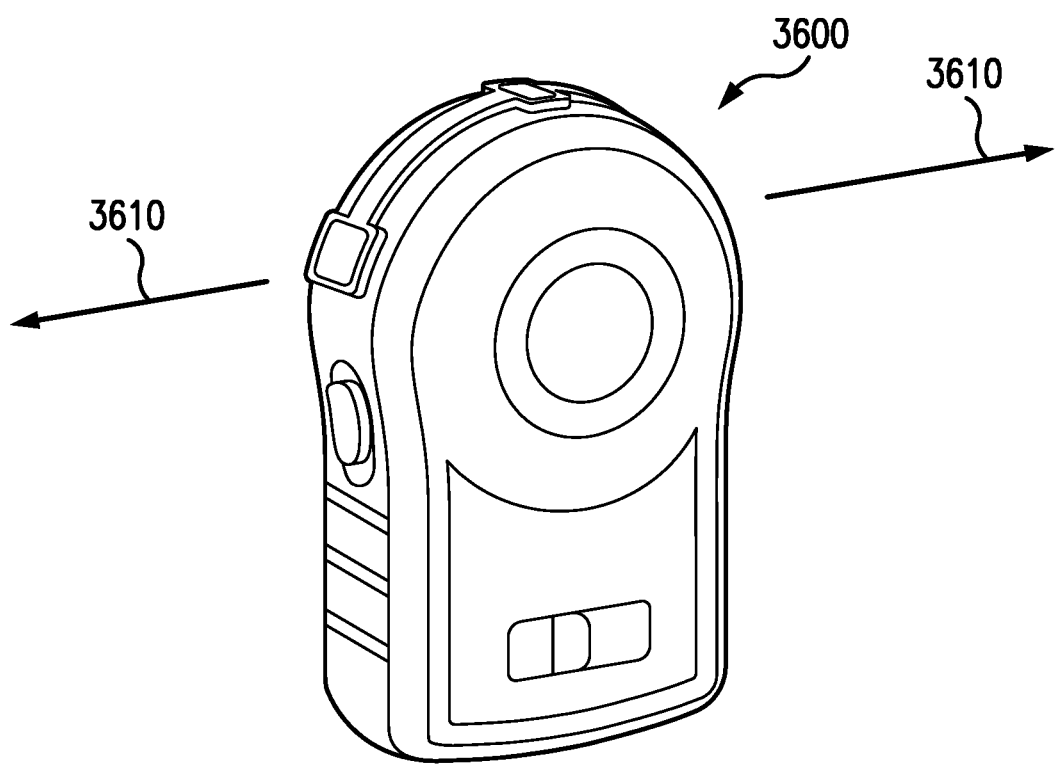
FIG. 60F1

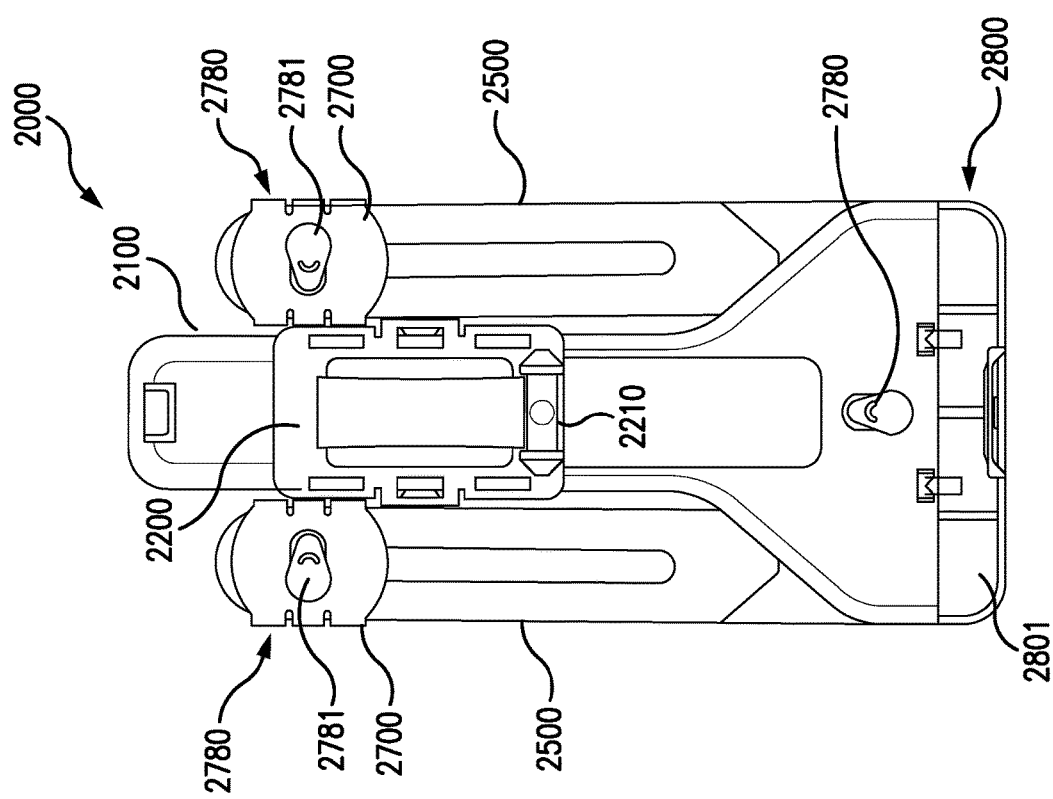

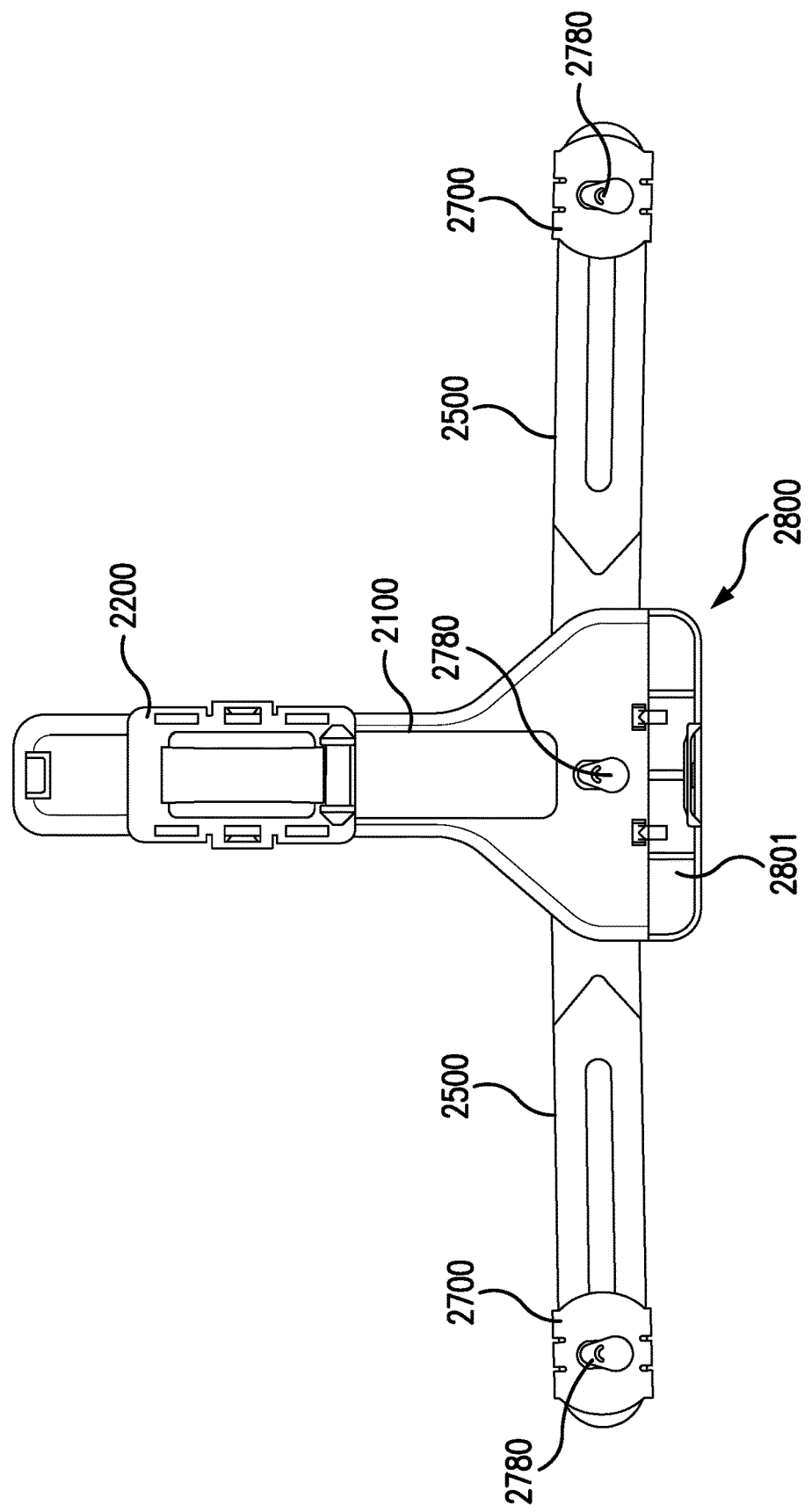

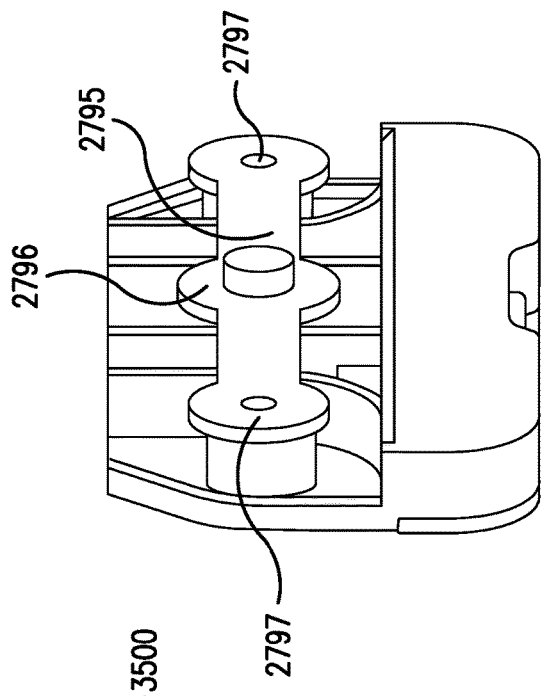
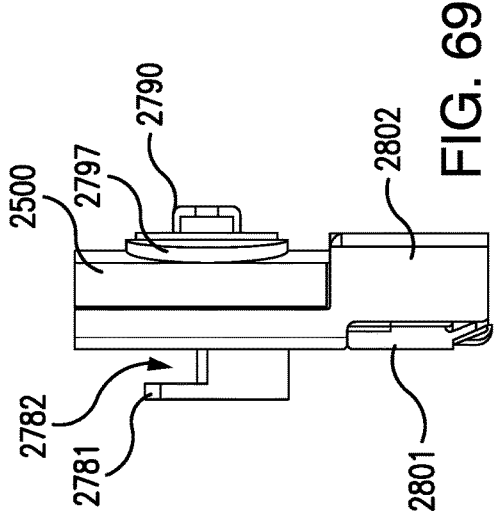
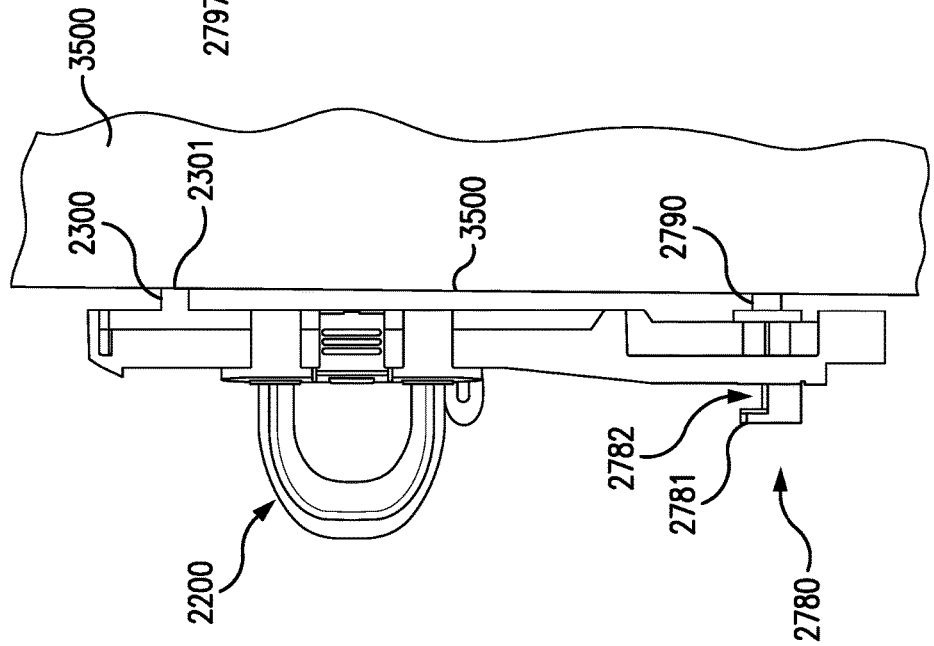

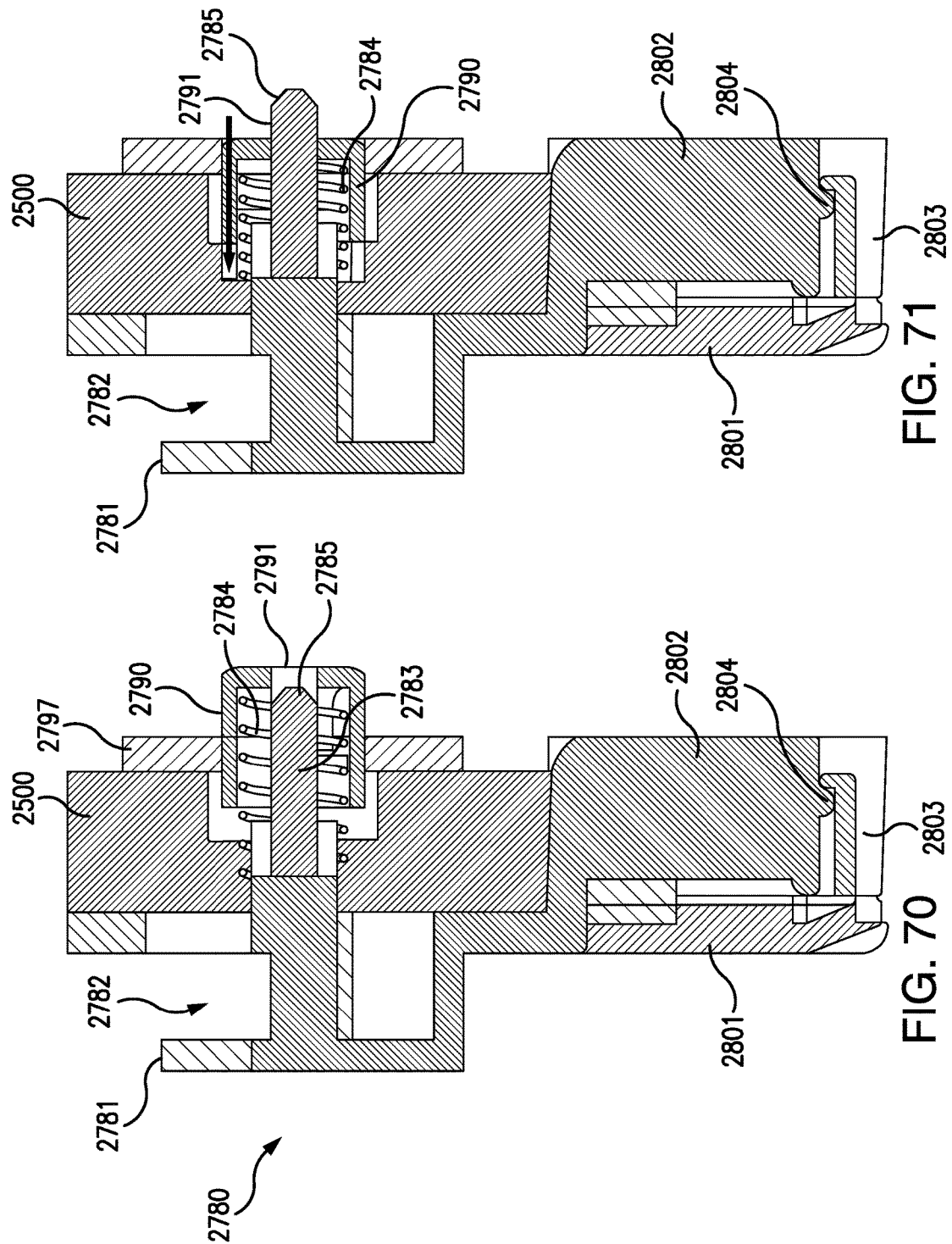

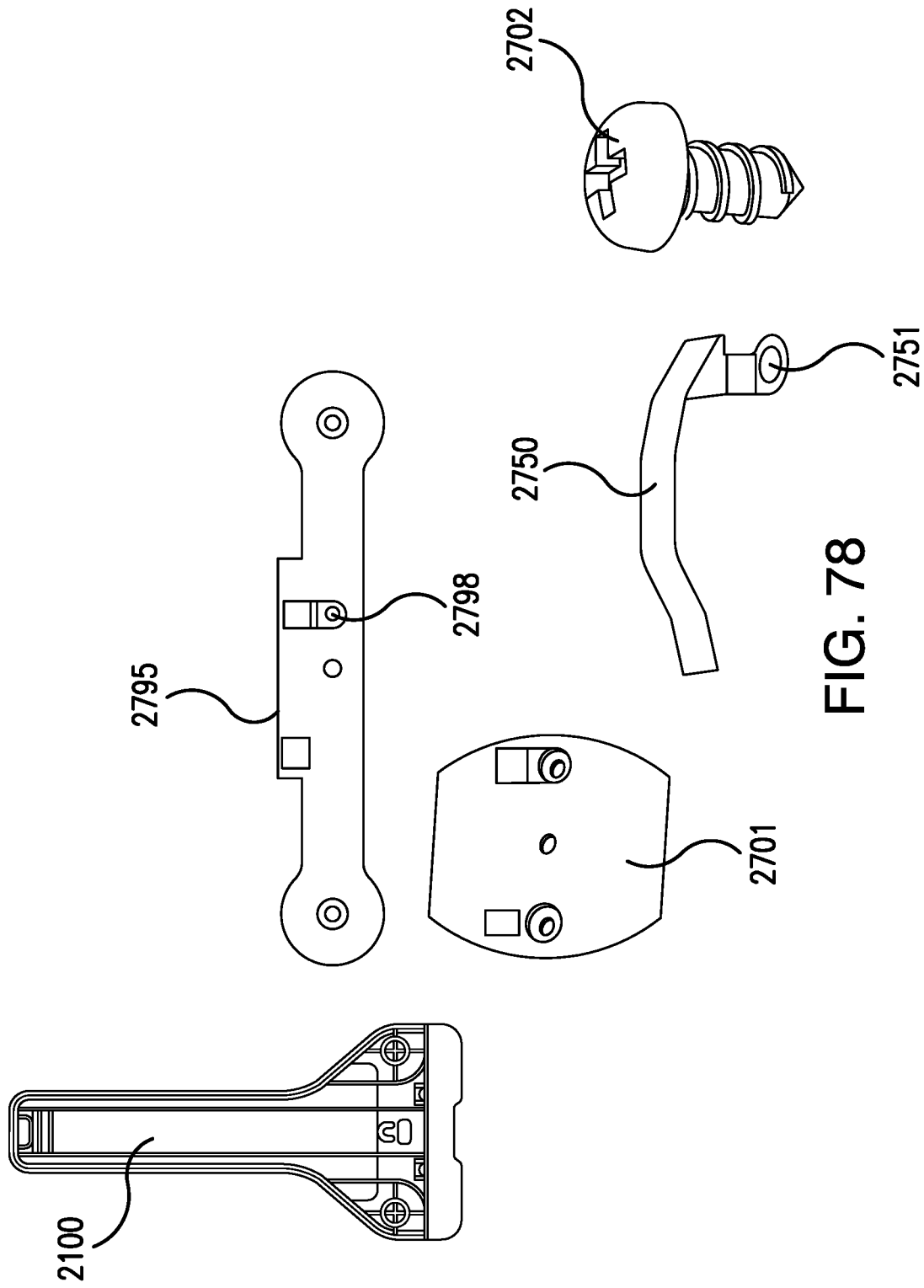

PICTURE HANGING DEVICE

CROSS-REFERENCE TO RELATED APPLICATIONS

This patent application claims benefit of the filing date of U.S. provisional patent application No. 62/320,924 entitled "Picture Hanging Device" filed on Apr. 11, 2016.

This patent application claims benefit of the filing date of U.S. provisional patent application No. 62/299,261 entitled "Picture Hanging Device" filed Feb. 24, 2016.

This patent application claims benefit of the filing date of U.S. provisional patent application No. 62/261,816 entitled "Intelligent Stud Finder" filed Dec. 1, 2015.

FIELD OF THE INVENTION

The invention relates to a stud finder, picture hanging device and picture hanging system.

INCORPORATION BY REFERENCE

This patent application incorporates by reference in its entirety U.S. provisional patent application No. 62/320,924 entitled "Picture Hanging Device" filed on Apr. 11, 2016.

This patent application incorporates by reference in its entirety U.S. provisional patent application No. 62/299,261 entitled "Picture Hanging Device" filed Feb. 24, 2016.

This patent application incorporates by reference in its entirety U.S. provisional patent application No. 62/261,816 entitled "Intelligent Stud Finder" filed Dec. 1, 2015.

U.S. Pat. No. 6,198,271 issued Mar. 6, 2001, entitled "Electronic Wall-Stud Sensor Display" to Heger et al. is incorporated by reference herein in its entirety.

U.S. Pat. No. 4,099,118 issued Jul. 4, 1978, entitled "Electronic Wall Stud Sensor" to Franklin et al. is incorporated by reference herein in its entirety.

U.S. Pat. No. 4,853,617 issued Aug. 1, 1989, entitled "Apparatus Having Capacitive Sensor And Metal Detector For Detecting Objects Concealed Behind Surfaces" to Douglas et al. is incorporated by reference herein in its entirety.

BACKGROUND OF THE INVENTION

Hanging one or multiple pictures or other objects on a surface is a complex process which can require find studs behind a wall or other surface, difficulties in hanging and leveling objects such as frames, as well as complex mathematics to determine the positioning and configurations of the art to be hung. There is a long-felt need for improved equipment and methods for hanging objects on surfaces.

SUMMARY OF THE INVENTION

The several and varied embodiments disclosed herein encompass devices, systems and methods for hanging one or more pictures on a surface. In an embodiment, a marking device can have one or more pivotable arms which can be used to mark a surface for hanging pictures by one, or more, hangers projecting from the surface. A picture hanging system can have an intelligent device which can utilize images data of a hanging surface, or hanging environment, and image data of one or more objects to be hung on a hanging surface to generate one or more possible configurations for hanging the one or more objects on the hanging surface. In an embodiment, an intelligent stud finder can have a plurality of capacitive plates and a dynamic user interface which intelligently communicates whether one or more studs is present behind a surface and how such studs are configured.

In an embodiment, the marking device, can have a main body portion having a target side configured to be placed against a target surface and a user side configured to face a user, as well as a first arm pivotably connected to the main body portion in which the first arm can include a first marker configured to mark, or selectively mark, the target surface, and a second arm pivotably connected to the main body portion in which the second arm can include a second marker configured to mark, or selectively mark, the target surface. Optionally, the main body portion further can have a third marker configured to mark, or selectively mark, the target surface. In an embodiment, the main body portion, or other portion of the marking device, can have and least one level indicator. Optionally, the level indicator can have a level bubble vial.

In an embodiment, the main body portion can have a sliding handle. The sliding handle can be selectively movable and lockable along a length of the main body portion.

In an embodiment, the marking device can also have at least one biasing member which biases the first marker and the second marker away from the target surface and wherein the first and second marker can each mark, or selectively mark, the target surface when each is respectively pressed toward the target surface against the force of the at least one biasing member. In an embodiment, the marking device can have at least one biasing member which has a first arm biasing member located on the first arm, and a second arm biasing member located on the second arm, as well as a main body biasing member located on the main body portion.

Optionally, the first marker can be disposed on a first slide member which is slidable along the first arm and the second marker can be disposed on a second slide member which is slidable along the second arm.

In an embodiment, the marking device can have a first hook which can be disposed on the user side and which can be adjacent to the first marker. The marking device can also have a second hook which can be disposed on the user side and which can be adjacent to the second marker.

In an embodiment, the marking device can have a main body portion having a target side configured to be placed against a target surface and a user side configured to face a user, and a first arm connected to the main body portion, the first arm including a first slide member which is slidable along the first arm, and a second arm connected to the main body portion and including a second slide member which is slidable along the second arm. The first marker can be disposed on the first slide member and configured to selectively mark the target surface; the second marker can be disposed on the second slide member and configured to selectively mark the target surface. In an embodiment, the first marker is disposed on a first slide member which can be slidable along the first arm and the second marker can be disposed on a second slide member which can be slidable along the second arm. A first hook can be disposed on the first slide member at a first location corresponding to the first marker, and a second hook can be disposed on the second slide member at a second location corresponding to the second marker. Optionally, the marking device can have at least one level indicator. In an embodiment, the first marker can be disposed on a first slide member which can be slidable along the first arm and the second marker can be disposed on a second slide member which can be slidable along the second arm.

In an embodiment, the marking device can have a sliding handle selectively movable and lockable along a length of the main body portion. The marking device can optionally also have at least one biasing member which can bias the first marker and the second marker away from the target surface.

In an embodiment, the marking device of claim can have the main body portion which has a sliding handle which is selectively movable and lockable along a length of the main body portion.

In an embodiment, the marking device, can have a body having a target side configured to be placed against a target surface and a user side configured to face a user, a first marker disposed on the target side and configured to selectively mark the target surface, and a first biasing member on the target side of the body. The first biasing member on the target side of the body can bias the body away from the target surface such that when the marking device is placed against the target surface, the first marker is biased away from marking the target surface by the first biasing member and such that a user can press the body towards the target surface against the first biasing member so that the first marker marks the target surface. Optionally, the first biasing member can be a spring, such as a leaf spring.

In an embodiment, the body of the marking device can have a main body portion, a first arm pivotably connected to the main body portion and a second arm pivotably connected to the main body portion. The first biasing member and first marker can be disposed on the main body portion. The second biasing member and a second marker can be disposed on the first arm and a third biasing member and third marker can be disposed on the second arm.

In an embodiment, the marking device, can have a main body portion having a target side which can be reversibly placed against a target surface and a user side which can face a user, a first arm pivotably connected to the main body portion the first arm bearing a first marking member adapted for a user to optionally actuate to mark a first arm marking on the target surface; and a second arm pivotably connected to the main body portion the second arm bearing a second marking member adapted for a user to optionally actuate to mark a second arm marking on the target surface.

The main body portion can also have a main marking member adapted for a user to optionally actuate to mark a main marking on the target surface.

Optionally, the main body portion can have a plurality of holding members and/or a holding loop and/or a first holding projection, or a combination thereof. For nonlimiting example, the main body portion can have a first holding projection and a second holding projection. In another example, the main body portion can have a first holding projection, a second holding projection and a holding loop. Optionally, the main body portion can have at least one bubble level, or one or more bubble levels.

In an embodiment, the first arm of the marking device can have a first marker slide bearing the first marking member and the second arm can have a second marker slide bearing the second marking member. In an embodiment, the first arm can have the first marking member which is separated from the second marking member by a marking distance of 18 inches or less.

In an embodiment, the marking device can also have a folded state in which the first arm is configured such that a first upper guide rail is adjacent to a first side of the main body. The first arm can be configured such that a second upper guide rail is adjacent to a second side of the main body. When in the folded state the main body can have a compact width of 4.2 inches or less. When in the folded state the main body having a main body length of 10 inches or less.

In an embodiment, the marking device can have a sliding handle support configured to be positioned at one or more positions along the main body length. In another embodiment, the marking device can have the first arm which bearing a first measuring rule markings and the second arm can have a second measuring rule markings. In yet another embodiment, the marking device can have the first arm bearing a first measuring rule and the second arm has a second measuring rule.

In an embodiment, the marking device can have a main body portion having a target side configured to be placed against a target surface and a user side configured to face a user, a first arm connected to the main body portion, the first arm including a first slide member which is slidable along the first arm and a second arm connected to the main body portion and including a second slide member which is slidable along the second arm. The first marker can be disposed on the first slide member and configured to selectively mark the target surface and the second marker disposed on the second slide member and configured to selectively mark the target surface. A first hook can be disposed on the first slide member at a first location corresponding to the first marker and a second hook disposed on the second slide member at a second location corresponding to the second marker. Optionally, the marking device can have at least one level indicator. In an embodiment, the marking device can have a sliding handle selectively movable and lockable along a length of the main body portion.

In an embodiment, the marking device can also have a first sheath, the first sheath being movable between a first position where an end of the first marker is surrounded by the first sheath and a second position where the end of the first marker is exposed whereby it can mark the target surface. Additionally, the marking device can have the first sheath biased to the first position.

In an embodiment, the marking device can have a body having a target side configured to be placed against a target surface and a user side configured to face a user, the marker disposed on the target side and configured to selectively mark the target surface, and a sheath which is movable between a first position where an end of the marker is surrounded by the sheath and a second position where the end of the marker is exposed whereby it can mark the target surface. The sheath can be biased towards the first position. The marking device can also have at least one level indicator, and additionally can optionally have a hook located on the user side at a position corresponding to the marker.

In an embodiment, the marking device can have a second sheath, the second sheath can be movable between a surrounding position where an end of the second marker is surrounded by the second sheath and an exposing position where the end of the second marker is exposed whereby it can mark the target surface. The second sheath is biased to the surrounding position.

In an embodiment, the marking device can also have a first biasing member on the target side of the main body portion which biases the main body portion away from the target. In another embodiment, the marking device can have a second biasing member on the first arm and configured to face the target surface, as well as a third biasing member on the second arm and configured to face the target surface. Optionally, the first biasing member can be a spring, such as a leaf spring. The second biasing member and third biasing members can also respectively be leaf springs.

In an embodiment, the marking device cam have the first marker and the second biasing member located on a first sliding member can be slidable along the first arm and the second biasing member can be disposed adjacent the first marker. The second marker and the third biasing member can be located on a second sliding member which can be slidable along the second arm and the third biasing member can be disposed adjacent the second marker.

In an embodiment, an intelligent stud finder can have a number of capacitive plates arranged side by side, in which a number of the capacitive plates are adapted to provide a sensor output indicating a capacitance. The intelligent stud finder can have a number of LEDs which can be controlled by a processor executing program executable code having executable logic to process respective the sensor output indicating the capacitance for each of the number of capacitive plates. The processor can execute program executable code to control the illumination of at least one LED. The processor can also execute program executable code to identify whether the number of capacitive plates has moved from a first detecting position to a second detecting position. The processor can executing program executable code to maintain at least one LED in an first state which can be an initial unlit state until the number of capacitive plates have moved from a first detecting position to a second detecting position which can activate a communicating state. In the communicating state, the processor can execute program executable code executing program logic to identify whether a first capacitive plate has a first capacitance which is set point difference from a second capacitance of a second capacitive plate. When in the communicating state, if the first capacitance is different than the second capacitance, then the processor can executes program executable code illuminating the at least one LEDs.

In an embodiment, the intelligent stud finder can have the processor execute program executable code having executable logic adapted to change the state of the at least one LED when in the communicating state from illuminated to not illuminated when the set point difference in capacitance is not satisfied between the first capacitive plate and the second capacitive plate. In another embodiment, the intelligent stud finder can have the processor execute program executable code having executable logic adapted to illuminate one LED when a first capacitive plate has a first capacitance satisfying a set point difference than the second capacitance of an adjacent second capacitive plate.

In yet another embodiment, the intelligent stud finder can have the processor execute program executable code having executable logic adapted to illuminate two LEDs when the first capacitance of a first capacitive plate and a second capacitance of a second capacitive plate are each different from the third capacitance of a third capacitive plate. In a still further embodiment, the intelligent stud finder can have the processor execute program executable code having executable logic adapted to illuminate three LEDs when the first capacitance of a first capacitive plate, a second capacitance of second capacitive plate, and a third capacitance of a third capacitive plate are each different from the fourth capacitance of a fourth capacitive plate.

In an embodiment, the intelligent stud finder can have the processor execute program code having executable program logic to illuminate one LED when at least a portion of a capacitive plate is projected over a stud. In another embodiment, the intelligent stud finder can have the processor execute program code having executable program logic to illuminate two LEDs when at least a portion of a first capacitive plate and at least a portion of a second capacitive plate are each projected over a first stud. In yet another embodiment, the intelligent stud finder can have the processor execute program code having executable program logic to illuminate three LEDs when at least a portion of each of three capacitive plates are projected over a first stud. In a still further embodiment, the intelligent stud finder can have the processor execute program code having executable program logic to illuminate three LEDs when at least a portion of more than three capacitive plates are positioned such that at least a portion of each of the capacitive plates project over a stud. Optionally, the intelligent stud finder can have the processor execute program code having executable program logic to illuminate three LEDs when at least a portion of more than three capacitive plates are positioned such that at least a portion of each of the capacitive plates project over two or more adjacent studs.

In an embodiment, the intelligent stud finder can have a non-momentary on/off power switch which can be toggled to provide power or discontinue power to the intelligent stud finder from a power source. The intelligent stud finder can also have processor execute program code having executable program logic to identify a first stud and an adjacent a second stud. For nonlimiting example, the executable program logic can identify the first stud by a capacitance value of a first capacitive plate. In another nonlimiting example, the executable program logic can identify the second stud by a capacitance value of a second capacitive plate which is adjacent to the first capacitive plate. The first capacitive plate and the second capacitive plate can each having capacitances which are different.

In an embodiment, the intelligent stud finder can have the processor programmed with executable program code to: (1) illuminate three first stud LEDs when at least a portion of the capacitive plates of one or more capacitive plates are positioned such that at least a portion of the one or more capacitive plates project over the first stud, the first stud LEDs projecting over the first stud; (2) illuminate three second stud LEDs when at least a portion of the one or more capacitive plates are projected over an adjacent the second stud, the second stud LEDs projecting over the second stud; and (3) illuminate the first stud LEDs and the second stud LEDS in an alternating sequence.

In an embodiment, the intelligent stud finder can be programmed with executable program code having executable program logic to identify a first stud and a second stud separated by a spacing distance. The executable program logic can identify the first stud by a capacitance value of a first capacitive plate. The executable program logic can also identify the second stud by a capacitance value of a second capacitive plate. The first capacitive plate and the second capacitive plate can be configured on either side of at least one or more intervening capacitive plates. The first capacitive plate and the second capacitive plate can each having capacitances which are different from the respective capacitances of each of the at least one or more intervening capacitive plates.

In an embodiment, the intelligent stud finder can also be programmed to process by a processor executable program code to illuminate three first stud LEDs when at least a portion of one or more capacitive plates are positioned such that at least a portion of the one or more capacitive plates project over the first stud, the first stud LEDs projecting over the first stud. The processor can further be programmed with executable program code to illuminate three second stud LEDs when at least a portion of one or more capacitive plates are positioned such that at least a portion of the one or more capacitive plates project over the second stud, the second stud LEDs projecting over the second stud. The processor can also have executable program code to illuminate the first stud LEDs and the second stud LEDS in an alternating sequence.

In an embodiment, the intelligent stud finder can have a head portion can have a plurality of capacitive plates adjacent to one another; the capacitive plates each having a plate width, a plate length, a capacitive plate longitudinal centerline; the capacitive plates positioned to have at least a portion along a finding axis when used adjacent to a surface. The head portion can have a first width measured perpendicular to a capacitive plate longitudinal centerline and having a first width length with is greater than the sum of the plate widths of the plurality of capacitive plates. The intelligent stud finder can have a handle having a handle centerline which is not parallel to the finding axis, and optionally the handle can have a second width which is measure parallel to the first width.

In an embodiment, the intelligent stud finder can have the first width which is at least twice the width of the second width. In another embodiment, the intelligent stud finder can have the first width which is at least three times the width of the second width. In yet another embodiment, the intelligent stud finder can have the first width which is at least four times the width of the second width.

In an embodiment, the intelligent stud finder can have the head be paddle shaped. In another embodiment, the intelligent stud finder can have the head be paddle shaped and the handle can have a handle length which is shorter than a handle length. In yet another embodiment, the intelligent stud finder can have the head be paddle shaped and the handle can be generally spherical. In a still further embodiment, the intelligent stud finder can have the head be paddle shaped and the handle can be generally oblong.

In an embodiment, the stud sensor can be generally "T" shaped. The handle portion can be generally perpendicular to the sensor paddle portion.

In an embodiment, the intelligent stud finder can have a head which is a paddle shaped head; and the handle can have a handle centerline which is not parallel to the finding axis. In another embodiment, the intelligent stud finder can have a head which is a paddle shaped head and the handle can have a handle centerline which is at an angle to the finding axis.

In an embodiment, the sensor paddle portion can include at least 1, 2, 3, or more capacitive plates outside of the width of the handle portion. In an embodiment, the sensor paddle portion can include at least 1, 2, 3, or more display elements outside of the width of the handle portion. Optionally, each display element can be activated based on the capacitance of an individual capacitive plate.

In an embodiment, the intelligent stud finder can have a head which is a paddle head and the handle can have a handle centerline which is at an angle of 33 degrees, or 45 degrees, or 90 degrees, or greater to the finding axis. In an embodiment, the handle can be pivoted to configure the handle centerline at a desire angle which is greater than zero (0) degrees from the finding axis. In another embodiment, the handle can be pivoted to configure the handle centerline at a desired angle which is from 33 degrees to 90 degrees from the finding axis.

The sensor paddle portion can have a width that is in a range of 1.3 to 5 times as large as a width of the handle portion. For example the sensor paddle portion width can be at least 1.5, or 1.6, or 1.7, or 1.8, or 2 times as large as a width of the handle portion.

In an embodiment, a method of finding multiple studs behind a surface, can have the steps of: providing an intelligent stud finder having a number of capacitive plates arranged side by side, wherein each capacitive plate is adapted to provide a sensor output indicating a capacitance, the intelligent stud finder having a number of LEDs controlled by a processor executing program executable code having executable logic to process respective the sensor output indicating the capacitance for each of the number of capacitive plates; placing the number of capacitive plates adjacent to a target surface; processing executing program executable code to control the illumination of at least one LED; executing program logic to maintain the at least one LED in an first state which is an initial unlit state unlighted prior to the intelligent stud finder being moved against the target surface; moving the intelligent stud finder across at least a portion of the target surface; the processor executing program executable code to maintain the at least one LED in the first state which is an initial unlit state until the number of capacitive plates have moved from a first detecting position to a second detecting position which activates a communicating state; the processor executing program executable code executing program logic to identify whether a capacitive plate has experienced a change in capacitance when projected over a first stud; when in the communicating state, if a first capacitive plate has experienced a change in capacitance when projected over a first stud, then the processor executes program executable code illuminating the at least one LED; continuing to move the intelligent stud finder across at least a portion of the target surface; executing a program logic to generate a display indicated the presence of separated studs when at least the first capacitive plate experiences a change in capacitance when projected over a first stud and at least a second capacitive plate experiences a change in capacitance when projected over a second stud and the first capacitive plate and the second capacitive plate are separated by at least one capacitive plate which shows a different capacitance than the first capacitance plate and the second capacitance and is not projected over a stud. The method of finding multiple studs behind a surface can also have the step of lighting three LEDs indicating the location of the first stud. Additionally, the method of finding multiple studs behind a surface can have the step of lighting three LEDs indicating the location of the second stud.

According to an aspect of an exemplary embodiment, there is a stud sensor which is an intelligent stud finder and which can have at least five capacitive plates arranged side by side. Each capacitive plate is adapted to provide a sensor output indicative of a capacitance. The stud sensor includes a display controlled by a processor. The processor receives the sensor output and controls the display to indicate the location of a stud. The stud sensor has a sensor paddle portion including the at least five capacitive plates and the display. The stud sensor also includes a handle portion, the handle portion being non-parallel to the sensor paddle portion.

In an embodiment, the stud sensor can for example have at least 6, or 7, or 8, or more, capacitive plates. The display of the stud sensor can include a plurality of display elements, which can optionally be LEDs.

In an embodiment, the method of finding multiple studs behind a surface can also have the steps of: lighting a first three LEDs indicating the location of the first stud; then unlighting the first three LEDs; and then lighting a second three LEDs indicating the location of the second stud.

In yet another embodiment, the method of finding multiple studs behind a surface can also have the steps of: (a)

lighting a first three LEDs indicating the location of the first stud; (b) then unlighting the first three LEDs; (c) then lighting a second three LEDs indicating the location of the second stud; (d) then unlighting the second three LEDs; and repeating steps (a) through (d) one or more times.

In still yet another embodiment, the method of finding multiple studs behind a surface can also have the steps of: (a) lighting a first three LEDs indicating the location of the first stud; (b) then unlighting the first three LEDs; (c) then lighting a second three LEDs indicating the location of the second stud; (d) then unlighting the second three LEDs; (e) maintaining all LEDs in an unlit state; and repeating steps (a) through (e) one or more times.

In even another embodiment, the method of finding multiple studs behind a surface can also have the steps of: lighting a first three LEDs indicating the location of the first stud for at least 0.2 seconds; then unlighting the first three LEDs for at least 0.05 seconds; then lighting a second three LEDs indicating the location of the second stud for at least 0.2 seconds; then unlighting the second three LEDs; maintaining all LEDs in an unlit state for at least 0.05 seconds; and repeating steps (a) through (e) one or more times.

In an embodiment, a picture hanging design system can have a camera and a processor executing program executable code and executable program logic. The processor can receive a target surface data which has been input to a memory from the camera. The processor can also receive a standard distance data which is present in a memory. The processor can receive a first frame data of a first frame from the camera which has been input to a memory from the camera and the processor can execute executable program logic to process the standard distance data, the target surface data and the first frame data to generate a visualization output of a graphical depiction of the first frame overlaid on a portion of the target surface. In an embodiment, the target surface can be at last a portion of a wall.

In an embodiment, the processor the picture hanging design system can receive a plurality of frame data from a plurality of frames and the processor can execute executable program logic to process the standard distance data, the target surface data and the plurality of frame data to generate a visualization output of a graphical depiction of the plurality of frames overlaid on a plurality of portions of the target surface. In another embodiment, the processor of the picture hanging design system can receive a plurality of frame data from a plurality of frames and the processor executes executable program logic to process the standard distance data, the target surface data and the plurality of frame data to generate a visualization output of a graphical depiction of the plurality of frames overlaid in a pattern on at least a portion of the target surface.

In yet another embodiment, the processor the picture hanging design system can receive a plurality of frame data from a plurality of frames and the processor executes executable program logic to process the standard distance data, the target surface data and the plurality of frame data to generate a visualization output of a graphical depiction of the plurality of frames overlaid on at least a portion of the target surface in a pattern present in memory and which is selected from a plurality of patterns by a user and processed by the processor. In still yet another embodiment, he processor the picture hanging design system can receive a plurality of frame data from a plurality of frames and the processor executes executable program logic to process the standard distance data, the target surface data and the plurality of frame data to generate a visualization output of a graphical depiction of the plurality of frames overlaid on at least a portion of the target surface in a pattern present in memory and which is determined by the processor executing executable program logic to satisfy one or more design requirements.

In an even further embodiment, the processor the picture hanging design system can receive a plurality of frame data from a plurality of frames and the processor executes executable program logic to process the standard distance data, the target surface data and the plurality of frame data to generate a visualization output of a graphical depiction of the plurality of frames overlaid in a pattern on at least a portion of the target surface which satisfies one or more design requirements input by the user and processed by the processor.

BRIEF DESCRIPTION OF THE DRAWINGS

The present invention in its several aspects and embodiments solves the problems discussed above and significantly advances the technology of stud finding and picture hanging. The present invention can become more fully understood from the detailed description and the accompanying drawings, wherein:

FIG. 18A is a logic flow diagram for an example of a no stud operation;

FIG. 18F is a logic flow diagram for an example of a first (left) stud operation;

FIG. 18K1 is a schematic showing the stud finder projected over a second stud;

FIG. 18K2 is a schematic showing the stud finder projected over the earlier encountered second stud and a portion of a later encountered first stud;

FIG. 18K3 is a schematic showing the stud finder projected over both the earlier encountered second stud and the later encountered first stud;

FIG. 19 is a schematic showing the stud finder moving toward a stud;

FIG. 40 is a perspective view of the picture hanging device having two pivoting arms in an unfolded state;

FIG. 41A shows an example of the second arm with a second marker slide member in a first position;

FIG. 41B shows an example of the second arm with a second marker slide member in a second position;

FIG. 41C shows an example of the second arm with a second marker slide member in a third position;

FIG. 46H1 is a is a display-side detailed view of the picture hanging device with the sliding handle having its grips pressed to allow for it to be moved;

FIG. 46H2 is a back side detailed view of the picture hanging device with the sliding handle having its grips pressed to allow for it to be moved;

FIG. 46I1 is a display-side detailed view of the picture hanging device with the sliding handle having its grips pressed while it is moved;

FIG. 46I2 is a back side detailed view of the picture hanging device with the sliding handle having its grips pressed while it is moved;

FIG. 60C1 shows a variety of spacers;

FIG. 60F1 shows a laser level device;

FIG. 62D shows a stud finder having a wheel in sensing mode;

FIG. 63 shows a picture hanging device according to another exemplary embodiment with the arms in a vertical position;

FIG. 64 shows the picture hanging device with the arms extended;

FIG. 65 shows the picture hanging device from the side with the arms in a vertical position;

FIG. 66 is a close up view of the storage drawer and marker assembly of the picture hanging device of the exemplary embodiment;

FIG. 67 shows a side view of the picture hanging device against the wall with the arms removed;

FIG. 68 is a close-up view of the locking bar and central marker assembly of the picture hanging device of the exemplary embodiment;

FIG. 69 is a close-up side view of the locking bar and central marker assembly of the picture hanging device of the exemplary embodiment;

FIG. 70 is a close-up side view of the central marker assembly of the picture hanging device of the exemplary embodiment;

FIG. 71 is a close-up side view of the central marker assembly of the picture hanging device of the exemplary embodiment;

FIG. 72 is an exploded view of the marker assembly and locking bar of the picture hanging device of the exemplary embodiment; and FIG. 73 is a side view of the picture hanging device of the exemplary embodiment pressed against a wall for marking the wall.

FIG. 74 illustrates a slide member of another exemplary embodiment;

Figure 75:
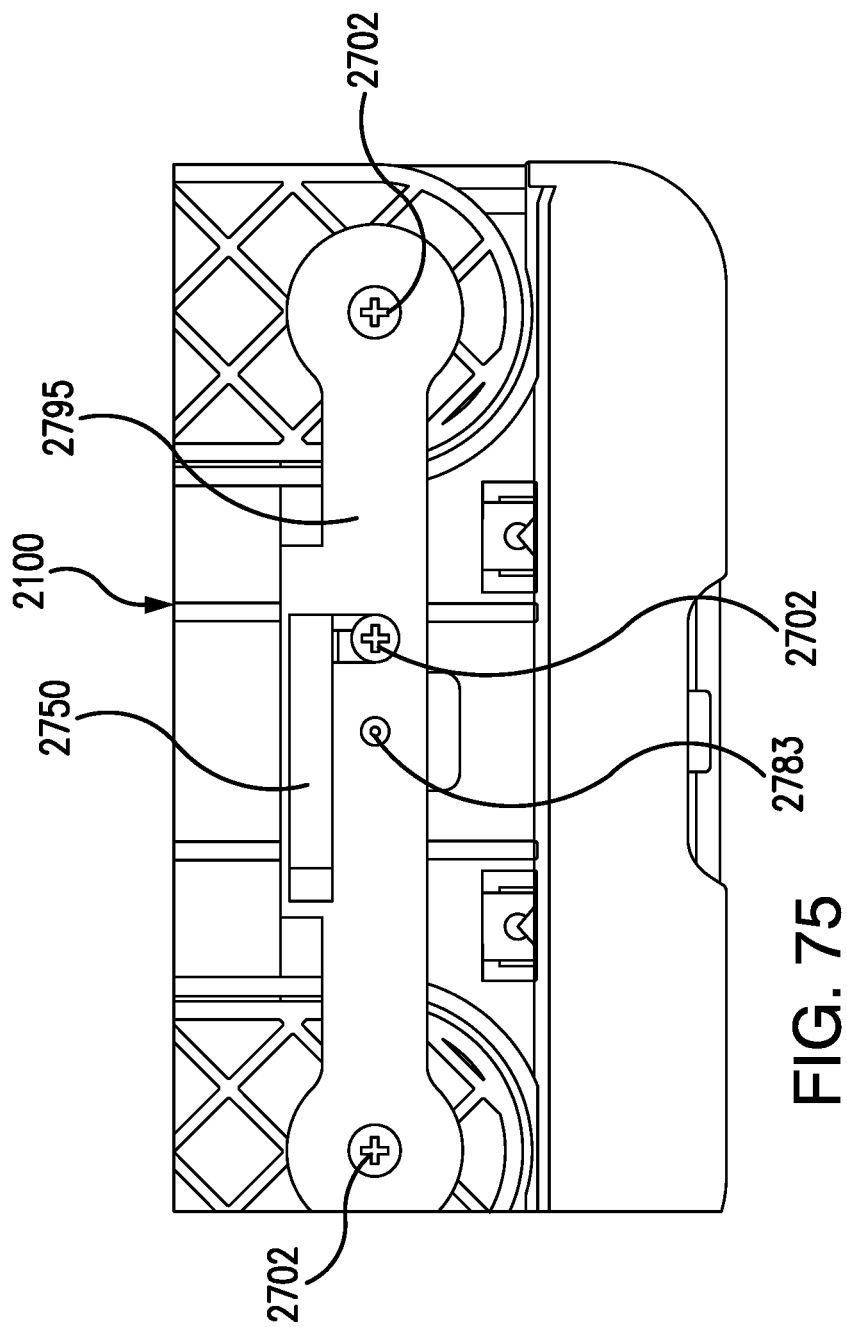
Figure 76:
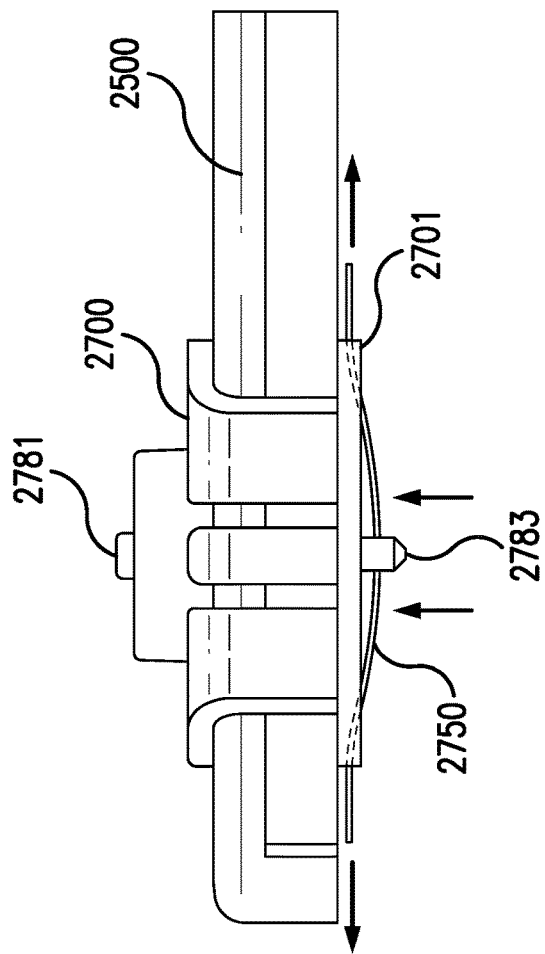
Figure 77:
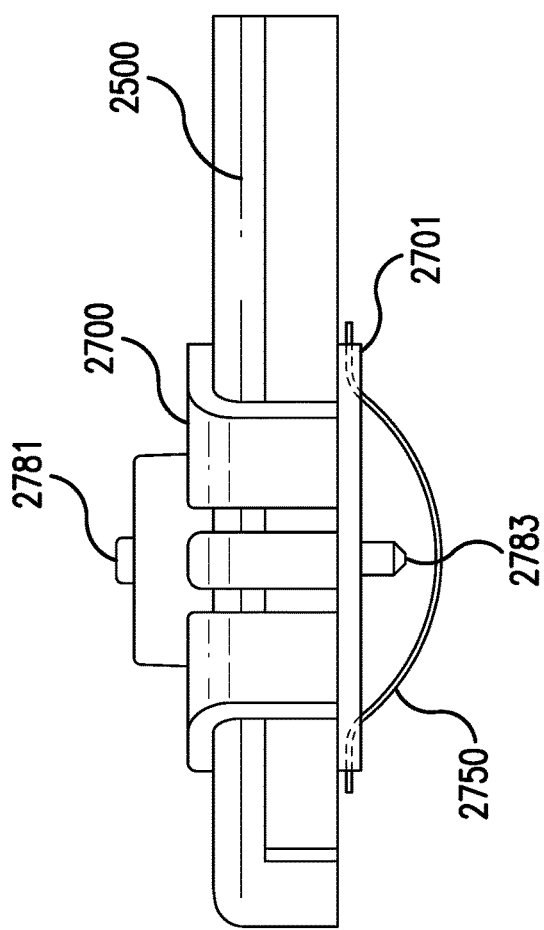

FIG. 75 illustrates a rear side of a central body portion of a picture hanging device according to the exemplary embodiment;

FIG. 76 illustrates the slide member of the exemplary embodiment with the leaf spring in a relaxed position;

FIG. 77 illustrates the slide member of the exemplary embodiment with the leaf spring in a moved position; and FIG. 78 illustrates various components of the exemplary embodiment.

Herein, like reference numbers in one figure refer to like reference numbers in another figure.

DETAILED DESCRIPTION OF THE INVENTION

The many and varied inventions here significantly advance the picture hanging process, allow a use to arrange object to be hung in an arrangement, and provides computer technology and apparatus to achieve attractive, accurate and aesthetically pleasing results. This specification discloses an intelligent stud finder, a picture hanging device and a picture hanging system which uses one or more devices running executable program code and logic to automate the complex aspects of the picture hanging process.

Intelligent Stud Finder

Figure 1A:
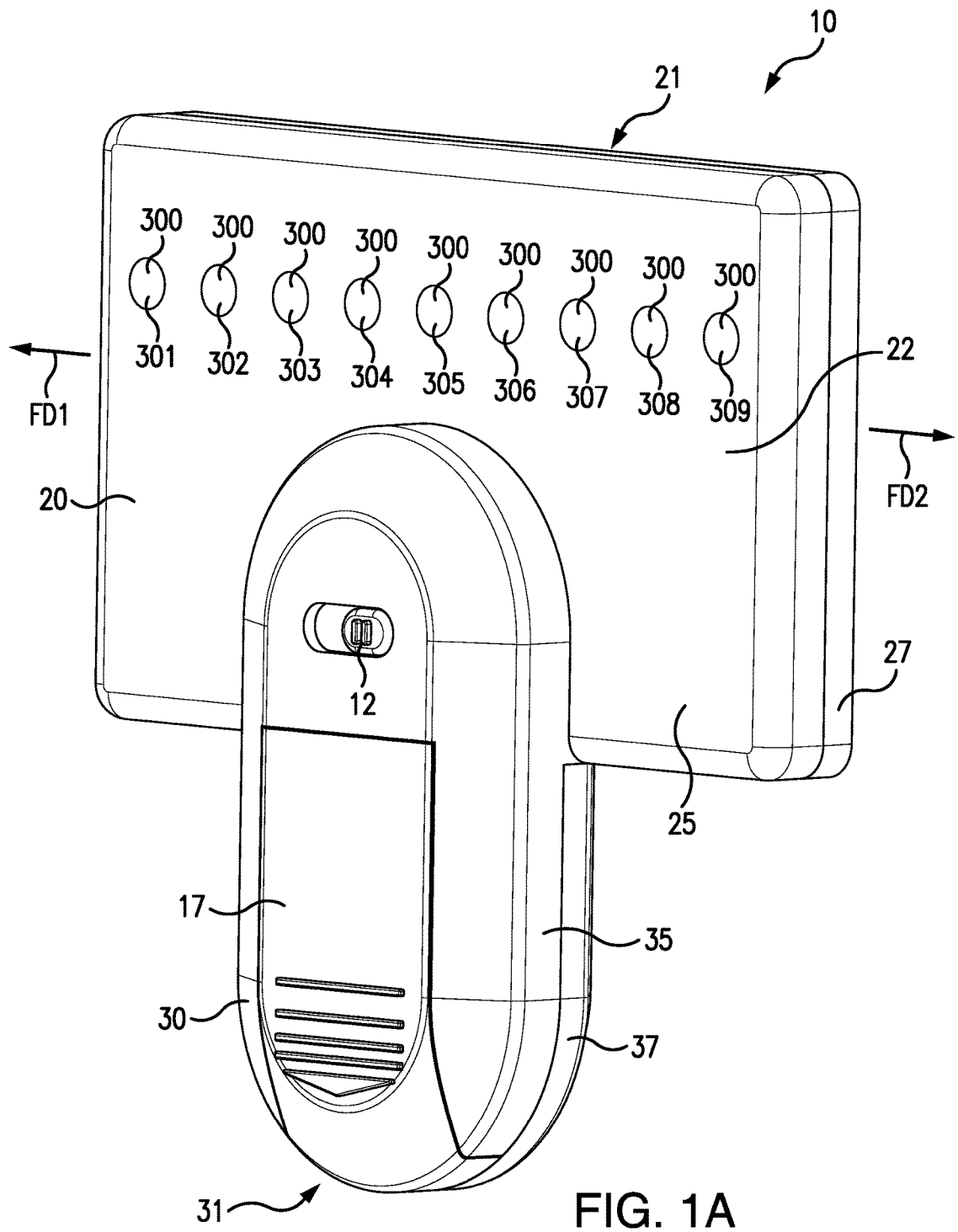
FIG. 1A is a perspective view of an embodiment of an intelligent stud finder.

FIG. 1A is a perspective view of an embodiment of an intelligent stud finder 10. In an embodiment, the intelligent stud finder 10 can have a sensor paddle attached to a handle 30. Herein, the term "intelligent stud finder" and "stud finder are used synonymously".

The stud finder 10 can be turned on and off by a switch 12 which can be a toggle (non-momentary) switch which be or a momentary switch. In an embodiment, the switch 12 can be pushed on, switched on, or toggled on and the stud finder 10 can stay on until the switch 12 is pushed off, switched off or toggled off.

In an embodiment, the stud finder 10 can turn off after a pre-designated period of time, such as 3 minutes.

In an embodiment, the stud finder 10 can be battery operated by a battery 15 (FIG. 8A) which can be placed in a battery compartment 16 (FIG. 8A) to power the stud finder 10. The battery compartment 16 can be covered at least in part by a battery cover 17.

Figure 3:
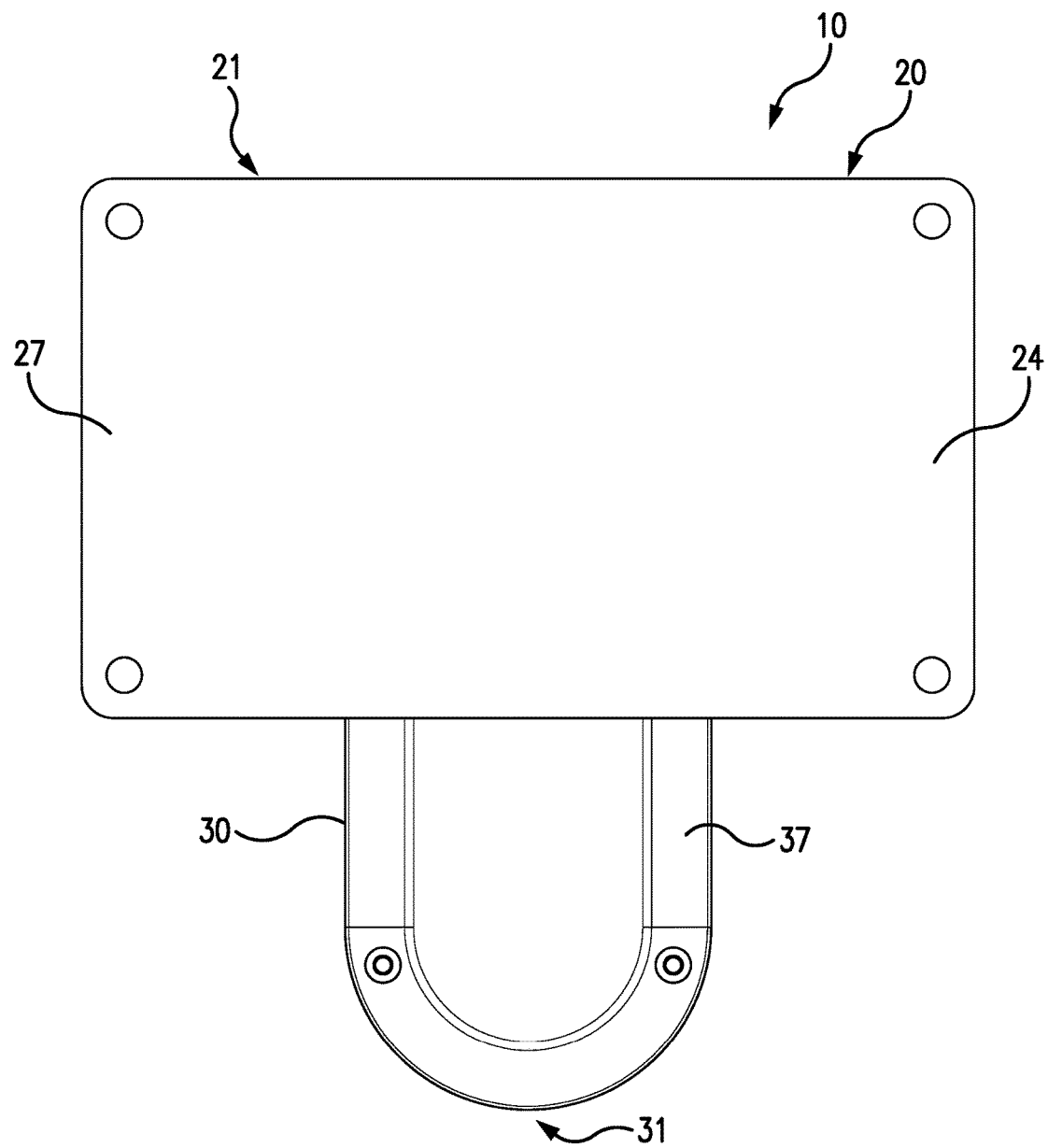
FIG. 3 is a sensor-side view of the stud finder.

In an embodiment, the stud finder 10 and sensor paddle can have a display-side 22 and a sensor-side 24 (FIG. 3). The stud finder 10 can also have a sensor end 21 and a handle end 31.

The intelligent stud finder can have a printed circuit board ("PCB") PCB 99 (FIG. 8A) which bears capacitive plates, a processer and LEDs. In an embodiment, a sensor paddle configuration can cover the PCB 99 with a housing which can have a display-side PCB cover 25 and a sensor side PCB cover 35. The handle 30 can also be protected with a housing which can have a display-side handle cover 37 and a sensor-side handle cover 37. Each of these housing portions can optionally have materials which are durable and/or inflexible, or materials which are flexible and/or soft, or a combination of densities and physical properties.

Figure 8A:
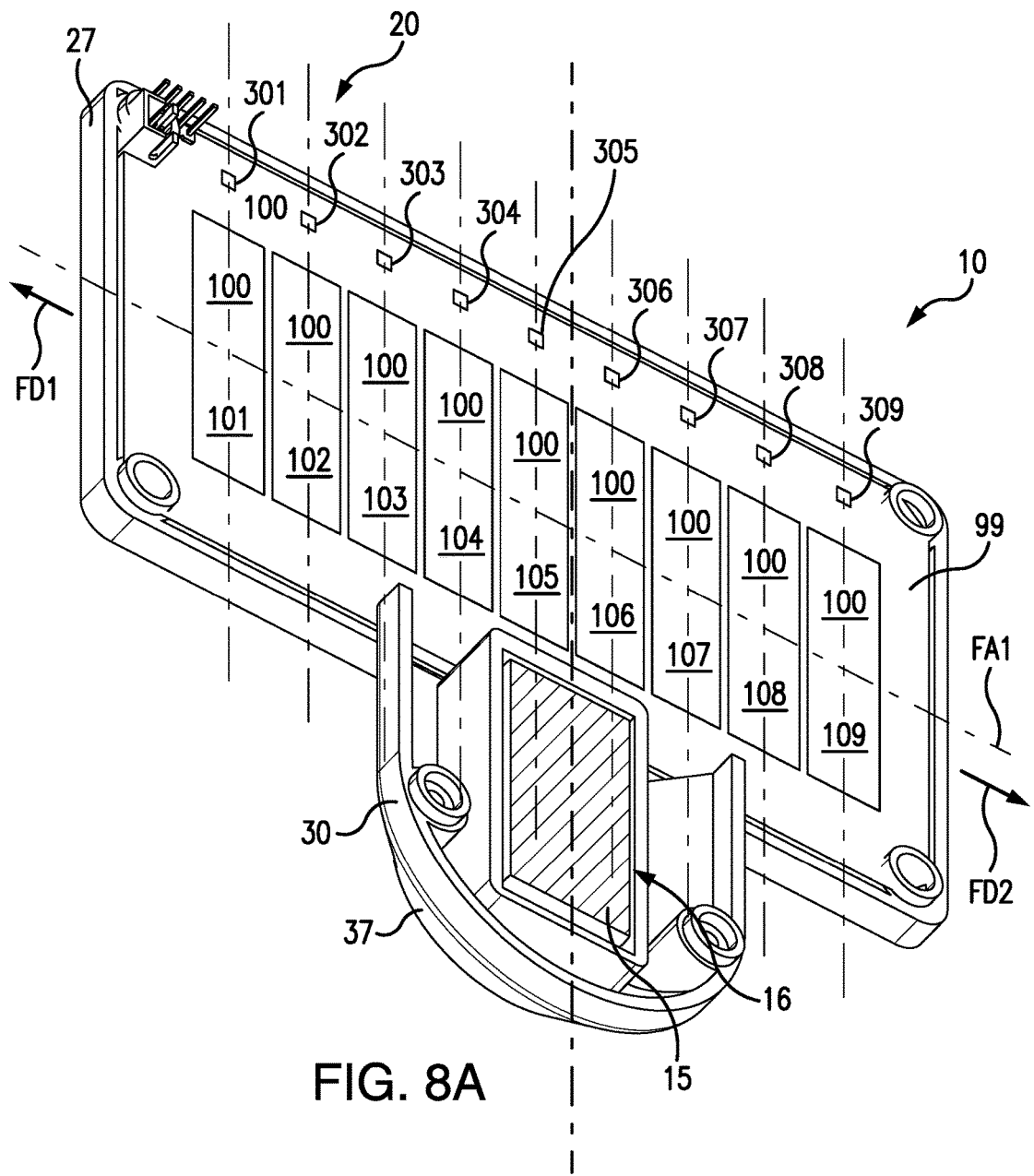
FIG. 8A is a sectional view showing a printed circuit board ("PCB") of the stud finder.

In an embodiment, the stud finder 10 can have a visual display, or graphical user interface, to display information to the user. In an embodiment, the stud finder can use an LED 300 a plurality of LEDs 300. In a nonliming example, the stud finder can have one LED per capacitive plate (FIG. 8A). In the example embodiment of FIG. 1, nine (9) LEDs 300 are provided on the display-side 22 of the sensor paddle 20, for example $1^{st}$ LED 301 (LED 301), $2^{nd}$ LED 302 (LED 302), $3^{rd}$ LED 303 (LED 303), $4^{th}$ LED 304 (LED 304), $5^{th}$ LED 305 (LED 305), $6^{th}$ LED 306 (LED 306), $7^{th}$ LED 307 (LED 307), $8^{th}$ LED 308 (LED 308) and $9^{th}$ LED 309 (LED 309).

Figure 1B:
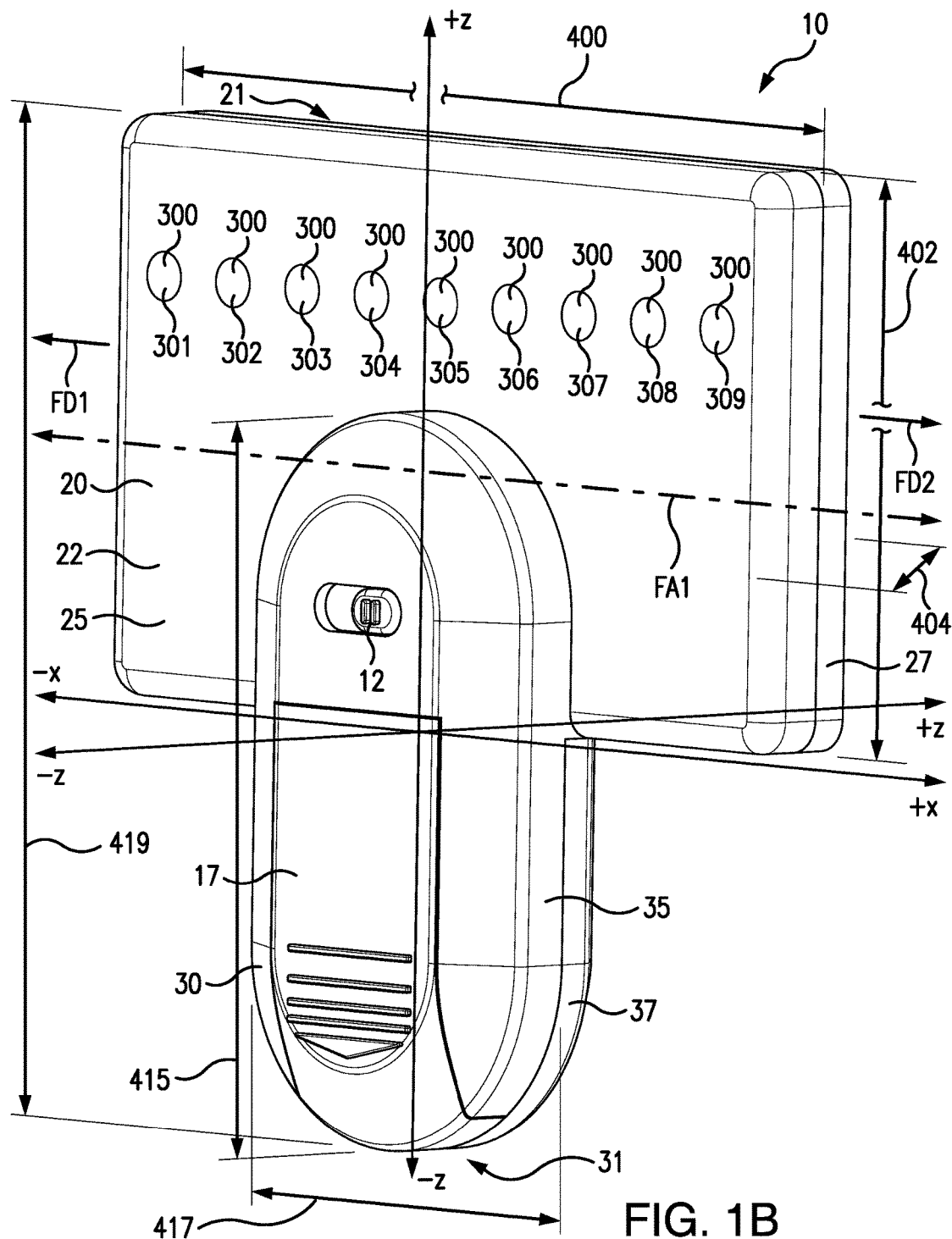
FIG. 1B is a perspective view of an embodiment of an intelligent stud finder showing geometric features.

FIG. 1A also shows that the stud finder 10 can operate when moved in multiple directions, for example in a first finding direction, as shown by arrow FD1, and in a second finding direction, as shown by arrow FD2. In an embodiment, optionally the first finding direction and second finding direction can be parallel to a finding axis FA1 (FIG. 1B). However, any motion which caused the respective capacitive plates to experience differences in capacitance can be used.

FIG. 1B is a perspective view of an embodiment of an intelligent stud finder showing geometric features.

Numeric values and ranges herein, unless otherwise stated, also are intended to have associated with them a tolerance and to account for variances of design and manufacturing. Thus, a number can include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in non-limiting e.g., ±10 percent of a given value). Likewise, the claims are to be broadly construed in their recitations of numbers and ranges.

The stud finder 10 can have a sensor head 19, which can optionally be a sensor paddle 20. The sensor head 19 can have a sensor head width 400 which can range from less than 2 inches to greater than 24 inches, as well as a sensor head height 402 which can range from less than 1 inch to greater than 24 inches. A sensor head thickness can range from less than Y4 inch to greater than 6 inches.

In an embodiment, the handle length 415 can range from less than 2 inches to 3 ft, or longer as needed to reach a give surface to be sensed. The handle width 417 can range from less than 1 inch to greater than 8 inches. In an embodiment the stud finder length 417 of the stud finder 10 can range from less than 3 inches to 3 ft or longer as needed to reach a give surface to be sensed.

Figure 2:
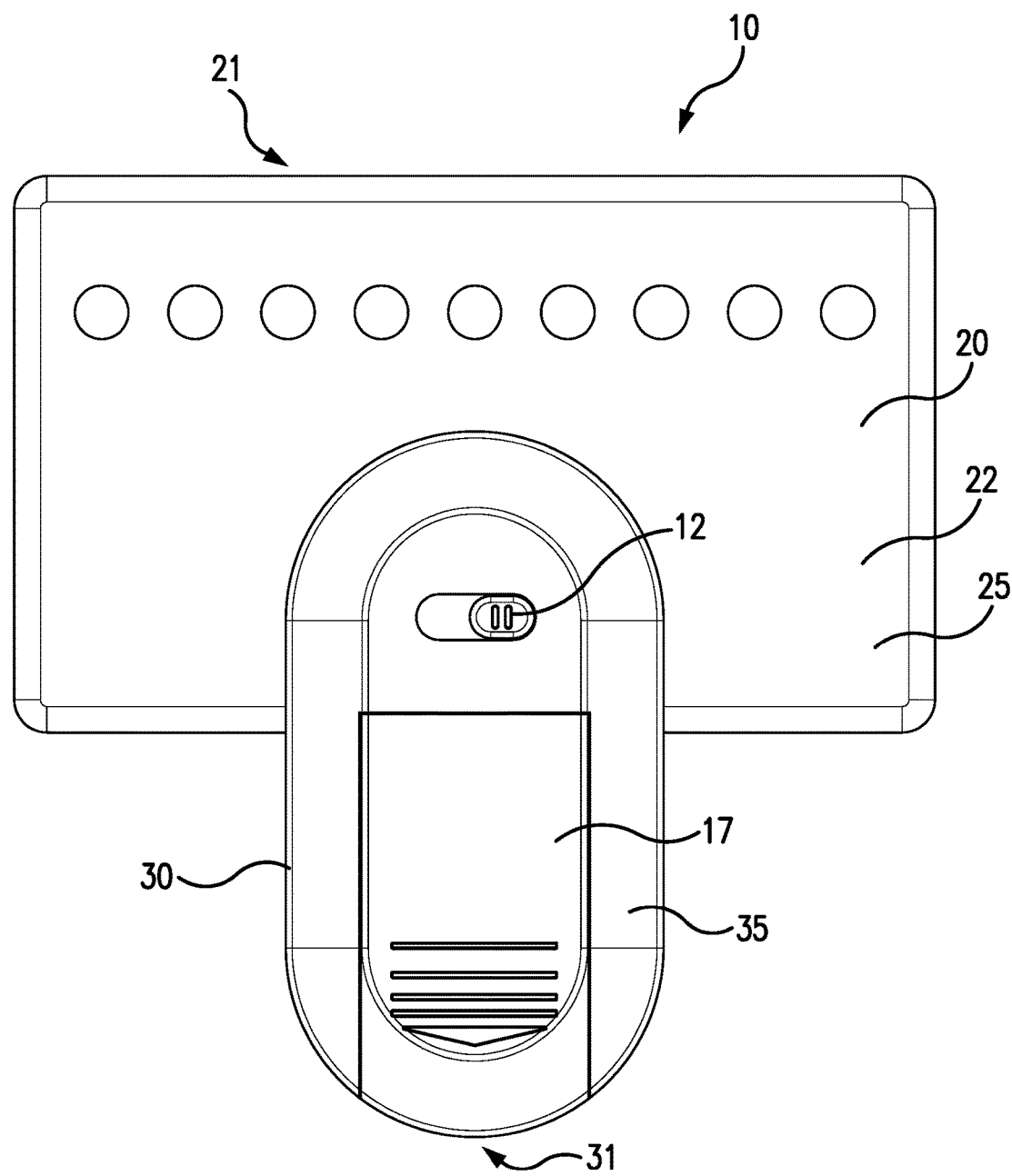
FIG. 2 is a display-side view of the stud finder.

FIG. 2 is a display-side view of the stud finder.

FIG. 3 is a sensor-side view of the stud finder.

Figure 4:
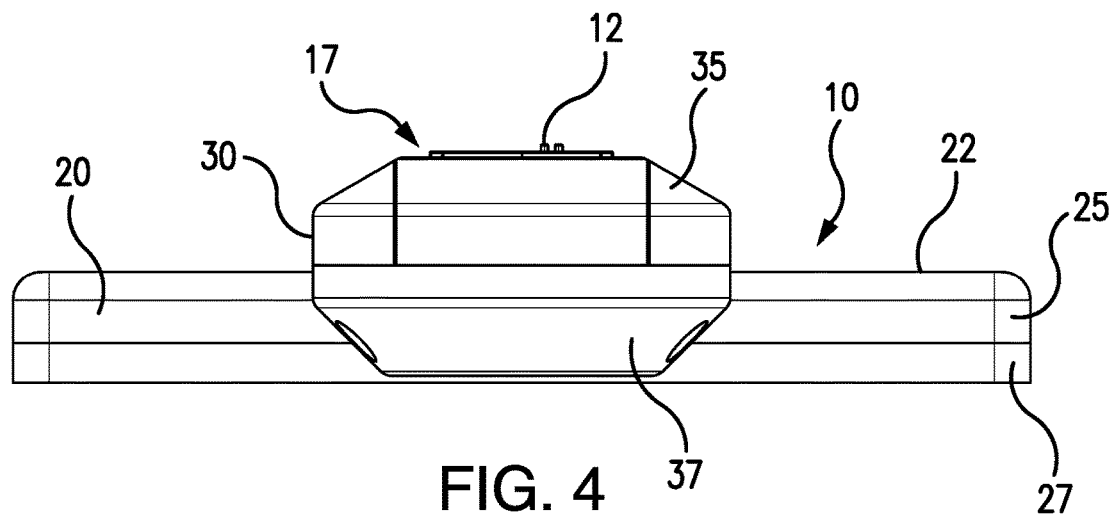
FIG. 4 is a handle end view of the stud finder.

FIG. 4 is a handle end view of the stud finder.

Figure 5:
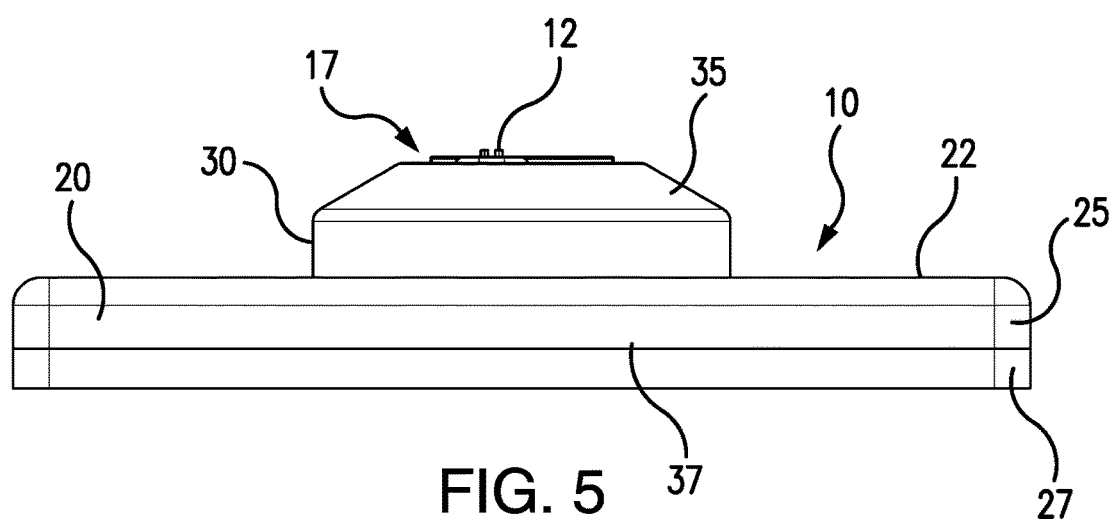
FIG. 5 is a sensor end view of the stud finder.

FIG. 5 is a sensor end view of the stud finder.

Figure 6:
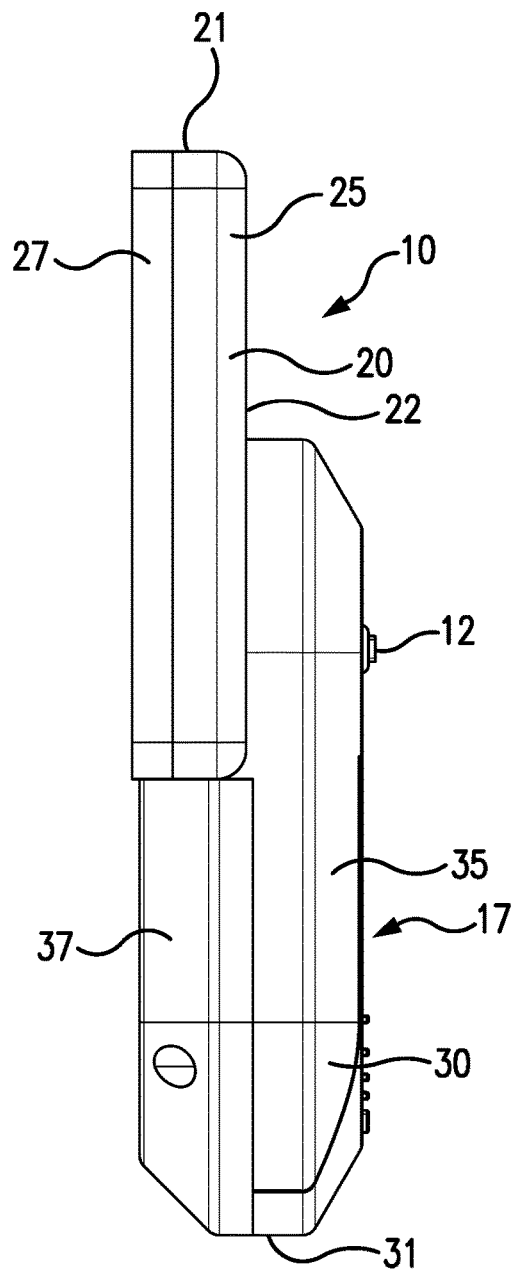
FIG. 6 is a first side view of the stud finder.

FIG. 6 is a first side view of the stud finder.

Figure 7:
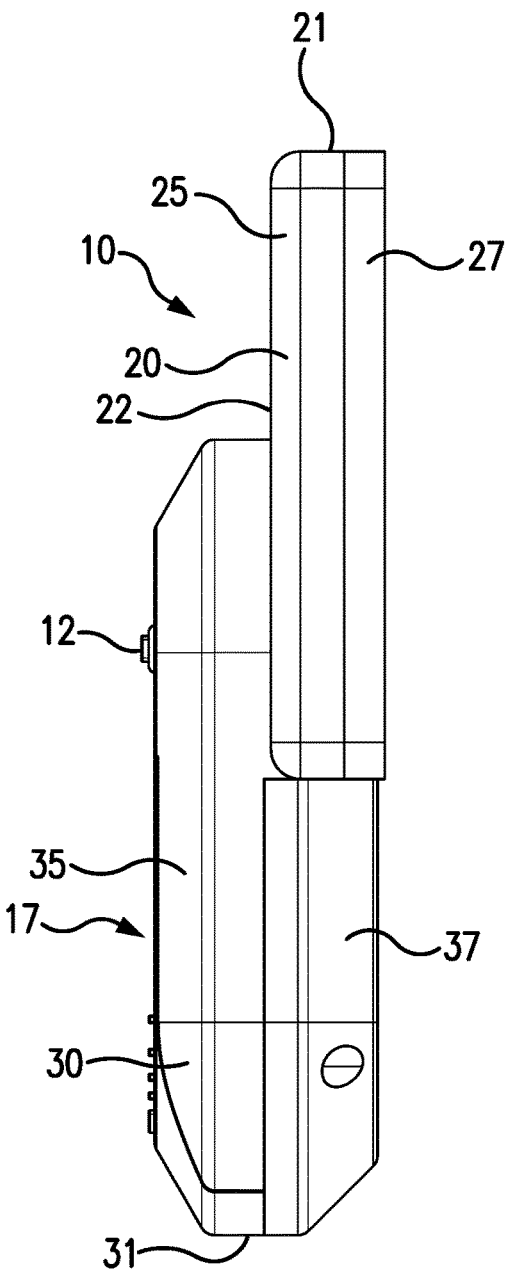
FIG. 7 is a second side view of the stud finder.

FIG. 7 is a second side view of the stud finder.

FIG. 8A is a sectional view showing a printed circuit board ("PCB") of the stud finder.

In an embodiment a PCB 99 can have a capacitive plate 100 or a plurality of capacitive plates 100, such as $1^{st}$ capacitive plate 101 ("CP 101"), $2^{nd}$ capacitive plate 102 ("CP 102"), $3^{rd}$ capacitive plate 103 ("CP 103"), $4^{th}$ capacitive plate 104 ("CP 104"), $5^{th}$ capacitive plate 105 ("CP 105"), $6^{th}$ capacitive plate 106 ("CP 106"), $7^{th}$ capacitive plate 107 ("CP 107"), $8^{th}$ capacitive plate 108 ("CP 108") and $9^{th}$ capacitive plate 109 ("CP 109").

Figure 8B:
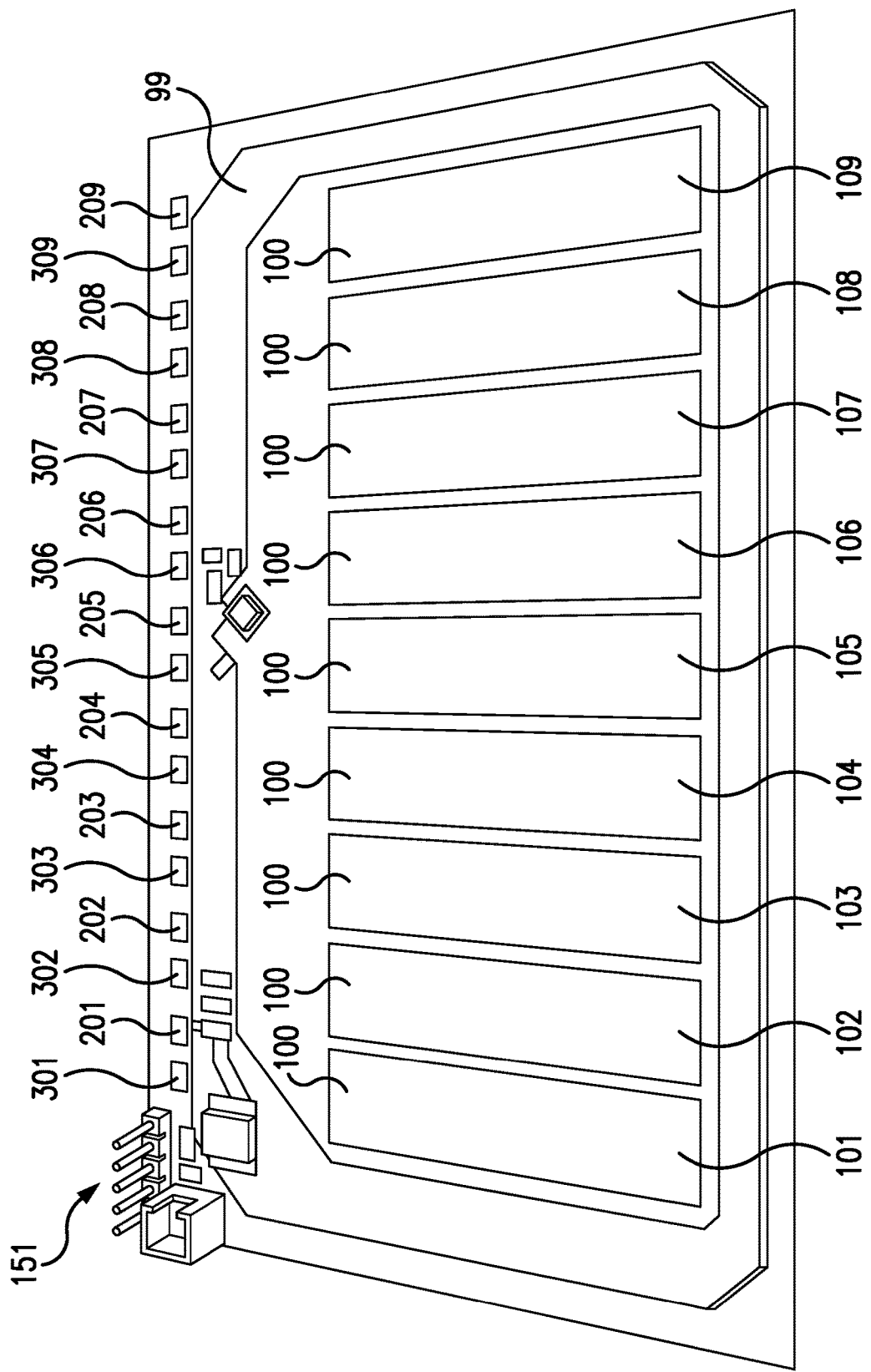
FIG. 8B is a detail view of the PCB.

FIG. 8B is a detail view of the PCB which shows the details of the PCB circuits each having a capacitive plate 100, a resistor 200 and an LED 300, e.g.: CP 101 causes a, forward current to be sent to LED 301 which is resisted by a $1^{st}$ resistor 201 ("R 201"); CP 102 causes a forward current to be sent to LED 302 which is resisted by a $2^{nd}$ resistor 202 ("R 202"); CP 103 causes a forward current to be sent to LED 303 which is resisted by a $3^{rd}$ resistor 203 ("R 203"); CP 104 causes a forward current to be sent to LED 304 which is resisted by a $4^{th}$ resistor 204 ("R 204"); CP 105 causes a forward current to be sent to LED 305 which is resisted by a $5^{th}$ resistor 205 ("R 205"); CP 106 causes a forward current to be sent to LED 306 which is resisted by a 6th resistor 206 ("R 206"); CP 107 causes a forward current to be sent to LED 307 which is resisted by a 7th resistor 207 ("R 207"); CP 108 causes a forward current to be sent to LED 308 which is resisted by a 8th resistor 208 ("R 208"); and CP 109 causes a forward current to be sent to LED 309 which is resisted by a 9th resistor 209 ("R 209").

Figure 8C:
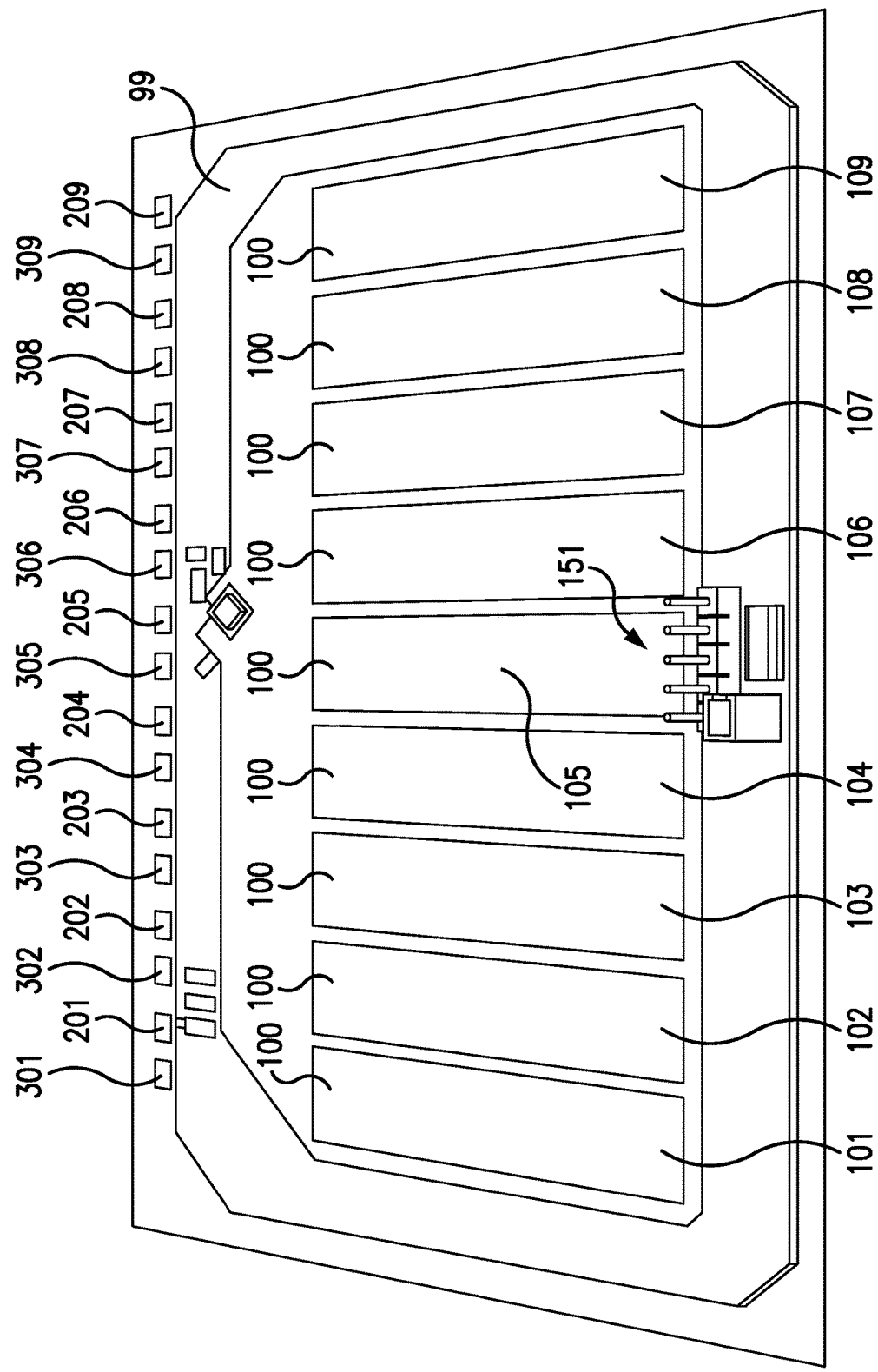
FIG. 8C is a detail view of the PCB having its battery connection proximate to the handle.

FIG. 8B shows the PCB having its battery connection and/or power source connection at a distance from the battery near FIG. 8C is a detail view of the PCB having its battery connection and/or power source connection proximate to the handle.

Figure 8D:
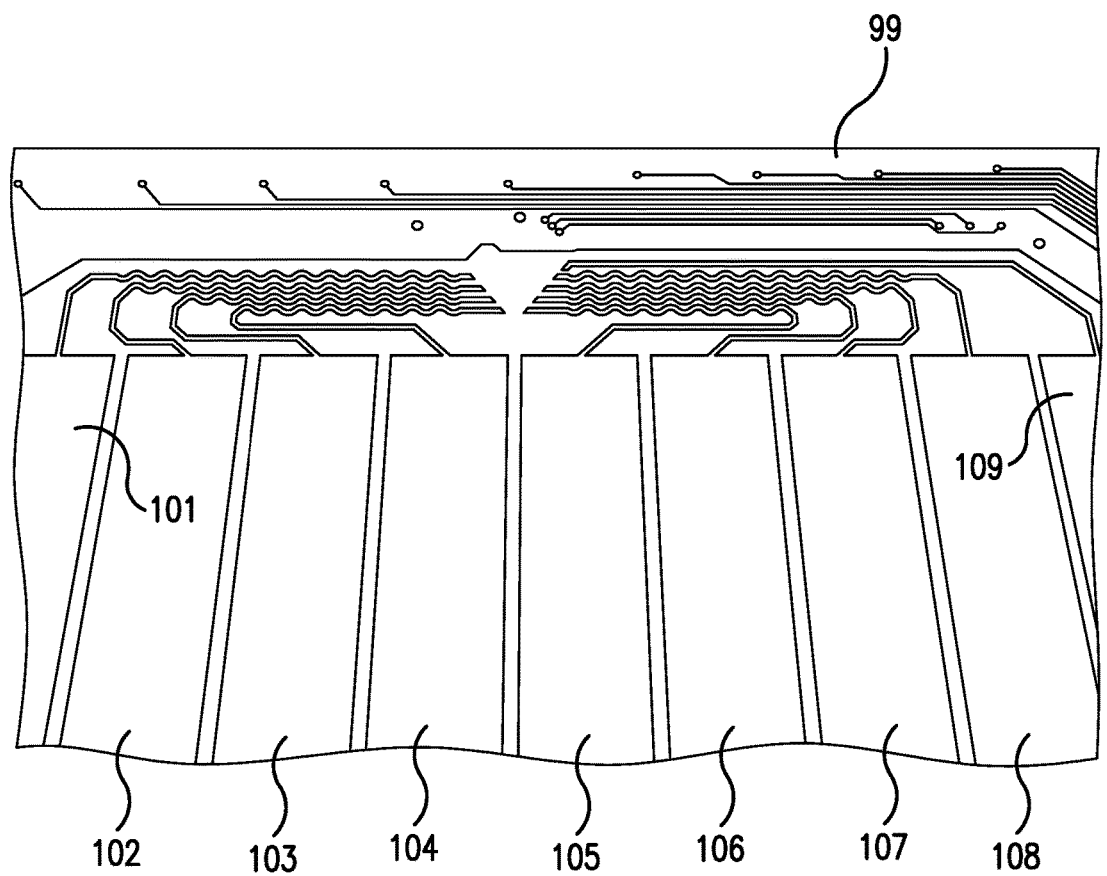
FIG. 8D is a detail view of the PCB showing a plurality of traces between sensor plates and a processor.

FIG. 8D is a detail view of the PCB showing a plurality of traces between sensor plates and a processor.

In an embodiment the capacitive plate output traces to the processor can be equal. In another embodiment the capacitive plate output traces to the processor can have lengths which are different. In yet another embodiment, every capacitive plate can have a different trace length to the processor.

Figure 8E:
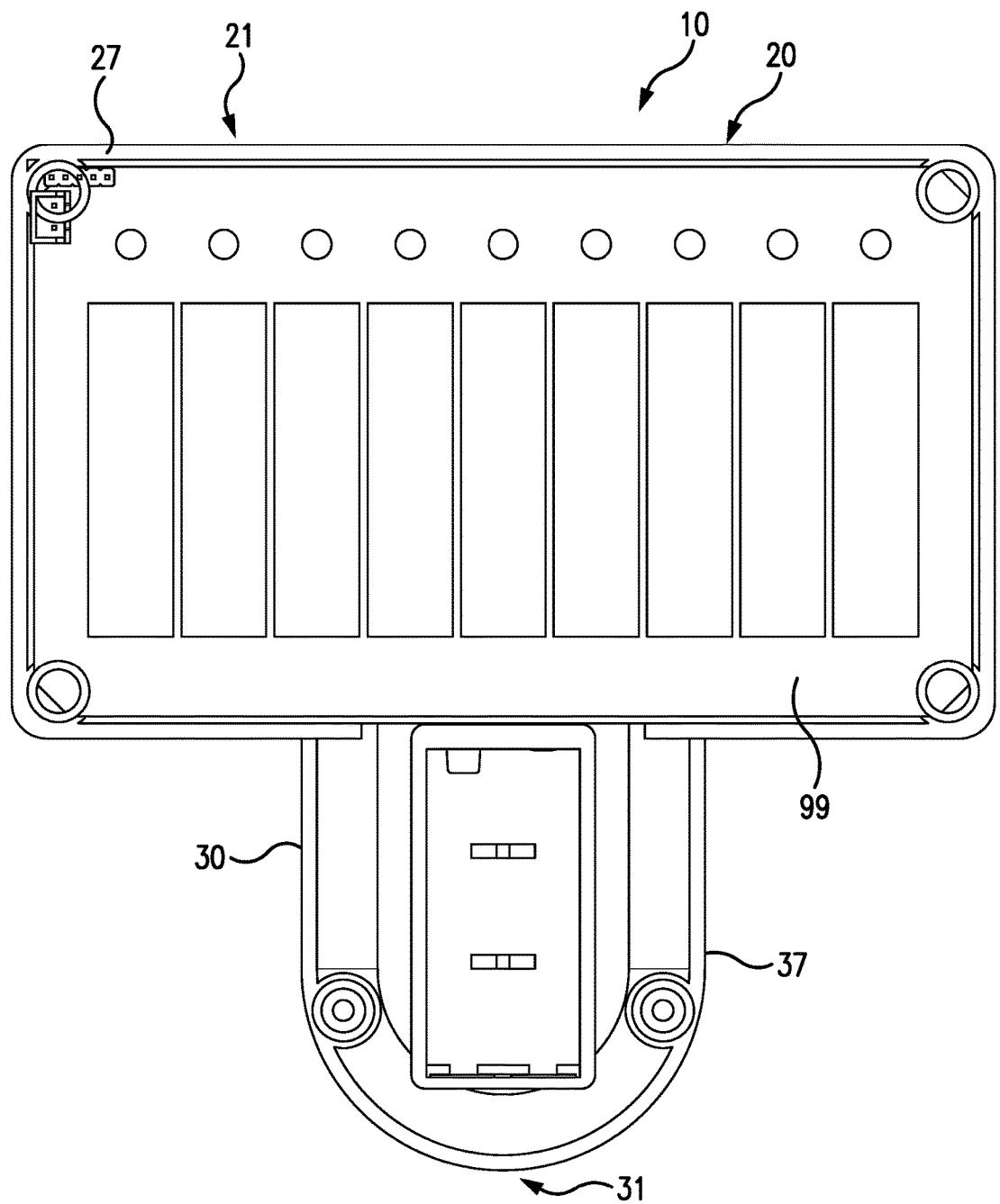
FIG. 8E is another sectional view showing the PCB of the stud finder.

FIG. 8E is another sectional view showing the PCB of the stud finder.

Figure 9:
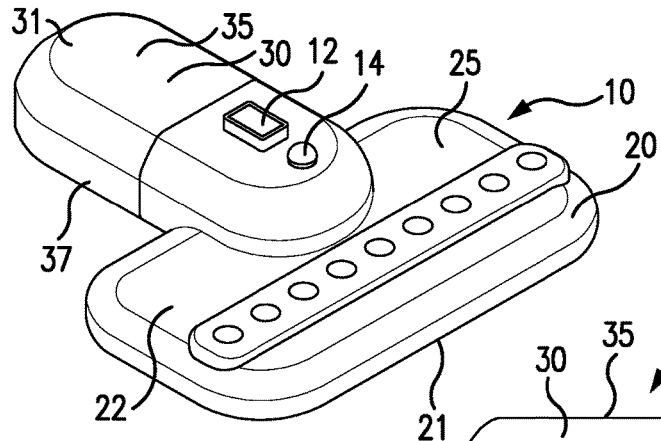
FIG. 9 is a perspective view of an example embodiment of the intelligent stud finder.

FIG. 9 is a perspective view of an example embodiment of the intelligent stud finder.

Optionally, the stud finder can have a power light 14 (FIGS. 9-12). For example, an LED can be used as a power light 14 so indicating the stud finder is in the "on" state and ready for operation, e.g. to find one or more studs, or otherwise execute programmable code and executable program logic.

Figure 10:
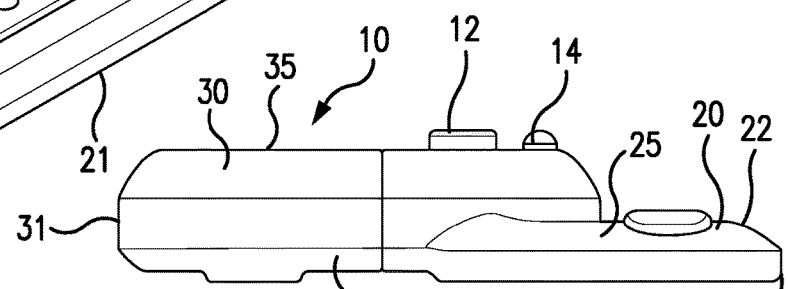
FIG. 10 is a second side view of the example embodiment of the intelligent stud finder.

FIG. 10 is a second side view of the example embodiment of the intelligent stud finder.

Figure 11:
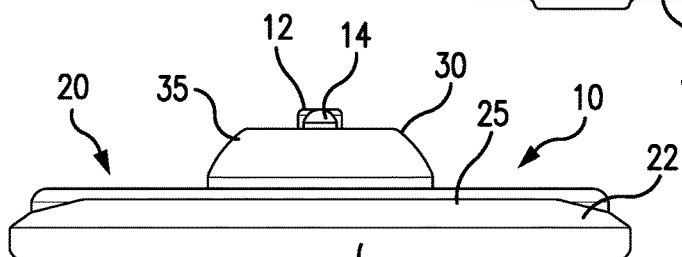
FIG. 11 is a sensor end view of the example embodiment of the intelligent stud finder.

FIG. 11 is a sensor end view of the example embodiment of the intelligent stud finder.

Figure 12:
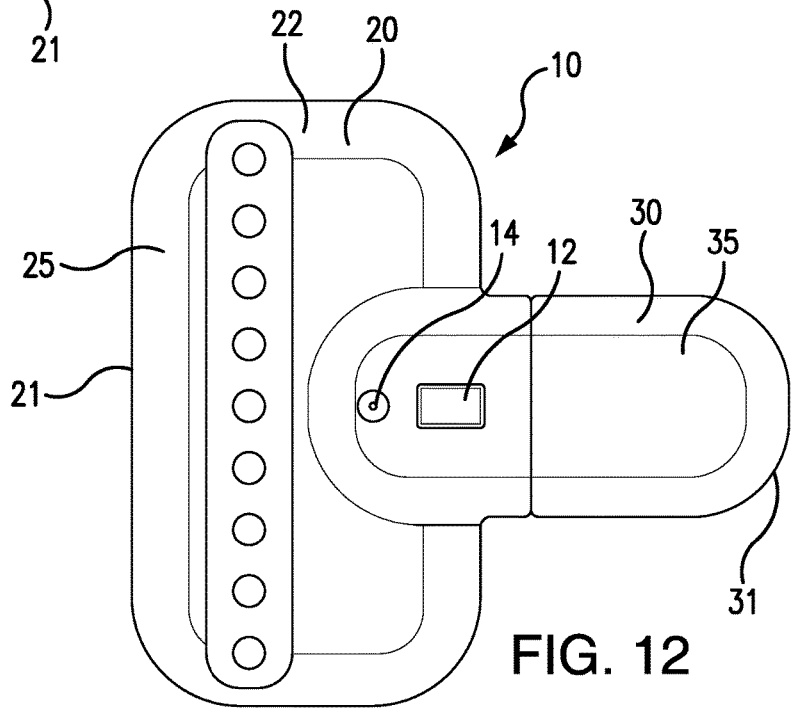
FIG. 12 is a display-side view of the example embodiment of the intelligent stud finder.

FIG. 12 is a display-side view of the example embodiment of the intelligent stud finder.

FIGS. 13, 14, 16-17, 19-23, 26-28, 30-32 and 34 are schematic representations of the sensor paddle having a PCB with LEDs and a handle portion. For simplicity of description, the respective LEDS in the figures are numbered 1 . . . n, e.g. 1, 2, . . . 9. In these figures, 1st LED 301 is referred to as LED 1 marked on the figure as the number "1" under the circle for the LED 1; 2nd LED 302 is referred to as LED 2 marked on the figure as the number "2" under the circle for the LED 2; 3rd LED 303 is referred to as LED 3 marked on the figure as the number "3" under the circle for the LED 3; 4th LED 304 is referred to as LED 4 marked on the figure as the number "4" under the circle for the LED 4; 5th LED 305 is referred to as LED 5 marked on the figure as the number "5" under the circle for the LED 5; 6th LED 306 is referred to as LED 6 marked on the figure as the number "6" under the circle for the LED 6; 7th LED 307 is referred to as LED 7 marked on the figure as the number "7" under the circle for the LED 7; 8th LED 308 is referred to as LED 8 marked on the figure as the number "8" under the circle for the LED 8; and 9th LED 309 is referred to as LED 9 marked on the figure as the number "9" under the circle for the LED 9.

Figure 13:
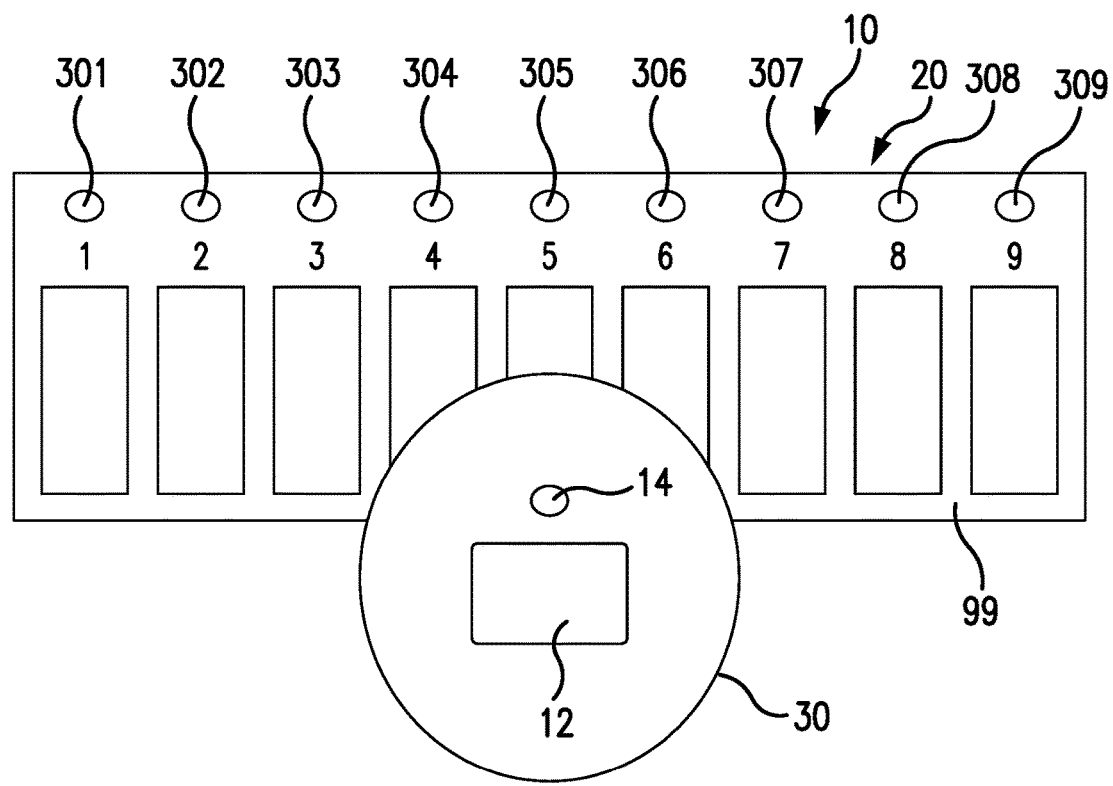
FIG. 13 is a schematic representation of the PCB with LEDs and a handle portion.

FIG. 13 is a schematic representation of the PCB with LEDs and a handle portion.

Figure 14:
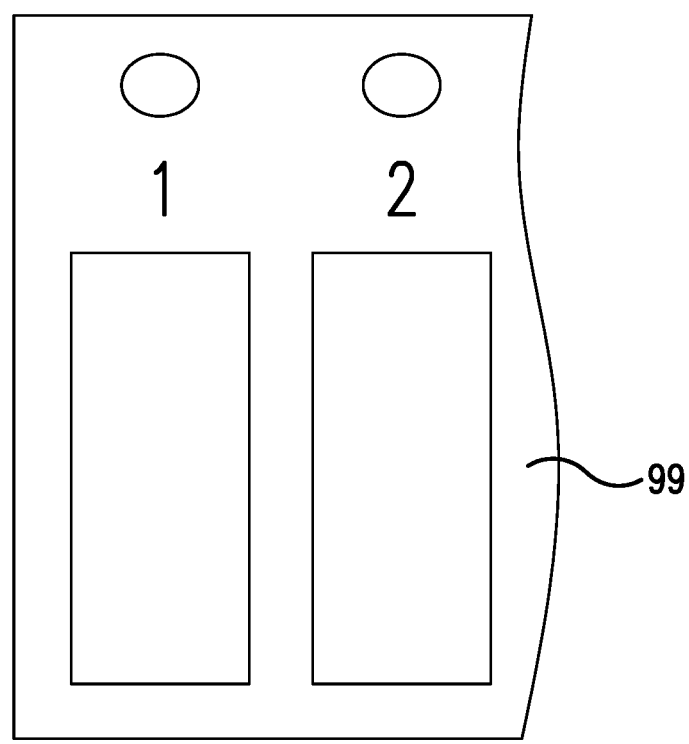
FIG. 14 is a detail view of two capacitive plates with their respectively associated LEDs.

FIG. 14 is a detail view of two capacitive plates with their respectively associated LEDs.

Figure 15:
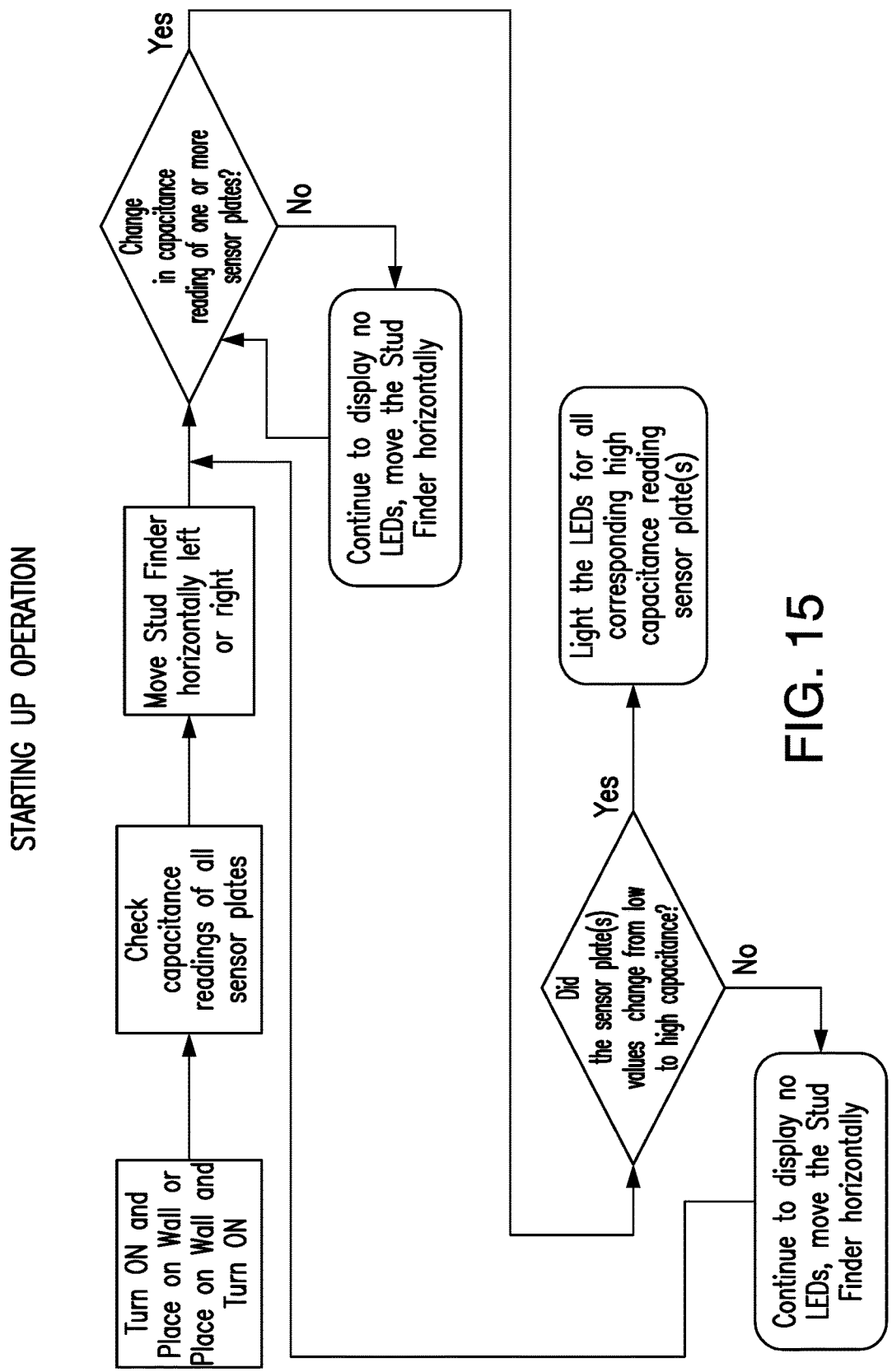
FIG. 15 is a logic flow diagram for an example starting up operation for the intelligent stud finder.

FIG. 15 is a logic flow diagram for an example starting up operation for the intelligent stud finder.

Figure 16:
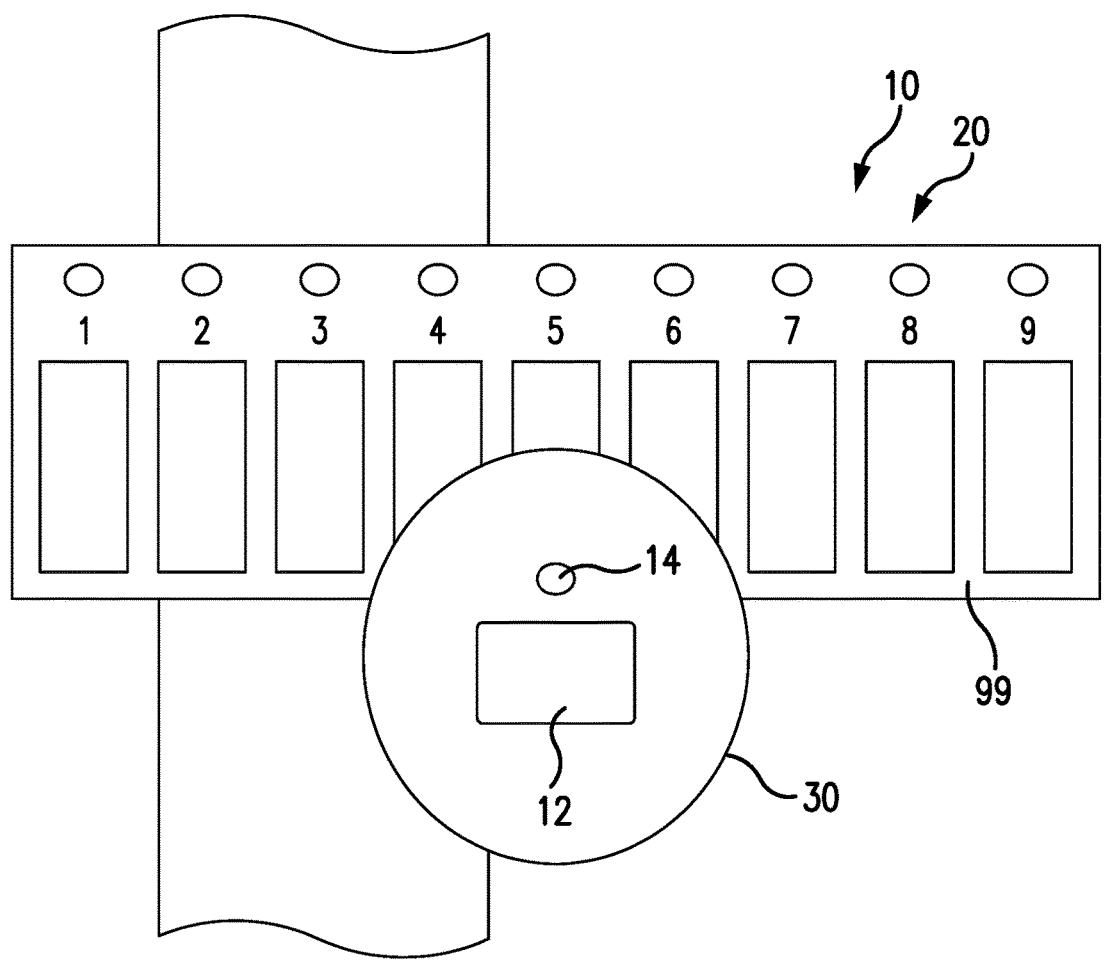
FIG. 16 is an example of a starting position projected over a stud.

FIG. 16 is an example of a starting position projected over a stud.

In embodiment the stud find can be calibrated without Moving.

Optionally, the stud finder can be configured to not display any lighted LEDs when initially placed on the wall 3500, target surface, or other surface to be sensed for studs, conduits, or other sources of changes in capacitance. Herein, the wall 3500 is used as an example of a target surface. The technology disclosed herein can be used to hang objects on a wide variety of target surfaces which can be made from a broad variety of materials, such as drywall, presentation boards, support structures, display structures, edifices, sets, scenery, or other support onto which an object and/or thing can be hung, all of which can be encompassed by the meaning of target surfaces as used herein.

In an embodiment, the stud finder will need to move 1 plate length in order to cause any LEDs to be lighted.

In an embodiment, the stud finder will need to see a capacitive plate increase in capacitance value of greater than the average noise value of capacitance readings, or a set point value of capacitance, in order to cause an LED associated with a capacitive plate to be lighted. In an embodiment, a set point difference in capacitance of 0.5%, or 1%, or 2%, or 3%, or greater, of the capacitance value of a capacitive plate when not sensing a stud can activate the LED associated with that capacitive plate to indicated that a stud has been sensed. In another embodiment, the set point value (also as "set point") of difference in capacitance is a difference greater than the nominal difference between capacitive plates, or greater than the capacitance noise values of the capacitive plates.

In an embodiment, the stud finder can be limited to lighting a maximum of three (3) LEDs at any one time.

Example 1

In an embodiment, the stud finder can have a Beginning Operation method having the steps below.

Step 1: Place the stud finder on the wall 3500 and turn it on.

Step 2: Once the unit is on, the capacitive plates will send readings to the microprocessor. The microprocessor will compare the capacitive values and the plates with a higher value will indicate a stud. In this example, capacitive plates 2, 3, and 4 in FIG. 16 are over a stud so they will read a high capacitive value. Capacitive plates 1, 5, 6, 7, 8, and 9 are not over a stud so they will read low capacitive values in comparison to the values of capacitive plates 2, 3, and 4. The unit will not turn on any LEDs though aside from the power light indicator.

Step 3: The unit will only turn on LEDs when a capacitive value changes from low to high.

Step 4: As the stud finder is moved to the left, as shown in FIG. 16, sensor plates 3 and 4 remain high capacitive values and 1, 6-9 remain low capacitive values. Capacitive plate 2 is no longer over the stud so its capacitive value changes from high to low. Capacitive plate 5 is now over the stud so its capacitive value changes from low to high. Now that this change from low to high capacitive value has occurred on one of the capacitive plates, the Stud Finder will turn on the LEDs corresponding to the capacitive plates indicating high capacitive values.

Optionally, in an embodiment an accelerometer can be used in lieu of or in addition to capacitive plates. Once the stud finder is powered and placed on the wall 3500, the accelerometer will return a value of zero when the unit is not moving. Once the stud finder is moved along the wall 3500, the accelerometer will verify an increase in acceleration in the lateral direction, either positive or negative. The processor would then recognize that the stud finder moved. At this point, the stud finder will check capacitive readings and will send a signal to light the LEDs that are associated with the sensor plates with high capacitive readings.

Figure 17:
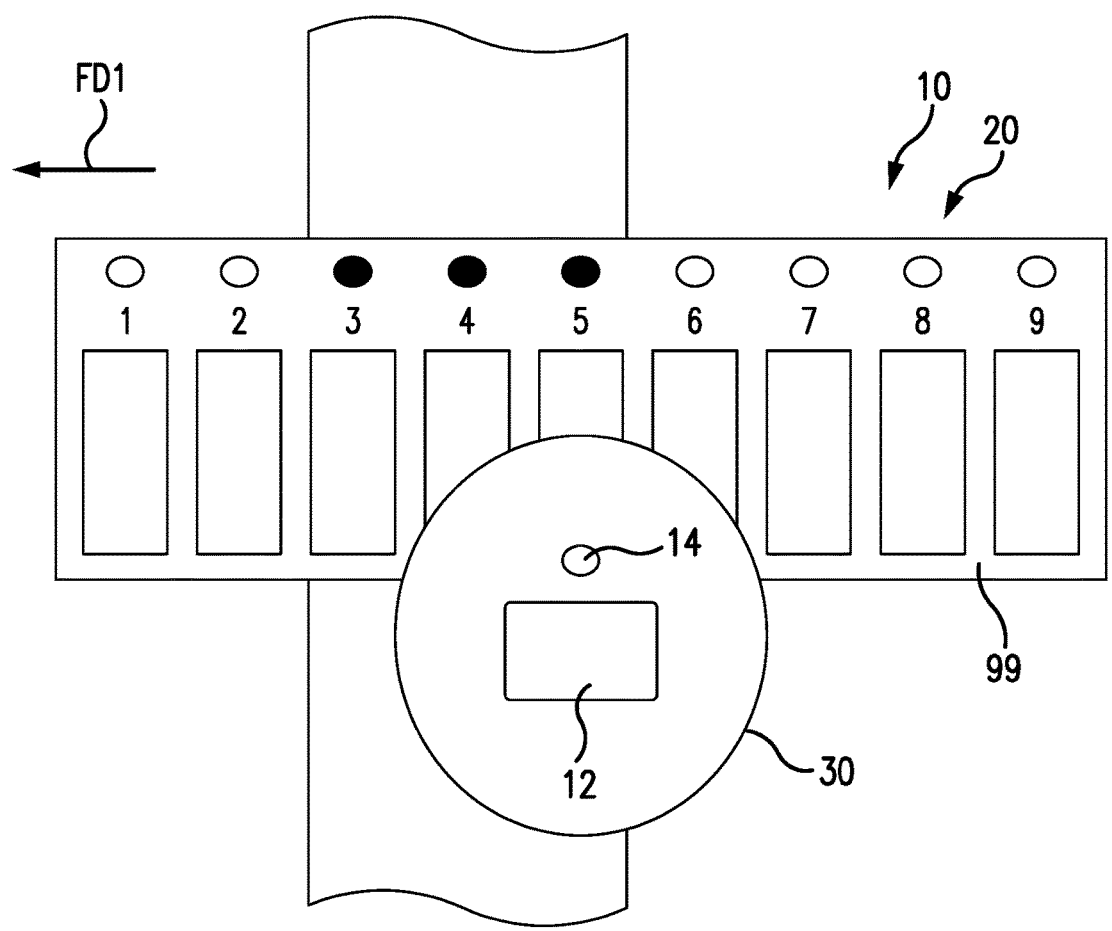
FIG. 17 shows the movement of the stud finder to activate the LEDs projected over the stud.

FIG. 17 shows the movement of the stud finder to activate the LEDs projected over the stud.

FIG. 18A is a logic flow diagram for an example of a no stud operation.

Figure 18B:
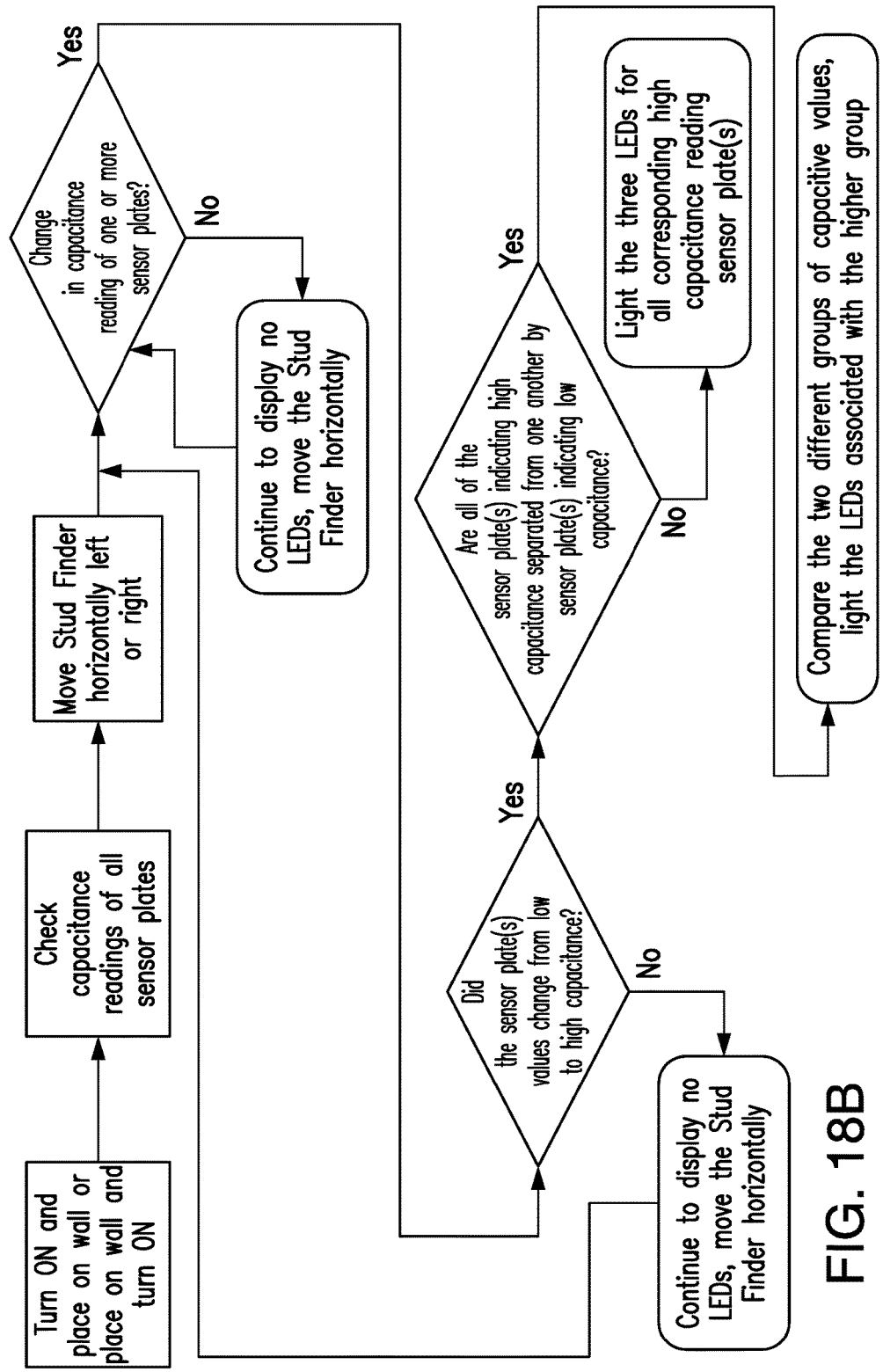
FIG. 18B is a logic flow diagram for an example of a stronger capacitive value operation.

FIG. 18B is a logic flow diagram for an example of a stronger capacitive value operation.

When two separate groups of sensor plates indicate high capacitance, the unit will compare which group of values are higher, and display those LEDs. In the situation above, the left group of capacitive values has higher values than the right group of capacitive values, so left group of LEDs are displayed.

Figure 18C:
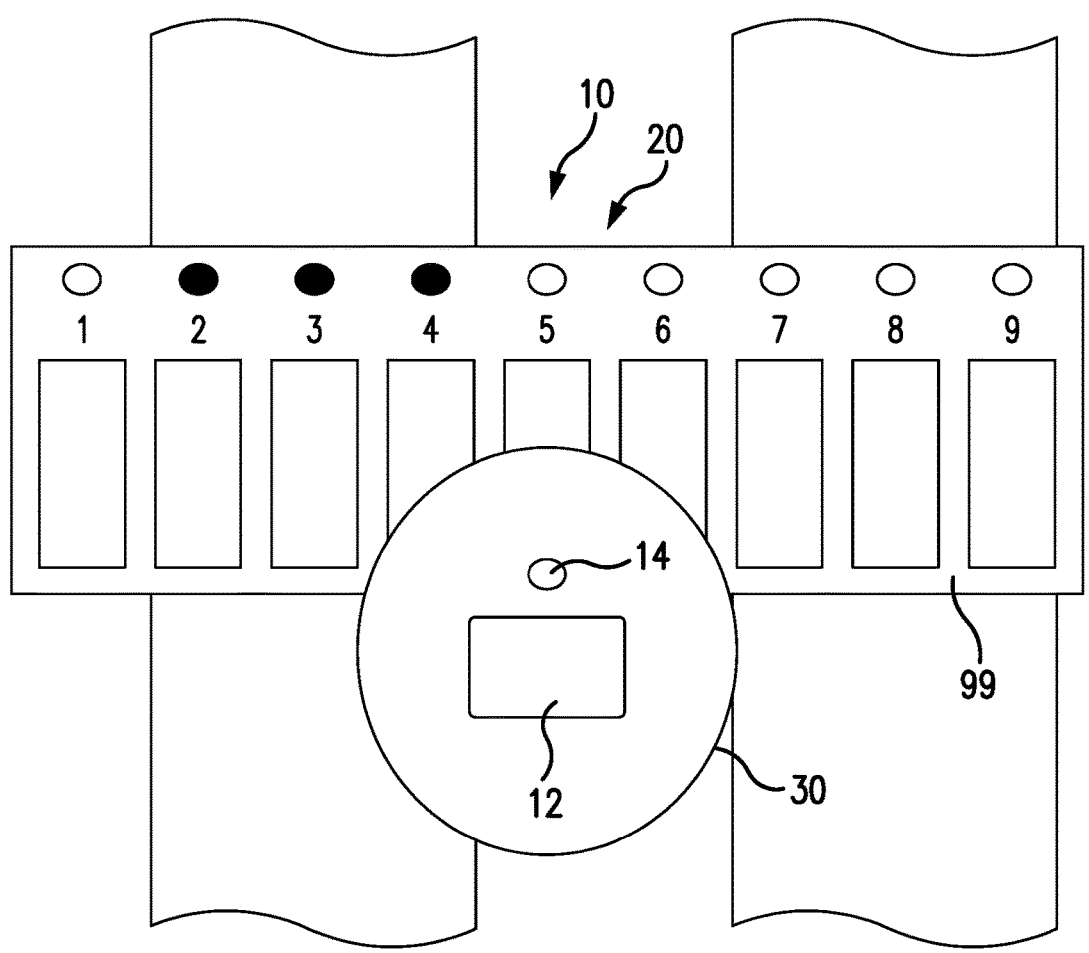
FIG. 18C is a schematic showing a result when the capacitive plates over a first stud have higher values that the capacitive places over a second stud.

FIG. 18C is a schematic showing a result when the capacitive plates over a first stud have higher values that the capacitive places over a second stud.

Figure 18D:
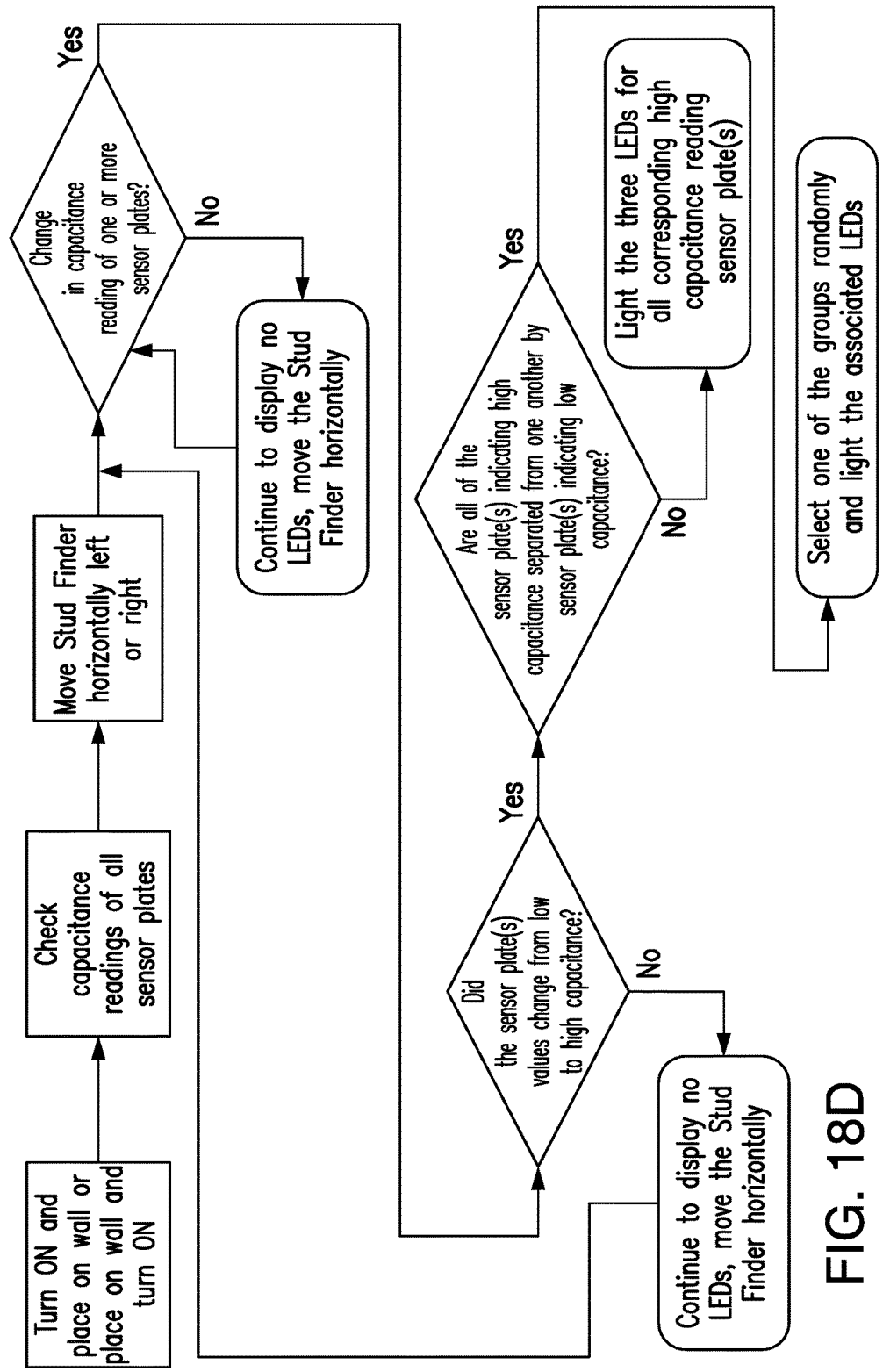
FIG. 18D is a logic flow diagram for an example of a random operation.

FIG. 18D is a logic flow diagram for an example of a random operation. When two separate groups of sensor plates indicate high capacitance, the unit will randomly select one of the groups and display the LEDs of the selected group.

Figure 18E:
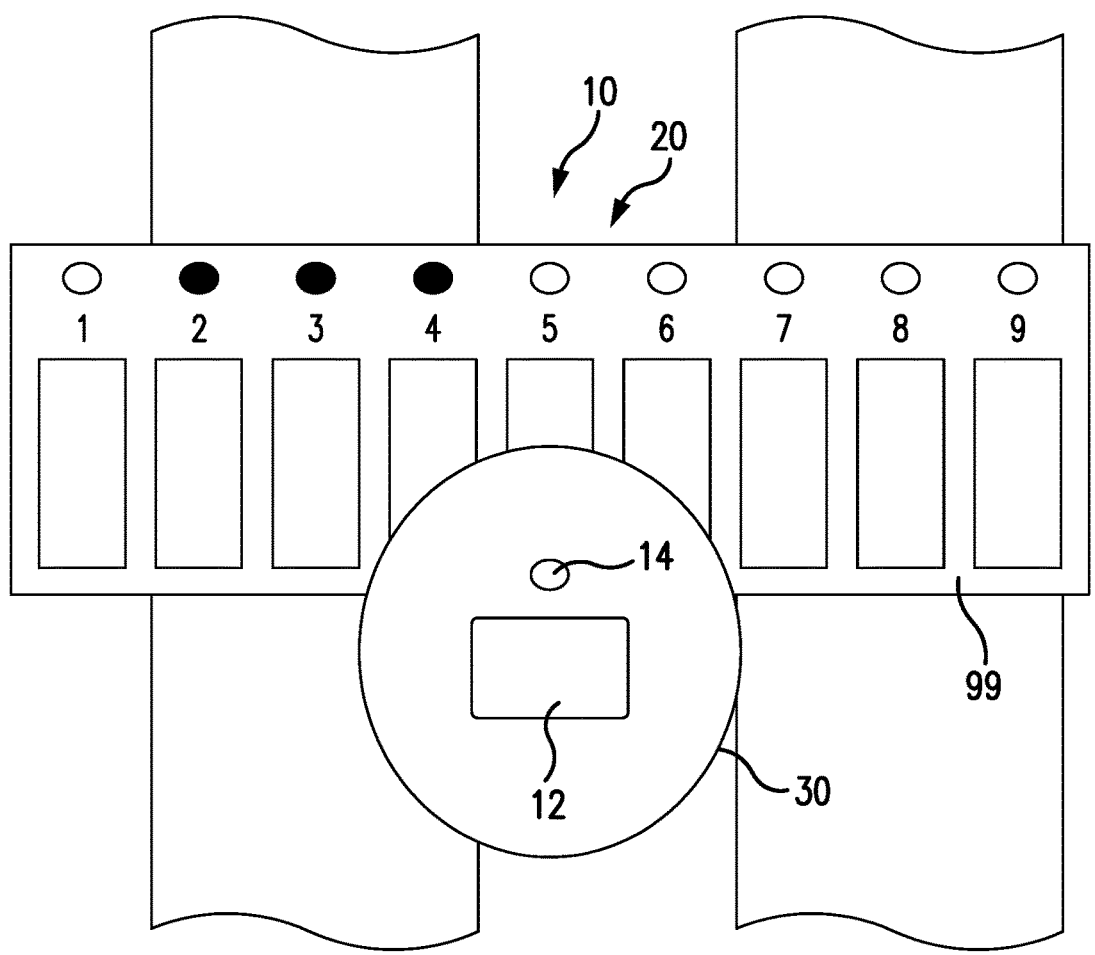
FIG. 18E is a schematic showing a result when the capacitive plates over a first stud have a high capacitance and the capacitive places over a second stud also have a high capacitance.

FIG. 18E is a schematic showing a result when the capacitive plates over a first stud have a high capacitance and the capacitive places over a second stud also have a high capacitance.

FIG. 18F is a logic flow diagram for an example of a first (left) stud operation. When two separate groups of sensor plates indicate high capacitance, the unit will display the left group of three LEDs.

Figure 18G:
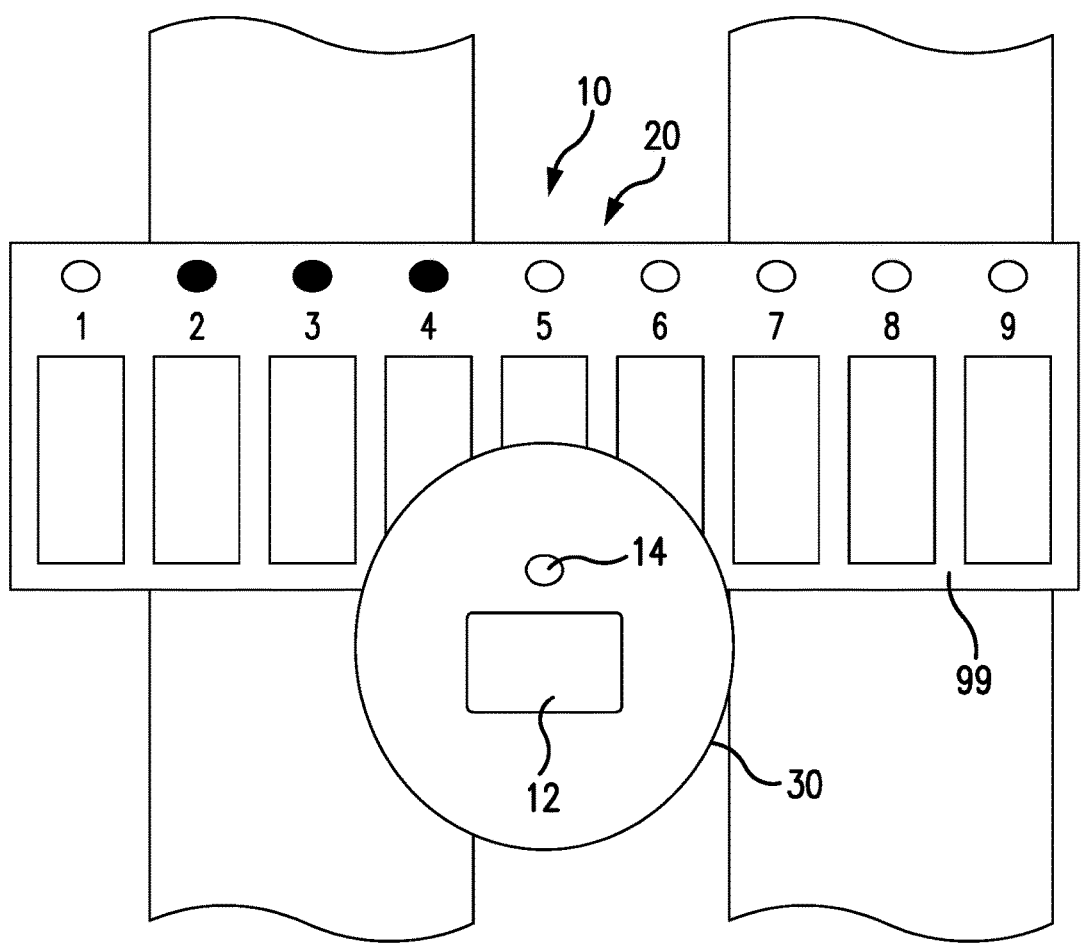
FIG. 18G is a schematic showing a result when a first stud have a high capacitance and the capacitive places over a second stud also have a high capacitance and three LEDs projected over the first (left) stud are lighted.

FIG. 18G is a schematic showing a result when a first stud have a high capacitance and the capacitive places over a second stud also have a high capacitance and three LEDs projected over the first (left) stud are lighted.

Figure 18H:
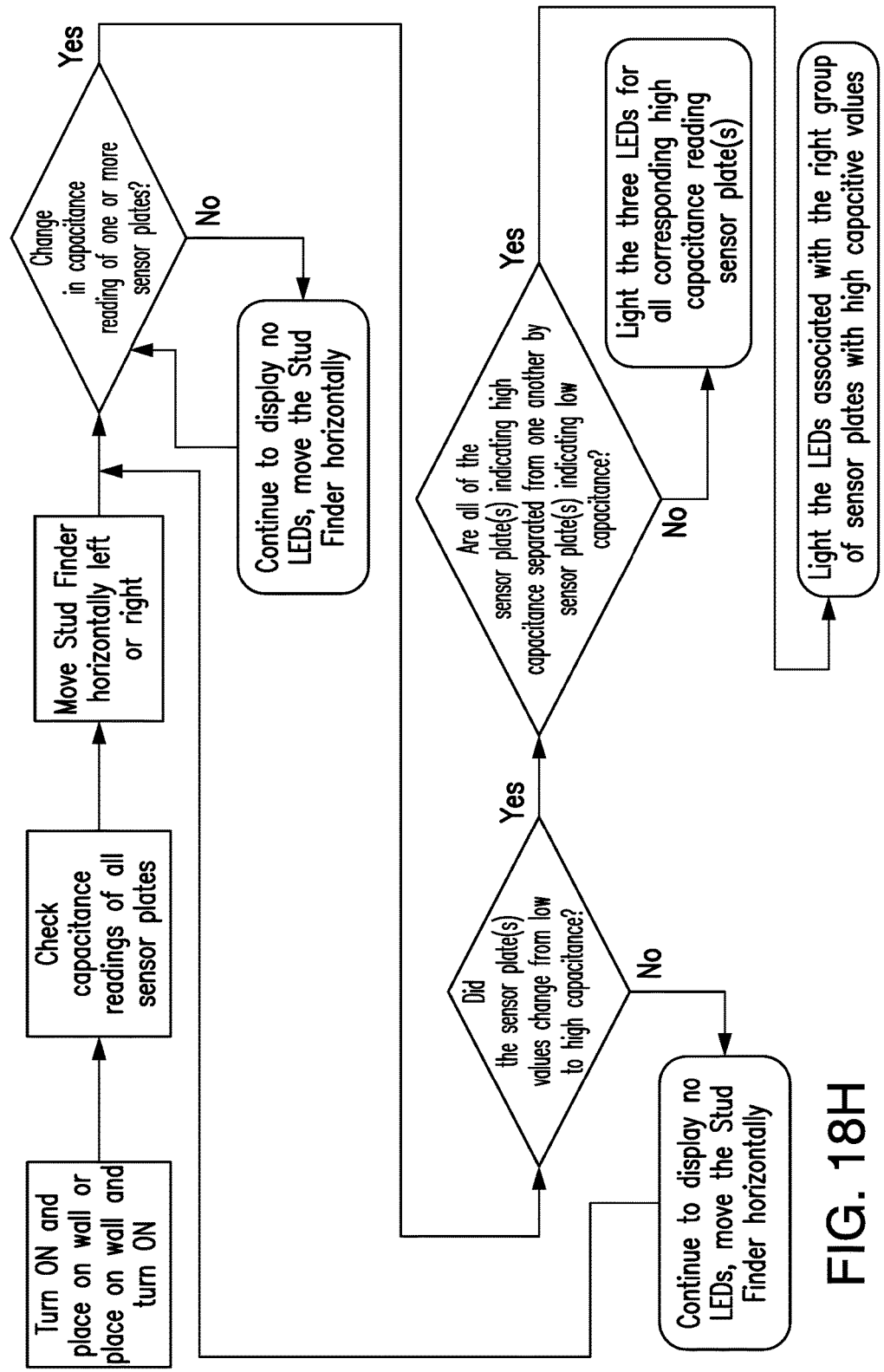
FIG. 18H is a logic flow diagram for an example of a second (right) stud operation.

FIG. 18H is a logic flow diagram for an example of a second (right) stud operation. When two separate groups of sensor plates indicate high capacitance, the unit will display the right group of three LEDs. Optionally, when two separate groups of sensor plates indicate high capacitance from being projected over separated studs, the unit can have no lighted LEDs.

Figure 18I:
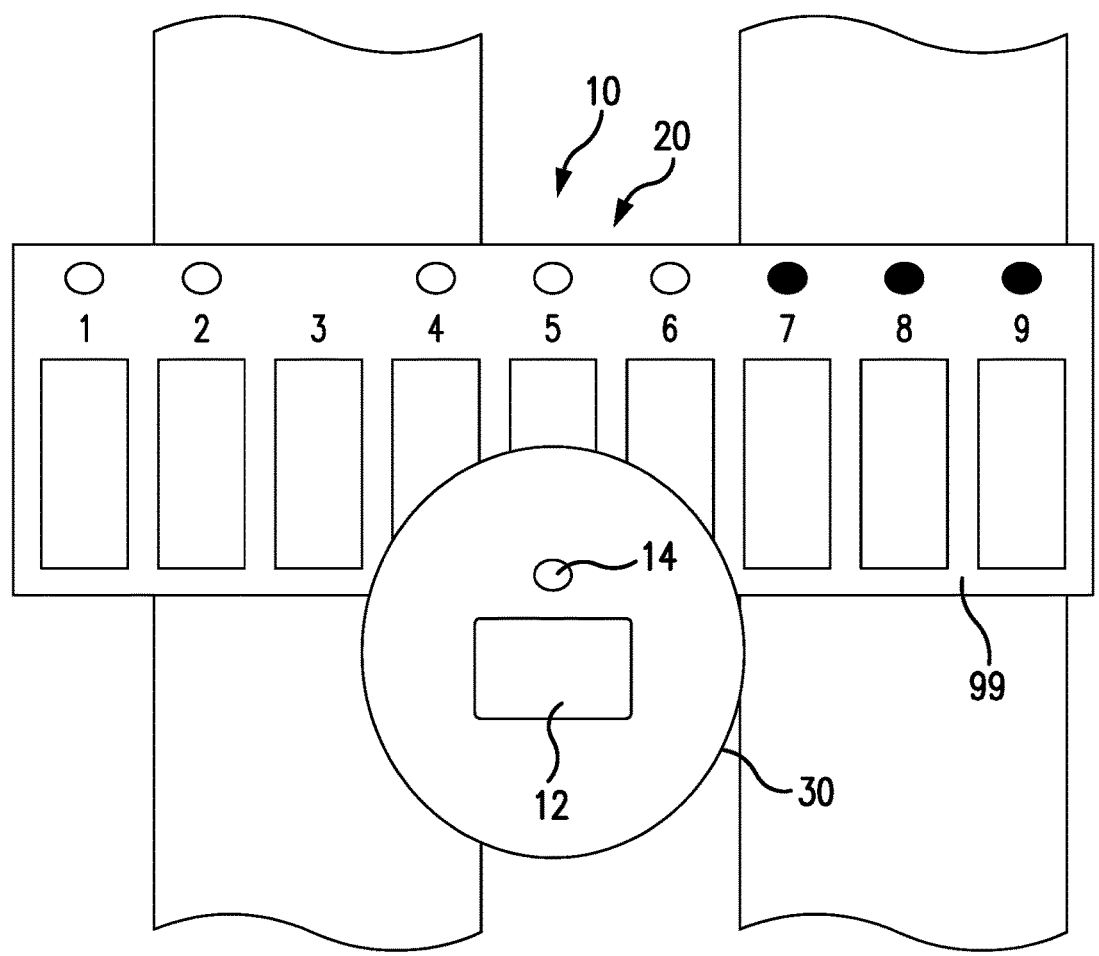
FIG. 18I is a schematic showing a result when a first stud have a high capacitance and the capacitive places over a second stud also have a high capacitance and three LEDs projected over the second (right) stud are lighted.

FIG. 18I is a schematic showing a result when a first stud have a high capacitance and the capacitive places over a second stud also have a high capacitance and three LEDs projected over the second (right) stud are lighted.

Figure 18J:
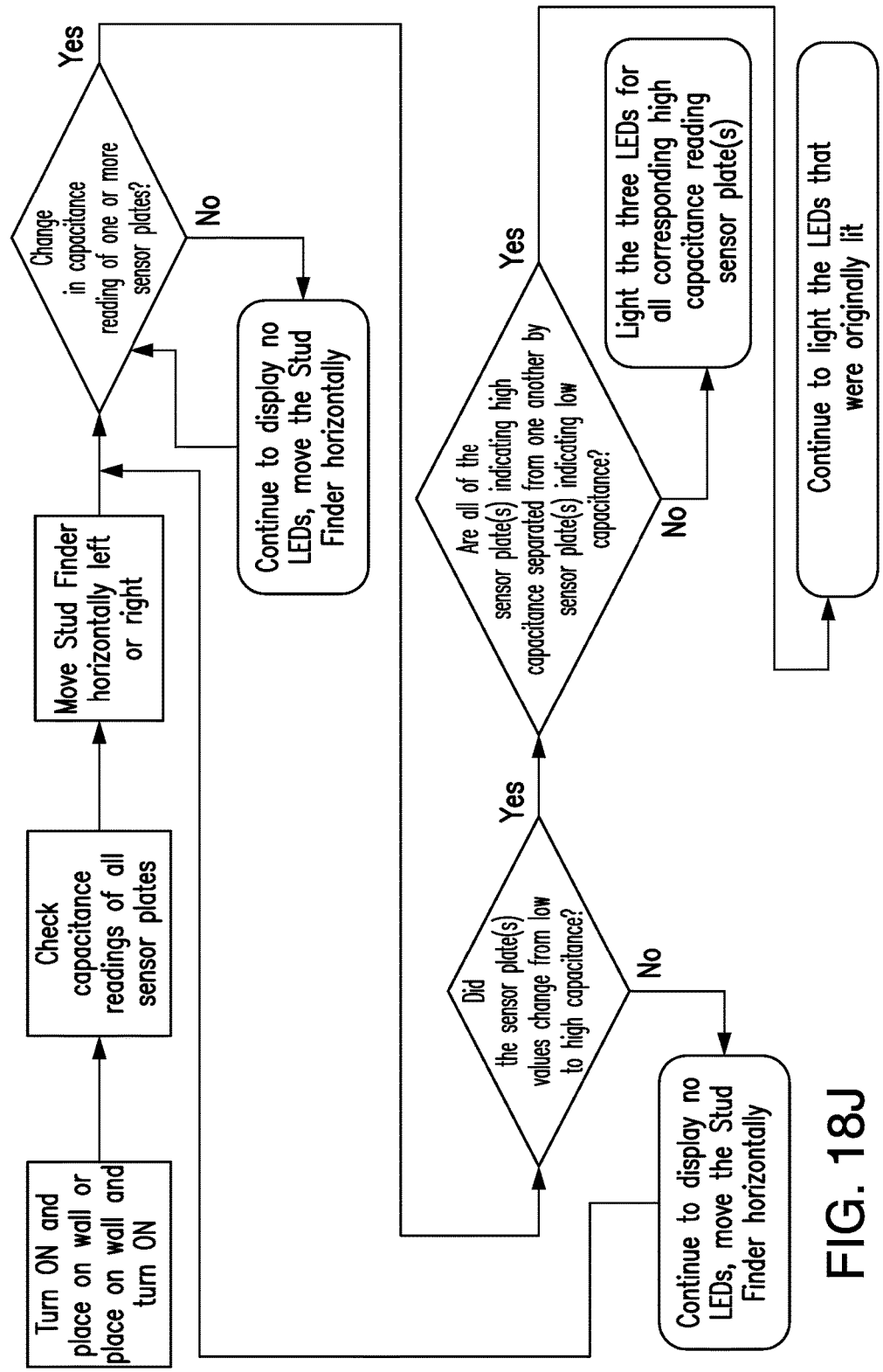
FIG. 18J is a logic flow diagram for an example of a first stud operation.

FIG. 18J is a logic flow diagram for an example of a first stud operation. When two separate groups of sensor plates indicate high capacitance, the unit will always show the first stud it encountered. For example, in FIGS. 18K2 and 18K3, the stud finder senses both studs but remains showing the first stud and the first stud only.

FIG. 18K1 is a schematic showing the stud finder projected over a second stud.

FIG. 18K2 is a schematic showing the stud finder projected over the earlier encountered second stud and a portion of a later encountered first stud.

FIG. 18K3 is a schematic showing the stud finder projected over both the earlier encountered second stud and the later encountered first stud.

Figure 18L:
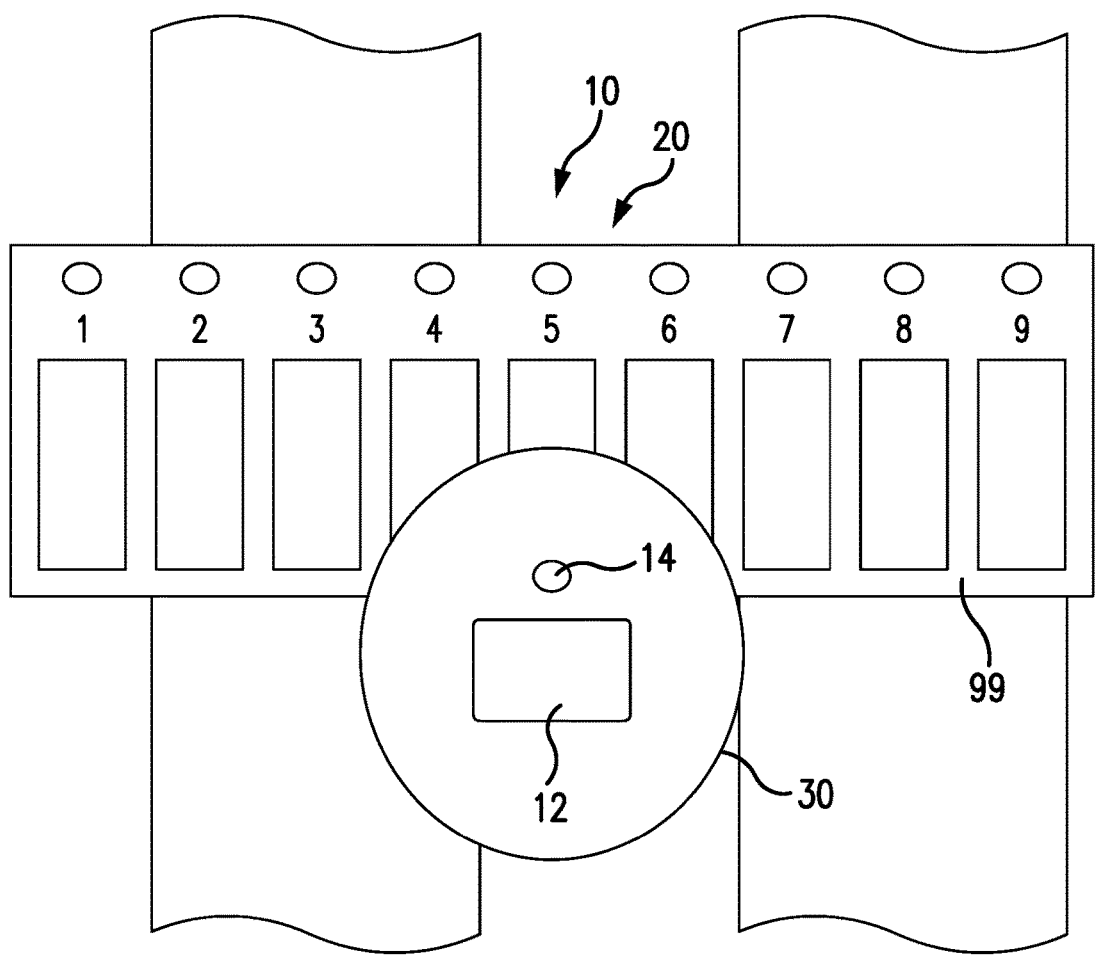
FIG. 18L is a schematic showing no LEDS when two separate groups of capacitive plates each indicate high capacitance.

FIG. 18L is a schematic showing no LEDS when two separate groups of capacitive plates each indicate high capacitance. Optionally, when two separate groups of sensor plates indicate high capacitance, the unit can display no LEDs.

Figure 18M:
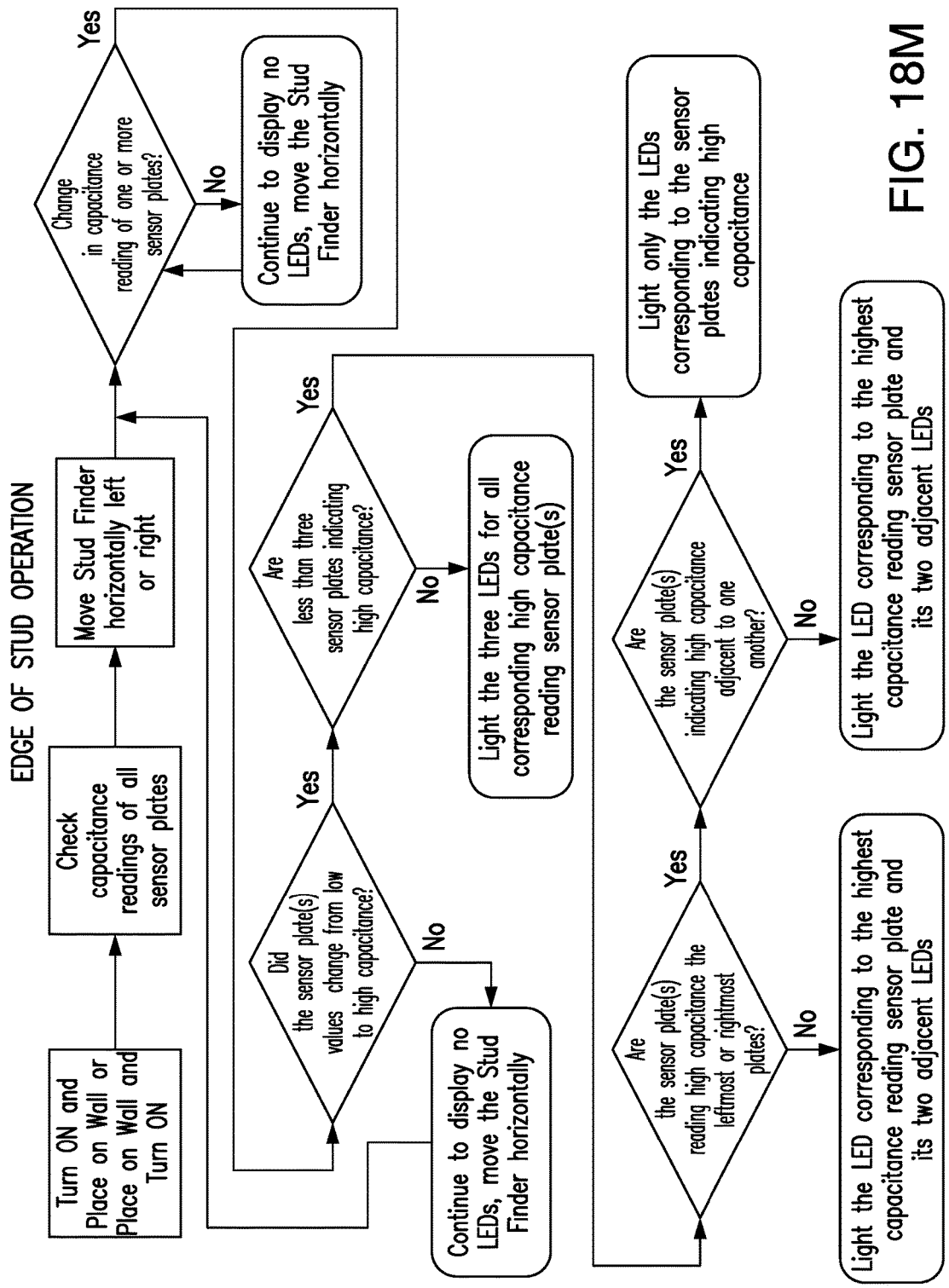
FIG. 18M is a logic flow diagram for an example edge of a stud operation for the intelligent stud finder.

FIG. 18M is a logic flow diagram for an example edge of stud operation for the intelligent stud finder.

Example 2

In an embodiment, the stud finder can have an Edge of Stud Finder Operation method having the steps below.

Step 1: When the sensor plates do not indicate any plates with high capacitance, the unit will not display any LEDs Step 2: As the unit approaches the edge of a stud, the outside edge sensor plate (sensor plate 1) will change from low to high capacitance and the corresponding LED will turn on Step 3: As the unit moves further across the stud, the second sensor plate will also change from low to high capacitance and the corresponding LED will also turn on Step 4: Only the 2 sensor plates on each end can display their LEDs without being a complete set of three. If only one or two central sensor plates indicate high capacitance but the other adjacent sensors indicate low capacitance, than the three closest LEDs to the central highest capacitance value will turn on.

FIG. 19 is a schematic showing the stud finder moving toward a stud.

Figure 20:
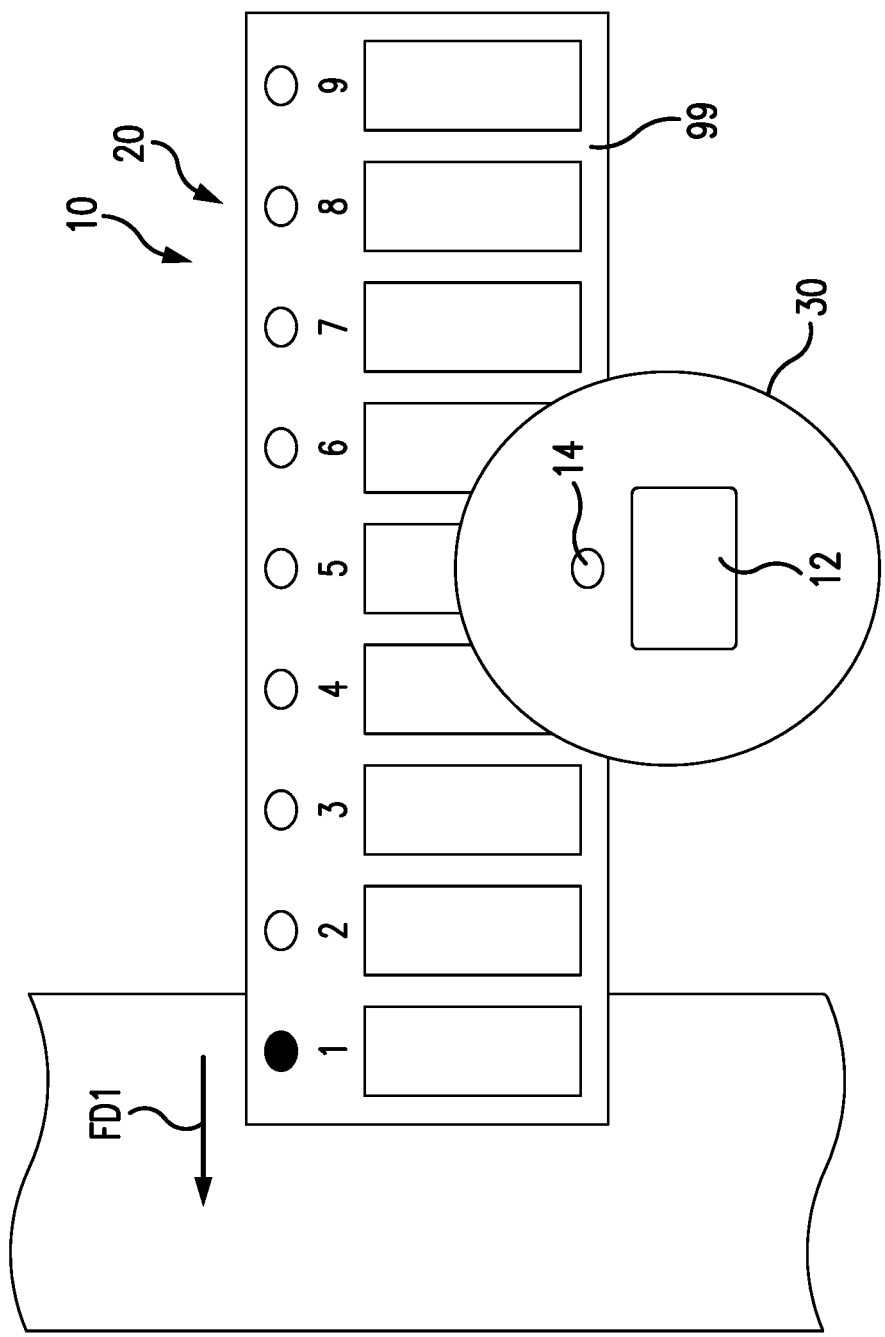
FIG. 20 is a schematic showing the stud finder having one capacitor plate projected over the stud.

FIG. 20 is a schematic showing the stud finder having one capacitor plate projected over the stud.

Figure 21:
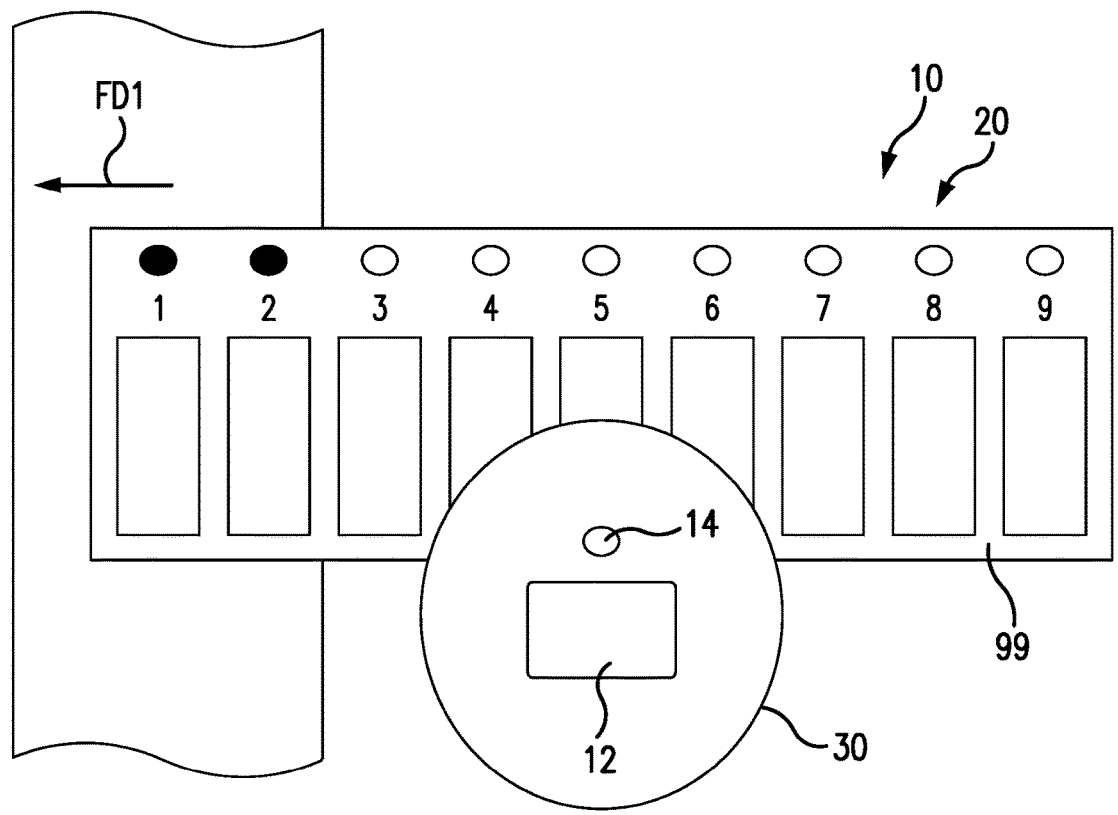
FIG. 21 is a schematic showing the stud finder having two capacitor plates projected over the stud.

FIG. 21 is a schematic showing the stud finder having two capacitor plates projected over the stud.

Figure 22:
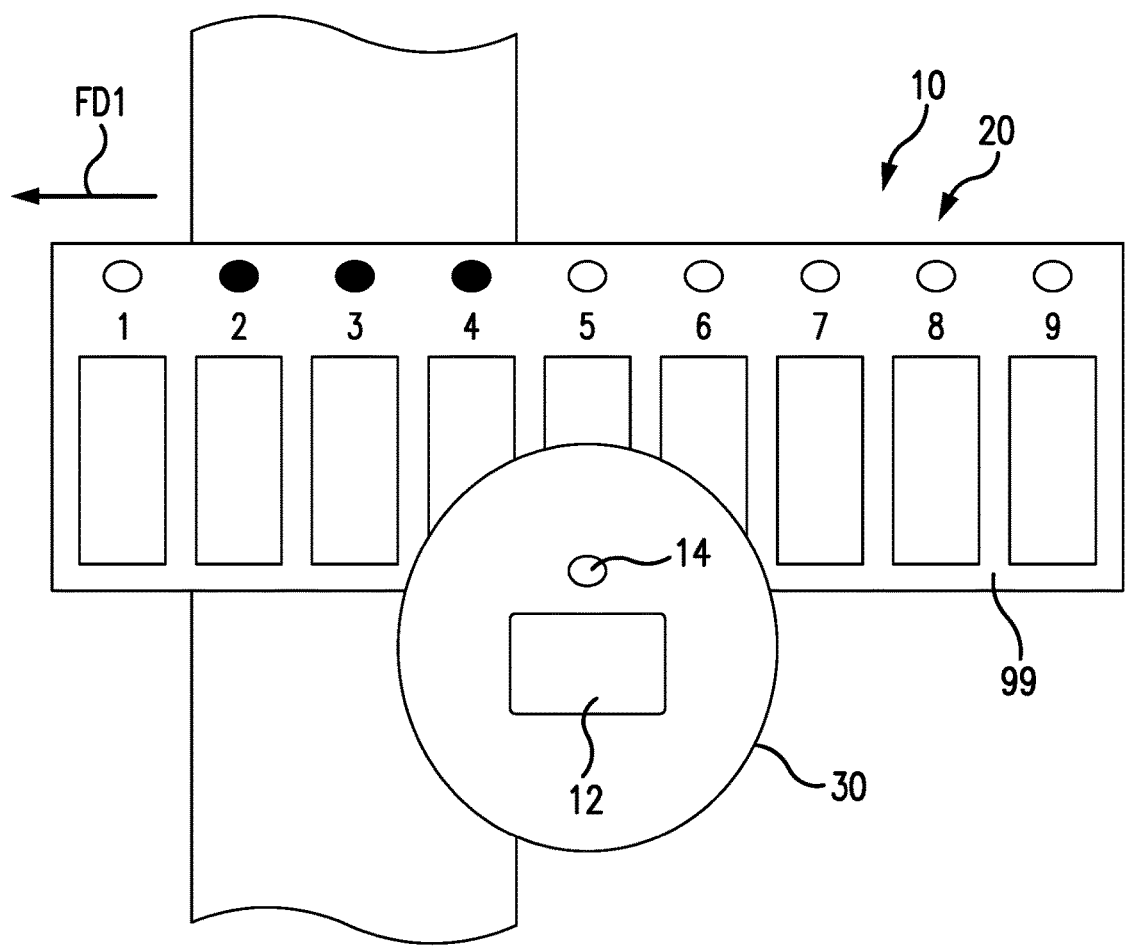
FIG. 22 is a schematic showing the stud finder having three capacitor plates projected over the stud.

FIG. 22 is a schematic showing the stud finder having three capacitor plates projected over the stud.

Figure 23:
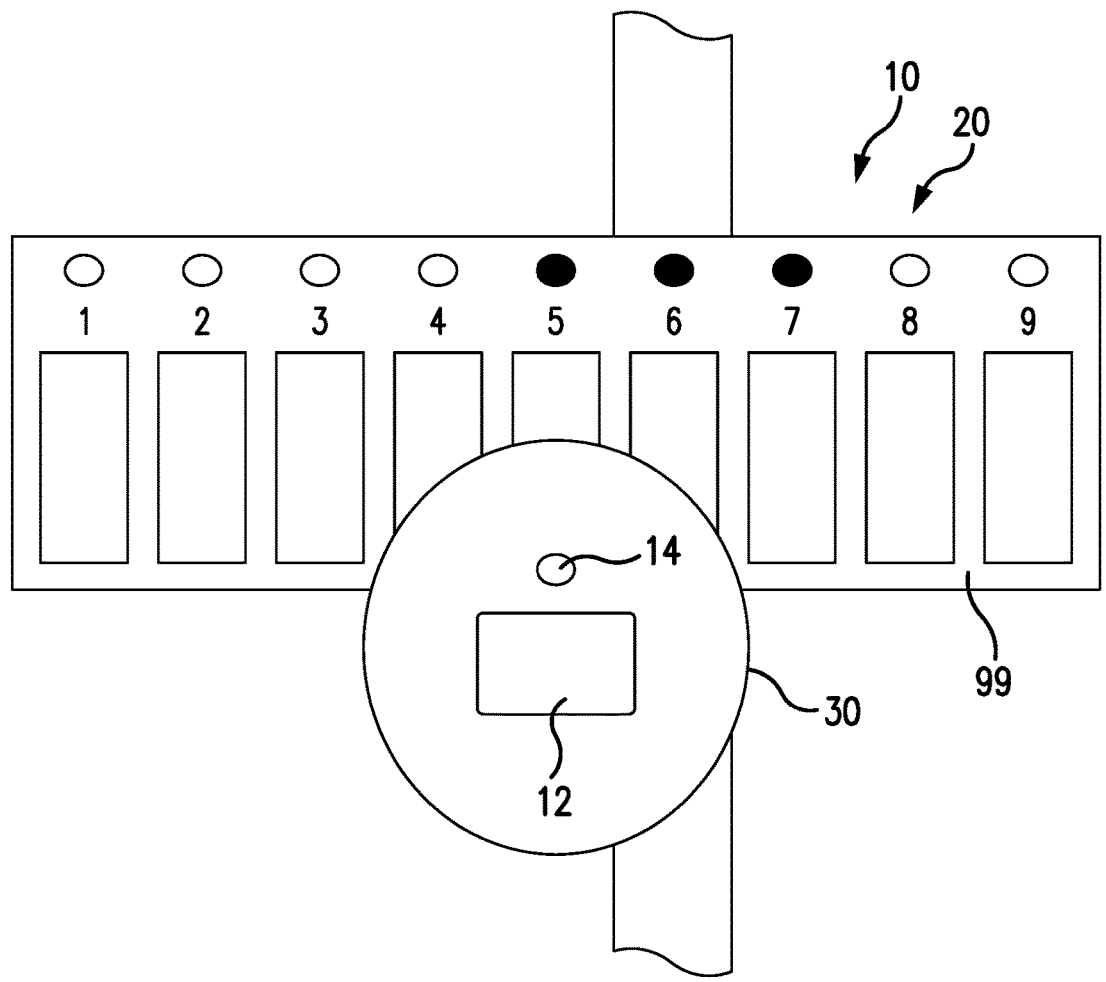
FIG. 23 is a schematic showing the stud finder having one capacitor projected over a conduit.

In another example, FIG. 23 is a schematic showing the stud finder having one capacitor projected over a conduit.

Figure 24:
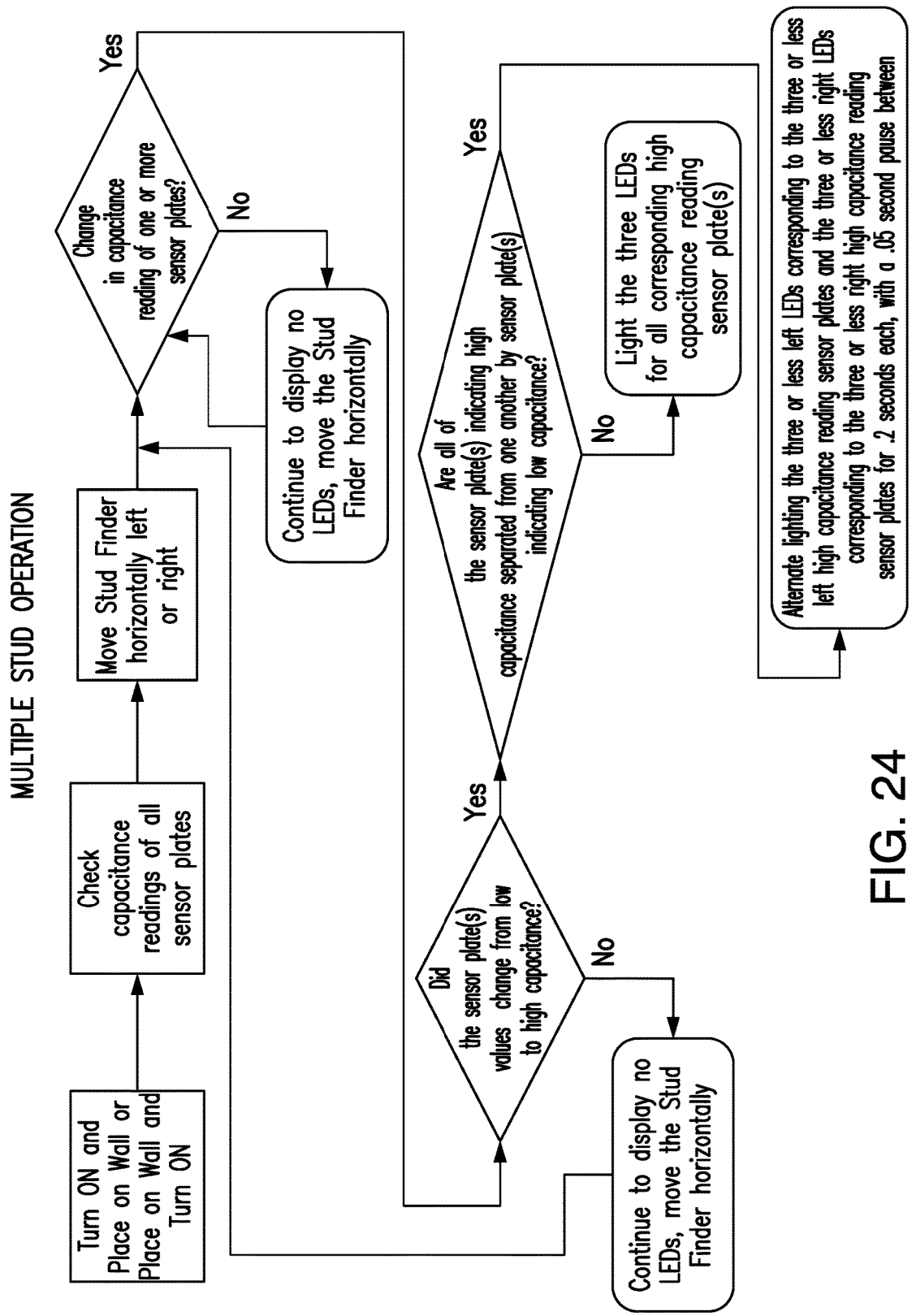
FIG. 24 is a logic flow diagram for a multiple stud operation for the intelligent stud finder.

FIG. 24 is a logic flow diagram for a multiple stud operation for the intelligent stud finder.

Figure 25:
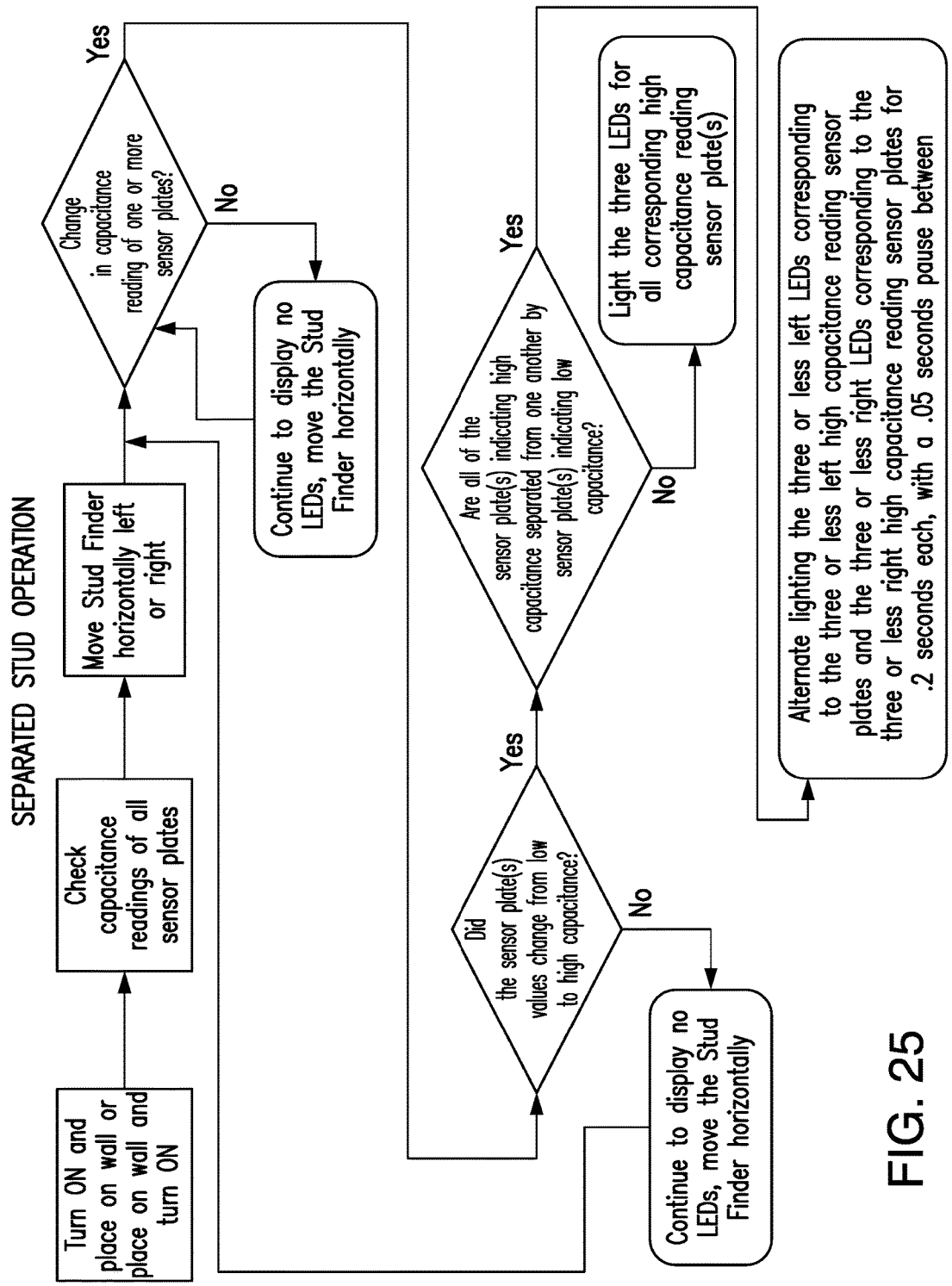
FIG. 25 is a logic flow diagram for a separated stud operation for the intelligent stud finder.

FIG. 25 is a logic flow diagram for a separated stud operation for the intelligent stud finder.

Example 3

In an embodiment, the stud finder can have a Two Separate Stud Operation method having the steps below.

Step 1: When two separate groups of sensor plates indicate high capacitance, the unit will display the left group of three LEDs for 0.2 seconds.

Step 2: The unit will have a 0.05 second delay, displaying no studs.

Step 3: The unit will then display the right group of three LEDs corresponding with the right group of sensor plates indicating high capacitance for 0.2 seconds, and then have another 0.05 second delay displaying no studs before repeating.

In another example, when multiple studs are sensed, the stud finder can communicate the following display of LEDs:

Step 1: Turn the 3 LEDs associated with the left stud on for 0.2 seconds;

Step 2: Turn off all LEDs for 0.05 seconds;

Step 3: Turn the 3 LEDs associated with the right stud on for 0.2 seconds;

Step 4: Turn off all LEDs for 0.05 seconds; and

Step 5: Repeat, on optional number of times from once to many, or for as long as the stud finder is maintained in the activation position projected over the multiple studs.

Figure 26:
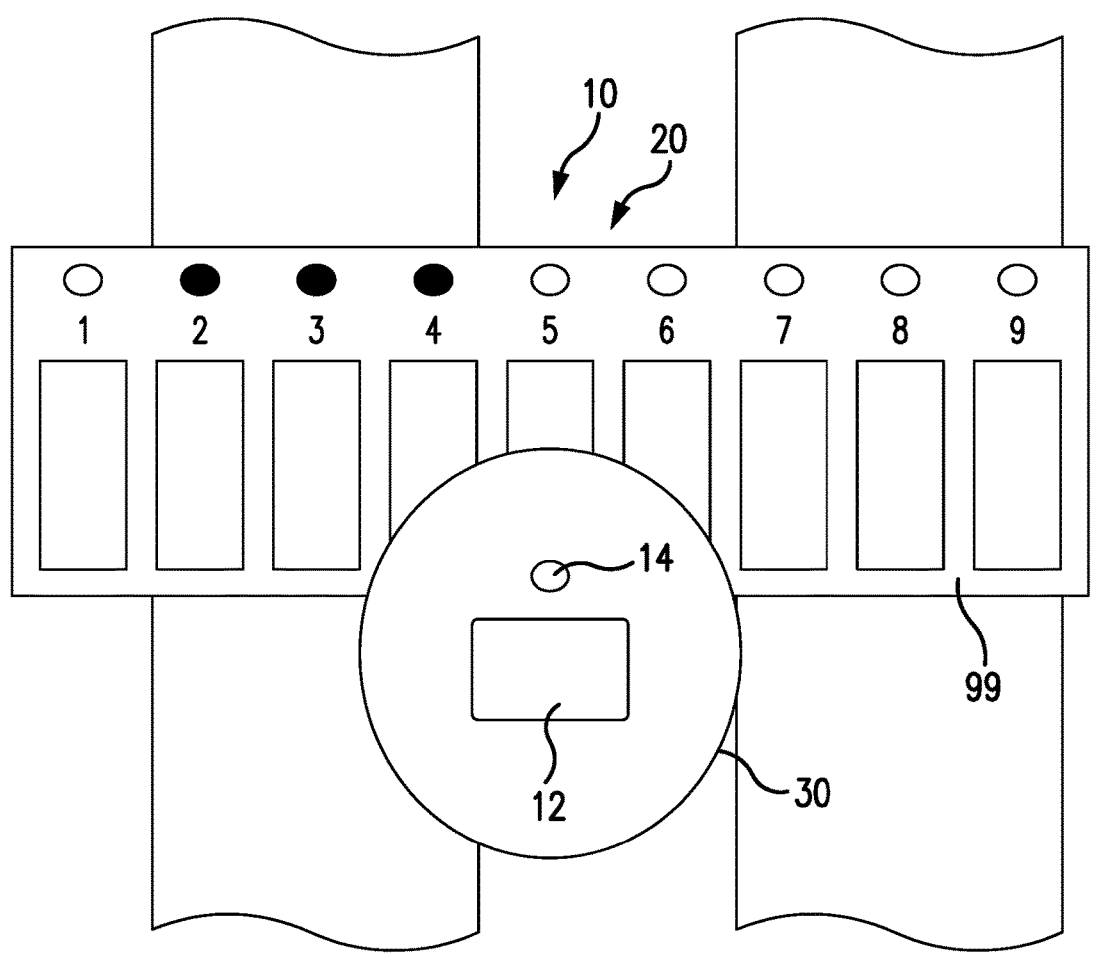
FIG. 26 is a schematic showing the stud finder having three capacitor plates and three lighted LEDs projected over a first stud and having three capacitor plates and three unlighted LEDs projected over a second stud.

FIG. 26 is a schematic showing the stud finder having three capacitor plates and three lighted LEDs projected over a first stud and having three capacitor plates and three unlighted LEDs projected over a second stud.

Figure 27:
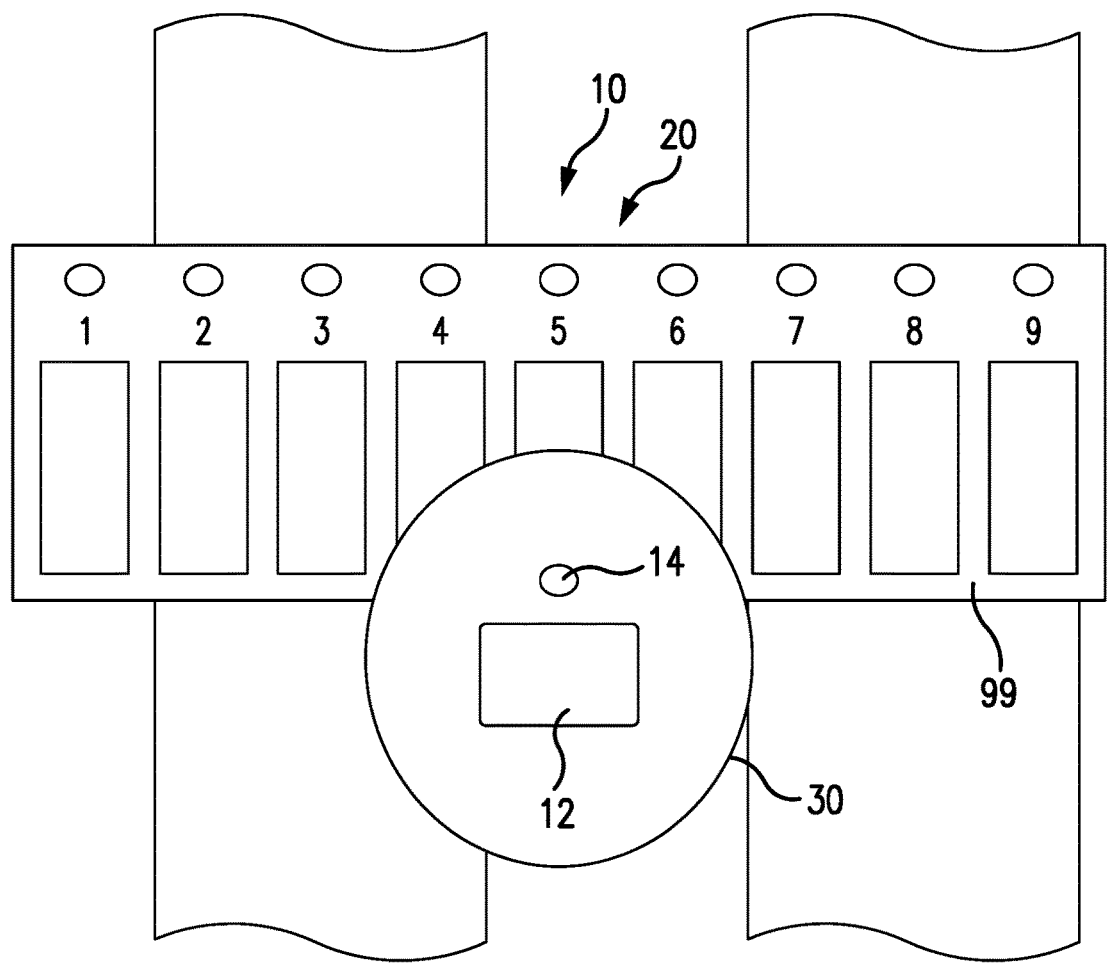
FIG. 27 is a schematic showing the stud finder having three capacitor plates and three unlighted LEDs projected over a first stud and having three capacitor plates and three unlighted LEDs projected over a second stud.

FIG. 27 is a schematic showing the stud finder having three capacitor plates and three unlighted LEDs projected over a first stud and having three capacitor plates and three unlighted LEDs projected over a second stud.

Figure 28:
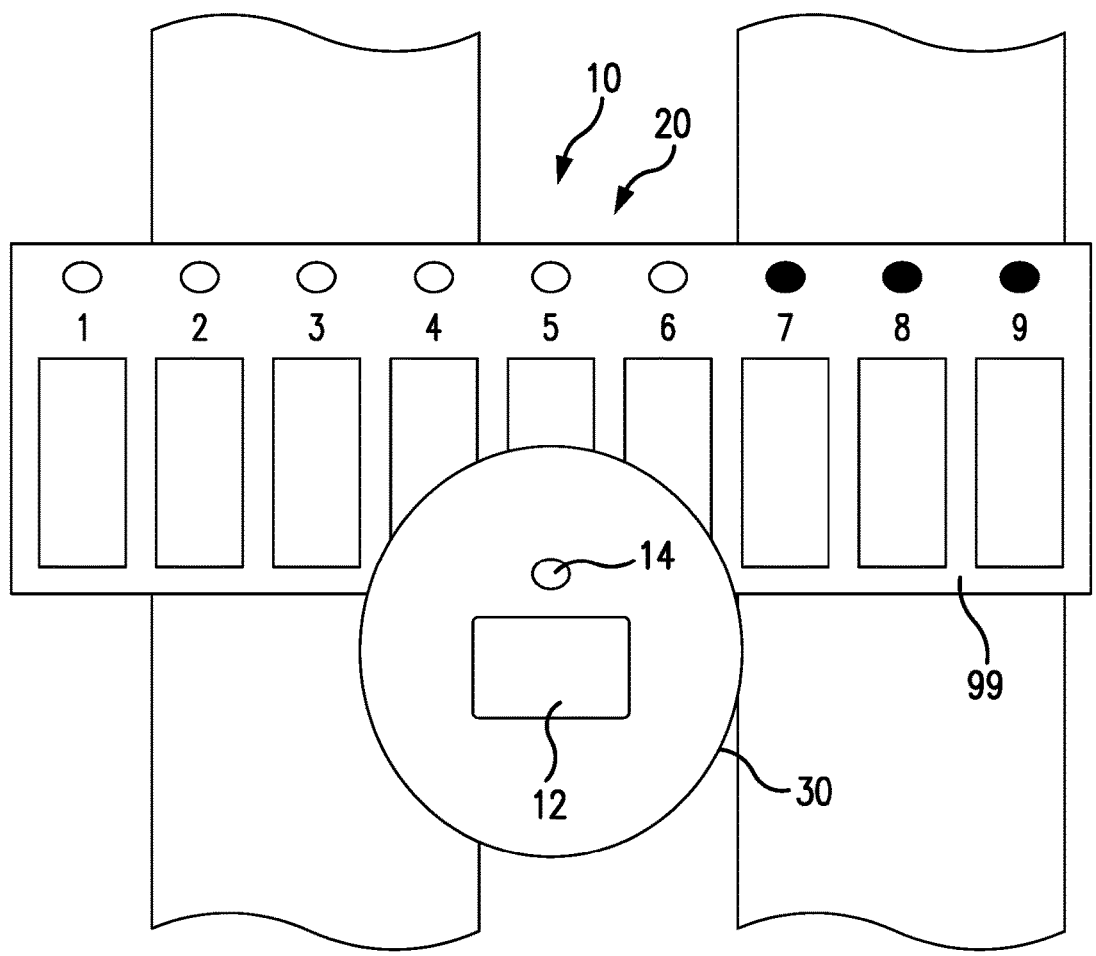
FIG. 28 is a schematic showing the stud finder having three capacitor plates and three unlighted LEDs projected over a first stud and having three capacitor plates and three lighted LEDs projected over a second stud.

FIG. 28 is a schematic showing the stud finder having three capacitor plates and three unlighted LEDs projected over a first stud and having three capacitor plates and three lighted LEDs projected over a second stud.

Figure 29:
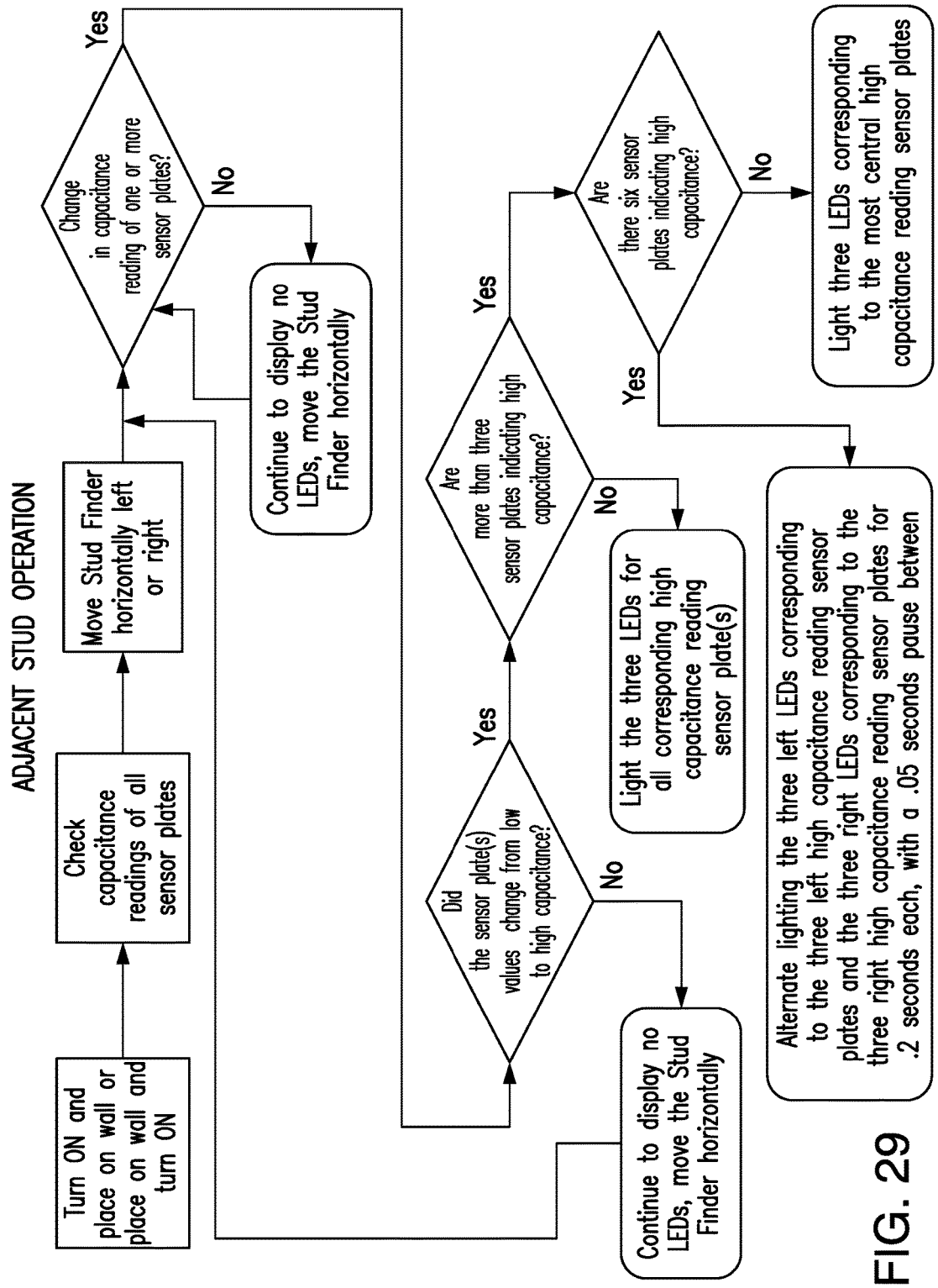
FIG. 29 is a logic flow diagram for an adjacent stud operation for the intelligent stud finder.

FIG. 29 is a logic flow diagram for an adjacent stud operation for the intelligent stud finder.

Example 4

In an embodiment, the stud finder can have a Double Stud Operation which in the embodiment of FIG. 29 is an adjacent stud configuration, the method of displaying the sensor results can have the steps below.

Step 1: When there are six sensor plates grouped together indicate high capacitance, the unit will display the left group of three for 0.2 seconds;

Step 2: The unit will have a 0.05 second delay, displaying no studs; and

Step 3: The unit will then display the right group of three LEDs corresponding with the right group of sensor plates indicating high capacitance for 0.2 seconds, and then have another 0.05 second delay displaying no studs, before repeating.

Figure 30:
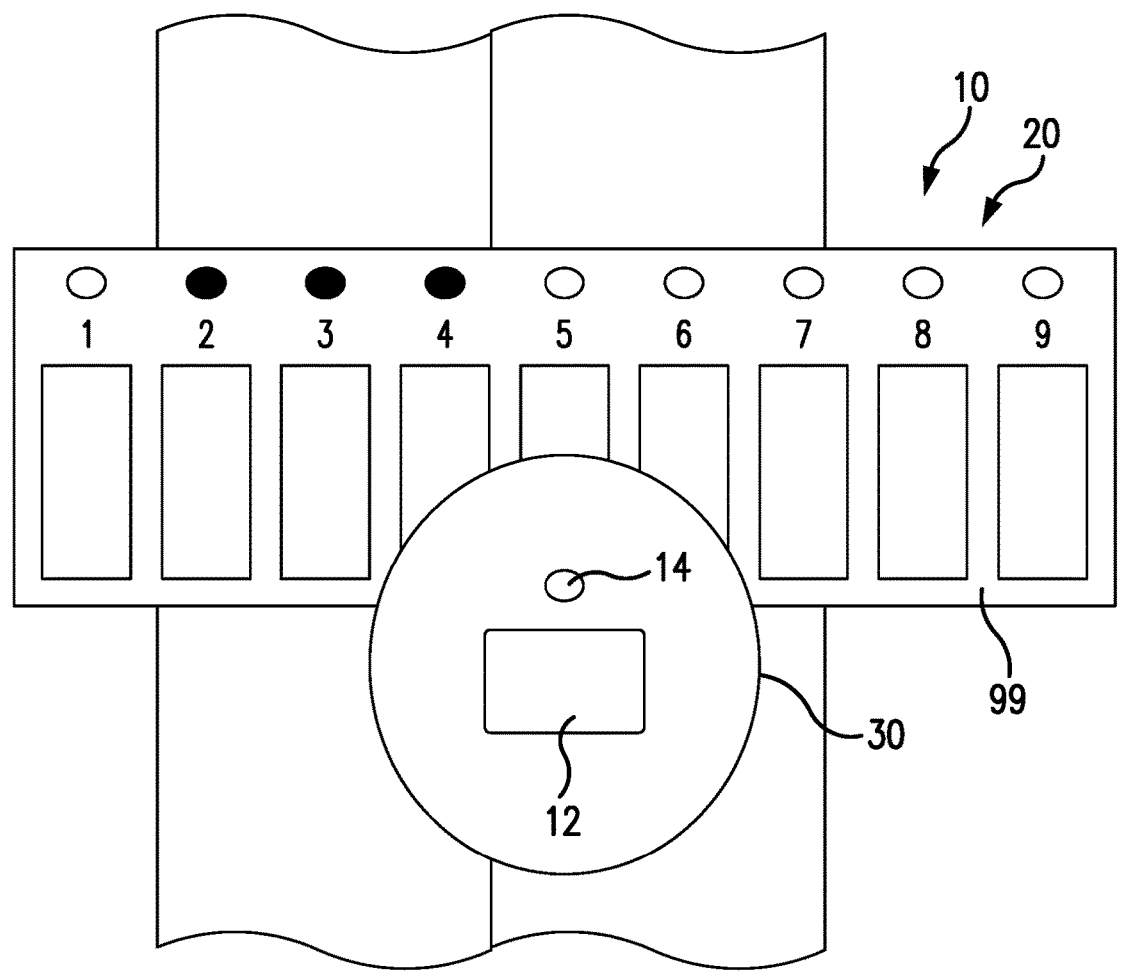
FIG. 30 is a schematic showing the stud finder having three capacitor plates and three lighted LEDs projected over a first stud and having three capacitor plates and three unlighted LEDs projected over an adjacent second stud.

FIG. 30 is a schematic showing the stud finder having three capacitor plates and three lighted LEDs projected over a first stud and having three capacitor plates and three unlighted LEDs projected over an adjacent second stud.

Figure 31:
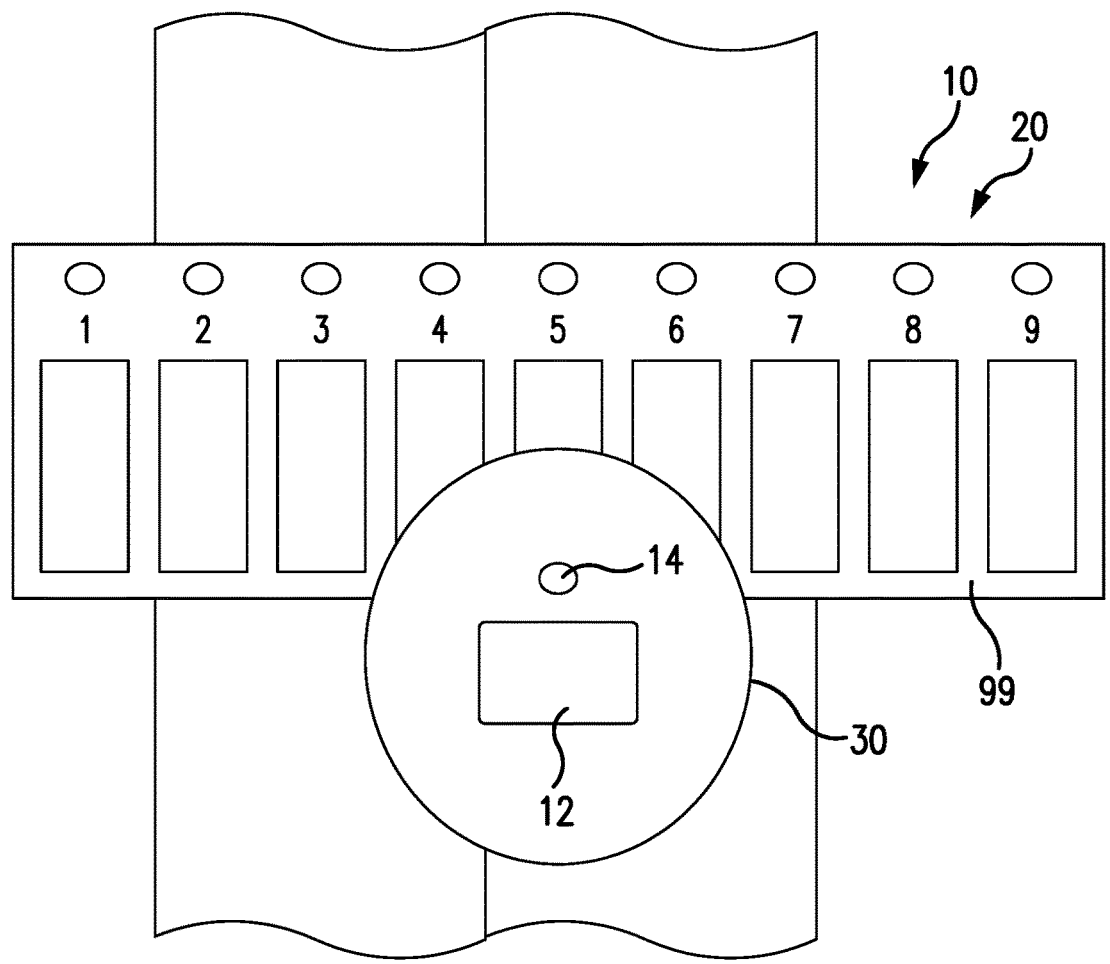
FIG. 31 is a schematic showing the stud finder having three capacitor plates and three unlighted LEDs projected over a first stud and having three capacitor plates and three unlighted LEDs projected over an adjacent second stud.

FIG. 31 is a schematic showing the stud finder having three capacitor plates and three unlighted LEDs projected over a first stud and having three capacitor plates and three unlighted LEDs projected over an adjacent second stud.

Figure 32:
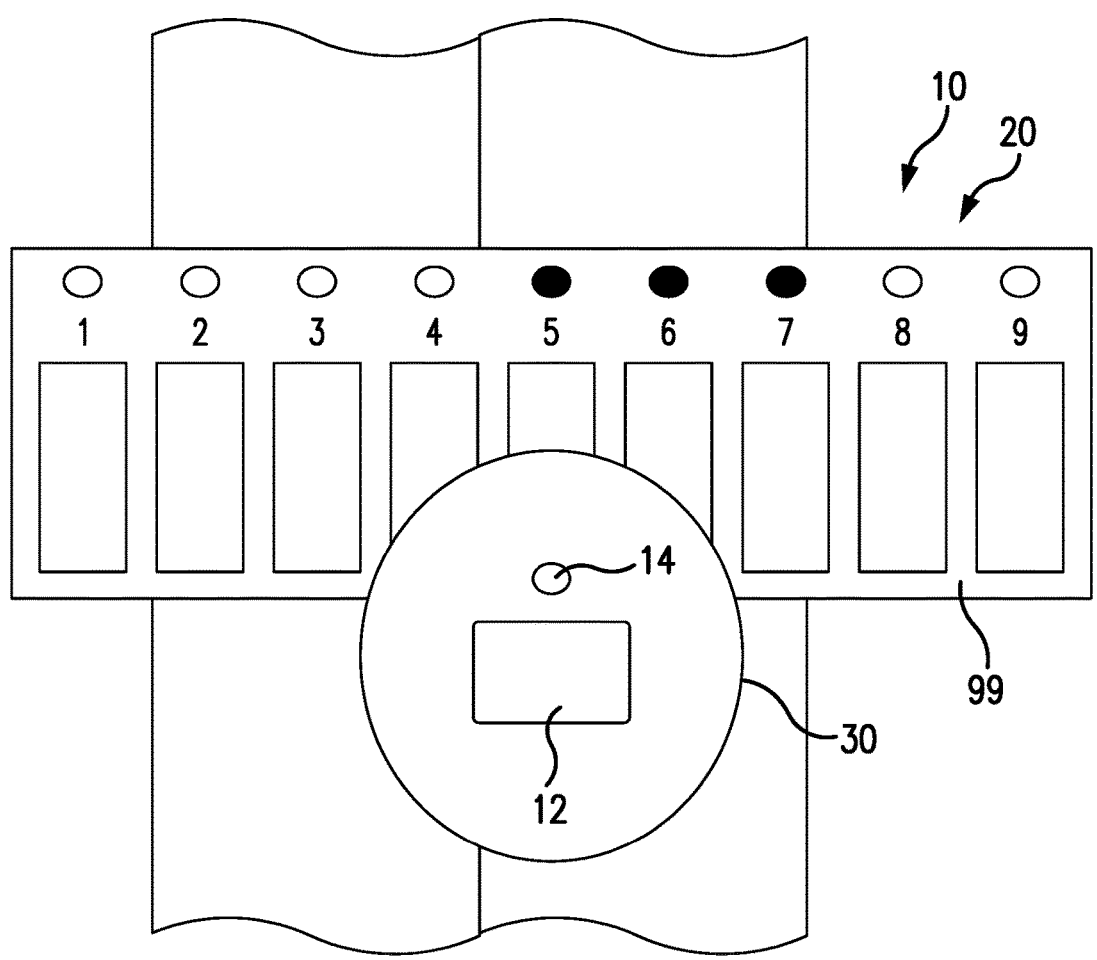
FIG. 32 is a schematic showing the stud finder having three capacitor plates and three unlighted LEDs projected over a first stud and having three capacitor plates and three lighted LEDs projected over an adjacent second stud.

FIG. 32 is a schematic showing the stud finder having three capacitor plates and three unlighted LEDs projected over a first stud and having three capacitor plates and three lighted LEDs projected over an adjacent second stud.

Figure 33:
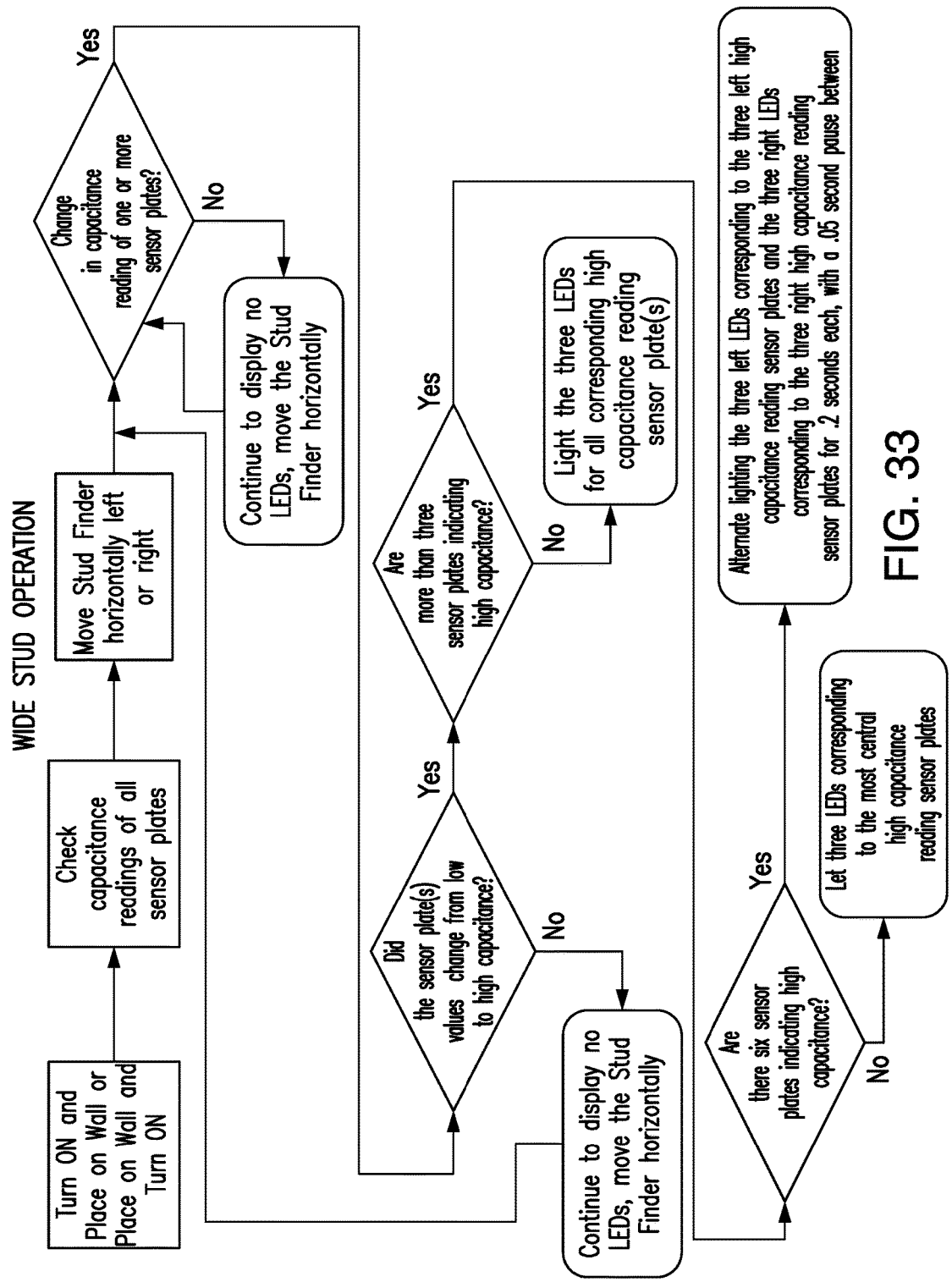
FIG. 33 is a logic flow diagram for a wide stud operation for the intelligent stud finder.

FIG. 33 is a logic flow diagram for a wide stud operation for the intelligent stud finder.

Example 5

In an embodiment, the stud finder can have a Wide Stud Operation which can display the results the intelligent stud finder's sensing results using a method having the steps below.

Step 1: If the four or five adjacent sensor plates are indicating high capacitance, then the stud finder will assume that this is a wide stud and only display the three LEDs corresponding to the highest capacitance reading sensor plates.

Figure 34:
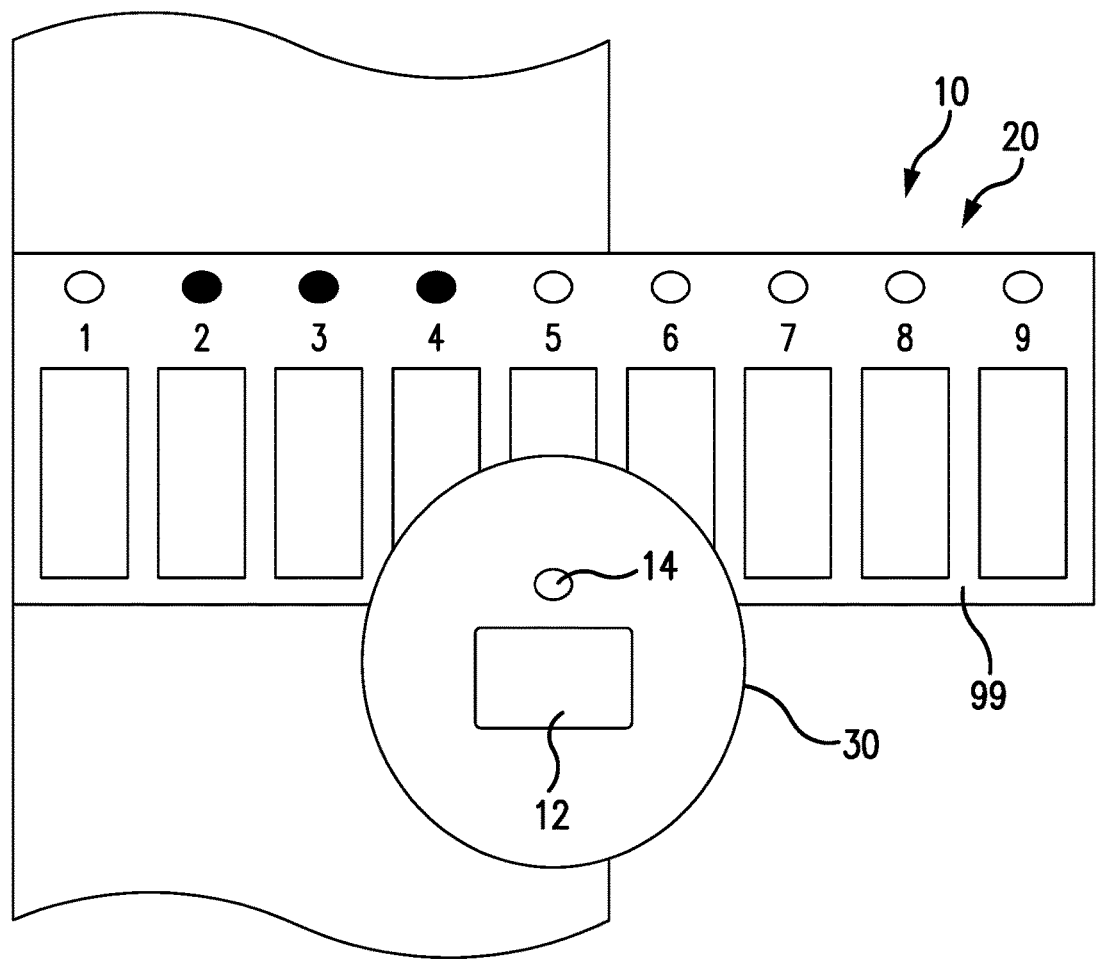
FIG. 34 is a schematic showing the stud finder having five capacitor plates projected over a wide stud in which three of the projected capacitor plates are lighted.

FIG. 34 is a schematic showing the stud finder having five capacitor plates projected over a wide stud in which three of the projected capacitor plates are lighted. Herein a stud is considered to be wide if it has a width of greater than 4 capacitive plates, or in another example more than 2 inches. In an embodiment, when 4 or 5 capacitor plates are projected over or sense a stud, then the 3 LEDs most central to the wide stud will be lighted.

Optionally, when a stud has a wide width the display can be limited to showing no more than three (3) LEDs when three, or greater than three, capacitor plates are projected over the wide stud.

Figure 35:
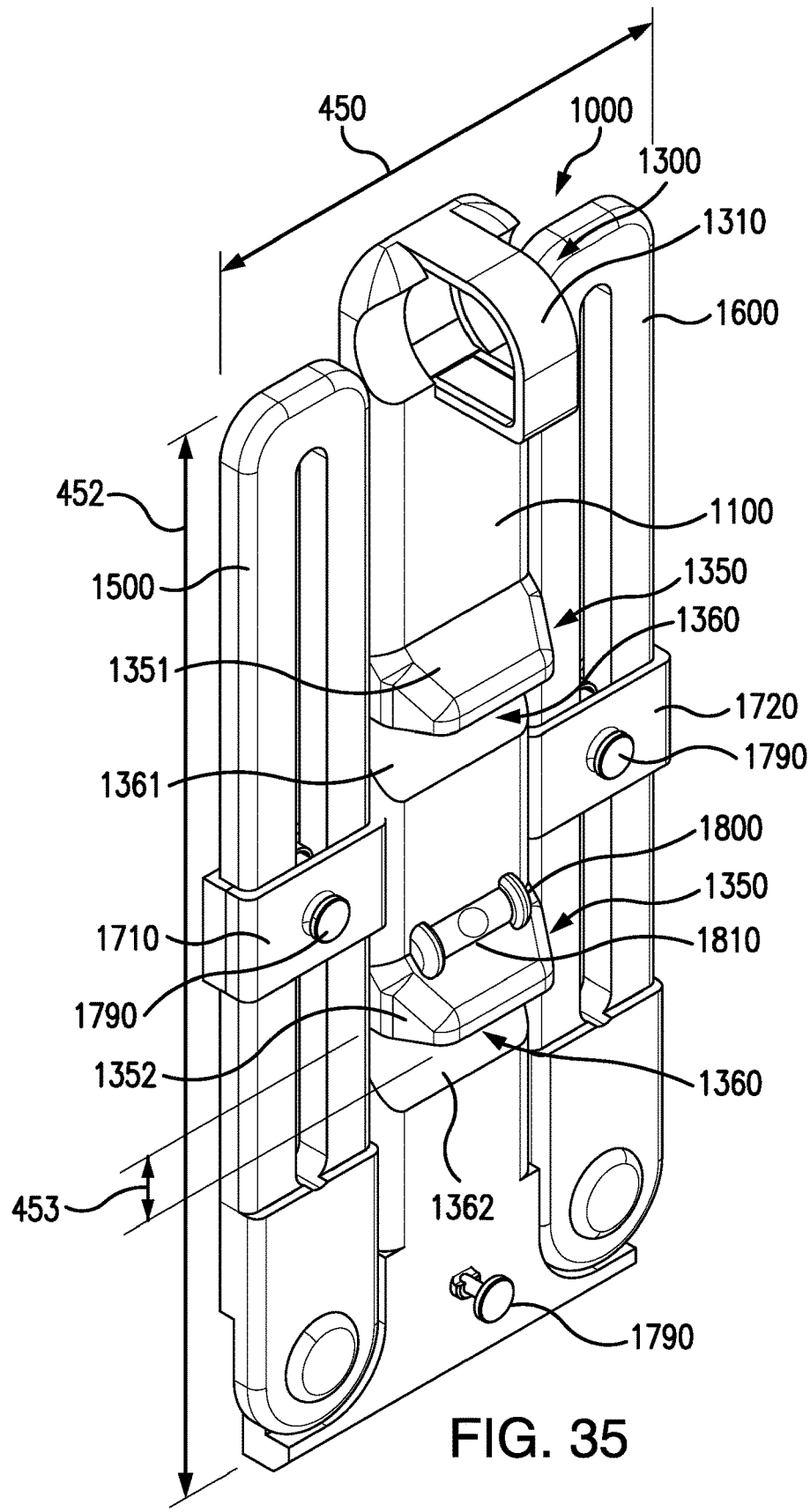
FIG. 35 is a holding side perspective view of an embodiment of a picture hanging device having two pivoting arms and a bubble level.
Figure 38:
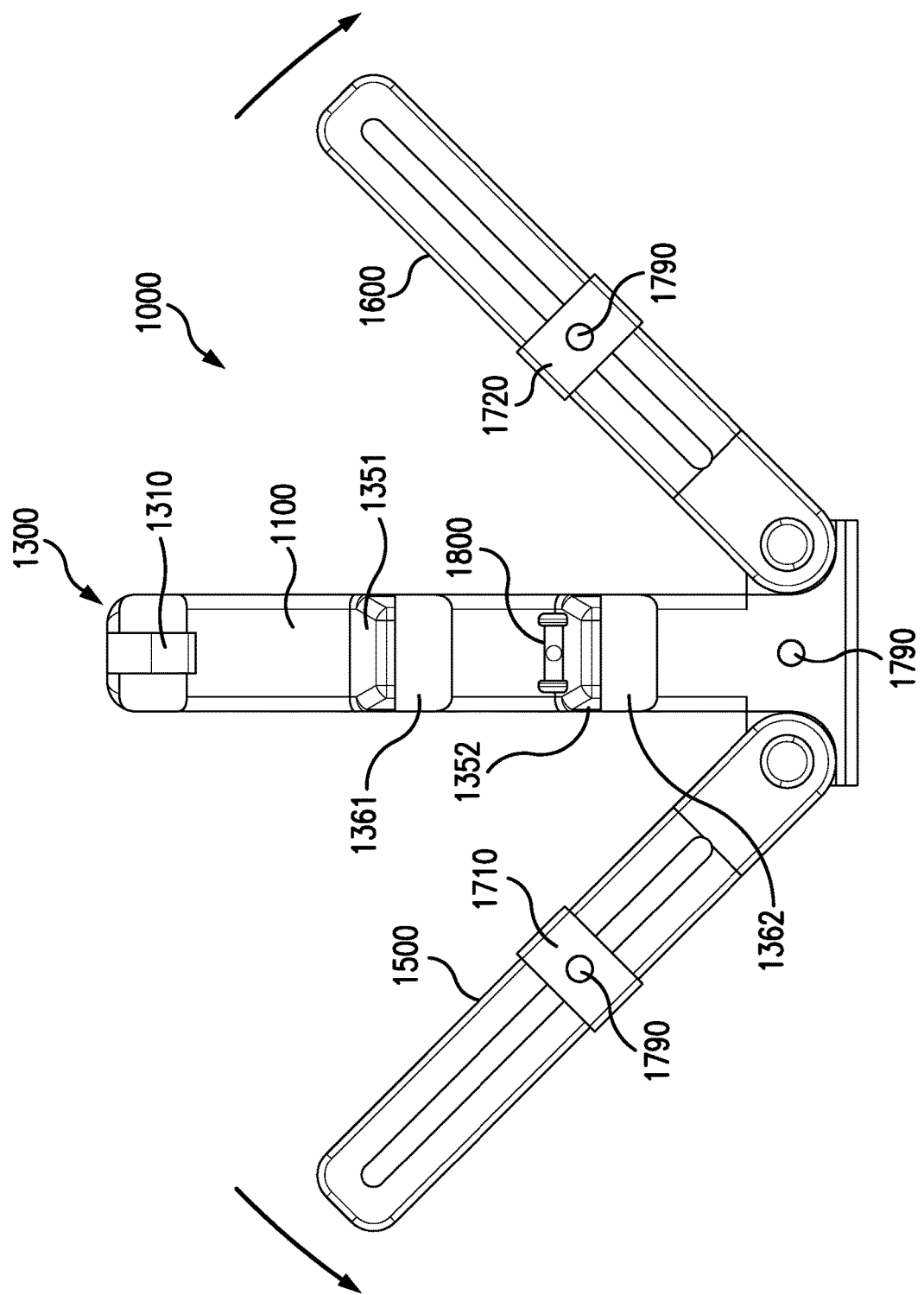
FIG. 38 is a holding side view of the picture hanging device having two pivoting arms respectively being pivoted to an unfolded state.
Figure 39:
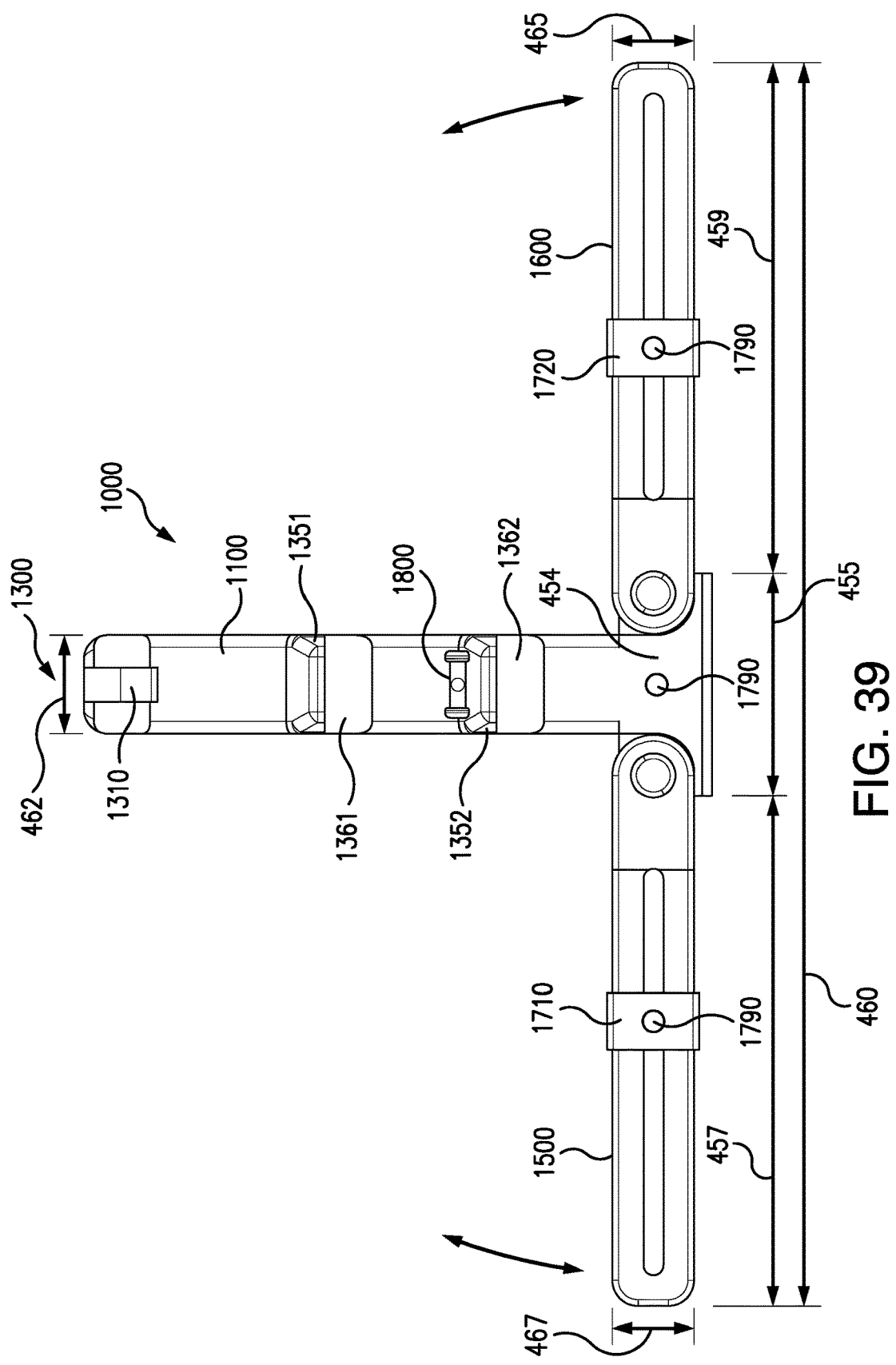
FIG. 39 is a holding side view of the picture hanging device having two pivoting arms in an unfolded state.

Optionally, when a double stud, or two adjacent studs, are sensed, then it will use the multiple stud method of showing the left and right studs Picture Hanging Device FIG. 35 is a holding side perspective view of an embodiment of a picture hanging device having two pivoting arms and a bubble level. FIG. 35 shows a picture hanging device 1000 having a body 1100 and two pivotably attached arms which can be unfolded by a radial motion (FIGS. 38 and 39). The non-limiting example embodiment of FIG. 35 shows a first arm 1500 pivotably attached to the body 1100 and a second arm 1600 pivotably attached to the body 1100.

Each of the first arm 1500 and that second arm 1600 can have a marker slide member 1700. The first arm 1500 is shown having a first marker slide member 1710 and the second arm 1600 is shown having a second marker slide member 1720.

Optionally, the picture hanging device can have a level, such as a level bubble vial 1800, such as first level bubble vial 1810. Optionally, the picture hanging device can have a number of levels, such as the first level bubble vial 1810, a second level bubble vial 1820 (FIG. 36), or more.

Levels, such as a level indicator 2210 (e.g. FIG. 46E), or a level having level bubble vial 1800, can be used, to indicate the picture is straight before removing the picture from the picture hanging device. In an embodiment, the body can have the level bubble vial 1800 at a location visible to the user. Optionally, the body can have the level bubble vial 1800 at a location visible to the user regardless of the height of the frame while hanging it on the Picture Hanger. Optionally, a sliding handle 1900 (FIG. 46) can have the level bubble vial 1800 at a location visible to the user regardless of the height of the frame while hanging it on the Picture Hanger.

In an embodiment, the picture hanging device can have one or more of a hook 1300, loop or other of a fixed handle 1310. In an embodiment, a user can put one or more fingers, e.g. an index finger through a hook 1300, or loop, for holding, support and/or stability of the picture hanging device.

In an embodiment, the picture hanging device can have one or more of a holding ridge 1350. For example, the body 1100 shown in FIG. 35 can have a first holding ridge 1351 and a second holding ridge 1352.

Optionally, a holding groove 1360 can be placed adjacent to each holding ridge 1350. In an embodiment, ridges can be used for user to put their thumb on for support and stability. In an embodiment, two ridges can be use in order to accommodate users with larger or smaller hands. In an embodiment, a single Support marking hook 2781, can be used in which the user can hang an object or picture(s) with one single nail support. Levels can be used to indicate the picture is straight before removing the picture from the picture hanging device.

In an embodiment, the picture hanging device 1000 can have a device width 450 in the state with the both arms folded, i.e. fully folded state, in a range of from less than 2.5 inches to greater than 12 inches, such as 4.2 inches; and a device height 452 in a range of from less than 4 inches to greater than 24 inches, such as 10 inches. The device thickness 453 can range from less than ¼ inch to 6 inches or greater, such as 0.6 inches, or 2 inches.

Figure 36:
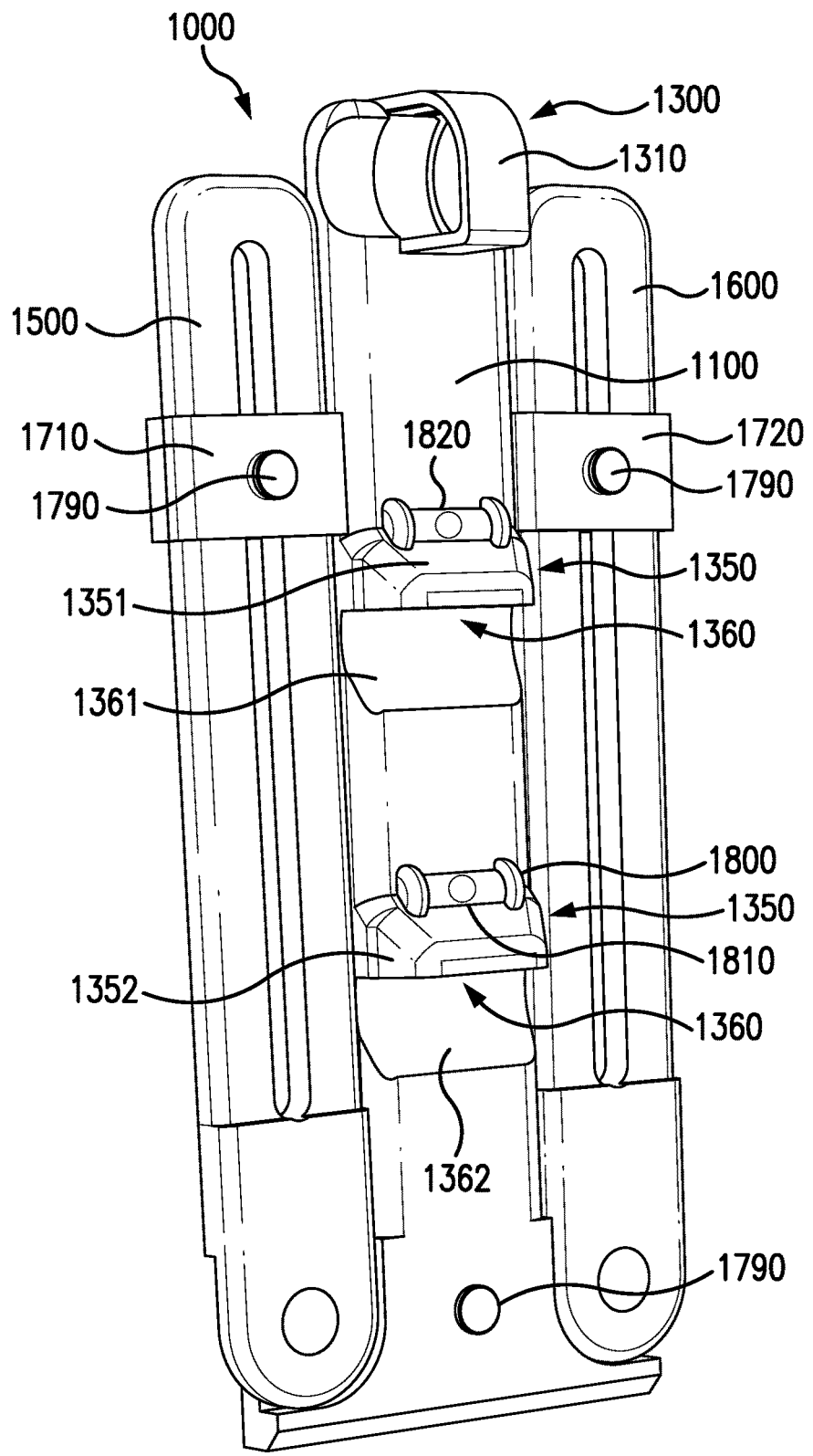
FIG. 36 is a holding side perspective view of an embodiment of a picture hanging device having two pivoting arms in a folded state and two bubble levels.

FIG. 36 is a holding side perspective view of an embodiment of a picture hanging device having two pivoting arms in a folded state and two bubble levels, e.g. first level bubble vial 1810 and second level bubble vial 1820.

Figure 37:
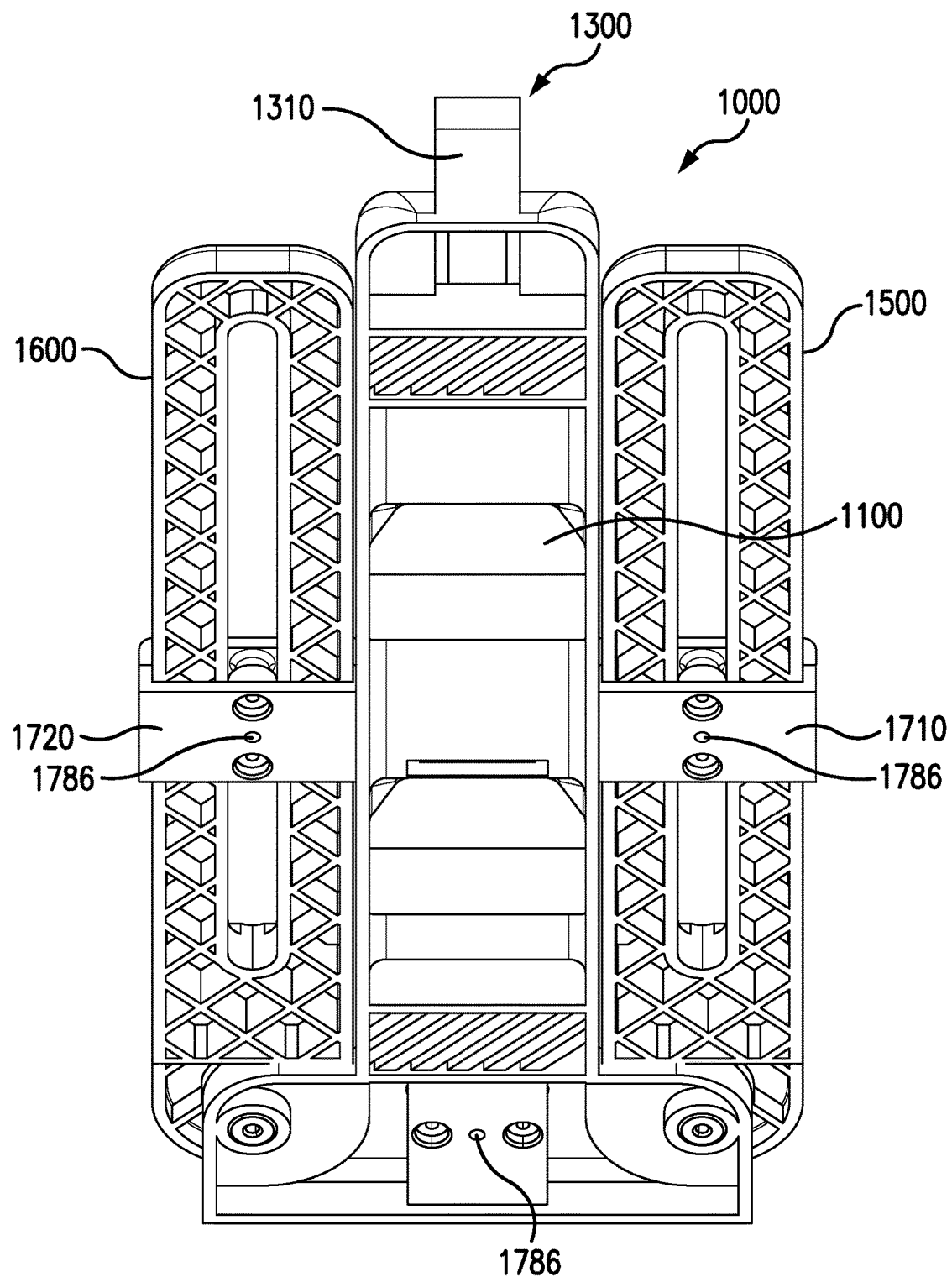
FIG. 37 is a target side perspective view of an embodiment of a picture hanging device having two pivoting arms.

FIG. 37 is a target side perspective view of an embodiment of a picture hanging device having two pivoting arms.

FIG. 38 is a holding side view of the picture hanging device having two pivoting arms respectively being pivoted to an unfolded state.

FIG. 39 is a holding side view of the picture hanging device having two pivoting arms in an unfolded state.

The picture having device can have an unfolded arm span 460 in a range of from less than 3 inches to greater than 4 ft, such as 18 inches, or as appropriate for the surface being examined.

The first arm 1500 can have a first arm length 457 in a range of from less than 3 inches to greater than 2 ft, such as 19.9 inches. The second arm 1600 can have a second arm length 459 in a range of from less than 3 inches to greater than 2 ft, such as 19.9 inches.

In an embodiment, the distance between the marker 1790 of the first marker slide member 1710 and the marker 1790 of the second marker slide member 1720 can be in a range of The pivot base 454 which bears the pivoting arms and the marking 1790 can have a pivot base width of 455 in a range of less than 3 inches to greater than 4 ft, such as 18 inches, or as appropriate for the surface being examined.

In an embodiment the body 1100 can have a body width 462 in a range of from less than 0.5 inches to greater than 6 inches, such as 1.6 inches. The first arm 1500 can have a first arm height in a range of from less than 1.0 inch to greater than 6 inches, such as 1.3 inches. The second arm 1600 can have a first arm height in a range of from less than 1.0 inch to greater than 6 inches, such as 1.3 inches.

FIG. 40 is a perspective view of the picture hanging device having two pivoting arms in an unfolded state.

FIG. 41A shows an example of the second arm with a second marker slide member in a first position.

FIG. 41B shows an example of the second arm with a second marker slide member in a second position.

FIG. 41C shows an example of the second arm with a second marker slide member in a third position.

Figure 42A:
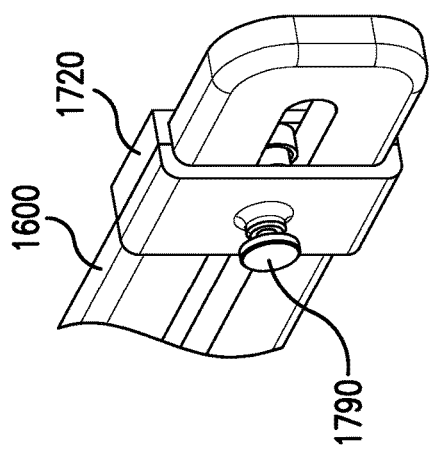
FIG. 42A shows a holding side perspective of second marker in an resting state.

FIG. 42A shows a holding side perspective of second marker in a resting state.

Figure 42B:
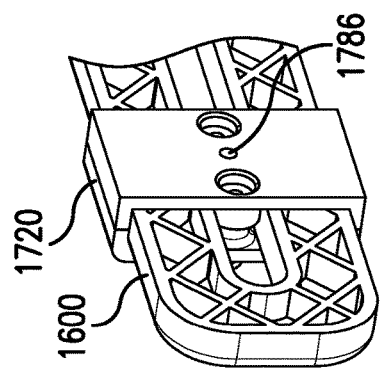
FIG. 42B shows a target side perspective of second marker in an resting state.

FIG. 42B shows a target side perspective of second marker in a resting state.

Figure 43A:
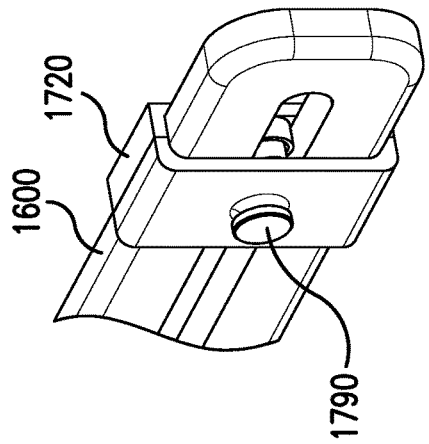
FIG. 43A shows a holding side perspective of second marker in a marking state.

FIG. 43A shows a holding side perspective of second marker in a marking state.

Figure 43B:
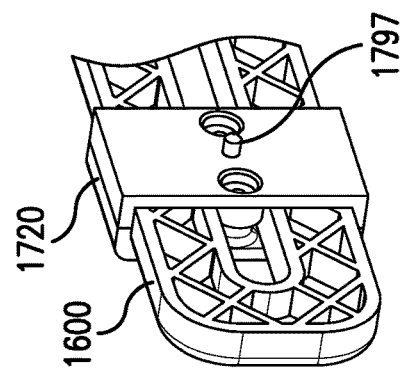
FIG. 43B shows a target side perspective of second marker in a marking state.

FIG. 43B shows a target side perspective of second marker in a marking state.

Figure 44:
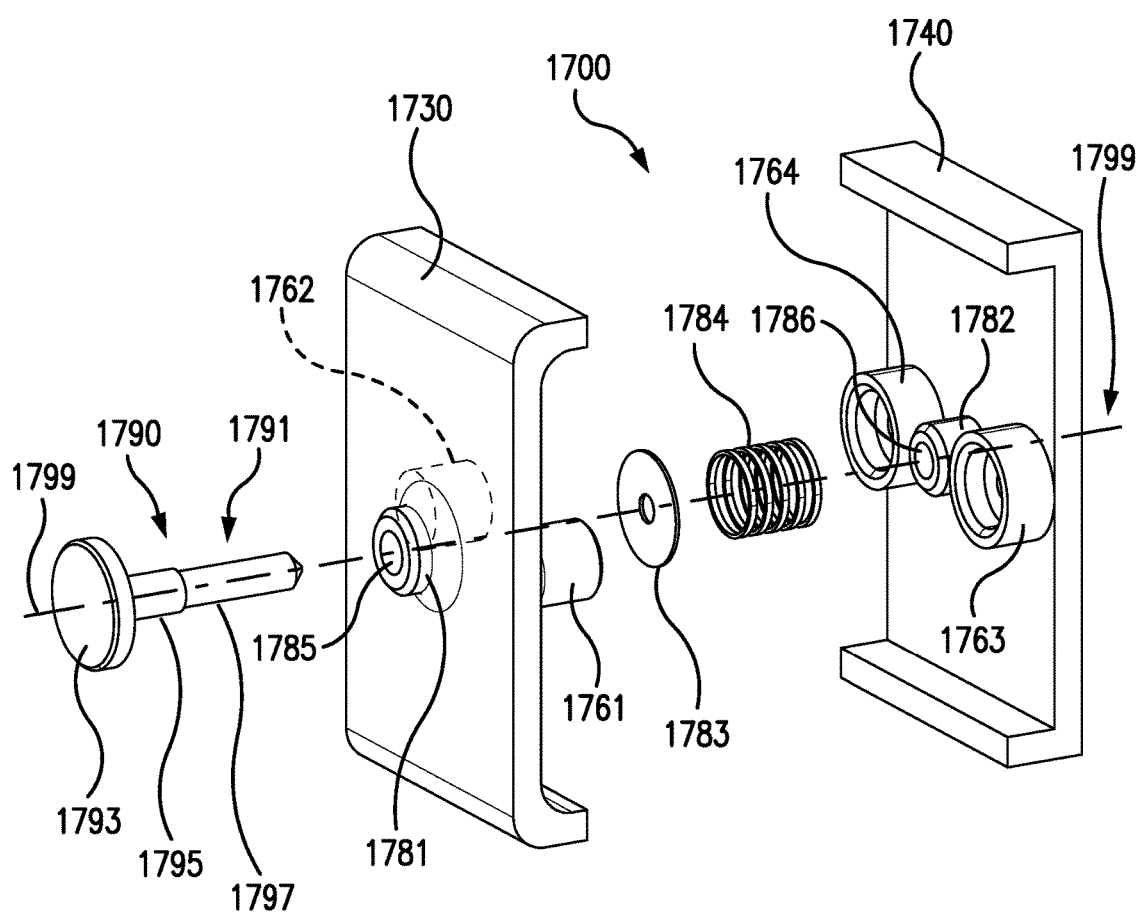
FIG. 44 is an exploded view of a marker slide member.

FIG. 44 is an exploded view of a marker slide member.

In the example of FIG. 44, the marker slide member 1700 having a marker 1790, which can in non-limiting example be a marker pin 1791. The marker 1790, such as the marker pin 1791, can have a marker head 1793, a marker shaft 1795 and a marker point 1797.

As shown in FIG. 44, the components of the marker slide member 1700 can be configured along a marker centerline 1799. In the example of FIG. 44, the marker shaft 1795 can be aligned coaxially with the marker centerline 1799. The marker centerline 1799 passes through the center of marker entrance 1785, the center of a washer 1783, coaxial to a spring 1784 and the center of a marker exit 1786. In an embodiment, a display-side slide portion 1730 can have a first marker guide, a first alignment guide 1761 and a second alignment guide 1762. A target side slide portion 1740 can have a first receiving guide which can receive the first alignment guide 1761, as well as a second receiving guide 1764 which can receive the second alignment guide 1762.

Figure 45A:
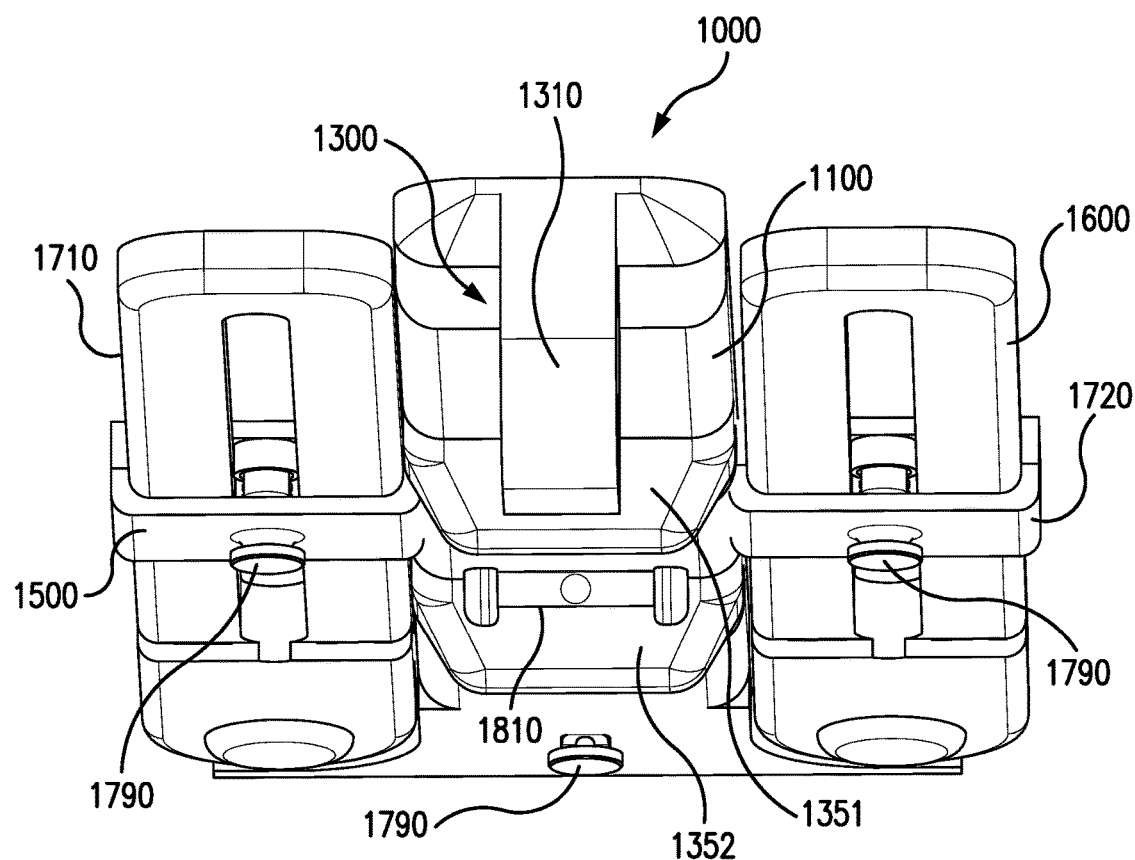
FIG. 45A is a handle end perspective view showing the center marker in a resting state.

FIG. 45A is a handle end perspective view showing the center marker in a resting state.

Figure 45B:
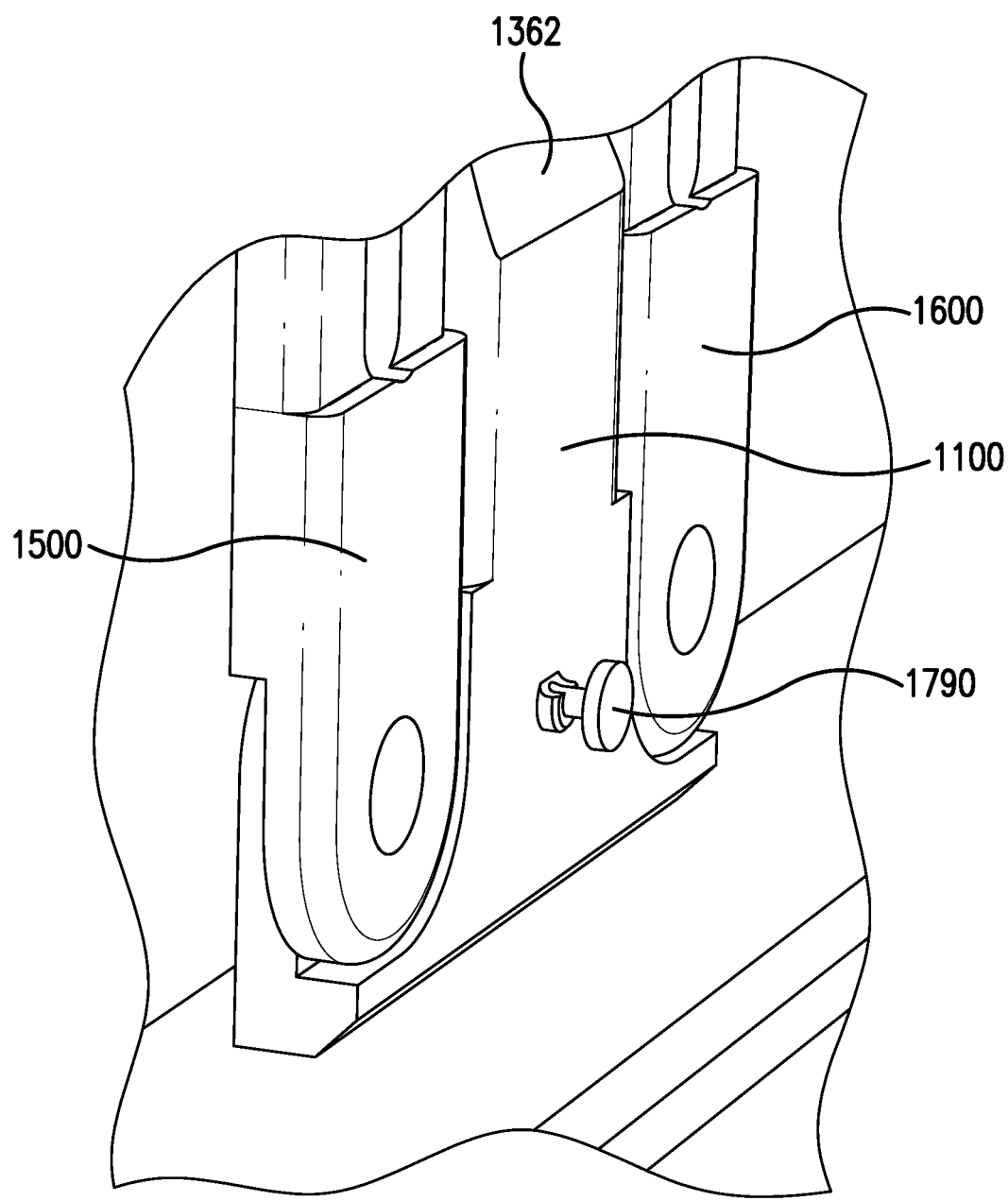
FIG. 45B is a detail view showing the center marker in a resting state.

FIG. 45B is a detail view showing the center marker in a resting state.

Figure 45C:
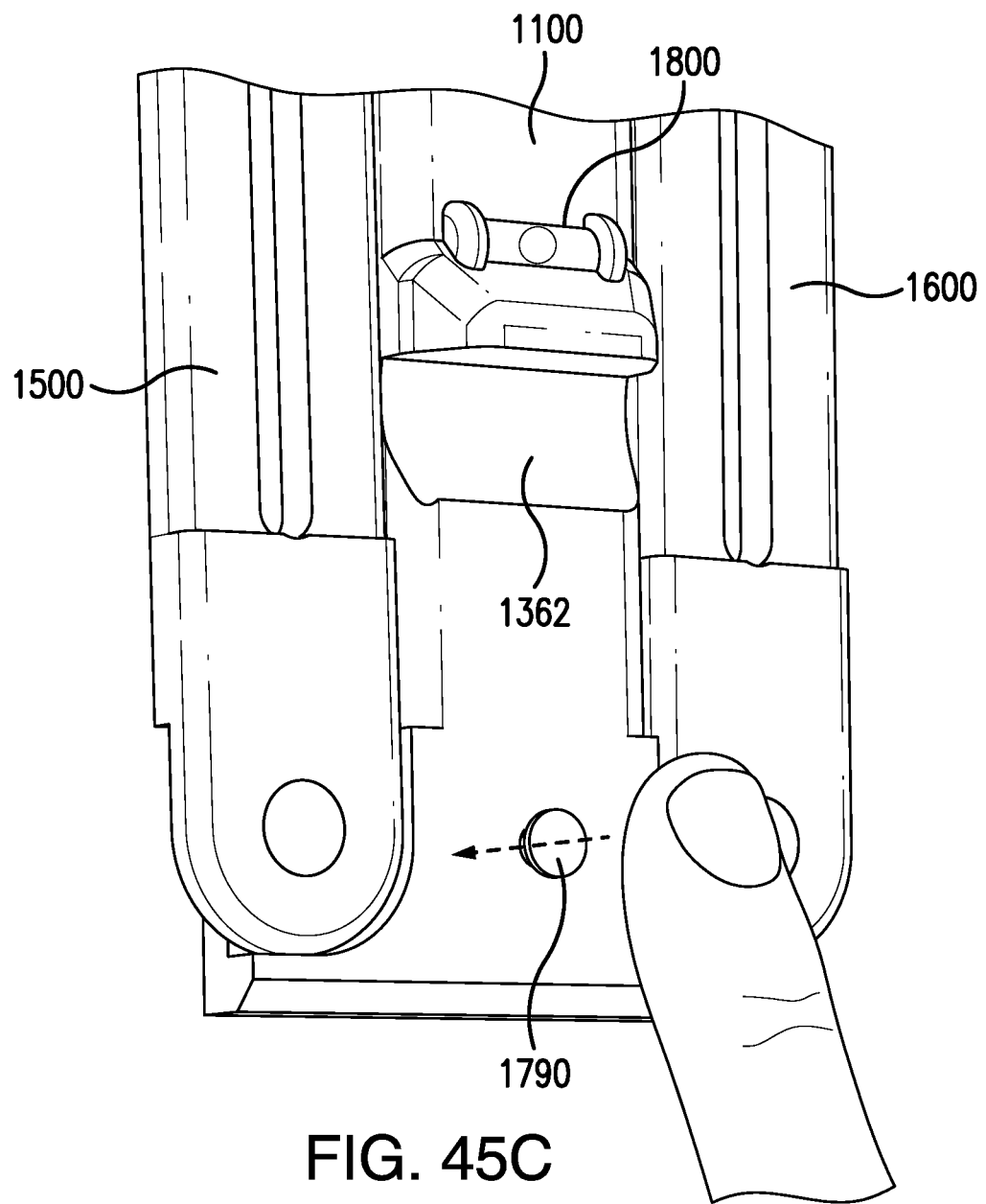
FIG. 45C is a detail view showing a finger pressing the center maker from its resting state to a marking state.

FIG. 45C is a detail view showing a finger pressing the center maker from its resting state to a marking state.

Figure 45D:
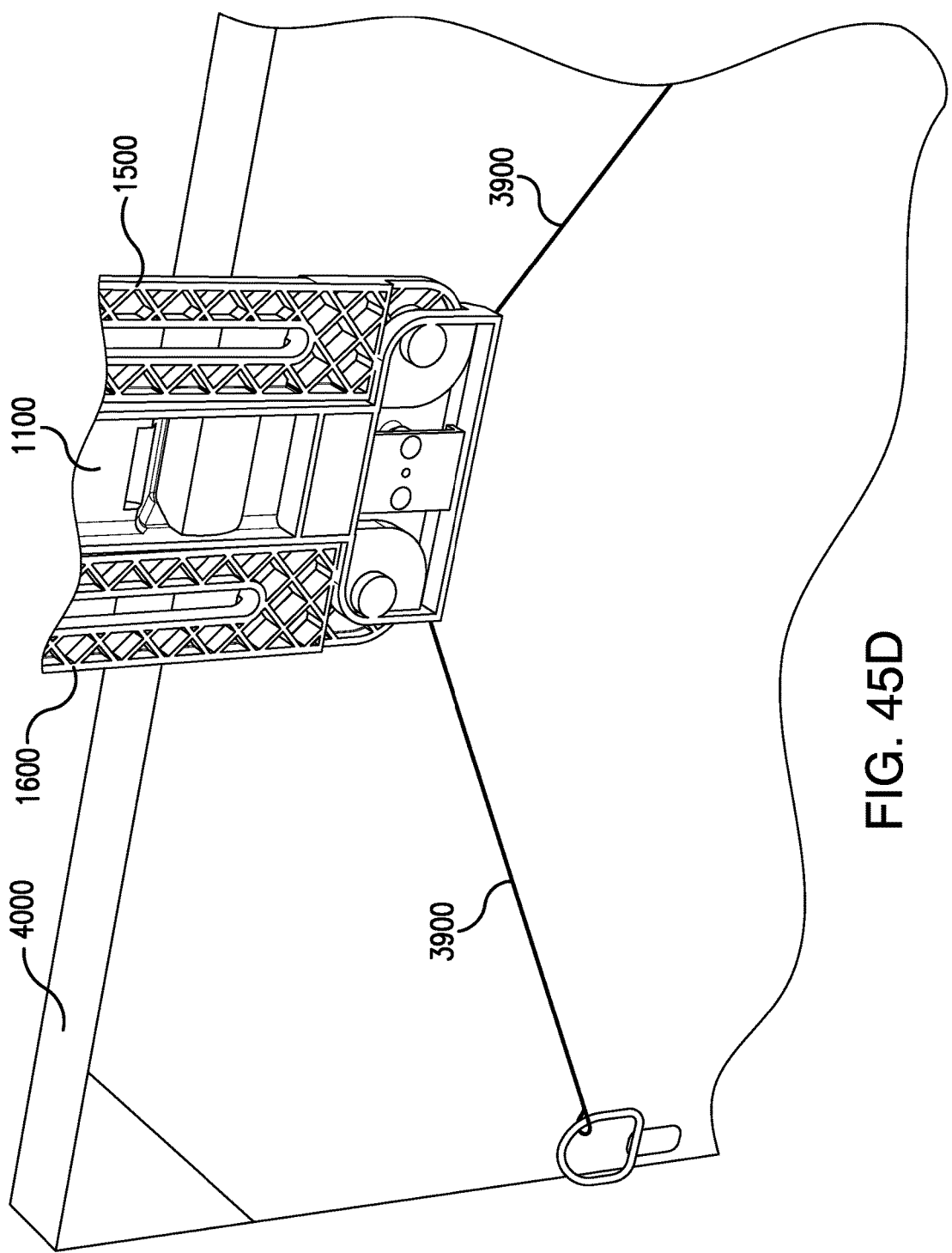
FIG. 45D is a detail view showing a hanging by wire of a picture hung from the center maker in its resting state.

FIG. 45D is a detail view showing a hanging wire 3900 of a picture hung from the center maker in its resting state.

Figure 46A:
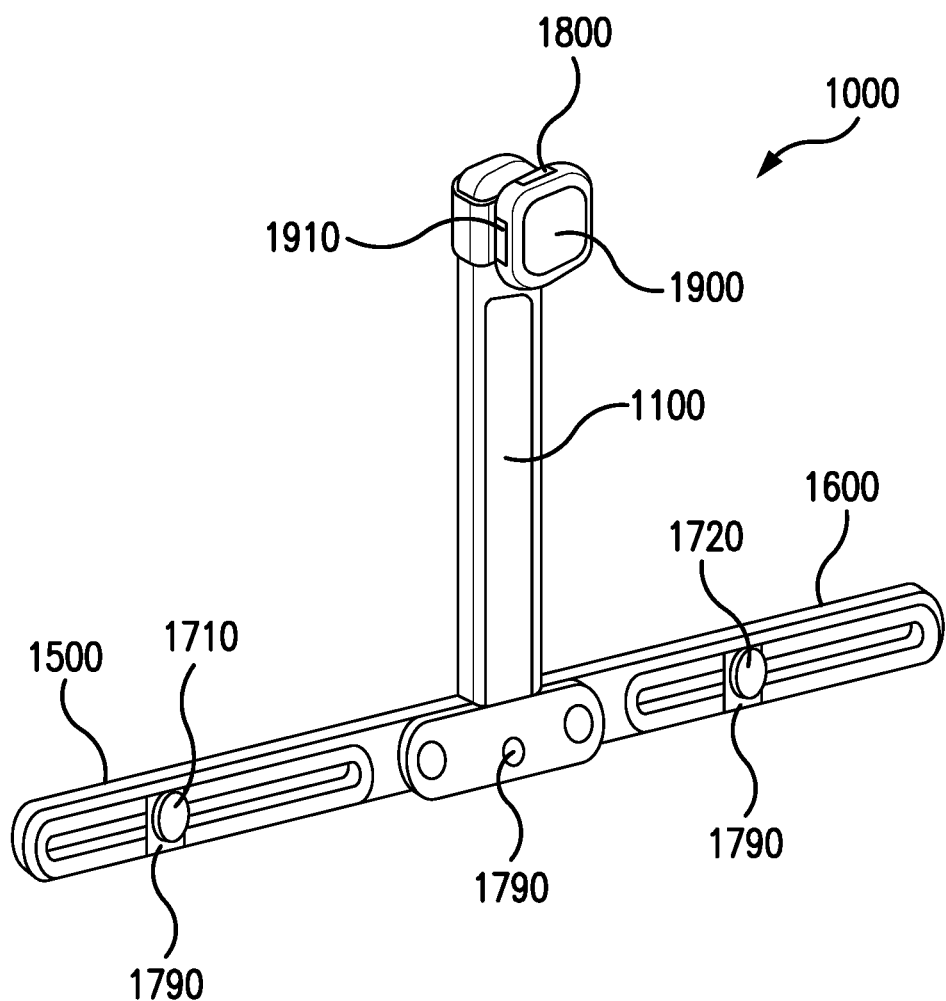
FIG. 46A is a perspective view of the picture hanging device with a movable handle and two pivoting arms in an unfolded state.

FIG. 46A is a perspective view of the picture hanging device with a movable handle and two pivoting arms in an unfolded state.

In an embodiment, the picture hanging device can have a sliding handle. In the embodiment of FIG. 46A, the movable handle has a mushroom shape. However, the handle can be of any of a broad variety of shapes and designs.

The purpose of the sliding handle is to help the user adjust the height of the handle depending on the picture frame they are using.

Pictures have different sized gaps between the back support and the top of the frame, so the ability to adjust the handle to accommodate for these different situations would help the user to be able to use the picture hanger for many different sized frames quickly and effectively The Sliding Handle works by having two locking pins or locking projections such as locking projections 2222. Optionally, one locking pin or locking projection 2222 can be used on each side of the central body of the picture hanger. The locking pins or locking projections 2222 can reversibly fasten into designated slots inside the back of the central body of the picture hanger. Once the locking pins or locking projections 2222 are secured into their slots, the sliding handle will not move achieving a hand support for the user to hold on the picture hanger allowing the user to maintain the picture in a desired position steadily against the wall 3500

When the user wants to adjust the height of the sliding handle, they just compress and hold both grips, such as fingers 2221, in. This will release the locking pins or locking projections 2222 from their fastened position and allow the user to adjust the height of the sliding handle. Once the user has reached the new desired position, they release the grips, such as fingers 2221, and adjust it so that the two locking pins fasten to the closest parallel slots. The user can verify that these are the correct slots with the bubble vial on the sliding handle. Now the user can employ the handle again as a steady support for the next picture they will hang on the wall 3500.

Figure 46B:
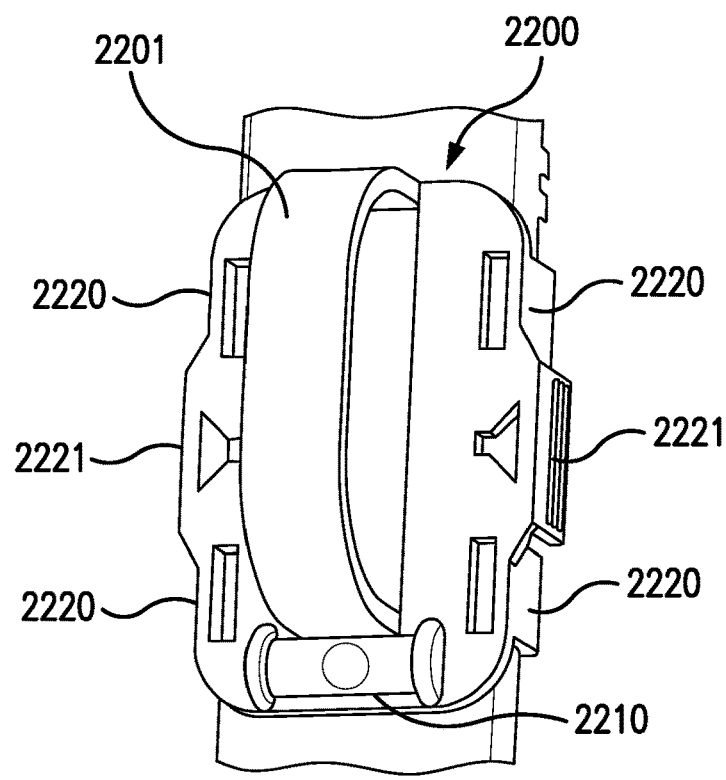
FIG. 46B is a perspective view of an embodiment of a sliding handle.

FIG. 46B is a perspective view of an embodiment of a sliding handle. In an embodiment, a bubble vial 1800 can be used. In embodiments in which the level bubble vial 1800 is a part of the sliding handle, the user will be able to see the level bubble vial 1800 regardless of the height of the frame while hanging it on the picture hanging device.

Figure 46C:
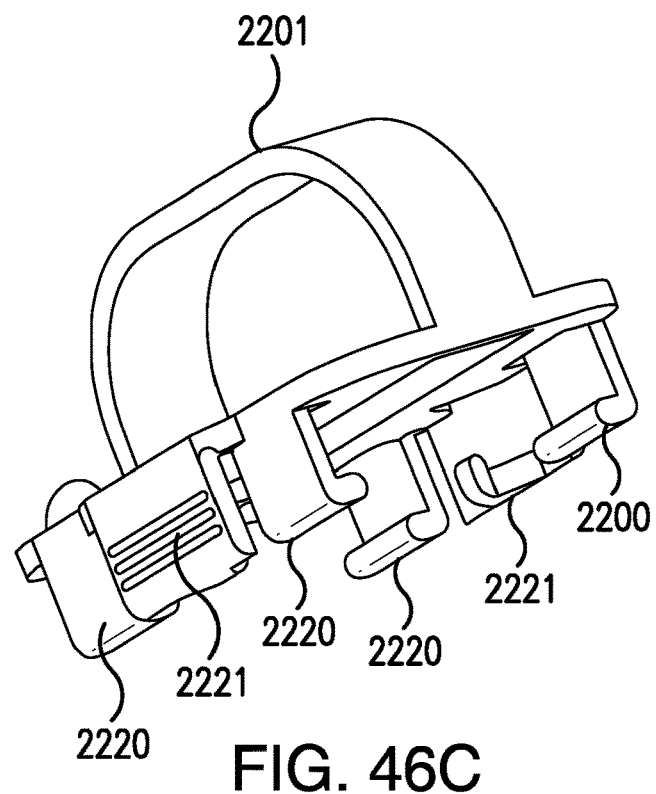
FIG. 46C is a perspective view of an embodiment of a sliding handle detached from the body upon which is slides.

FIG. 46C is a perspective view of an embodiment of a sliding handle detached from the body upon which is slides.

Figure 46D:
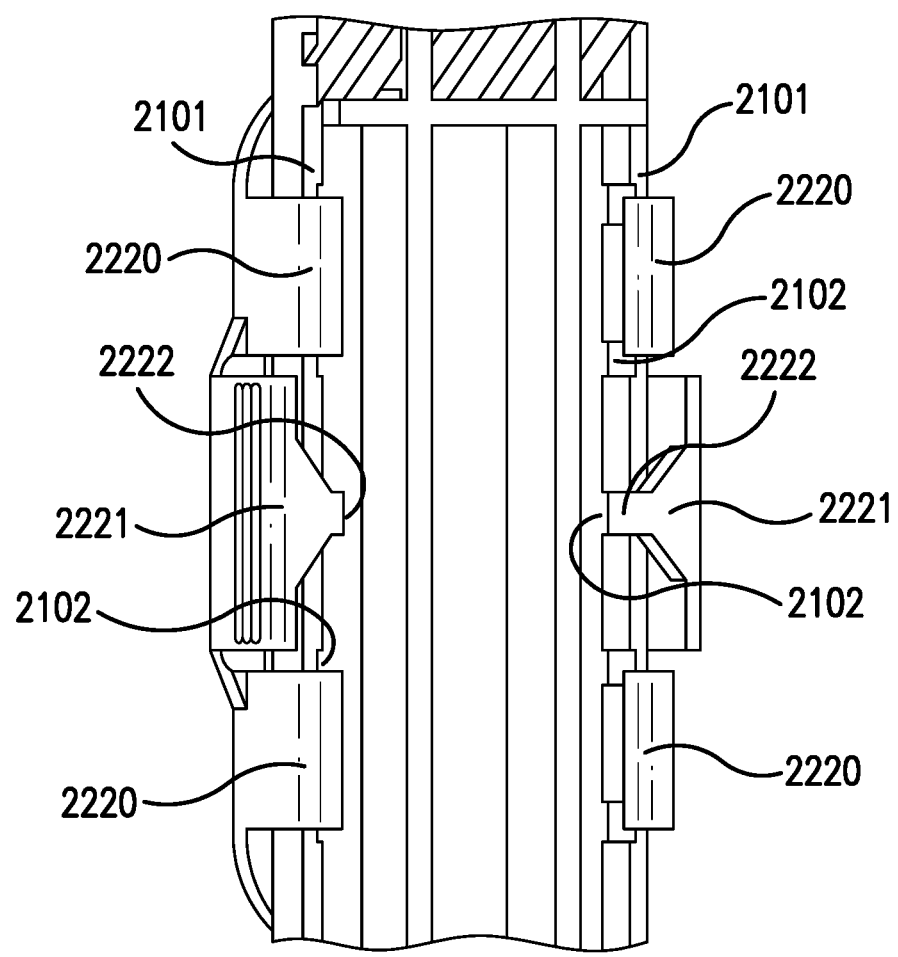
FIG. 46D is a perspective view of an embodiment of a sliding handle showing a plurality of slots for one or more locking pins, or locking projections.

FIG. 46D is a perspective view of an embodiment of a sliding handle showing a plurality of slots which can be used for and to reversibly engage with one or more locking pins. In an embodiment, the sliding handle can work by having two locking pins, one on each side of the central body of the picture hanger. The locking pins can fasten into designated slots inside the back of the central body of the picture hanger. Once the locking pins are secured into their slots, the sliding handle will not move to allow the user to have a hand support on the picture hanger to hold the picture steadily against the wall 3500.

Figure 46E:
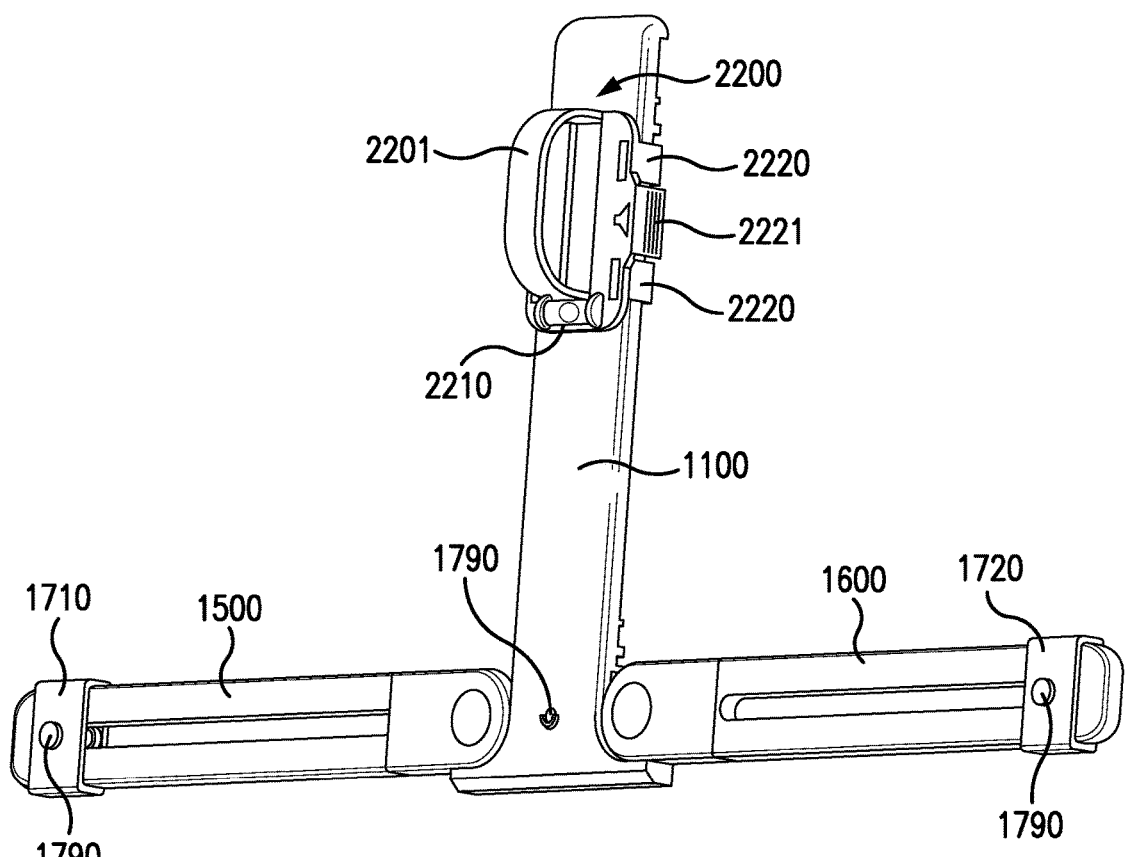
FIG. 46E is a perspective view of the picture hanging device with the sliding handle of FIG. 46B in a first position.

FIG. 46E is a perspective view of the picture hanging device with the sliding handle of FIG. 46B in a first position.

Now the user can employ the handle again as a steady support for the next picture they will hang on the wall 3500.

Figure 46F:
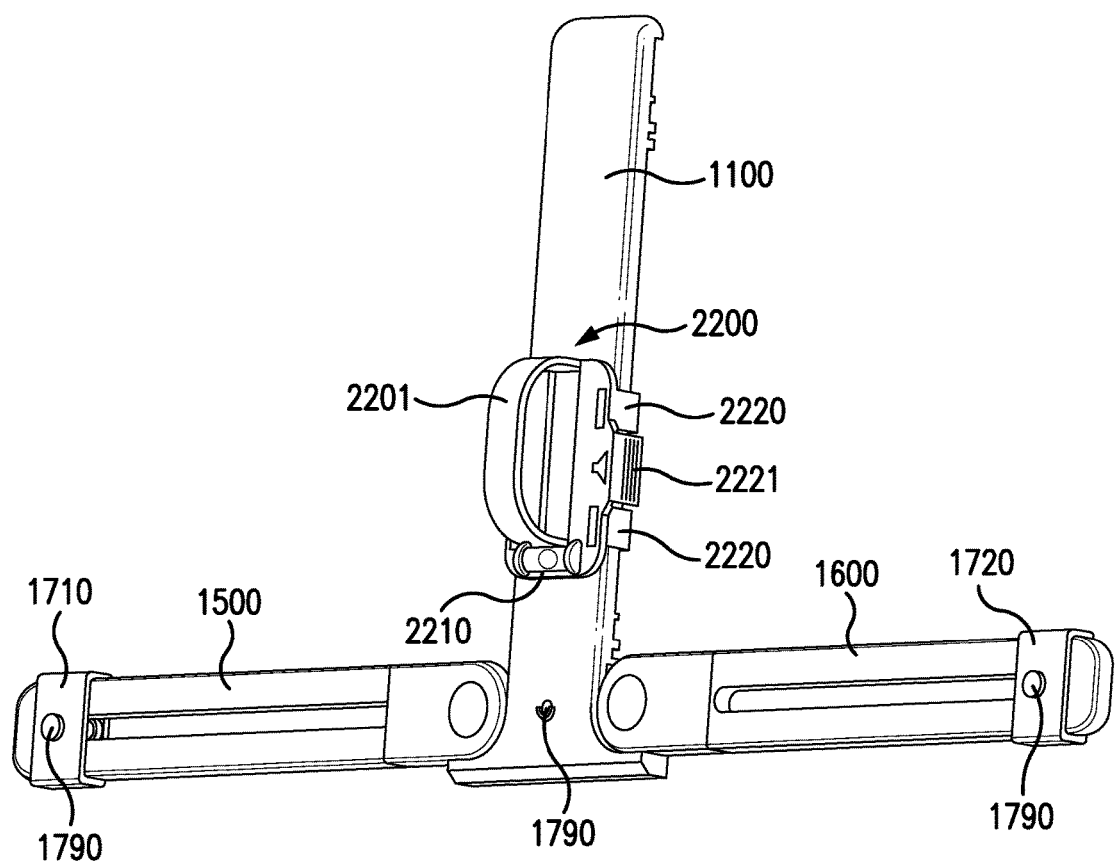
FIG. 46F is a perspective view of the picture hanging device with the sliding handle of FIG. 46B in a second position.

FIG. 46F is a perspective view of the picture hanging device with the sliding handle of FIG. 46B in a second position.

Figure 46G:
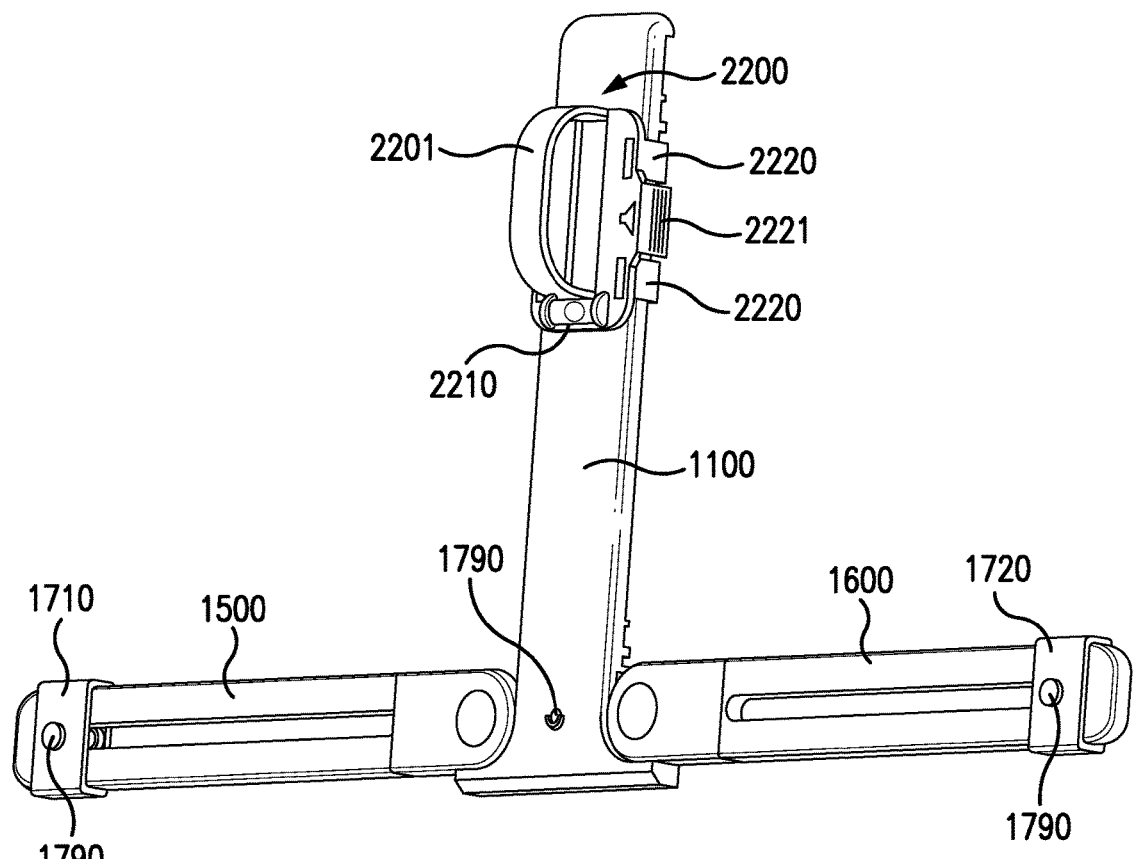
FIG. 46G is a perspective view of the picture hanging device with the sliding handle of FIG. 46B in a first position with two pivoting arms in an unfolded state.

FIG. 46G is a perspective view of the picture hanging device with the sliding handle of FIG. 46B in a first position with two pivoting arms in an unfolded state.

FIG. 46H1 is a is a display-side detailed view of the picture hanging device with the sliding handle having its grips pressed to allow for it to be moved.

FIG. 46H2 is a back side detailed view of the picture hanging device with the sliding handle having its grips pressed to allow for it to be moved.

FIG. 46H is a display-side detailed view of the picture hanging device with the sliding handle having its grips pressed while it is moved.

FIG. 46I2 is a back side detailed view of the picture hanging device with the sliding handle having its grips pressed while it is moved.

Figure 46J:
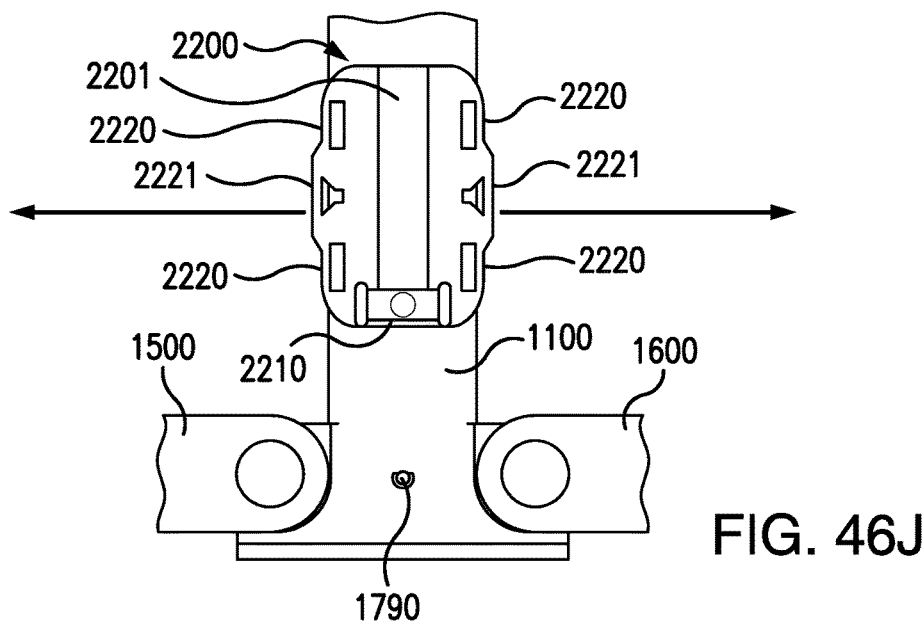
FIG. 46J is a display-side detailed view of the picture hanging device with the sliding handle having its grips release and located in a second position.

FIG. 46J is a display-side detailed view of the picture hanging device with the sliding handle having its grips release and located in a second position.

Figure 46K:
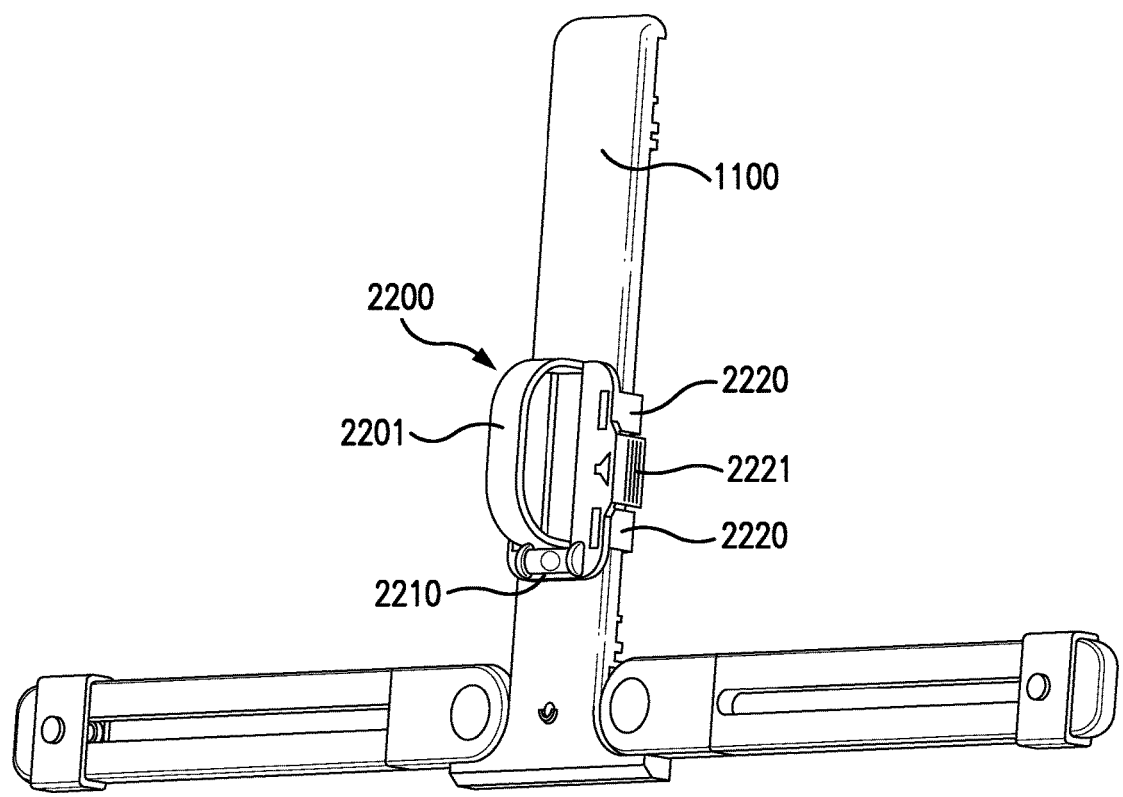
FIG. 46K is a perspective view of the picture hanging device with the sliding handle of FIG. 46B in a second position with two pivoting arms in an unfolded state.

FIG. 46K is a perspective view of the picture hanging device with the sliding handle of FIG. 46B in a second position with two pivoting arms in an unfolded state.

Figure 47:
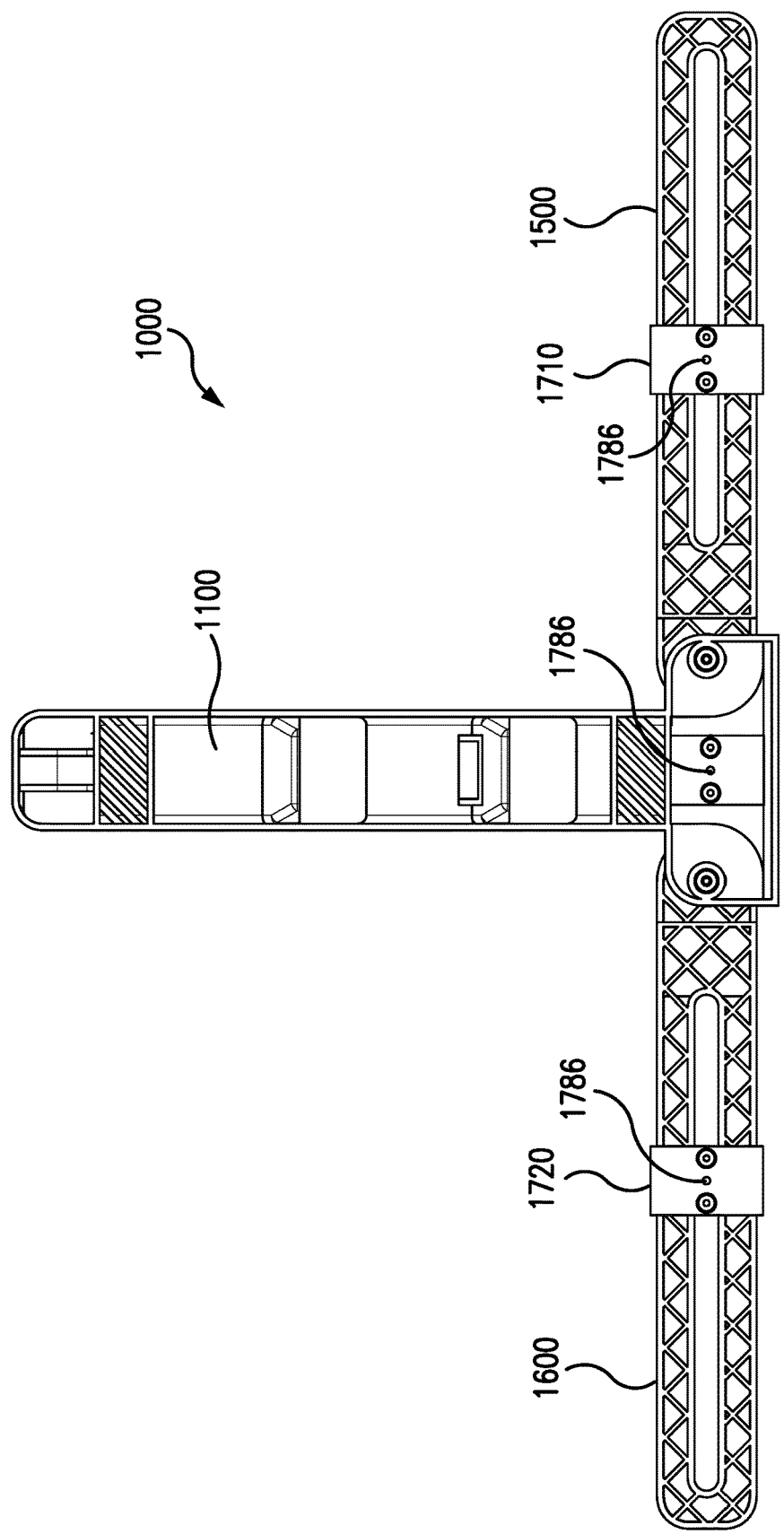
FIG. 47 is a target side perspective view of the picture hanging device with a movable handle and two pivoting arms in an unfolded state.

FIG. 47 is a target side perspective view of the picture hanging device with a movable handle and two pivoting arms in an unfolded state.

Figure 48:
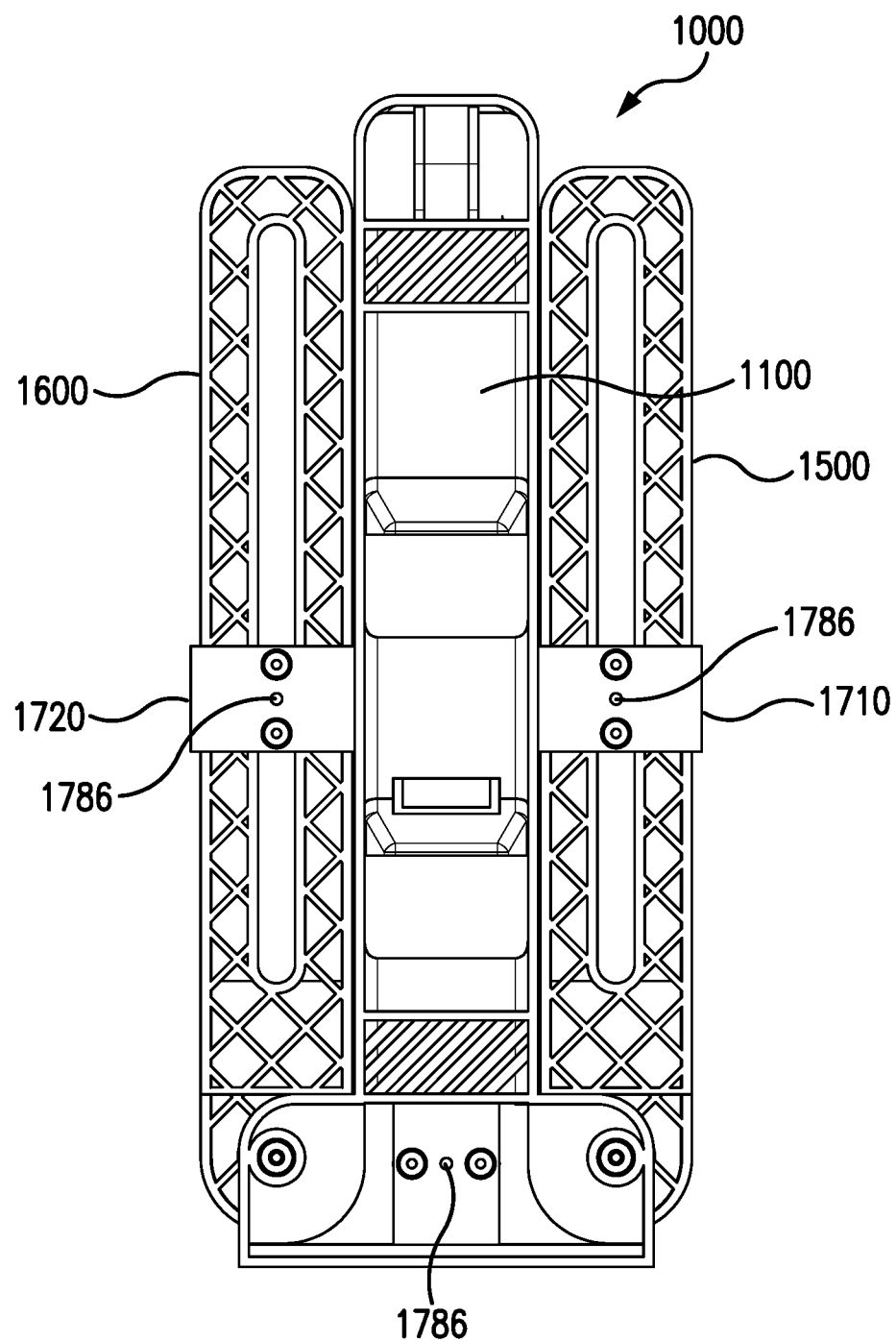
FIG. 48 is a target side perspective view of the picture hanging device with a movable handle and two pivoting arms in an folded state.

FIG. 48 is a target side perspective view of the picture hanging device with a movable handle and two pivoting arms in a folded state.

Figure 49:
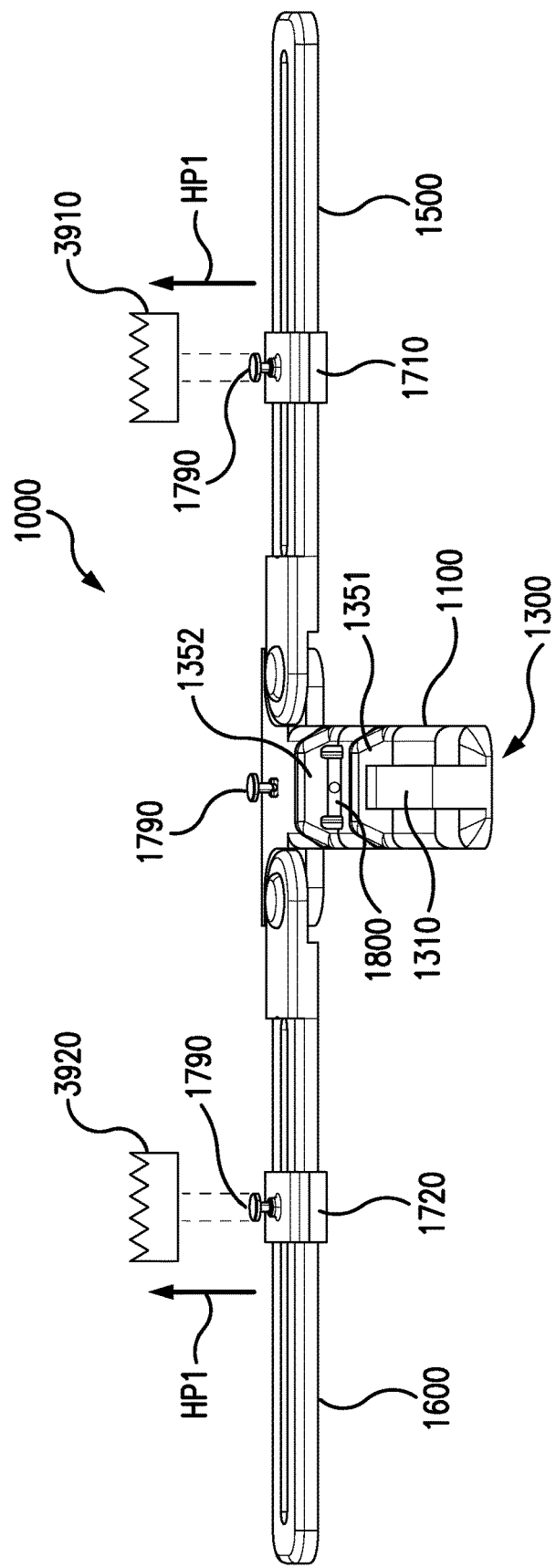
FIG. 49 shows a handle end perspective view of the picture hanging device with unfolded arms and a first marker slide member and a second marker slide member positioned for marking.

FIG. 49 shows a handle end perspective view of the picture hanging device with unfolded arms and a first marker slide member and a second marker slide member positioned for marking.

In an embodiment, dual support marking hook slider rails, can be used allow the user to move the dual support marking hooks to their appropriate frame supports. In an embodiment, dual support marking hooks, can be used where the user hangs pictures with two nail supports. In an embodiment, dual support picture hangers, can have two metal saw tooth hangers, or other hangers, or supports, or anchors, on the back of the picture, frame, or elsewhere Dual Support Process Step 1: User can first find the appropriate location for the picture frame;

Step 2: User can align the marking hooks to saw tooth hangers by moving the dual marking hooks along the dual marking hook slider rails;

Step 3: Place the marking hooks on the central gullets of each of the metal saw tooth hangers;

Step 4: Once the picture frame supports are placed on each marking hook 2781, the user picks up the picture hanging device and puts it against the wall 3500 so the picture frame is in the desired location;

Step 5: After the picture frame is in the desired location, adjust the picture frame so level indicate that the picture frame is straight;

Step 6: The user now removes the picture frame from both marking hooks with one hand while keeping the strait mate in place with the other;

Step 7: The user now presses on each marking hook 2781, which will leave a dimple in the wall 3500 in both places;

Step 8: The user can grab their hammer and two nails, and pound a nail into each dimple in the wall 3500 created by the picture hanging device;

Step 9: The user can place the picture frame on the wall 3500;

Step 10: The user can use a level to verify that the picture frame is straight;

Step 11: Now the picture hanging can be considered by the use as completed.

Figure 50:
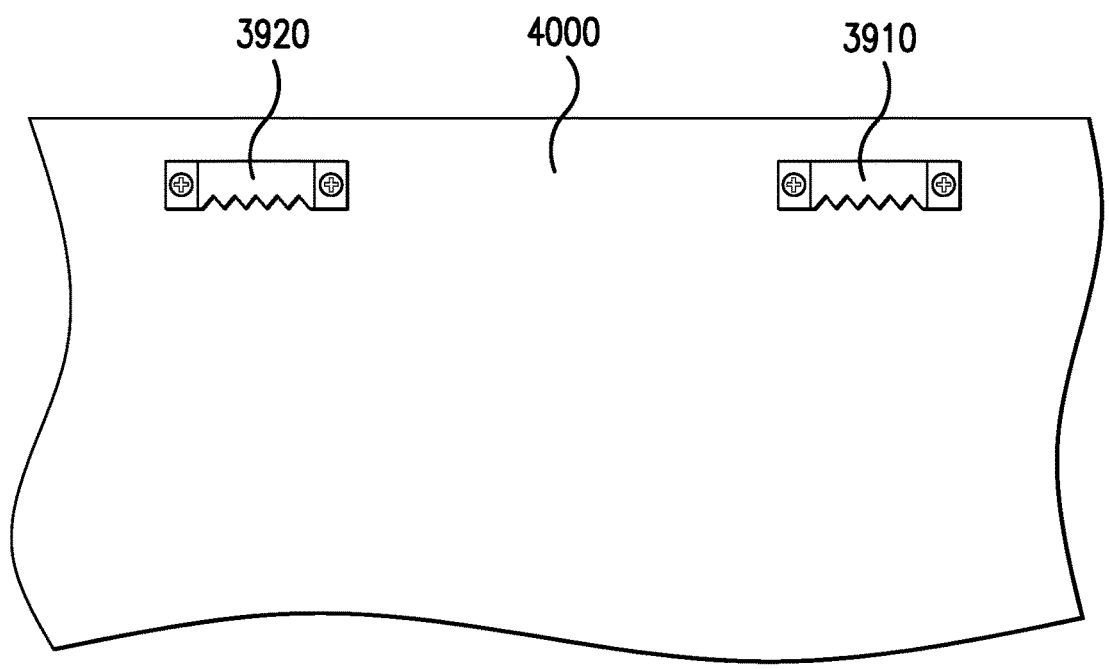
FIG. 50 shows a target side of a picture frame having a first sawtooth hanger and a second sawtooth hanger.

FIG. 50 shows a target side of a picture frame having a first sawtooth hanger 3910 and a second sawtooth hanger 3920.

Figure 51:
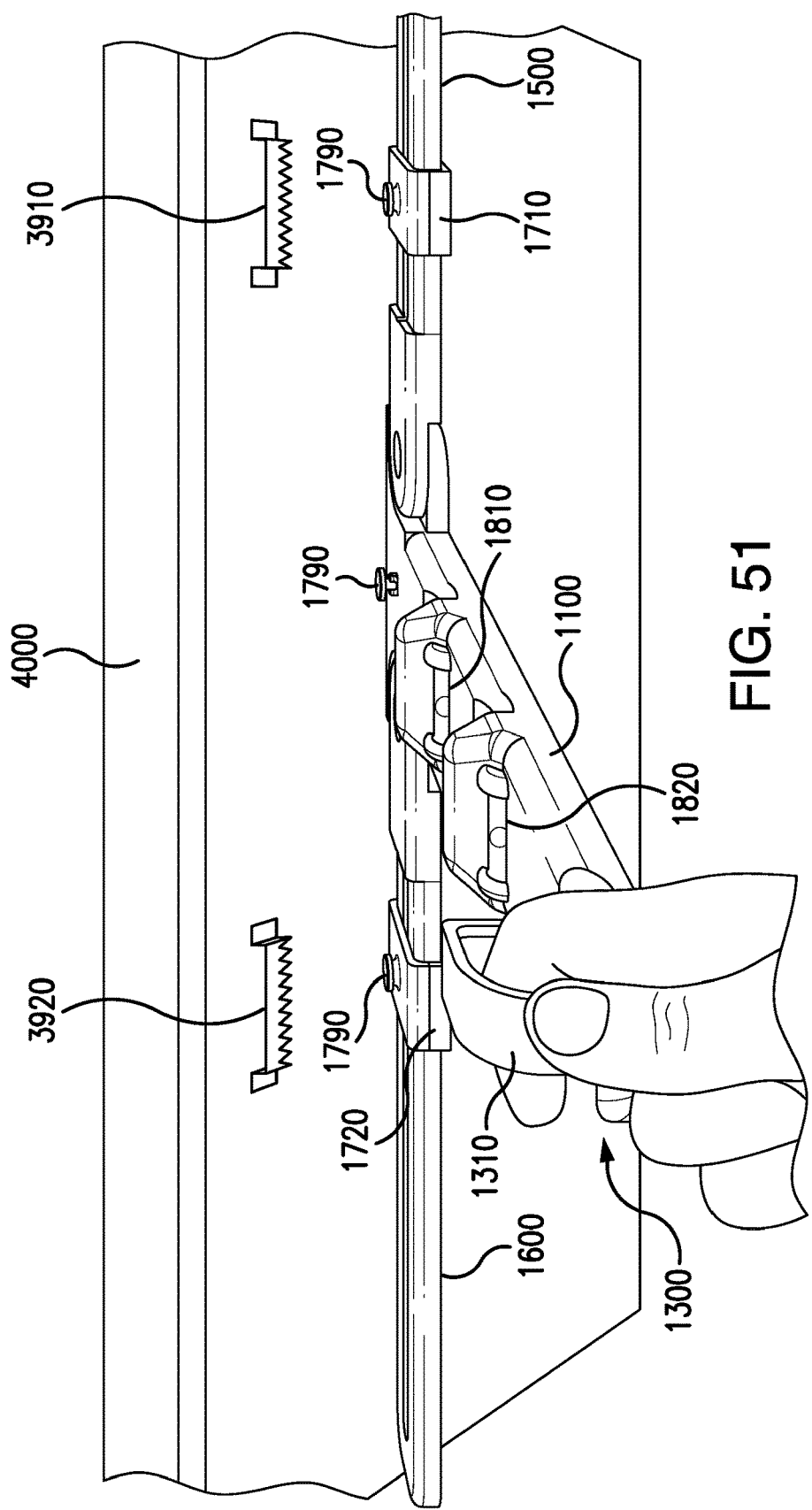
FIG. 51 shows a handle end perspective view of the picture hanging device with unfolded arms and a first marker slide member and a second marker slide member are positioned for a reversible engagement with the first sawtooth hanger and the second sawtooth hanger.

FIG. 51 shows a handle end perspective view of the picture hanging device with unfolded arms and a first marker slide member and a second marker slide member are positioned for a reversible engagement with the first sawtooth hanger 3910 and the second sawtooth hanger 3920.

Figure 52:
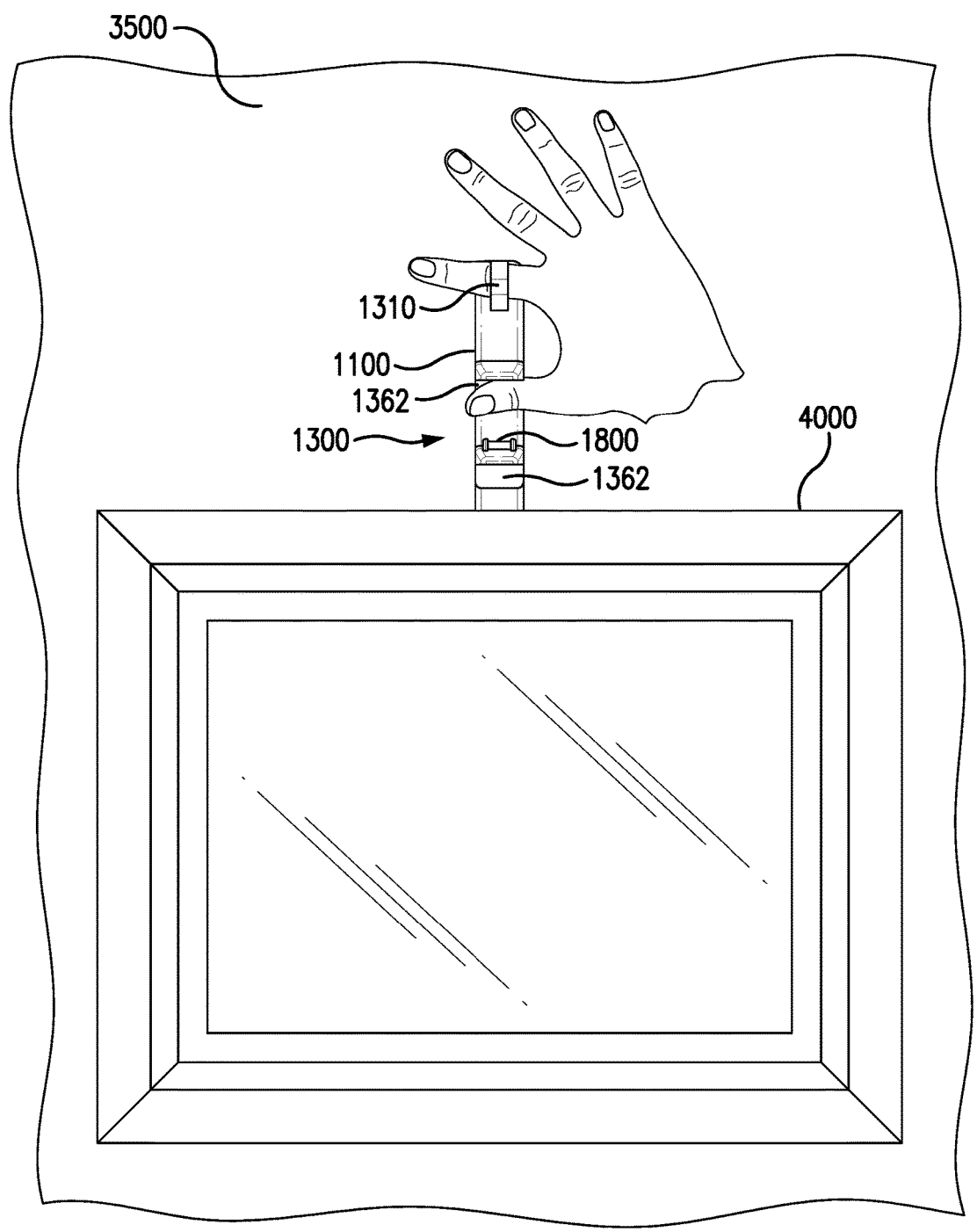
FIG. 52 shows an example of a hanging by wire of a picture hung from the center maker in its resting state and having the target side held against a target surface of a wall.

FIG. 52 shows an example of a hanging by wire of a picture frame 4000 hung from the center maker in its resting state and having the target side held against a target surface of a wall 3500. Herein, the reference number 4000 refers broadly to objects and things to be hung on a target surface or support, such as a wall, a surface, a structure, edifice, display or other target on which to hang something. The objects and things which reference number 4000 encompasses can, in nonlimiting example, be any one or more of a: material thing, a tangible thing, a frame, a picture frame, an object of art, an artistic work, a furnishing, a decorative item, a display piece, knickknacks, bric-a-brac, a machine, an equipment, a clock, a mirrors, a lighting or other fixture, an ornament, a decoration, a drapery, or other item. The reference number 4000 encompasses, for nonlimiting example "picture frames", also herein as "frames", generally and in all shapes and sizes regardless of what subject matter is actually framed, e.g. a picture, a piece of artwork, a mirror, or other framed subject matter. Herein, a picture frame 4000 also includes a framed canvas or other support structure which is to be hung.

Single Support Process

Step 1: User can first find the appropriate location for the picture frame 4000;

Step 2: User places picture frame 4000 on the marking hook 2781 of the picture hanging device;

On wire hangers, locate the most central point on the wire and hook the wire at that location with the marking hook 2781;

On metal saw tooth hangers, attach the marking hook 2781 to the central gullet;

Step 3: Once the picture frame support (wire or metal saw tooth) is placed on the marking hook 2781, the user picks up the picture hanging device and puts it against the wall 3500 so the picture frame 4000 is in the desired location;

Step 4: The user now removes the picture frame 4000 from the marking hook 2781 with one hand while keeping the picture hanging device in place with the other;

Step 5: The user now presses on the marking hook 2781, which will leave and/or creates a dimple in the wall 3500, or marking on or to the wall 3500;

Step 6: The user will grab their hammer and a nail, and pound the nail into the dimple in the wall 3500 created by the picture hanging device;

Step 7: The user will place the picture frame 4000 on the wall 3500;

Step 8: The user will use a level to verify that the picture frame 4000 is straight;

Step 9: Now the picture hanging is complete.

Picture Hanging System

The picture hanging system allows users to visualize, plan, layout, and execute creative "gallery" arrangements of decorative items in their home.

The picture hanging system helps inexperienced users to visualize picture wall 3500 gallery. Offer inspiration in the form of attractive "suggested" arrangements.

The picture hanging system can be used with a wide variety of objects to be hung, e.g., picture frames, shelves, TVs, flat screen TVs unusually shaped objects.

In an embodiment, the picture hanging system provides instructions to the users and suggestions as to which tools to use to hang pictures on the wall 3500 to create the gallery per the visualized plan.

Optionally, the picture hanging system can display images of the tools that the use can use to realize the results that the app helped them to plan and visualize.

User Experience Step by step: Visualization

User should take photo of the wall 3500 to be decorated. App should provide instructions on how to do it to allow the app to recognize the size of the wall 3500. User can be asked to indicate center of the arrangement in the photo.

App automatically saves image and ask user to make a photo of pictures (frames) to be arranged. App provides instruction how to do it to allow app to recognize size of each picture. App automatically visualizes new picture at the wall 3500 at scale. Repeat this step to accommodate all pictures.

In an embodiment, a user can photograph each framed object from a number of objects, or object to be hung, individually. The app and/or software can have a processor which executes executable program code having program logic which recognizes the dimension of each framed object. This processor and software can be customized to process the execution of executable program code having a rule-based logic to determine possible appropriate arrangements of the framed objects. The possible appropriate arrangements can be stored and called from an accessible computer memory, or can be entered by the user. When a user is to choose an appropriate arrangement from stored possible appropriate arrangements, then the user can select a desired arrangement. Once the user has selected the desired arranged, then the processor can process that user input, stored data and/or instructions regarding use of selected arrangement of the framed objects and/or objects.

The option to save images and add additional pieces to the existing arrangement should provide the opportunity for the user to visualize a potential new piece while still in the store before purchase.

At this point the app will offer the choice of automatic arrangement by App using "smart algorithm". Herein, the to "app" or "App" in addition to its ordinary and customary meaning, is intended to encompass a computer software application(s), software, program code and executable program code and related logic which can be use or execute to achieve the embodiments disclosed in this application. The term "app" is to be broadly construed to encompass the computer software, code, executables and instructions to operate in conjunction with a computer processor and memory on a computer, computing device, phone, smart phone, digital device, personal digital assistant, camera, digital camera, video camera or other device which may be used for the purposes disclosed herein. The app can consider the actual pictures and/or objects a user intends to arrange and/or hang and can determine and suggest aesthetically pleasing arrangements to be executed by the user Alternatively, the user can manually move pictures and app will help to keep them parallel to floor and provide equal spacing. The app should provide a "snap to grid" feature to aid in making the pictures aligned horizontally or vertically or to align items relative to center of picture.

App will allow the change of horizontal and vertical spacing in both modes. And move whole arrangement together in any desired direction.

In an embodiment, a user can use the app in conjunction with a variety of tools and object to achieve the end result shown by the app and/or chosen by the user, e.g. stud finder, laser level device 3600, picture hanging device, picture hanger, spacers 3800, and a measuring device.

Figure 53:
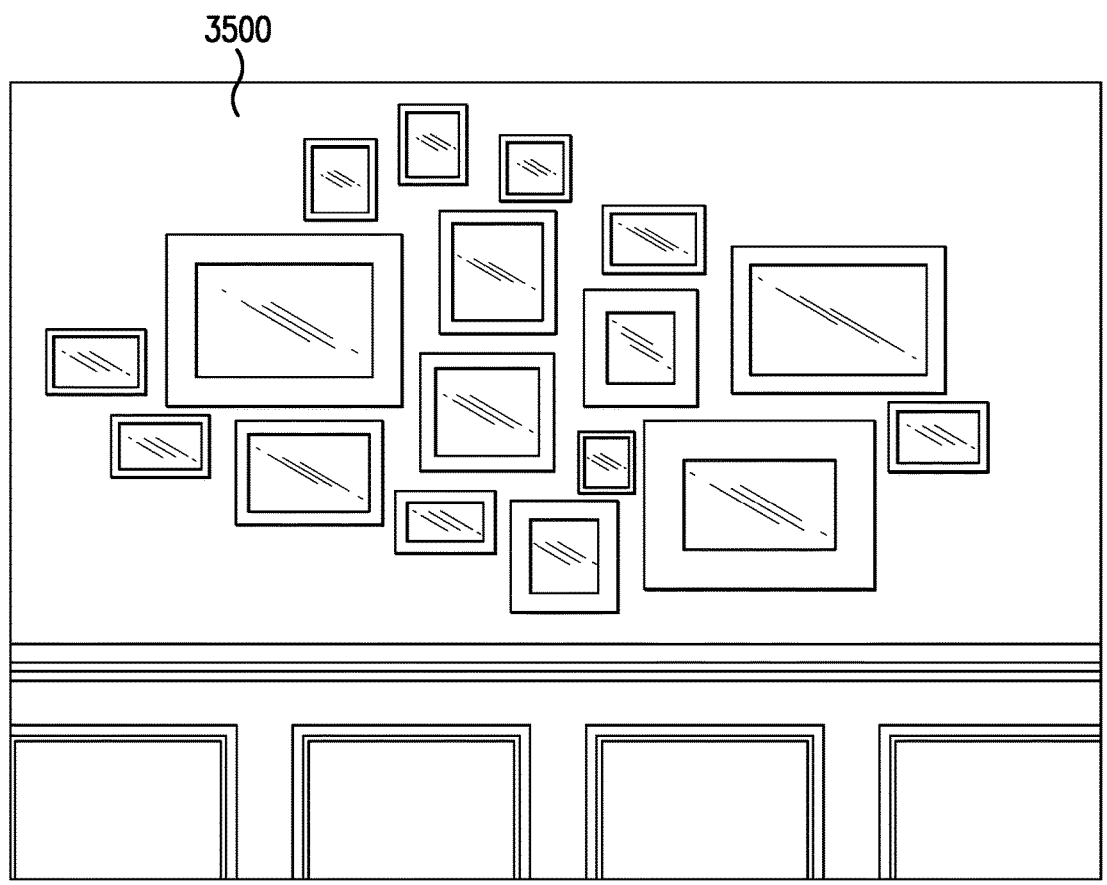
FIG. 53 is an example of a configuration of hung pictures achieved by use of the picture hanging system.

In an embodiment, the user will be asked to hang the first picture as close as possible to the position of green mark on the gallery visualization screen. On the next steps the user can be taught how to arrange pictures based on position of first one. This will depend on mountings for picture frame 4000 and other variables FIG. 53 is an example of a configuration of hung pictures achieved by use of the picture hanging system.

Figure 54A:
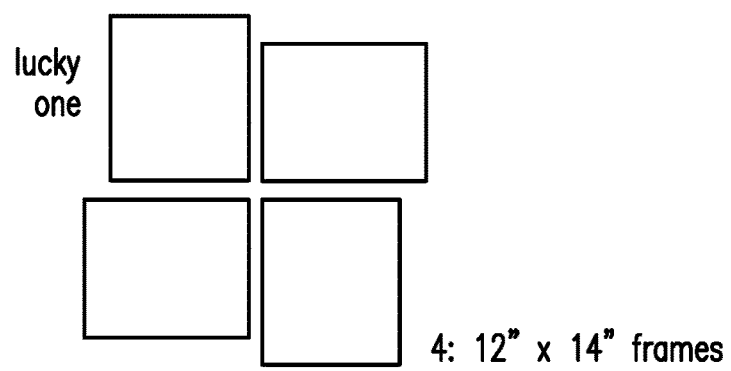
FIG. 54A shows an example configuration of pictures generated by use of the picture hanging system entitled "Lucky One"

FIG. 54A shows an example configuration of pictures generated by use of the picture hanging system entitled "Lucky One".

Example of Instructions for "Lucky One" Arrangement

Using SM hang picture #1 on the wall 3500 as close as possible to location shown in the app image.

Using level ensure that picture is positioned straight.

Attach sticky paper spacers 3810 on the left and top of the picture frame 4000. Use spacers 3800 equivalent to the distance a user can choose during gallery creation using app.

In an embodiment, the laser level 3600 can produce one or more of a laser beam 3610, herein used synonymously as or laser 3610. For nonlimiting example, the laser level 3600 can be self-leveling and produce a laser 3610. A user can align the self-leveling laser 3610 with the upper edge of picture frame #1, and secure it to the wall 3500 using its suction cup. Using SM align picture frame #2, referencing the paper spacers 3810 for proper gap to pic #1.

Hang Pic #2.

Align self-leveling laser 3610 with the left edge of picture frame #1, and secure it to the wall 3500 using its suction cup. Using SM align picture frame #3, referencing the paper spacers 3810 for proper gap to pic #1.

Hang Pic #3.

Attach sticky paper spacers 3810 on the left of picture frame #3 and above picture frame#2. Use spacers 3800 equivalent to the distance a user can choose during gallery creation using app.

Align self-leveling laser 3610 with the bottom edge of picture frame #3, and secure it to the wall 3500 using its suction cup. Using SM align picture frame #4, referencing the paper spacers 3810 for proper gap to both pic #2 and pic #3.

Hang Pic #4.

Remove all sticky paper spacers 3810 and use level to verify that all pictures are straight. Now the picture hanging is complete!

Figure 54B:
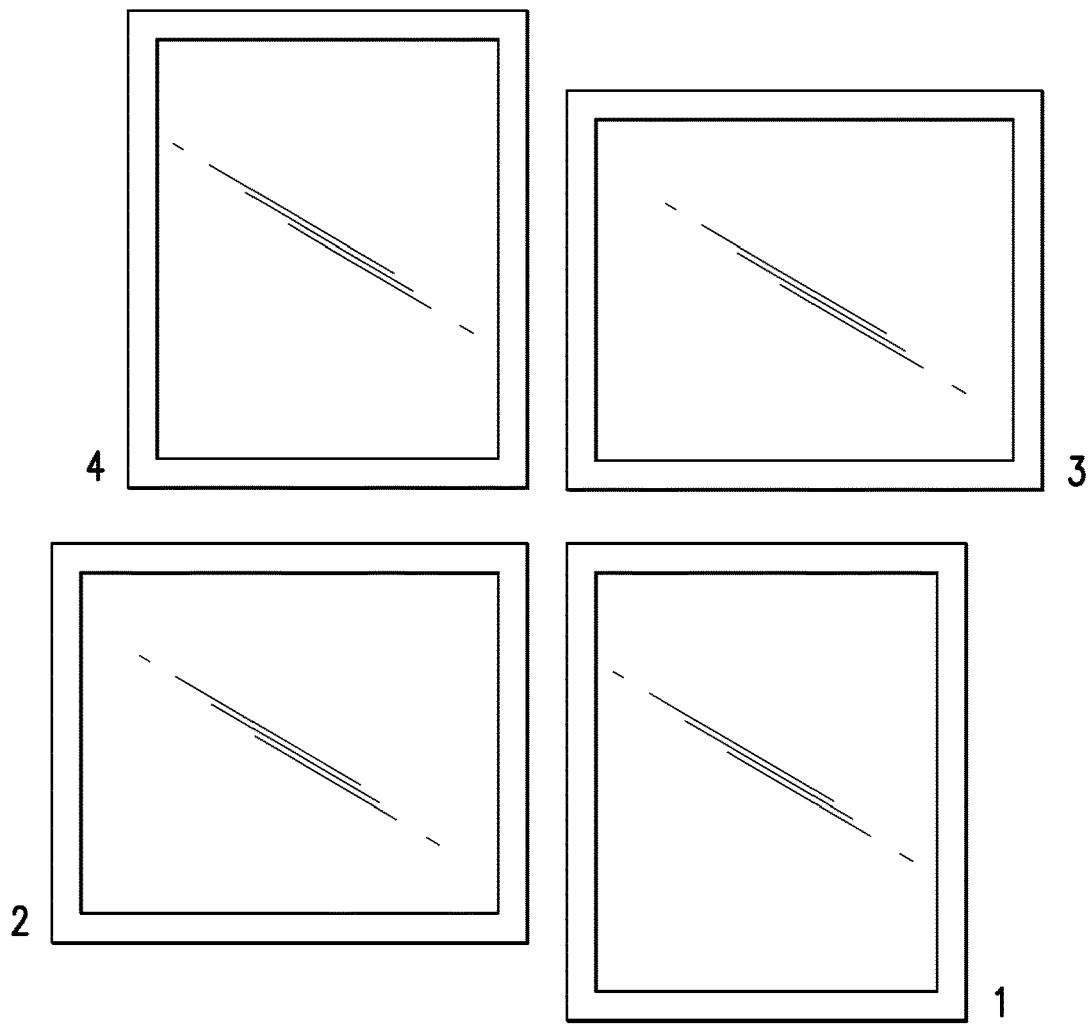
FIG. 54B shows an example of a "Lucky One" arrangement of hung pictures.

FIG. 54B shows an example of a "Lucky One" arrangement of hung pictures.

Figure 55A:
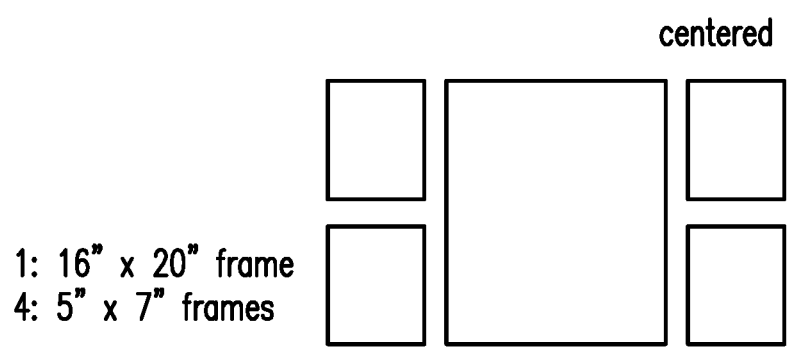
FIG. 55A shows an example configuration of pictures generated by use of the picture hanging system entitled "Centered"

FIG. 55A shows an example configuration of pictures generated by use of the picture hanging system entitled "Centered".

Example of instructions for "Centered" Arrangement

Using SM hang picture #1 on the wall 3500 as close as possible to location shown in the app image.

Using level ensure that picture is positioned straight.

Attach sticky paper spacers 3810 on the left and right of the picture frame 4000. Use spacers 3800 equivalent to the distance a user can choose during gallery creation using app.

Align self-leveling laser 3610 with the lower edge of picture frame #1, and secure it to the wall 3500 using its suction cup. Using SM align picture frame #2, referencing the paper spacers 3810 for proper gap to pic #1.

Hang Pic #2.

Align self-leveling laser 3610 with the upper edge of picture frame #1, and secure it to the wall 3500 using its suction cup. Using SM align picture frame #3, referencing the paper spacers 3810 for proper gap to pic #1.

Hang Pic #3.

Align self-leveling laser 3610 with the lower edge of picture frame #1, and secure it to the wall 3500 using its suction cup. Using SM align picture frame #4, referencing the paper spacers 3810 for proper gap to pic #1.

Hang Pic #4.

Align self-leveling laser 3610 with the upper edge of picture frame #1, and secure it to the wall 3500 using its suction cup. Using SM align picture frame #5, referencing the paper spacers 3810 for proper gap to pic #1.

Hang Pic #5.

Remove all sticky paper spacers 3810 and use level to verify that all pictures are straight.

Now the picture hanging is complete!

Figure 55B:
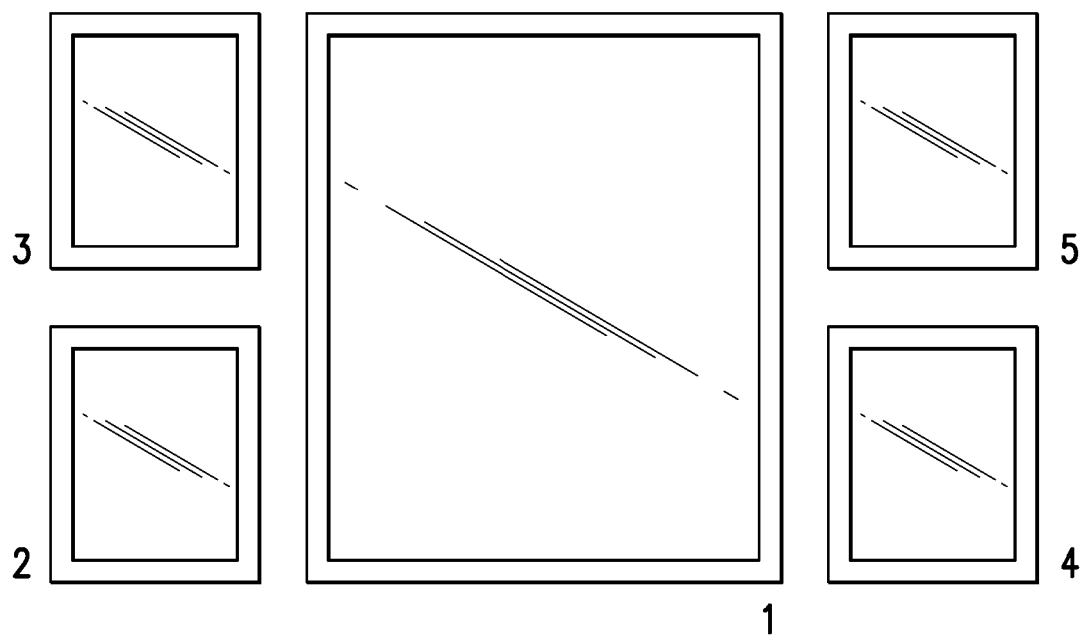
FIG. 55B shows an example of a "Centered" arrangement of hung pictures.
Figure 56A:
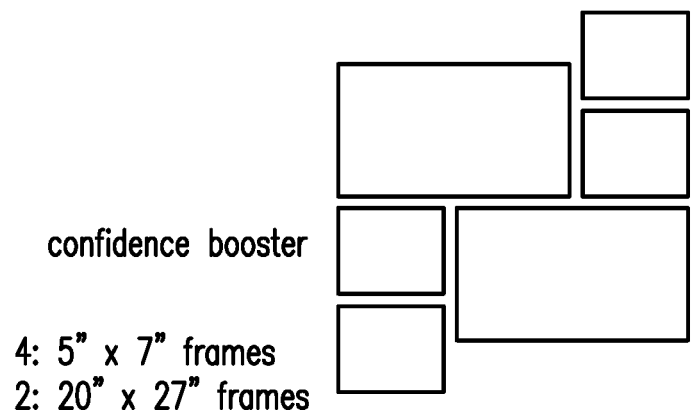
FIG. 56A shows an example configuration of pictures generated by use of the picture hanging system entitled "Confidence Booster"

FIG. 55B shows an example of a "Centered" arrangement of hung pictures;

FIG. 56A shows an example configuration of pictures generated by use of the picture hanging system entitled "Confidence Booster";

Example of Instructions for "Confidence Booster" Arrangement

Using SM hang picture #1 on the wall 3500 as close as possible to location shown in the app image.

Using level ensure that picture is positioned straight.

Attach sticky paper spacers 3810 on the top of the picture frame 4000. Use spacers 3800 equivalent to the distance a user can choose during gallery creation using app.

Align self-leveling laser 3610 with the left edge of picture frame #1, and secure it to the wall 3500 using its suction cup. Using SM align picture frame #2, referencing the paper spacers 3810 for proper gap to pic #1.

Hang Pic #2.

Attach sticky paper spacers 3810 on the top and right of picture frame #2. Use spacers 3800 equivalent to the distance a user can choose during gallery creation using app.

Align self-leveling laser 3610 with the upper edge of picture frame #2, and secure it to the wall 3500 using its suction cup. Using SM align picture frame #3, referencing the paper spacers 3810 for proper gap to pic #2.

Hang Pic #3.

Align self-leveling laser 3610 with the left edge of picture frame #1, and secure it to the wall 3500 using its suction cup. Using SM align picture frame #4, referencing the paper spacers 3810 for proper gap to pic #2.

Hang Pic #4.

Attach sticky paper spacers 3810 on the top of picture frame #3. Use spacers 3800 equivalent to the distance a user can choose during gallery creation using app.

Align self-leveling laser 3610 with the right edge of picture frame #3, and secure it to the wall 3500 using its suction cup. Using SM align picture frame #5, referencing the paper spacers 3810 for proper gap to pic #3.

Hang Pic #5.

Attach sticky paper spacers 3810 on the top of picture frame #5. Use spacers 3800 equivalent to the distance a user can choose during gallery creation using app.

Align self-leveling laser 3610 with the right edge of picture frame #3, and secure it to the wall 3500 using its suction cup. Using SM align picture frame #6, referencing the paper spacers 3810 for proper gap to pic #5.

Hang Pic #6.

Remove all sticky paper spacers 3810 and use level to verify that all pictures are straight. Now the picture hanging is complete!

Figure 56B:
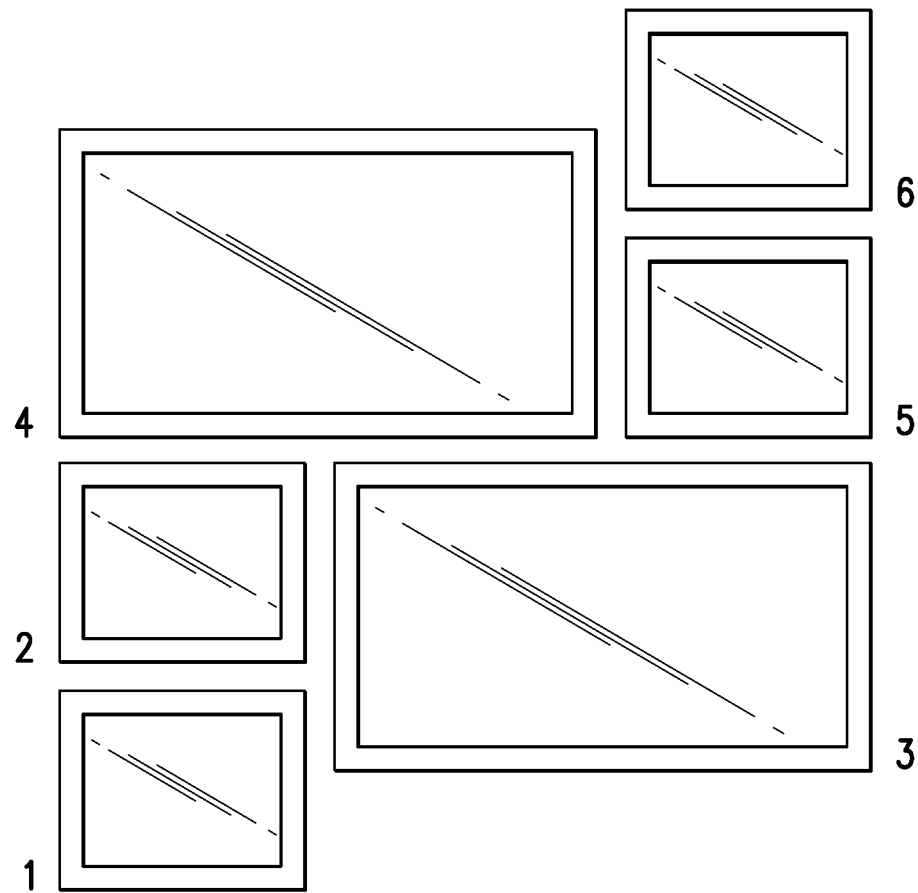
FIG. 56B shows an example of a "Confidence Booster" arrangement of hung pictures.
Figure 57A:
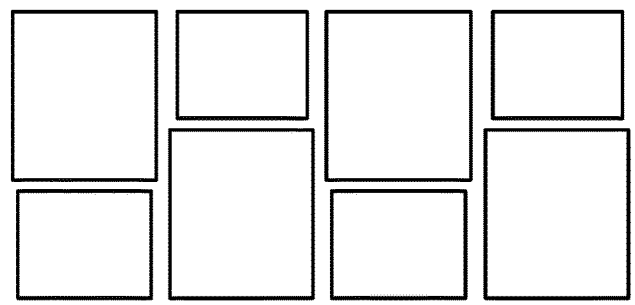
FIG. 57A shows an example configuration of pictures generated by use of the picture hanging system entitled "Puzzled"

FIG. 56B shows an example of a "Confidence Booster" arrangement of hung pictures;

FIG. 57A shows an example configuration of pictures generated by use of the picture hanging system entitled "Puzzled";

Example of Instructions for "Puzzled" Arrangement

Using SM hang picture #1 on the wall 3500 as close as possible to location shown in the app image.

Using level ensure that picture is positioned straight.

Attach sticky paper spacers 3810 on the top and right of the picture frame 4000. Use spacers 3800 equivalent to the distance a user can choose during gallery creation using app.

Align self-leveling laser 3610 with the left edge of picture frame #1, and secure it to the wall 3500 using its suction cup. Using SM align picture frame #2, referencing the paper spacers 3810 for proper gap to pic #1.

Hang Pic #2.

Align self-leveling laser 3610 with the lower edge of picture frame #1, and secure it to the wall 3500 using its suction cup. Using SM align picture frame #3, referencing the paper spacers 3810 for proper gap to pic #1.

Hang Pic #3.

Attach sticky paper spacers 3810 on the top of picture frame #3. Use spacers 3800 equivalent to the distance a user can choose during gallery creation using app.

Align self-leveling laser 3610 with the upper edge of picture frame #2, and secure it to the wall 3500 using its suction cup. Using SM align picture frame #4, referencing the paper spacers 3810 for proper gap to both pic #2 and pic #3.

Hang Pic #4.

Attach sticky paper spacers 3810 on the right of picture frames #3 and #4. Use spacers 3800 equivalent to the distance a user can choose during gallery creation using app.

Align self-leveling laser 3610 with the lower edge of picture frame #1, and secure it to the wall 3500 using its suction cup. Using SM align picture frame #5, referencing the paper spacers 3810 for proper gap to pic #3.

Hang Pic #5.

Repeat steps 3-7 to accurately hang picture frames 6, 7, and 8.

Remove all sticky paper spacers 3810 and use level to verify that all pictures are straight. Now the picture hanging is complete!

Figure 57B:
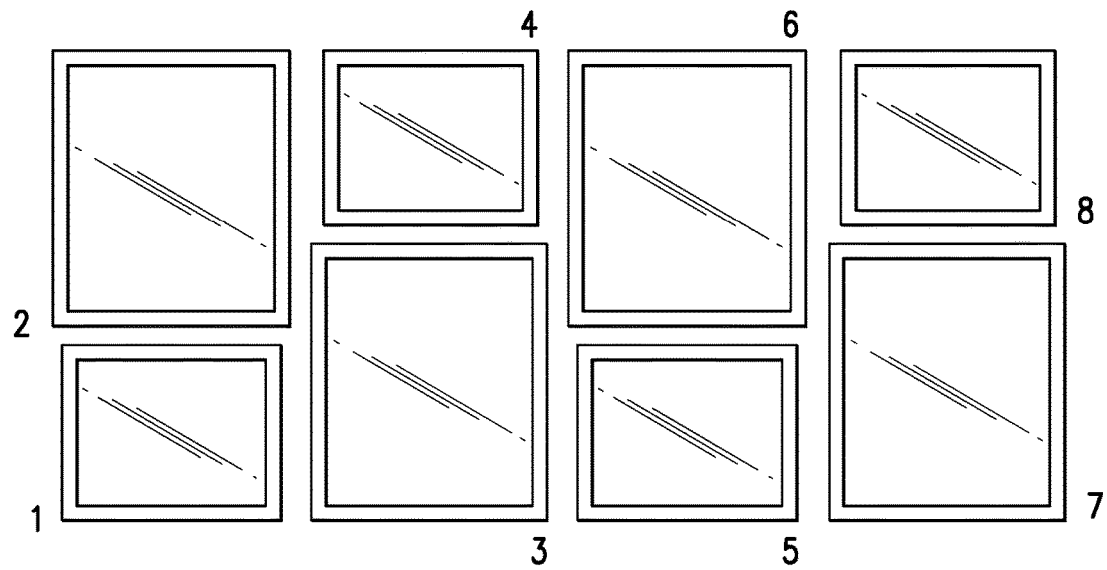
FIG. 57B shows an example of a "Puzzled" arrangement of hung pictures.

FIG. 57B shows an example of a "Puzzled" arrangement of hung pictures.

Figure 58:
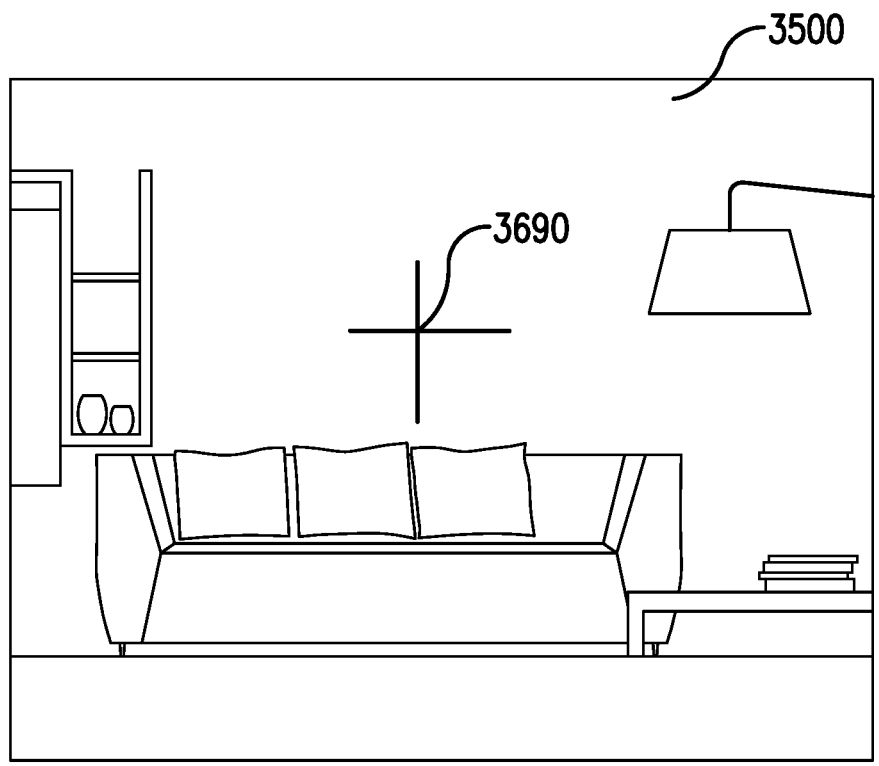
FIG. 58 shows the picture hanging system capturing image date of the hanging surface.

FIG. 58 shows the picture hanging system capturing image date of the hanging surface. FIG. 58 shows the wall 3500 and an arrangement centerpoint 3690 about which the picture hanging system can create an arrangement of from one to many objects 4000, such as framed pictures, or other items.

Figure 59A:
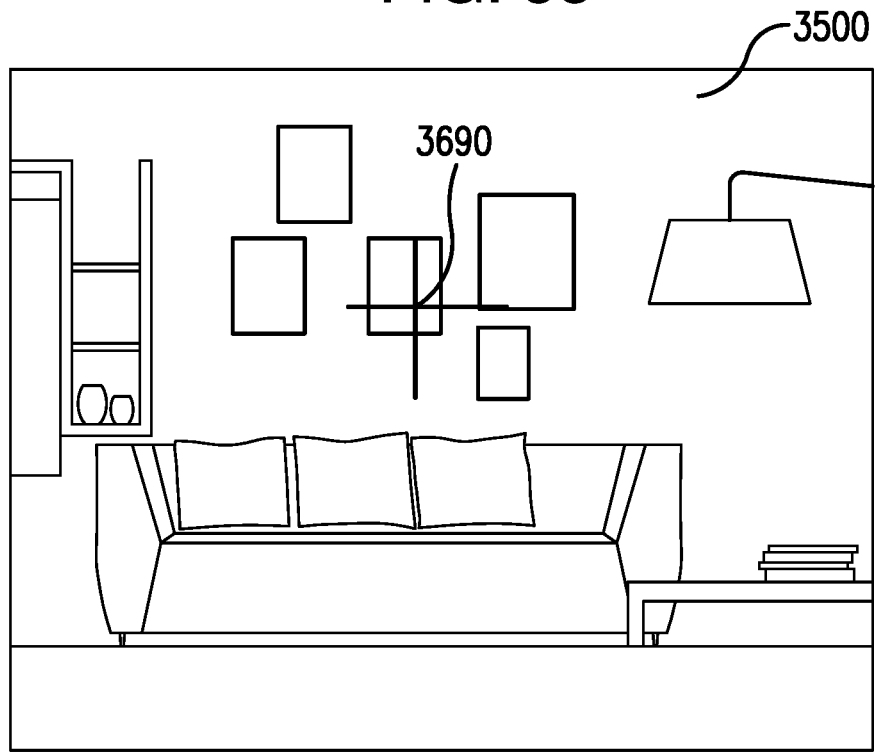
FIG. 59A shows a first proposed arrangement of five pictures generated by the picture hanging system.

FIG. 59A shows a first proposed arrangement of five pictures generated by the picture hanging system arranged about the arrangement centerpoint 3690

Figure 59B:
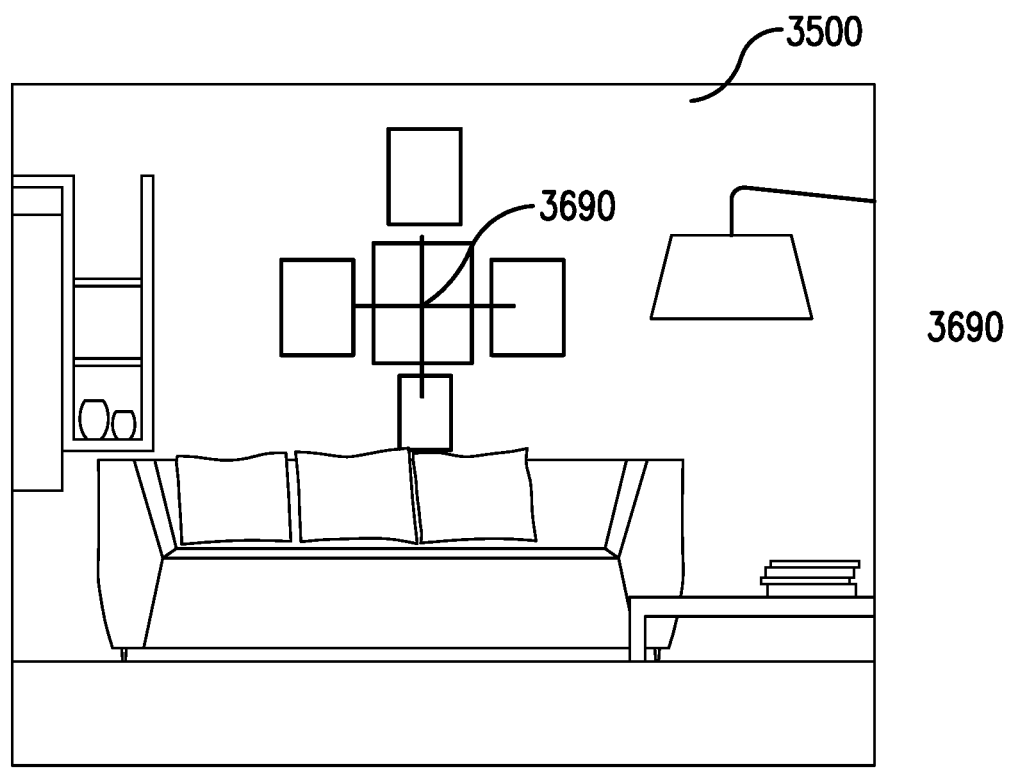
FIG. 59B shows a second proposed arrangement of five pictures generated by the picture hanging system.

FIG. 59B shows a second proposed arrangement of five pictures generated by the picture hanging system arranged about the arrangement centerpoint 3690.

Figure 59C:
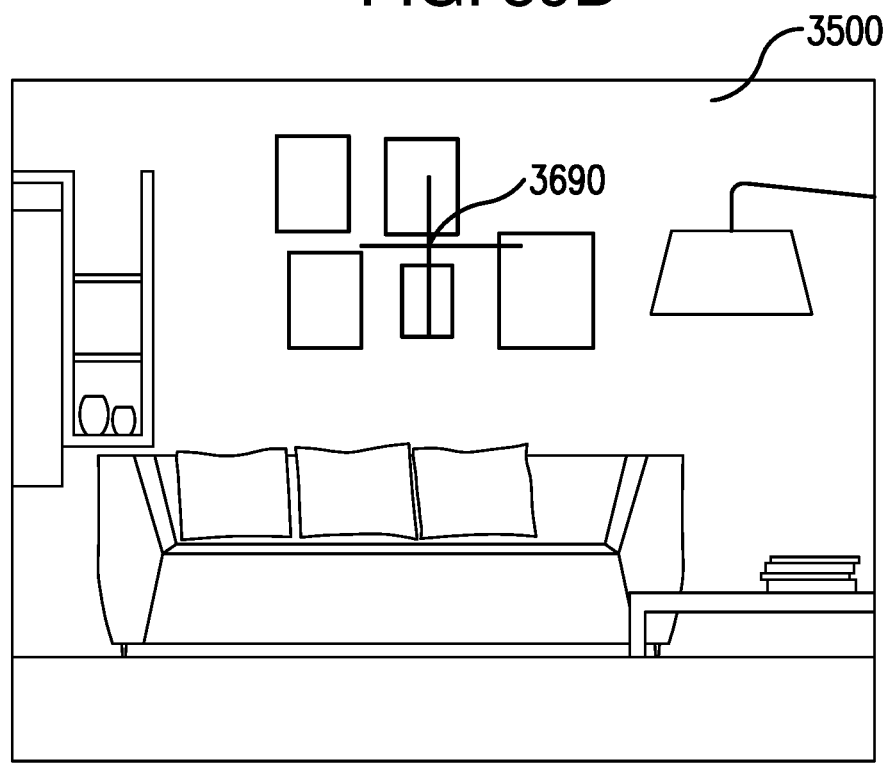
FIG. 59C shows a third proposed arrangement of five pictures generated by the picture hanging system.

FIG. 59C shows a third proposed arrangement of five pictures generated by the picture hanging system arranged about the arrangement centerpoint 3690.

Figure 59D:
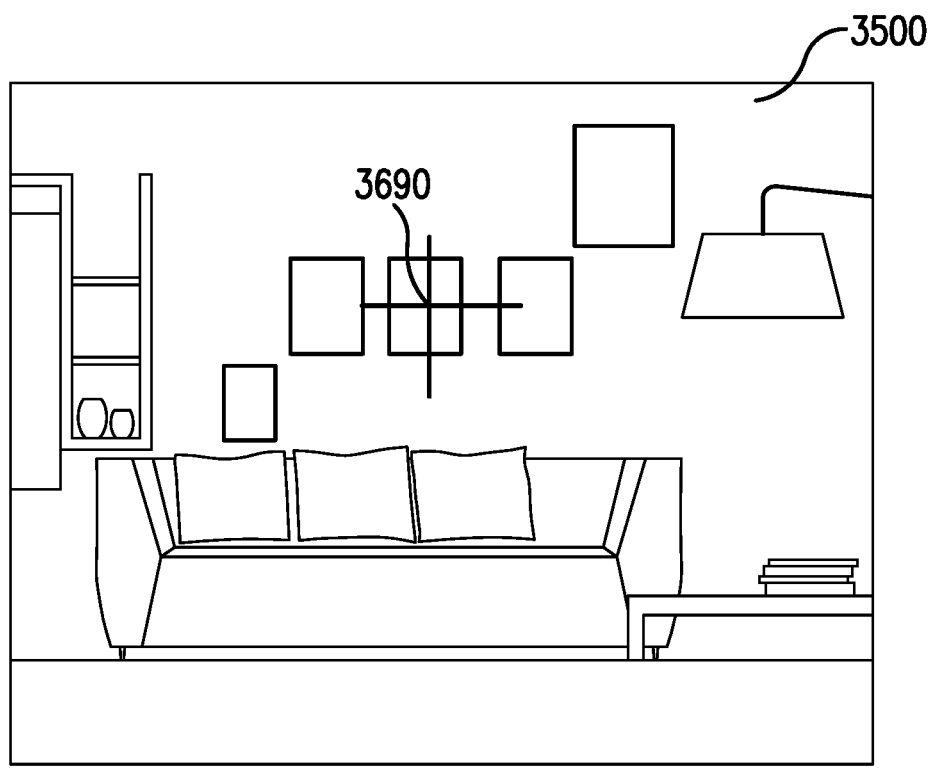
FIG. 59D shows a fourth proposed arrangement of five pictures generated by the picture hanging system.

FIG. 59D shows a fourth proposed arrangement of five pictures generated by the picture hanging system arranged about the arrangement centerpoint 3690.

Figure 59E:
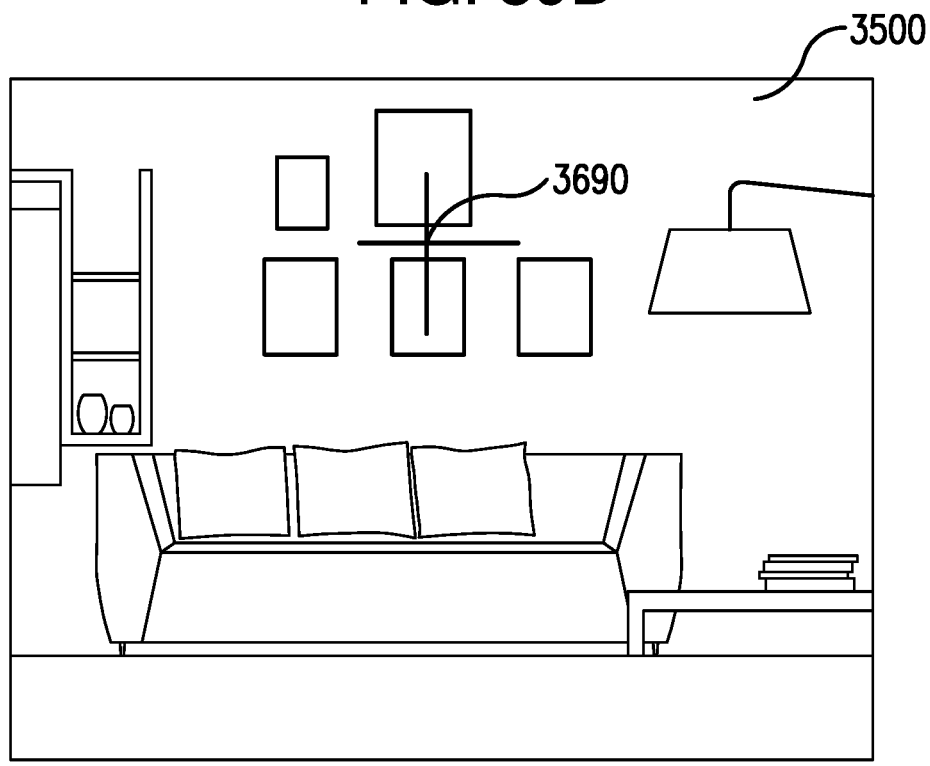
FIG. 59E shows a fifth proposed arrangement of five pictures generated by the picture hanging system.

FIG. 59E shows a fifth proposed arrangement of five pictures generated by the picture hanging system arranged about the arrangement centerpoint 3690.

Figure 60A:
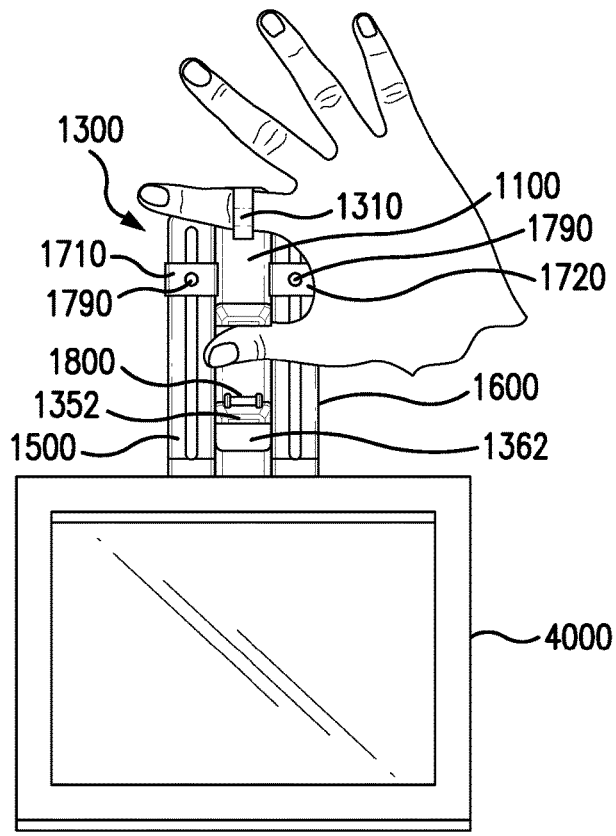
FIG. 60A shows a picture frame being supported by the picture hanging device.

FIG. 60A shows a picture frame 4000 being supported by the picture hanging device.

Figure 60B:
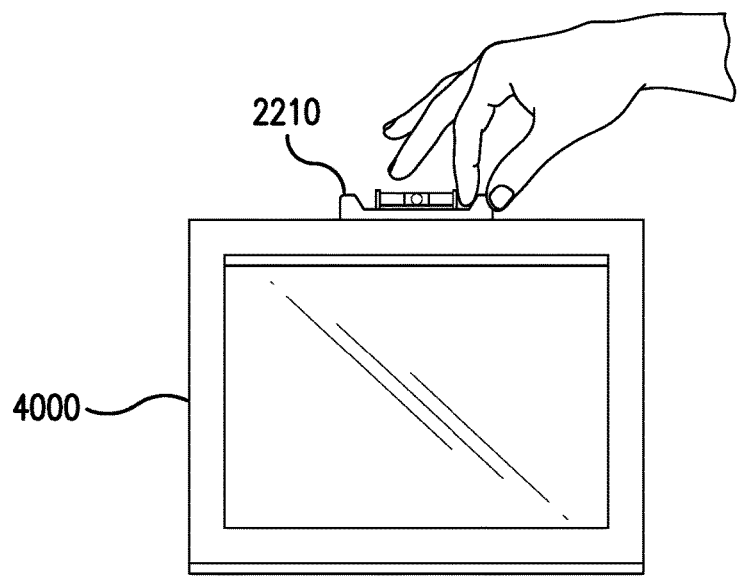
FIG. 60B show a user checking the level of a picture frame with a level device.

FIG. 60B show a user checking the level of a picture frame 4000 with a level device.

Figure 60C:
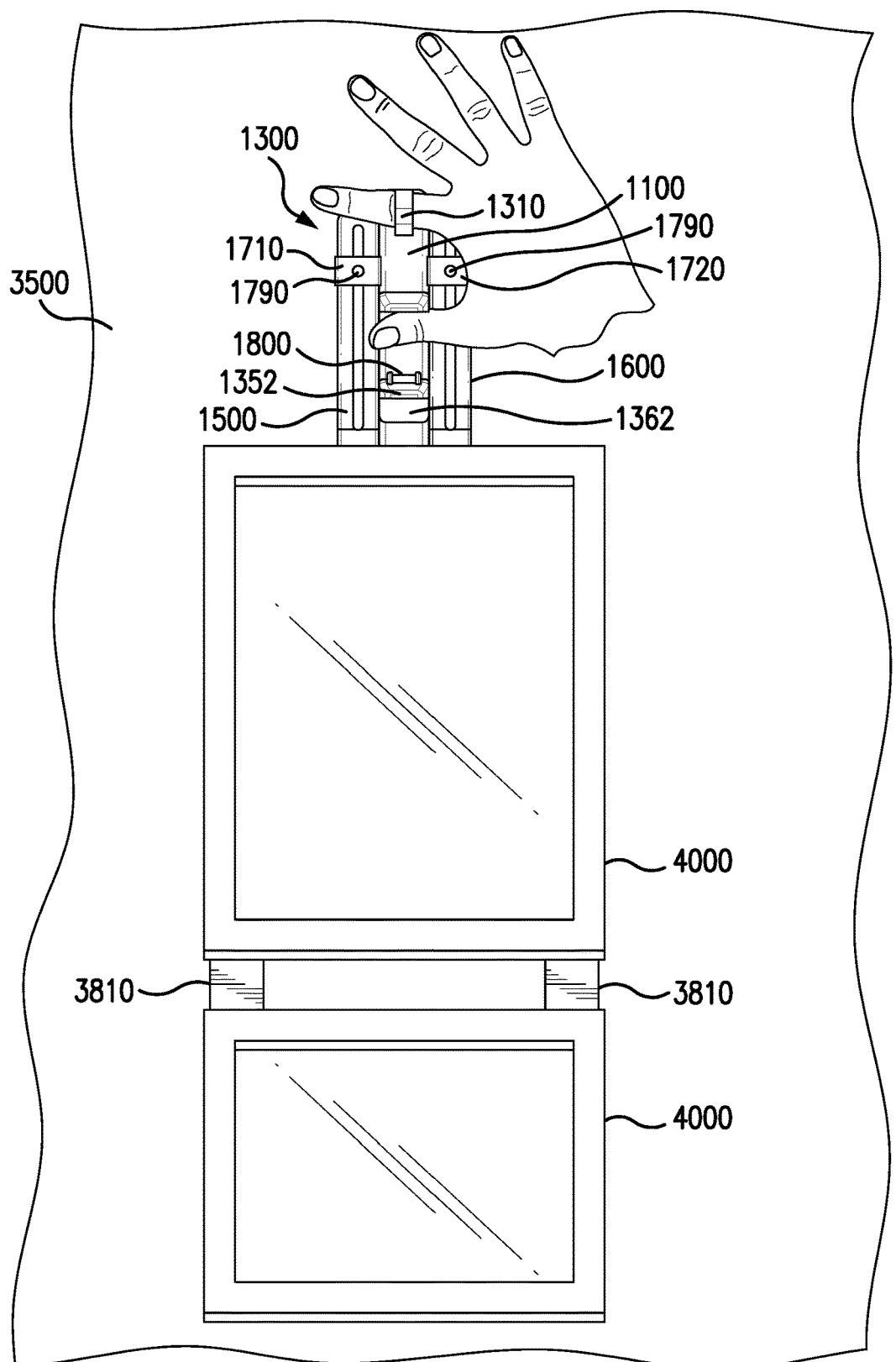
FIG. 60C shows a second picture frame being supported by the picture hanging device.

FIG. 60C shows a second picture frame 4000 being supported by the picture hanging device.

FIG. 60C1 shows a variety of spacers 3800 which can be used to facilitate the spacing of objects to be hung.

Figure 60D:
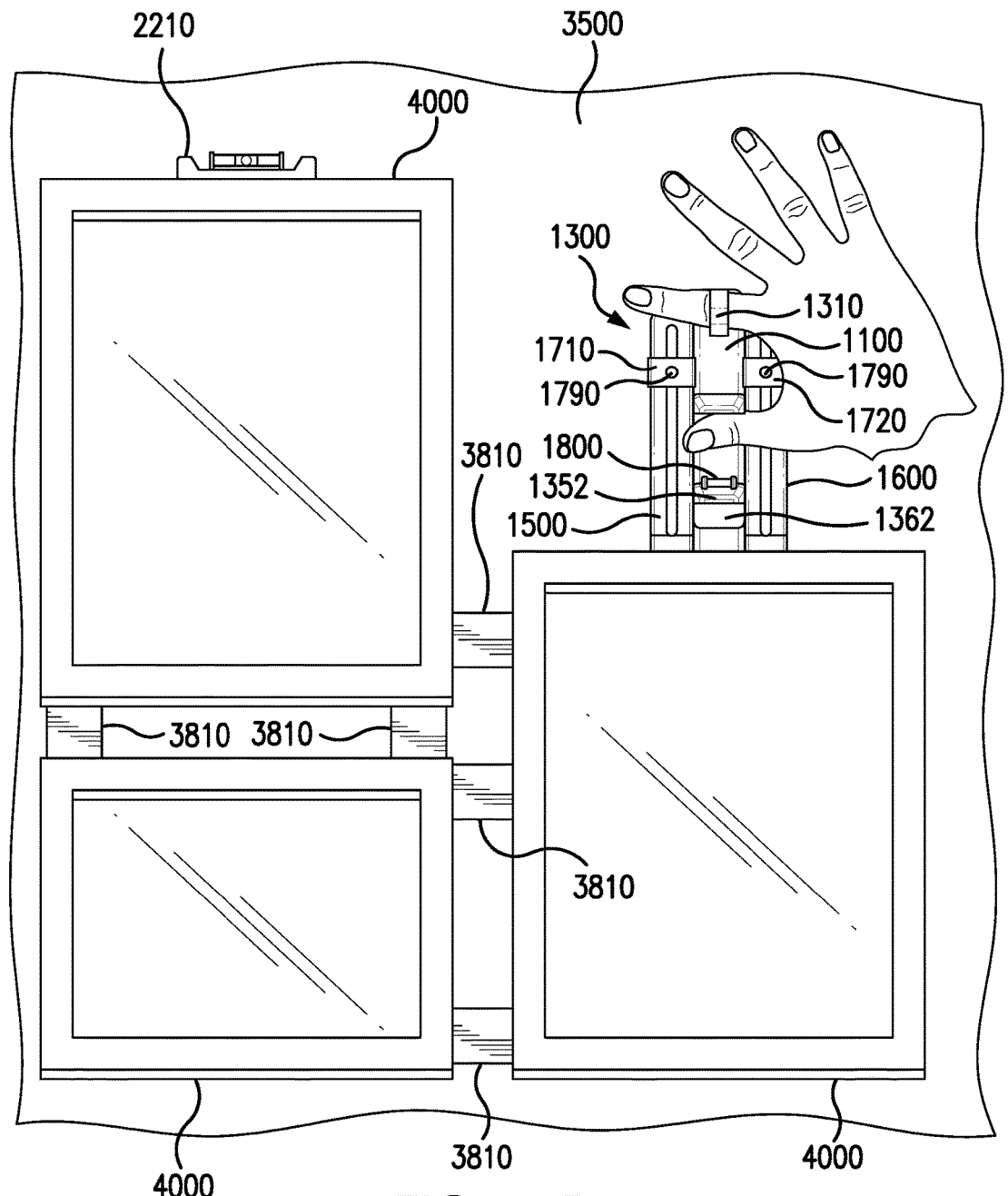
FIG. 60D shows a third picture frame being supported by the picture hanging device.
Figure 60E:
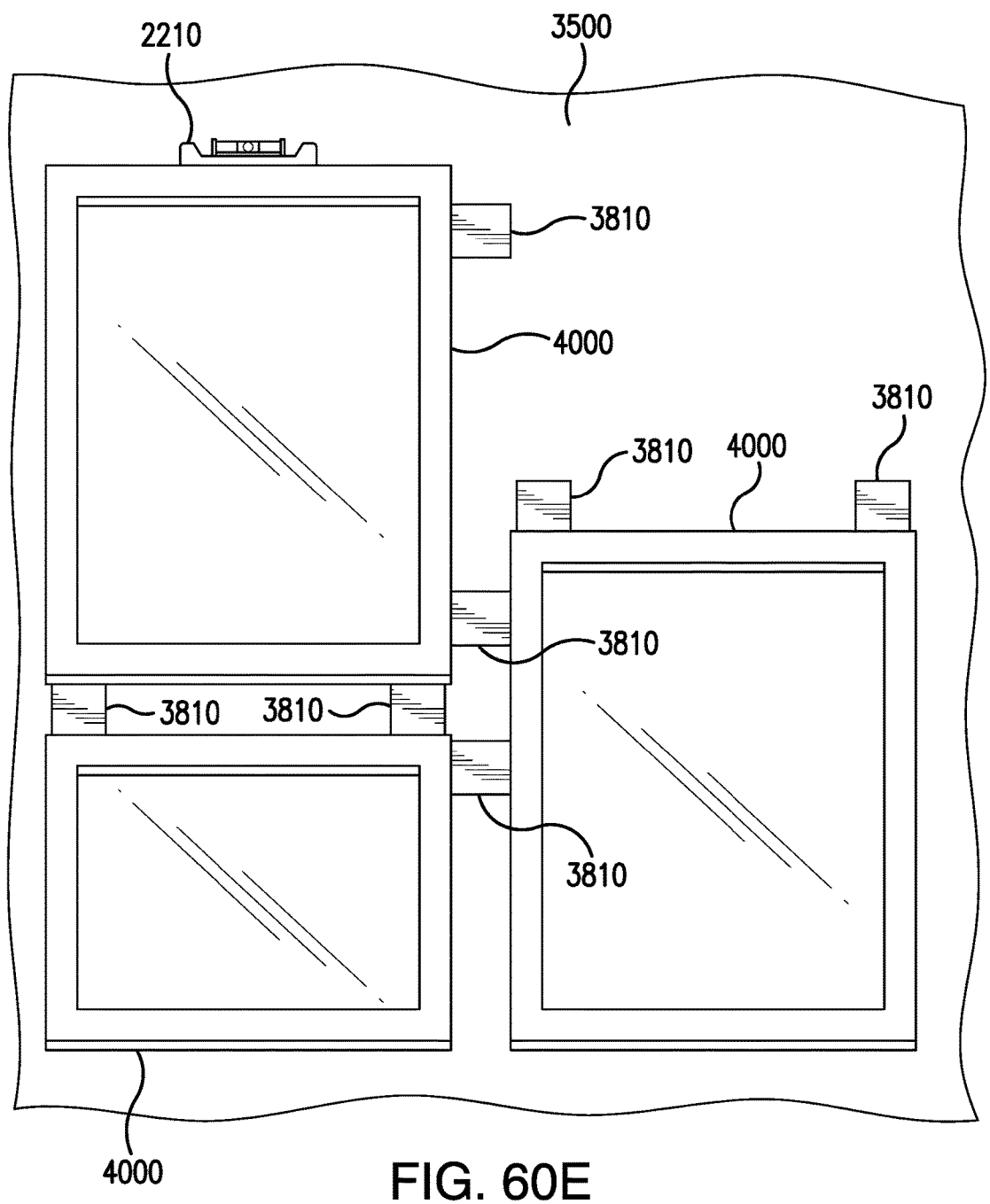
FIG. 60E shows three picture frames and a number of spacers.

FIG. 60D shows a third picture frame 4000 being supported by the picture hanging device;

FIG. 60E shows three picture frames and a number of spacers 3800.

Figure 60F:
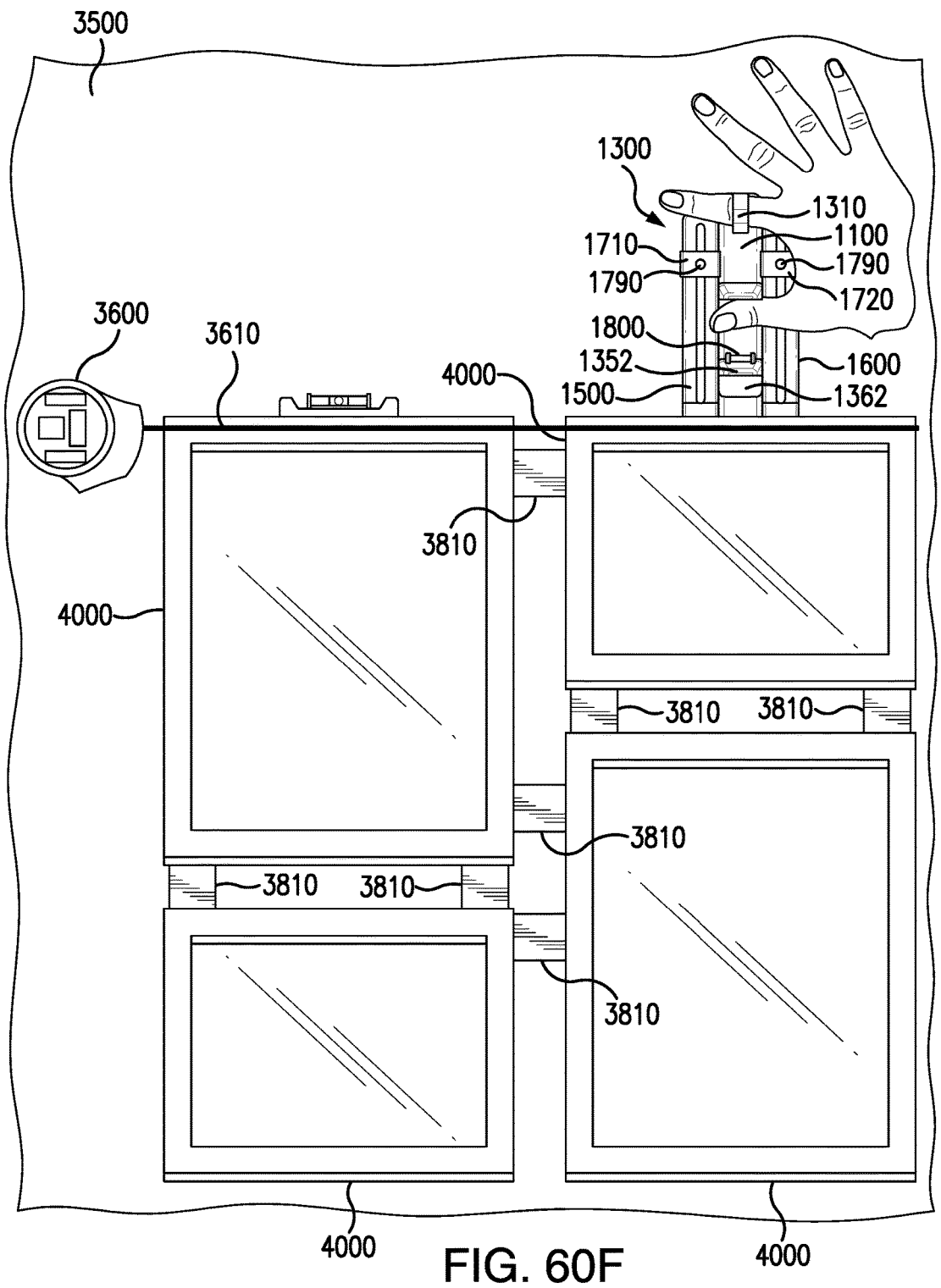
FIG. 60F shows a fourth picture frame being supported by the picture hanging device.

FIG. 60F shows a fourth picture frame being supported by the picture hanging device.

FIG. 60F1 shows a laser level device 3600.

Figure 60G:
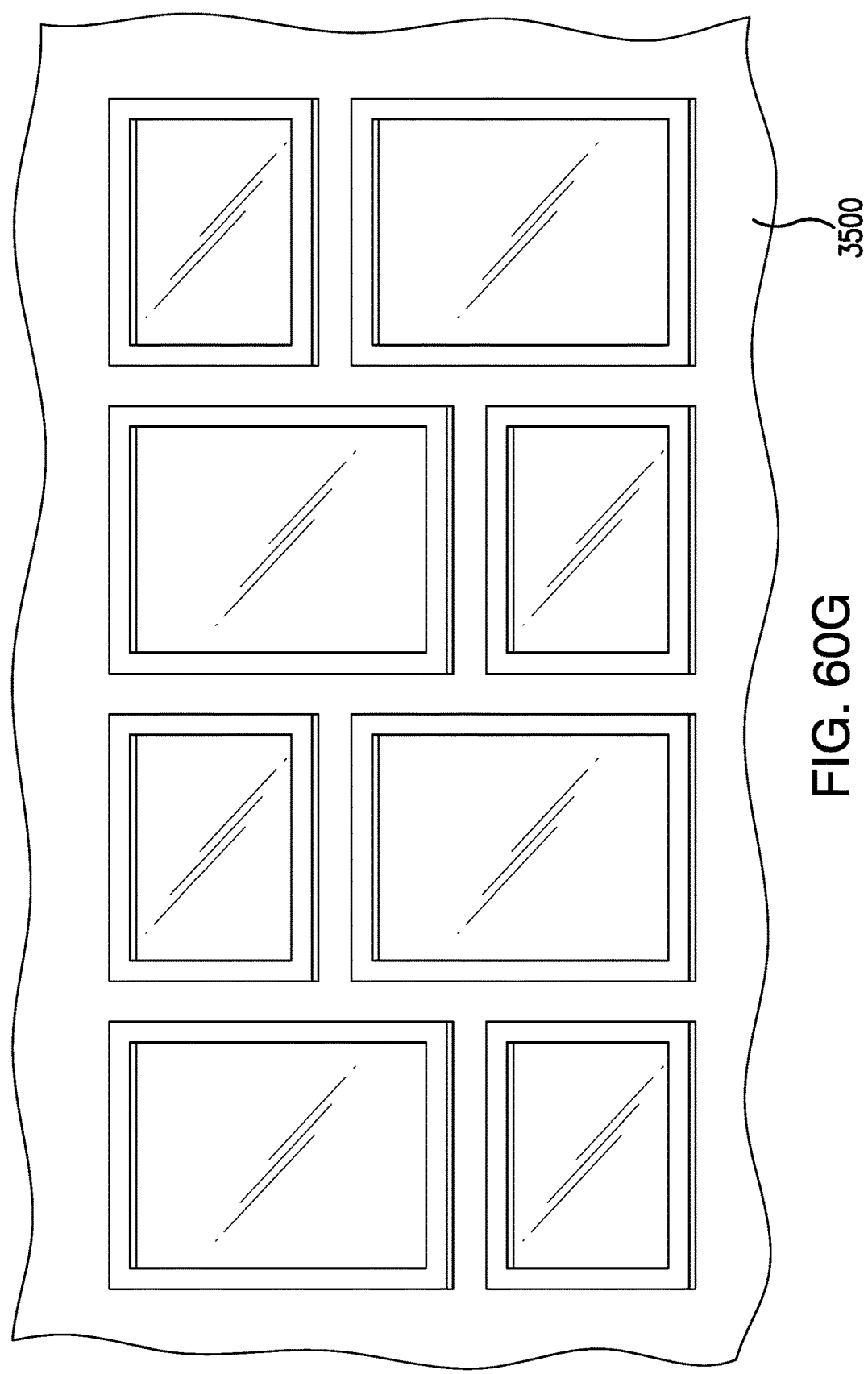
FIG. 60G shows a puzzled configuration achieved using the picture hanging system.

FIG. 60G shows a puzzled configuration achieved using the picture hanging system.

Figure 61:
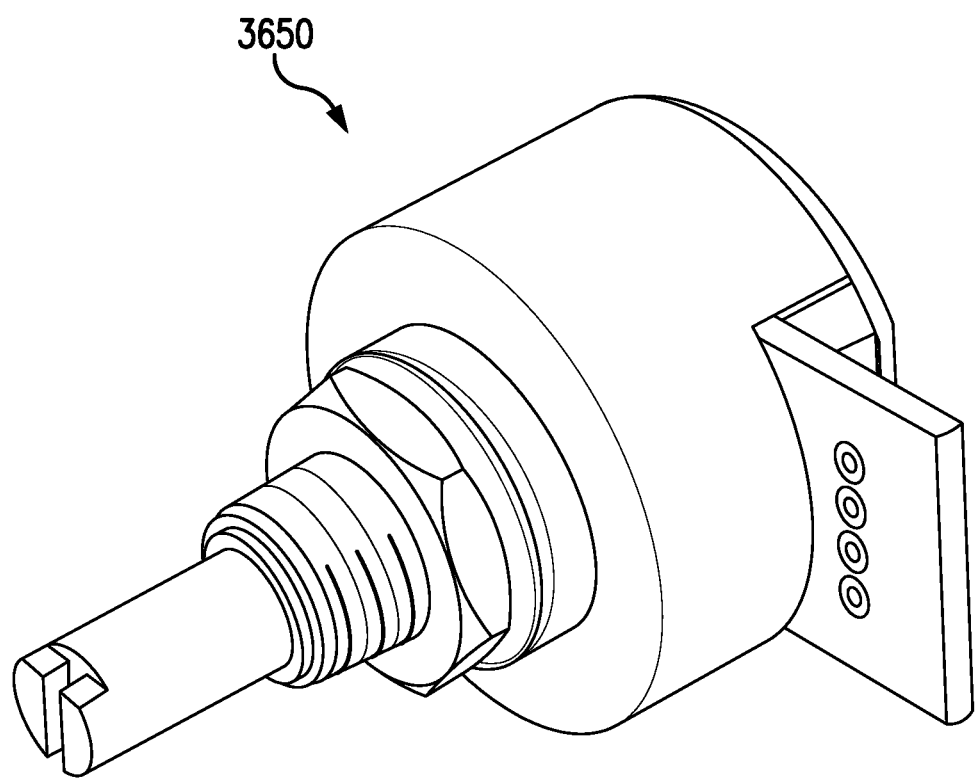
FIG. 61 shows a rotary encoder.

FIG. 61 shows a rotary encoder 3650.

A rotary encoder 3650 tracks the change in angular position of a shaft.

Figure 62A:
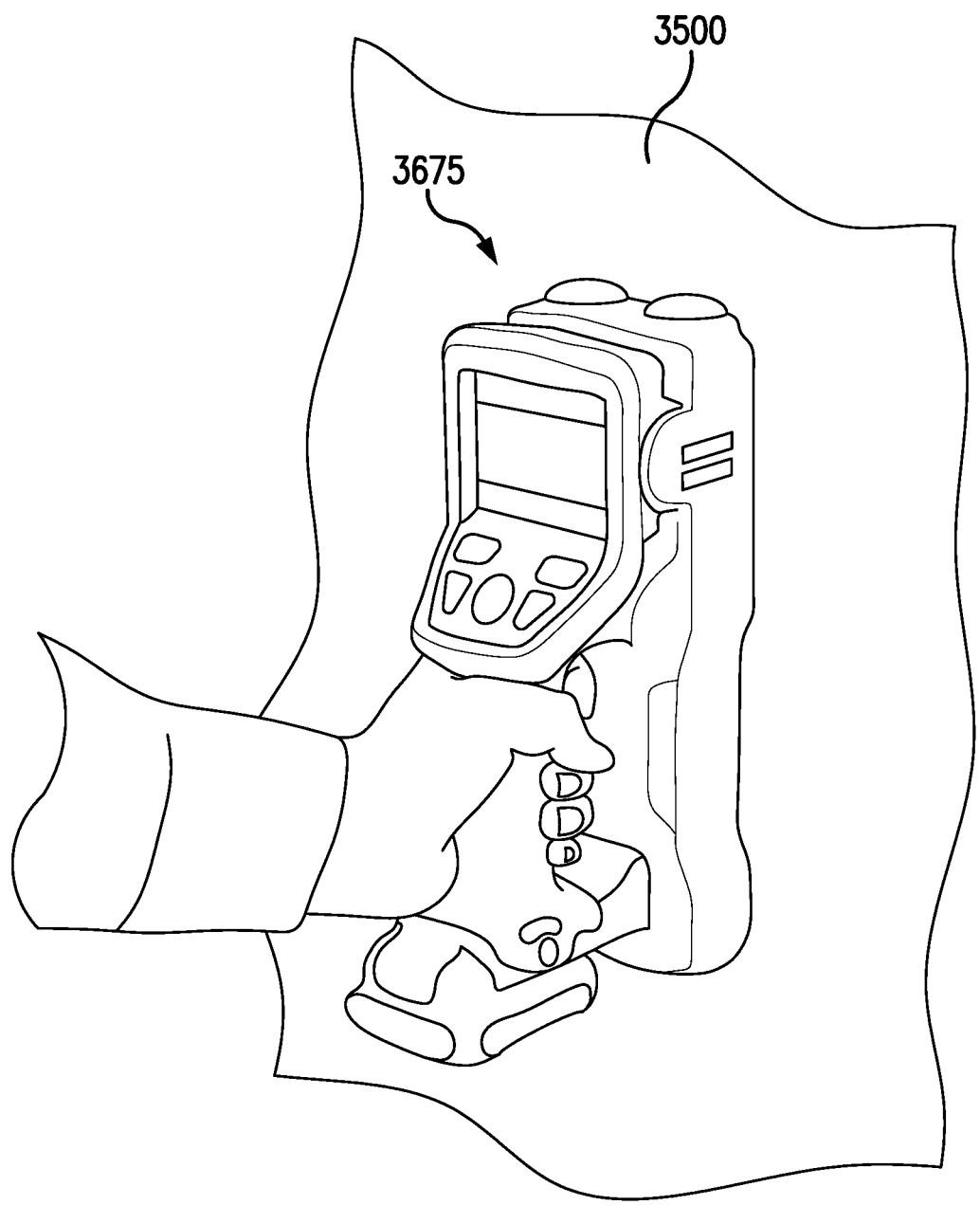
FIG. 62A shows a stud finder having a wheel.

FIG. 62A shows a stud finder having a wheel 3675.

The stud finder will have a wheel sticking outside of the housing. This wheel will be attached to an axel that goes inside the housing.

Inside the housing a rotary encoder will be attached to the axel.

Figure 62B:
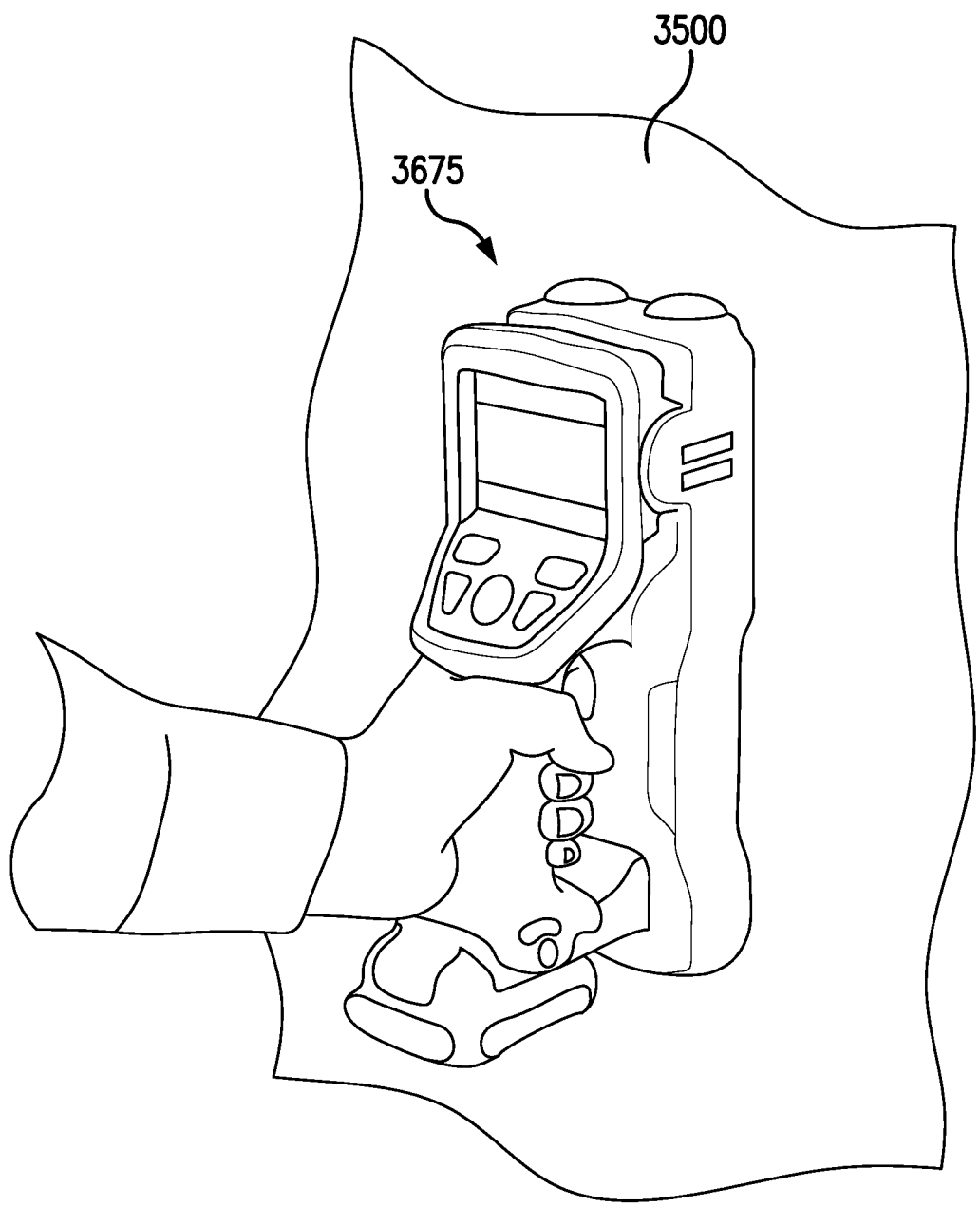
FIG. 62B shows a stud finder having a wheel held against a surface.

FIG. 62B shows a stud finder having a wheel 3675 held against a surface.

When the stud finder is turned on and placed on the wall 3500, the wheel is not rotating.

This means the axel will not rotate either, which then will be indicated by the rotary encoder not sensing any change in angular position.

Figure 62C:
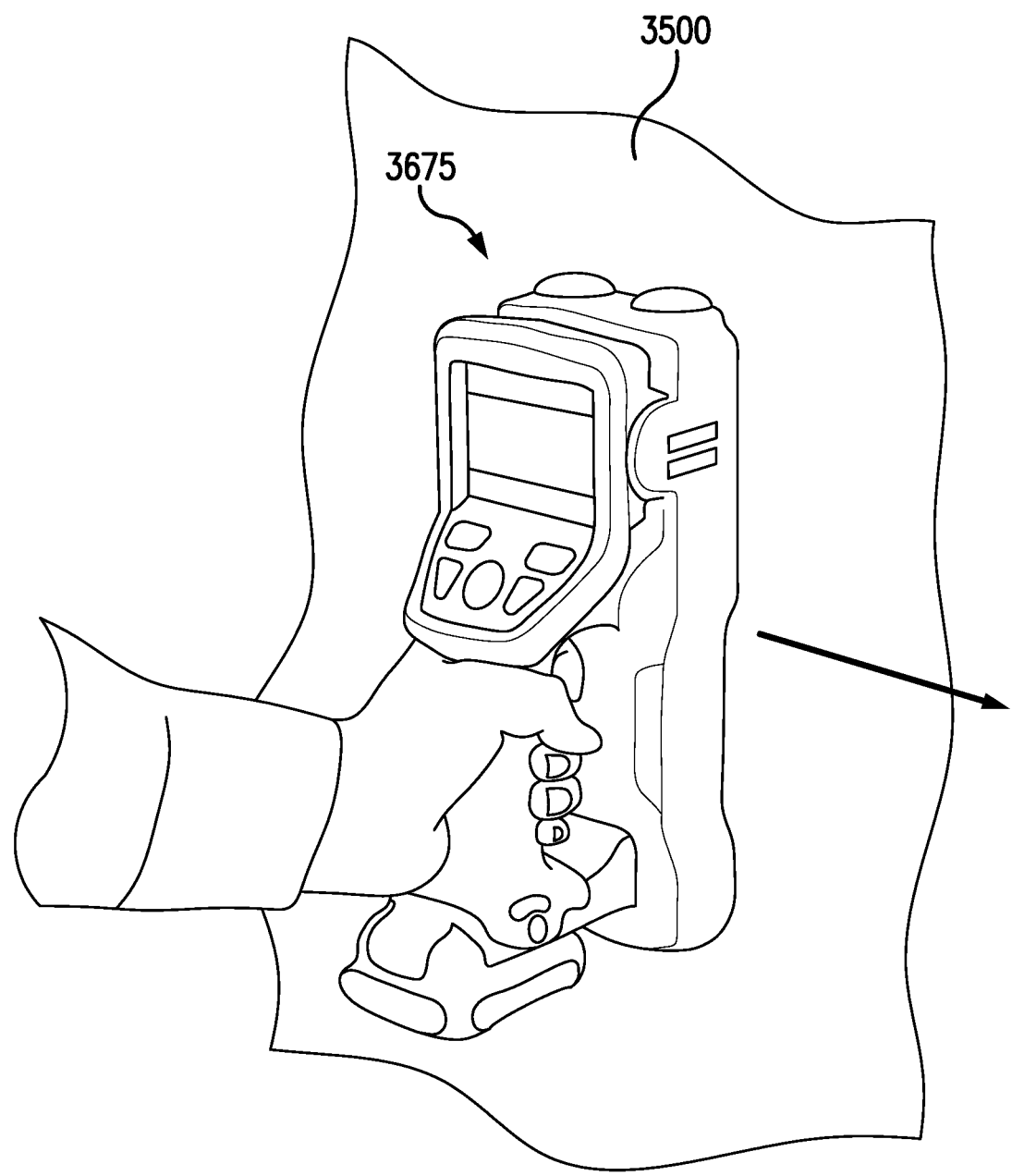
FIG. 62C shows a stud finder having a wheel being moved in a finding direction, optionally along a finding axis.

FIG. 62C shows a stud finder having a wheel 3675 being moved in a finding direction, optionally along a finding axis.

Once the user moves the stud finder laterally, the wheel will rotate.

This will then rotate the axel and the rotary encoder will then sense a change in rotation.

Figure 62D:
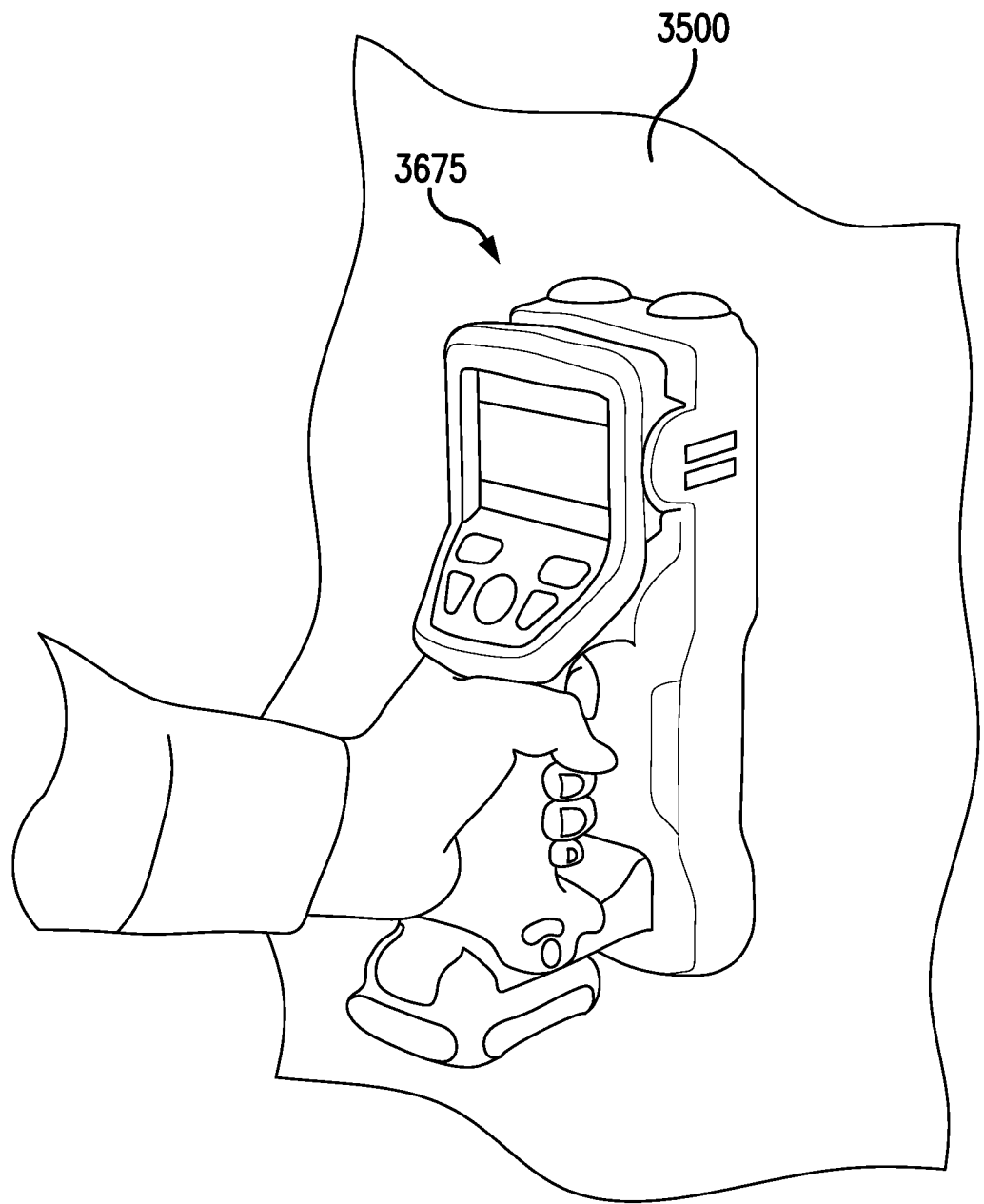
Figure 66:
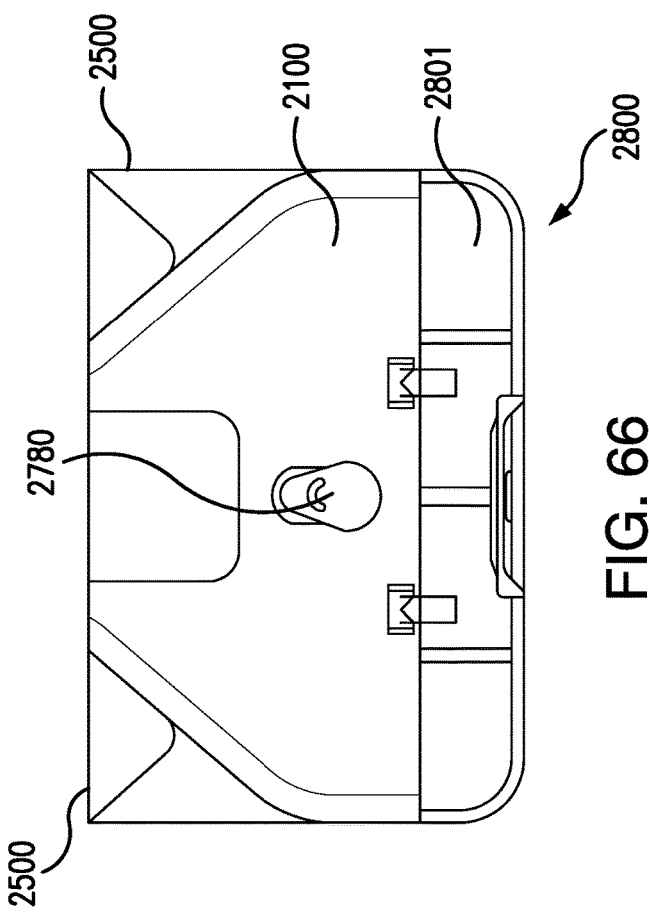

FIG. 62D shows a stud finder having a wheel 3675 in sensing mode.

The rotary encoder will send this signal to the processor.

The processor recognizes the stud finder has moved.

The processor collects the data from the capacitive plates and sends signals to the LEDs corresponding to the capacitive plates reading higher capacitance values.

Another exemplary embodiment of a picture hanging device is shown in FIGS. 63-73. The picture hanging device 2000 of this exemplary embodiment is similar to the picture hanging device 1000 of FIGS. 35-52 and the present exemplary embodiment should be presumed to operate similarly unless otherwise noted. Additionally, the features of the exemplary embodiment of FIGS. 35-52 can be combined with or substituted for features of the present exemplary embodiment.

The picture hanging device 2000 of FIGS. 63-73 includes a main body portion 2100. A pair of arms 2500 are rotatably attached to the main body portion 2100. The arms 2500 can rotate from a vertical or closed position, as shown in FIG. 63, to the extended position shown in FIG. 64. Although FIGS. 63 and 64 show the two arms 2500 in similar deployments, the two arms 2500 can be rotated independently of one another so that one arm can be in the closed position while the other is in the extended position. As with the earlier embodiment, the present embodiment includes a pair of slide members 2700 which slide along the arms 2500.

The picture hanging device 2000 also includes a sliding handle 2200. The sliding handle is shown in more detail in FIGS. 46B-46K, mentioned above. As shown in those figures, the sliding handle 2200 includes a handle portion 2201 which can be gripped by a user. It also includes a number of fingers 2220 and 2221. The fingers 2221 have locking projections 2222, as shown. Additionally, the sliding handle 2200 includes a level indicator 2210, such as a level bubble vial 1810, which allows a user to determine when the device is level.

The fingers 2220 and 2221 slide on rails 2101 on the main body portion 2100. The rails 2101 have a series of notches 2102. When the locking projections 2222 of the fingers 2221 engage the notches 2102, the sliding handle 2200 is secured at a particularly location. In order to move the sliding handle 2200, a user can press the fingers 2221 inwardly (e.g., see FIGS. 46H1 and 46H2). When the user presses the fingers 2221 inwardly, the locking projections 2222 disengage the notches 2102 and can move along the rails 2101. Particularly, the locking projections 222 are disposed inwardly of the rails 2101. The user can then slide the sliding handle 2200 along the rails 2101 to a desired location. Once the user releases the fingers 2221, they can again engage notches 2102 in order to secure the sliding handle 2200.

As shown in, for example, FIGS. 63-66, the picture hanging device 2000 includes a storage drawer 2800 at the bottom of the main body portion 2100. The storage drawer 2800 includes a drawer portion 2801 and a cover 2802 which can be opened and closed. The storage drawer 2800 can be used by a user to store accessories such as nails, picture supports, screws, wire and the like. The cover 2801 includes a cover side latching member 2803 and the drawer includes a drawer side latching member 2804, as shown in FIGS. 70 and 71. As shown in those figures, the cover side latching member 2803 of the exemplary embodiment projects over the bump that forms the drawer side latching member 2804 in order to keep the cover 2801 closed. As will be appreciated, the cover side latching member 2803 can deflect and allows a user to open the cover 2801 when it is pulled with a sufficient force whereas when no significant force is applied, the cover will remain closed.

Figure 65:
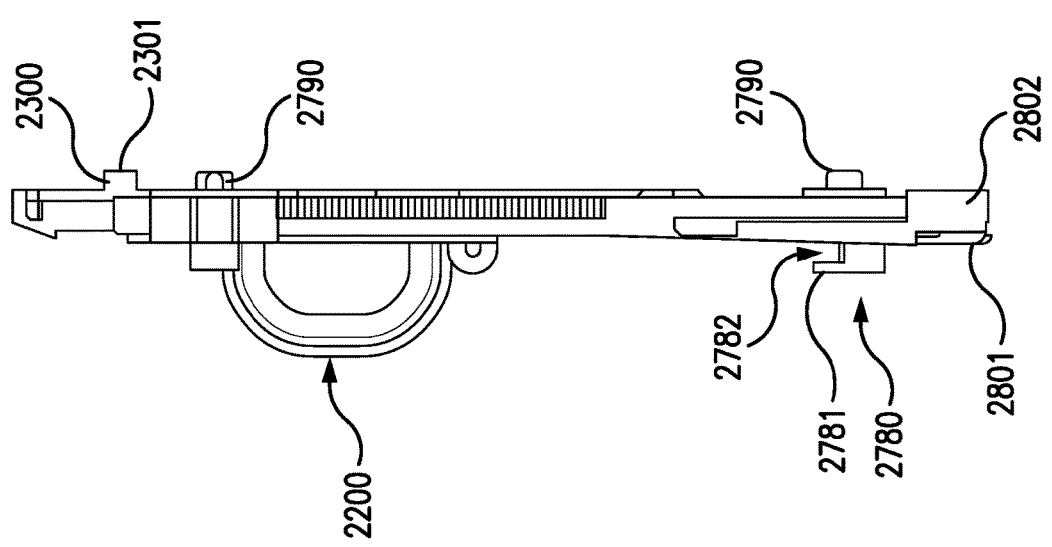

As shown in FIG. 63, the picture hanging device 2000 includes three markers 2780. Each arm 2500 includes a marker on the respective slide members 2700. Additionally, the main body portion 2100 includes a marker assembly 2780 at a lower central location above the storage drawer 2800. As shown in FIG. 65, the picture hanging device 2000 includes an anti-friction pad 2301 which is located on a projection 2300 which extends rearwardly from the main body portion 2100.

The picture hanging device 2000 of the present embodiment includes markers in a similar manner as the previous embodiment describing picture hanging device 2100. However, the marker assemblies 2780 of the present embodiment are constructed somewhat differently than the previous embodiment, as shown and described with reference to this exemplary embodiment. The marker assemblies 2780 include a marking hook 2781 at their front side. The marking hook 2781 includes a receiving space 2782 for a wire or the like. The marker assemblies 2780 further include a marker 2783 which is suitable for marking the wall 3500. In this case, the marker 2783 is made of metal and includes a point to make a mark on a wall 3500. However, other markers are possible, such as a marker that will produce an ink mark on the wall 3500. The marker can also be made of chalk or graphite to product the mark. In some embodiments, the marker can be replaceable and/or ink, chalk, graphite or other marking material of the marker can be replaceable. The marker can also be another hard material with a point that would make a mark on the wall 3500.

As shown in FIG. 70, the marker 2783 is surrounded by a sheath 2790. The sheath 2790 is biased towards the extended position shown in FIG. 70 by a spring 2784. Additionally, the sheath 2790 includes an opening 2791 sized and located for a tip end, such as the marker tip 2785 of the marker 2783 to protrude through the opening 2791 and mark a wall 3500. The marking hook 2781 and marker 2783 do not move relative to one another in order to expose the marker tip 2785. Instead, the sheath 2790 is movable relative to the rest of the picture hanging device 2000. Particularly, the sheath 2790 is biased by spring 2784 to the position of covering the marker end 2785, as shown in FIG. 70. When the picture hanging device 2000 is pressed towards the wall 3500, the sheath 2790 hits the wall 3500 and is compressed against the force of the spring 2784 to expose the marker end 2785. The sheath 2790 is shown in a compressed position in FIG. 71. As shown in FIG. 71, the marker end 2785 projects out of the opening 2791 and can mark a wall 3500 or other target surface.

In use, a user extends the arms 2500 to the extended positions shown in FIG. 64 and places the picture hanging device 2000 against a wall 3500. The user can adjust the location of the slide members 2700 along the arms 2500 as desired. As will be appreciated, the user can perform these steps in different orders. That is, a user can place the picture hanging device 2000 against the wall 3500 and then extend the arms 2500 or can extend one or more arms 2500 first and then place the picture hanging device 2000 against the wall 3500. Likewise, the slide members 2700 can be adjusted before or after the device is placed against the wall 3500. Once the slide members 2700 are slid to the appropriate positions and the picture hanging device 2000 is placed against the wall 3500, the user can use the picture hanging device 2000 to mark the wall 3500 with the marker assemblies 2780. In order to mark the wall 3500, the user pushes the picture hanging device 2000, particularly a lower portion of the picture hanging device 2000, towards the wall 3500. The lower portion of the hanging device 2000 can pivot around the projection 2300 with the friction pad 2301 so that the markers 2783 are moved closer to the wall 3500. As the markers are moved closer to the wall 3500, the sheath 2790 is moved by the wall 3500 in a direction of compressing the spring 2784. Accordingly, this exposes the marker end 2785 so that it can mark the wall 3500.

Figure 73:
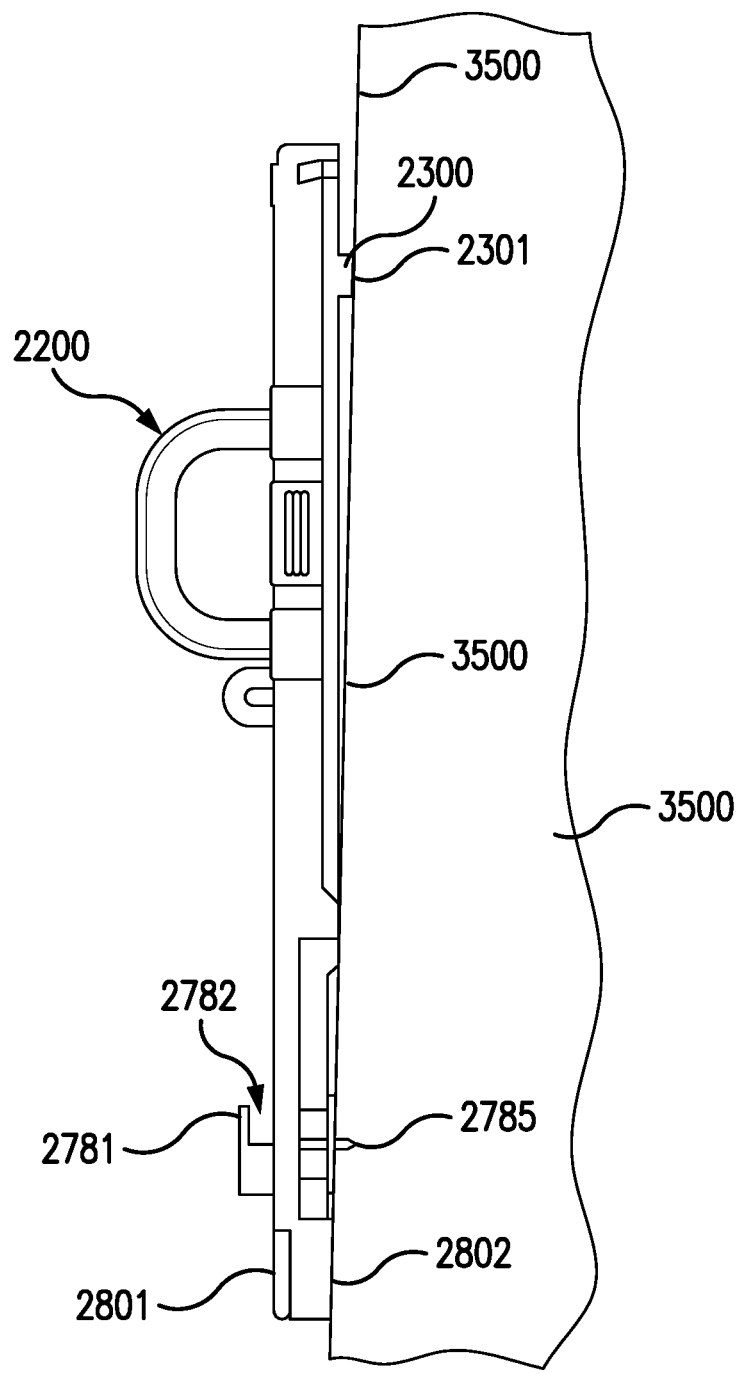

FIGS. 67 and 73 illustrate this operation of the picture hanging device 2000. Specifically, FIG. 67 illustrates the picture hanging device 2000 when the lower end of the picture hanging device is not pushed towards the wall 3500 and the sheath is covering the end 2785 of the marker 2783. FIG. 73 illustrates the picture hanging device 2000 in a marking condition where the lower end of the picture hanging device 2000 has been pushed towards the wall 3500. In FIG. 73, the sheath 2790 has been compressed to expose the end 2785 of the marker and the marker 2783 marks the wall 3500. The arms 2500 are removed in FIGS. 67 and 73 in order to illustrate the marking assembly 2780 located on the main body portion 2100. The remaining marking assemblies 2780 would work in a similar manner.

Figure 72:
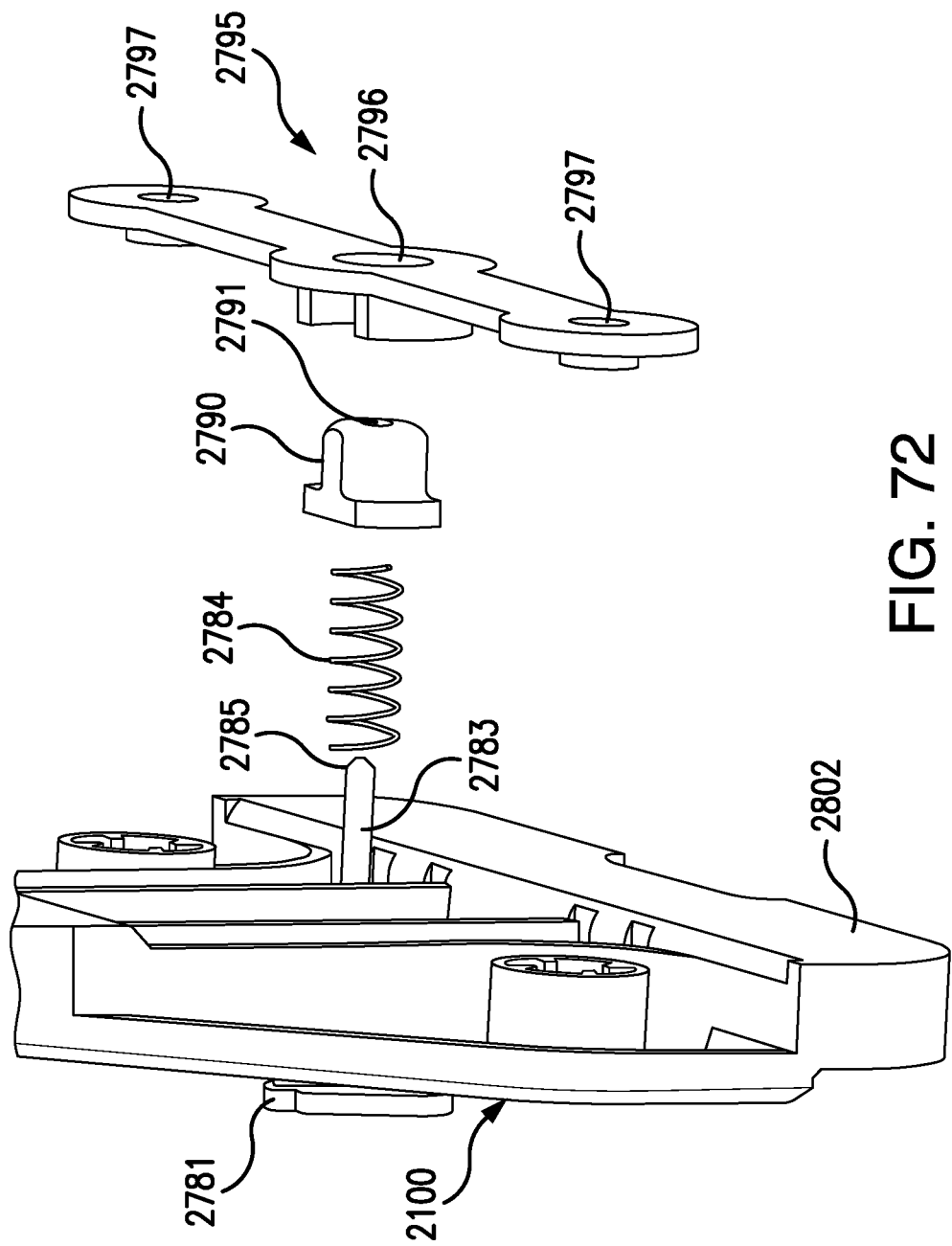

FIGS. 68 and 72 also illustrate a lock bar 2795 which is used to secure the sheath 2790 connected to the main body portion 2100 as well as to connect the arms 2500 to the main body portion. As shown in FIGS. 68 and 72, the lock bar 2795 includes a central portion 2796 through which the sheath 2790 can extend. The lock bar 2795 also includes side portions 2797. The side portions likewise are screwed into the main body portion 2100 to lock arms 2500 therebetween. The arms 2500 can be seen secured to the picture hanging device 2000 by the lock bar 2795 in FIGS. 65, 69, 70 and 71. The arms 2500 are removed in FIGS. 67, 68, 72, and 73 to provide clarity with respect to other parts of the picture hanging device 2000.

FIGS. 74-78 illustrate another embodiment of the picture hanging device, where like reference numerals are used to denote similar parts. The embodiment of FIGS. 74-78 is the same as that of FIGS. 63-73 unless otherwise noted. In the embodiment of FIGS. 74-78, the marker 2783 is not surrounded by a sheath 2790 which retracts. Instead, the marker 2783 is left free and leaf springs 2750 space the lower end of the picture hanging device from a wall 3500 to be marked. The leaf springs 2750 are included on each of the sliders 2700 and on the central body portion 2100.

Figure 74:
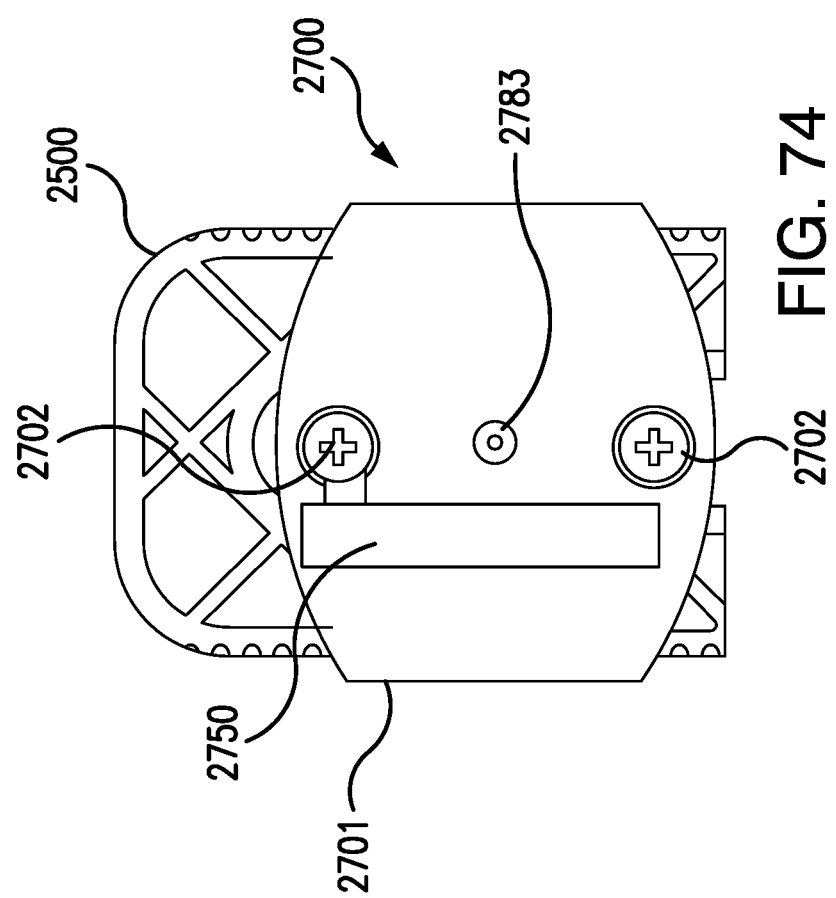

FIG. 74 shows an assembly of the leaf spring 2750 on one of the sliders 2700. As shown in FIG. 74, the slider has a back plate 2701 which faces a wall 3500 to be marked. The marker 2783 extends through the plate 2701. The back plate 2701 is secured by a pair of screws 2702 and one of these screws secures a leaf spring 2750 to slider 2700. FIG. 75 illustrate a leaf spring 2750 being secured to the central body portion 2100. As shown, the leaf spring 2750 is connected to the lock bar 2795 by a screw 2702. The leaf spring 2750 then travels adjacent to a marker 2783.

Operation of the picture hanging device including the leaf springs 2750 is shown with respect to FIGS. 76 and 77. FIG. 76 shows one of the arms 2500 when the leaf spring 2750 is in a relaxed position. The leaf spring 2750 serves to space the arm 2500 from the wall 3500 and prevent the marker 2783 from contacting the wall 3500. When a user presses the lower part of the picture hanging device against the wall 3500, the leaf spring 2750 compresses, as shown in FIG. 77. This allows the lower part of the picture hanging device, including the arms 2500 to move towards the wall 3500 and the marker 2783 to make a mark on the wall 3500. Accordingly, in use, a user can place the picture hanging device against a wall 3500. The leaf springs 2750 space the rest of the picture hanging device from the wall 3500. When the user is ready to mark the wall 3500, the user presses the picture hanging device (or the lower portion of the picture hanging device) against the wall 3500. This pressing force overcomes the force of the leaf springs 2750 and the picture hanging device moves towards the wall 3500 so that the markers 2783 will contact and make marks on the wall 3500.

FIG. 78 shows various parts of the picture hanging device of FIGS. 74-78 alone. As shown in those FIG. 78, the back plates 2701 include a leaf spring receiving portion 2708. The lock bar 2795 similarly includes a leaf spring receiving portion 2798. The leaf springs 2750 have a leaf spring connection portion 2751. In order to assemble the leaf spring 2750 to the picture hanging device, the leaf spring connection portion 2751 of the respective leaf springs 2750 are disposed in the leaf spring receiving portion 2708 for the back plate 2701 of slide member 2700 and the leaf spring receiving portion 2798 for the lock bar 2795. Then screws 2702 are inserted through the leaf spring connection portion 2751 and leaf spring receiving portions 2708 to secure the leaf springs 2750 in place. In the exemplary embodiment, there are three leaf springs 2750. One leaf spring 2750 on each of the slide member 2700 of the two arms 2500 and leaf spring 2750 on the central body portion 2100 secured at the lock bar 2795. There can be more or less leaf springs in various embodiments and they can be secured at different locations. Additionally, different springs or biasing members can be used in the embodiment of FIGS. 74-78. For example, a coil spring or a rubber member can be held by screws 2702. Also, elements from this embodiment can be combined with elements from the previously described embodiments of the picture hanging device.

The scope of this disclosure is to be broadly construed. It is intended that this disclosure discloses equivalents, means, systems and methods to achieve the devices, activities and mechanical actions disclosed herein. For each mechanical element or mechanism disclosed, it is intended that this disclosure also encompass in its disclosure and teaches equivalents, means, systems and methods for practicing the many aspects, mechanisms and devices disclosed herein. Additionally, this disclosure regards a stud finder, picture hanging device and picture hanging system, as well as its many aspects, features and elements. Such a stud finder, picture hanging device and picture hanging system can be dynamic in its use an operation, this disclosure is intended to encompass the equivalents, means, systems and methods of the use of the tool and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A marking device, comprising:
    a main body portion having a target side configured to be placed against a target surface and a user side configured to face a user;
    a first arm pivotably connected to the main body portion, the first arm including a first marker configured to mark the target surface; and
    a second arm pivotably connected to the main body portion, the second arm including a second marker configured to mark the target surface; and
    further comprising a first hook, the first hook being disposed on the user side adjacent to the first marker.

2. The marking device of claim 1, wherein said main body portion further comprises a third marker configured to mark the target surface.

3. The marking device of claim 1, wherein said main body portion further comprises and least one level indicator.

4. The marking device of claim 3, wherein the level indicator comprises a level bubble vial.

5. The marking device of claim 1, wherein the main body portion further comprises a sliding handle.

6. The marking device of claim 5, wherein the sliding handle is selectively movable and lockable along a length of the main body portion.

7. The marking device of claim 1, further comprising at least one biasing member which biases the first marker and the second marker away from the target surface and wherein the first marker and the second marker selectively mark the target surface when each of the first marker and the second marker is respectively pressed toward the target surface against the force of the at least one biasing member.

8. The marking device of claim 7, wherein the at least one biasing member comprises a first arm biasing member located on the first arm, a second arm biasing member located on the second arm and a main body biasing member located on the main body portion.

9. The marking device of claim 1, further comprising a second hook, the second hook being disposed on the user side adjacent to the second marker.

10. A marking device, comprising:
    a main body portion having a target side configured to be placed against a target surface and a user side configured to face a user;
    a first arm pivotably connected to the main body portion, the first arm including a first marker configured to mark the target surface; and
    a second arm pivotably connected to the main body portion, the second arm including a second marker configured to mark the target surface;
    wherein the first marker is disposed on a first slide member which is slidable along the first arm and wherein the second marker is disposed on a second slide member which is slidable along the second arm.

11. A marking device, comprising:
    a main body portion having a target side configured to be placed against a target surface and a user side configured to face a user;
    a first arm connected to the main body portion, the first arm having a first slide member which is slidable along a portion of the first arm;
    a second arm connected to the main body portion, the second arm having a second slide member which is slidable along a portion the second arm;
    a first marker disposed on the first slide member and configured to selectively mark the target surface;
    a second marker disposed on the second slide member and configured to selectively mark the target surface;
    a first hook disposed on the first slide member at a first location corresponding to the first marker; and
    a second hook disposed on the second slide member at a second location corresponding to the second marker.

12. The marking device of claim 11, wherein the marking device further comprises and least one level indicator.

13. The marking device of claim 11, further comprising a sliding handle selectively movable and lockable along a length of the main body portion.

14. The marking device of claim 11, further comprising at least one biasing member which biases the first marker and the second marker away from the target surface.

15. The marking device of claim 11, wherein the main body portion further comprises a sliding handle which is selectively movable and lockable along a length of the main body portion.

* * * * *